United States Patent
Enomura

(10) Patent No.: US 9,211,510 B2
(45) Date of Patent: *Dec. 15, 2015

(54) METHOD FOR PRODUCING NANOPARTICLES BY FORCED ULTRATHIN FILM ROTARY PROCESSING

(75) Inventor: Masakazu Enomura, Izumi (JP)

(73) Assignee: M. Technique Co., Ltd., Izumi-shi (JP)

( * ) Notice: Subject to any disclaimer, the term of this patent is extended or adjusted under 35 U.S.C. 154(b) by 1169 days.

This patent is subject to a terminal disclaimer.

(21) Appl. No.: 12/668,013

(22) PCT Filed: Jul. 4, 2008

(86) PCT No.: PCT/JP2008/062236
§ 371 (c)(1),
(2), (4) Date: Jan. 6, 2010

(87) PCT Pub. No.: WO2009/008393
PCT Pub. Date: Jan. 15, 2009

(65) Prior Publication Data
US 2010/0155310 A1 Jun. 24, 2010

(30) Foreign Application Priority Data

| Jul. 6, 2007 | (JP) | 2007-179098 |
| Jul. 6, 2007 | (JP) | 2007-179099 |
| Jul. 6, 2007 | (JP) | 2007-179100 |
| Jul. 6, 2007 | (JP) | 2007-179101 |
| Jul. 6, 2007 | (JP) | 2007-179102 |
| Jul. 6, 2007 | (JP) | 2007-179103 |
| Jul. 6, 2007 | (JP) | 2007-179104 |
| Jul. 9, 2007 | (JP) | 2007-180349 |
| Aug. 6, 2007 | (JP) | 2007-203850 |
| Aug. 9, 2007 | (JP) | 2007-207426 |
| Aug. 21, 2007 | (JP) | 2007-214821 |
| Sep. 10, 2007 | (JP) | 2007-233557 |

(51) Int. Cl.
| B01F 3/08 | (2006.01) |
| B01F 3/12 | (2006.01) |
| B01F 5/22 | (2006.01) |
| B01F 7/00 | (2006.01) |
| B22F 1/00 | (2006.01) |

(52) U.S. Cl.
CPC ............. *B01F 3/0807* (2013.01); *B01F 3/1221* (2013.01); *B01F 5/221* (2013.01); *B01F 7/00775* (2013.01); *B01F 7/00791* (2013.01); *B22F 1/0018* (2013.01)

(58) Field of Classification Search
CPC ............... B01F 3/0807; B01F 7/00791; B01F 7/00775; B01F 3/1221; B01F 5/221
USPC ........................................................ 516/21
See application file for complete search history.

(56) References Cited

U.S. PATENT DOCUMENTS 6,537,364 B2  3/2003 Dietz et al.
8,118,905 B2 * 2/2012 Enomura ...................... 75/343
(Continued)

FOREIGN PATENT DOCUMENTS

| JP | 57-42308 A | 3/1982 |
| JP | 7-144102 A | 6/1995 |

(Continued)

OTHER PUBLICATIONS

Machine Translation of Publ. No. JP 2004-160309 A, published Jun. 2004, Japan patent Office, Tokyo, Japan, obtained online @ http://dossier1.ipdl.inpit.go.jp/AIPN/odse_top_dn.ipdl?N0000=7400 (Downloaded Sep. 26, 2012), pp. 1-18.*

(Continued)

*Primary Examiner* — Daniel S Metzmaier
(74) *Attorney, Agent, or Firm* — Birch, Stewart, Kolasch & Birch, LLP

(57) ABSTRACT

The present invention provides a method for producing nanoparticles, which comprises maintaining a minute space of 1 mm or less between two processing surfaces capable of approaching to and separating from each other and being rotating relative to each other, allowing the minute space maintained between the two processing surfaces to serve as a flow path of a processed fluid thereby forming a forced thin film of the processed fluid and separating nanoparticles in the forced thin film.

20 Claims, 33 Drawing Sheets

(56) References Cited

U.S. PATENT DOCUMENTS

| | | | |
|---|---|---|---|
| 8,183,299 B2* | 5/2012 | Enomura | 516/78 |
| 8,222,301 B2* | 7/2012 | Enomura | 516/77 |
| 8,592,498 B2* | 11/2013 | Enomura | 522/3 |
| 8,747,699 B2* | 6/2014 | Enomura | 252/500 |
| 8,841,352 B2* | 9/2014 | Enomura | 516/22 |
| 8,889,885 B2* | 11/2014 | Enomura | 548/453 |
| 8,911,545 B2* | 12/2014 | Enomura | 106/31.6 |
| 9,005,567 B2* | 4/2015 | Kuraki et al. | 423/592.1 |
| 2004/0032792 A1 | 2/2004 | Enomura | |
| 2004/0191319 A1 | 9/2004 | Yun et al. | |
| 2004/0206275 A1 | 10/2004 | Shakhnovich | |
| 2006/0286015 A1 | 12/2006 | Holl | |
| 2010/0202960 A1* | 8/2010 | Enomura | 423/612 |
| 2010/0215958 A1* | 8/2010 | Enomura | 428/402 |
| 2010/0322997 A1* | 12/2010 | Enomura | 424/444 |
| 2010/0326321 A1* | 12/2010 | Enomura | 106/31.6 |
| 2010/0327236 A1* | 12/2010 | Enomura | 252/512 |
| 2011/0042626 A1* | 2/2011 | Enomura | 252/514 |

FOREIGN PATENT DOCUMENTS

| | | | |
|---|---|---|---|
| JP | 8-500289 A | | 1/1996 |
| JP | 2002-97281 A | | 4/2002 |
| JP | 2004-49957 A | | 2/2004 |
| JP | 2004-154635 A | | 6/2004 |
| JP | 2004-160309 A | * | 6/2004 |
| JP | 2004-174297 A | | 6/2004 |
| JP | 2004-211156 A | | 7/2004 |
| JP | 2005-313102 A | | 11/2005 |
| JP | 2006-247615 A | | 9/2006 |
| JP | 2006-249380 A | | 9/2006 |
| JP | 2006-341232 A | | 12/2006 |
| JP | 2007-8924 A | | 1/2007 |
| WO | WO 03/033097 A2 | | 4/2003 |
| WO | WO 2006/132443 A1 | | 12/2006 |

OTHER PUBLICATIONS

JPO on EAST, Patent Abstracts of Japan, Japan patent Office, Tokyo, Japan, JP 2004-160309 A (Jun. 2004), M. Technique Co, Ltd, Abstract, pp. 1-2.*

Derwent Abstract, week 199347, London: Derwent Publications Ltd., AN 2004-111477, US 20040032792 A1 / JP 2004049957 A, (M.Technique Co Ltd) abstract, pp. 1-6.*

Gerd Loebbert and Anand S. G. Sharangpani, "Pigment Dispersions", Kirk-Othmer Encyclopedia of Chemical Technology, (Published Online : Dec. 4, 2000), pp. 1-13, obtained online @ http://onlinelibrary.wiley.com/doi/10.1002/0471238961.1609071312150502.a01/pdf.*

Zhang et al., "Numerical simulation of flows in beadless disperser by finite difference lattice Boltzmann method", J. Coat. Technol. Res., 4 (1) 13-19, Mar. 2007.*

* cited by examiner

FIG. 2A
FIG. 2B
FIG. 2C
FIG. 2D
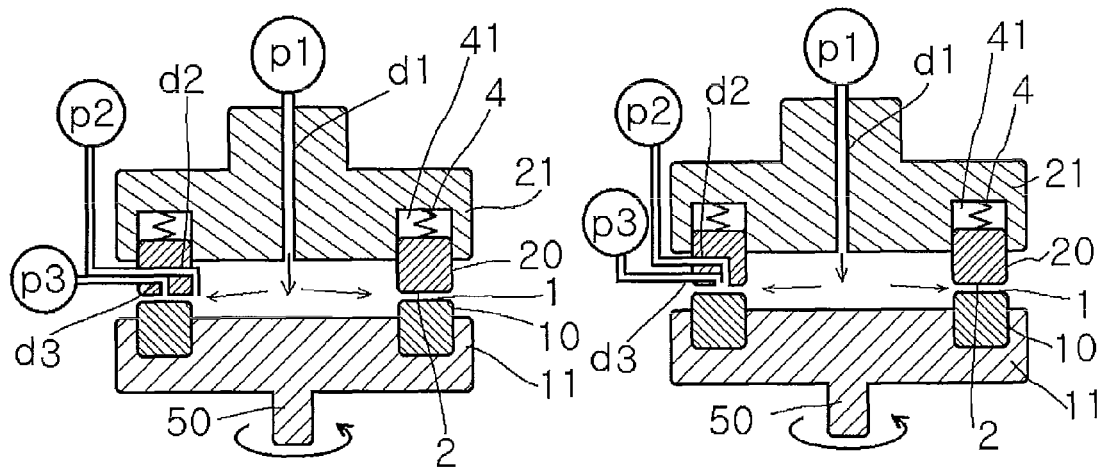
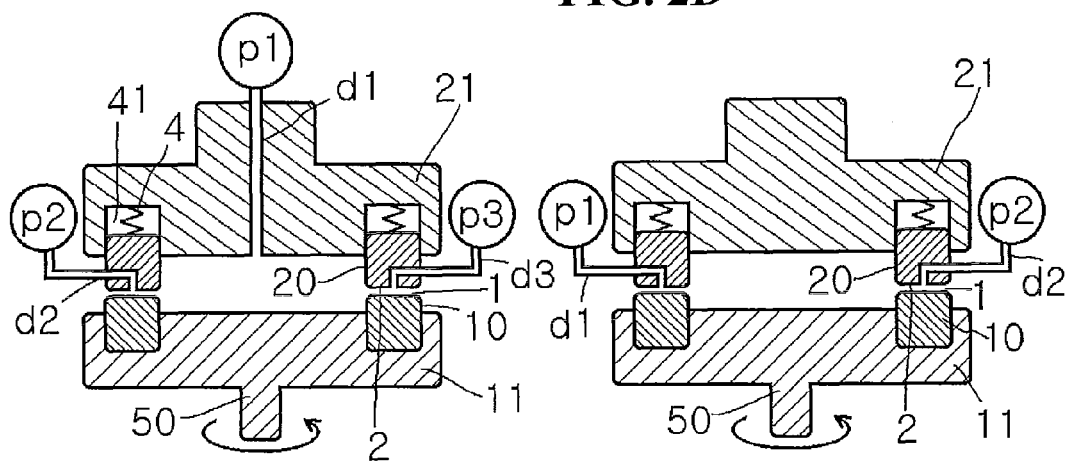

FIG. 30
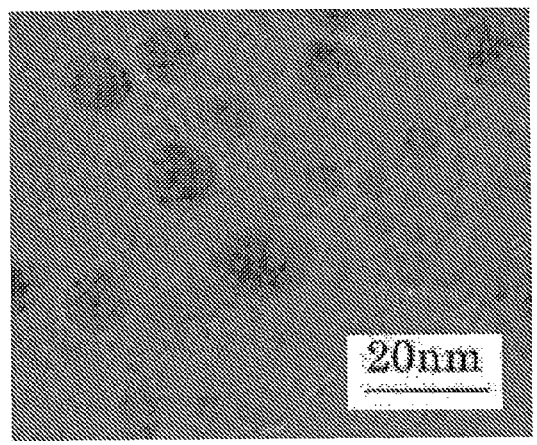
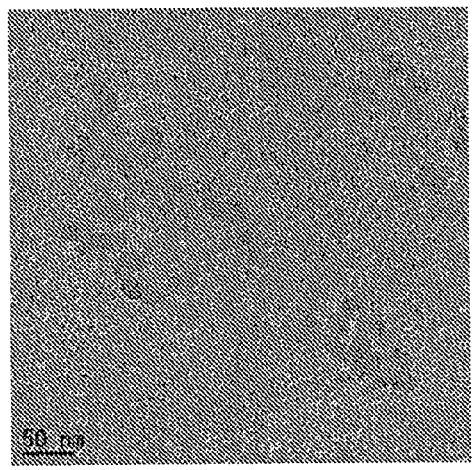
FIG. 31
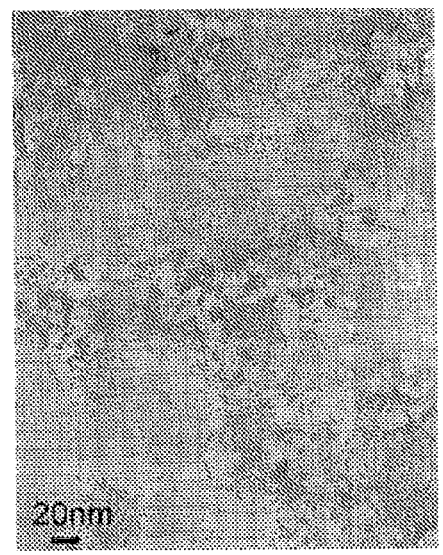
FIG. 32

FIG. 33
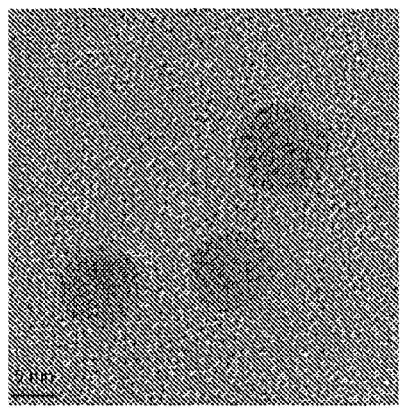
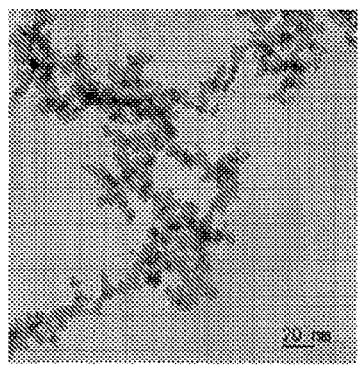
FIG. 34
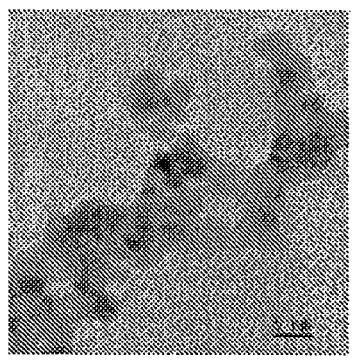
FIG. 35
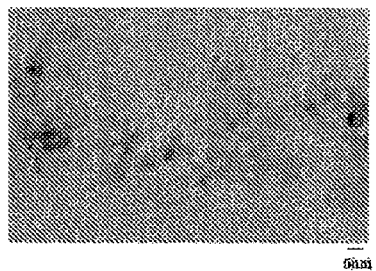
FIG. 36

FIG. 37
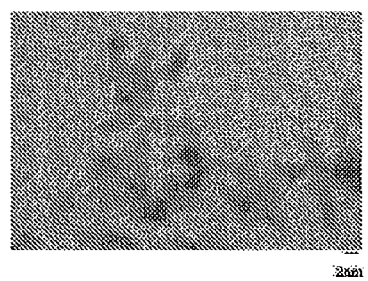
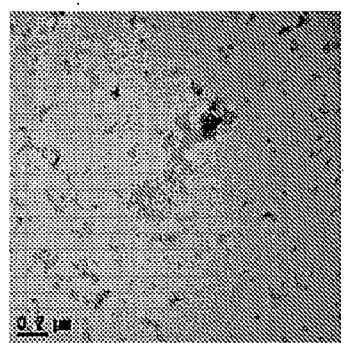
FIG. 38
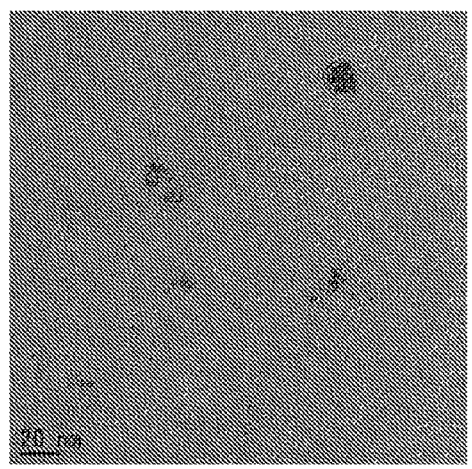
FIG. 39
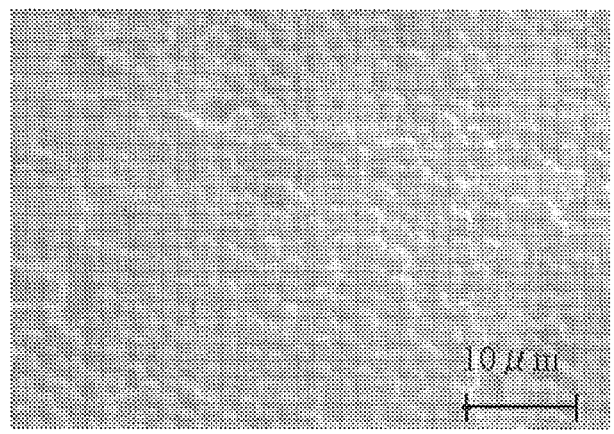
FIG. 40

– 1 –
METHOD FOR PRODUCING NANOPARTICLES BY FORCED ULTRATHIN FILM ROTARY PROCESSING

TECHNICAL FIELD

The present invention relates to a method for producing nanoparticles by processing a material to be processed between processing surfaces in processing members capable of approaching to and separate from each other, at least one of which rotates relative to the other.

BACKGROUND ART

Non-Patent Document 1: "Current Techniques of Nanomaterials" written by Mitsue Koizumi et al., first edition, CMC Publishing Co., Ltd., April, 2001

Non-Patent Document 2: "Nanotechnology Handbook, Part I, Creation", first edition, edited by Nanotechnology Handbook Editorial Committee, Ohmsha, Ltd., May, 2003

Patent Document 1: JP-A H07-144102
Patent Document 2: JP-A 2002-97281
Patent Document 3: JP-A 2007-8924
Patent Document 4: JP-A 2004-49957

Microparticles having a volume-average particle size of 1 µm or less in particle size distribution (referred to hereinafter as nanoparticles), particularly 100 nm or less nanoparticles, have a significantly high ratio of the surface area to volume of the particle, thus bringing about new characteristics, and thus nanomaterials such as nanoparticles themselves, their aggregates or organic-inorganic complexes are highly expected as materials in the 21st century (Non-Patent Document 1). That is, conventional materials can exhibit new functions by mere microparticulation, so the nanoparticles become an important theme in the industrial world, and the advance of nanotechnology is naturally inseparable from microparticles, particularly nanoparticles (Non-Patent Document 2).

Accordingly, a new method for producing microparticles has been desired. Further, it is the most important task in nanotechnology to establish a production method capable of stable large-production in order to utilize the method in industry.

As a method of preparing microparticles in liquid, there is a method of separating microparticles wherein a solution having a specific solute dissolved therein is stirred, while the difference in solubility of the solute in the solvent caused by temperature difference is utilized, as shown in Patent Document 1. This method utilizes the phenomenon that the solubility of the solute in the solvent at a predetermined temperature is decreased by decreasing the temperature of the solvent so that the solute in an amount over saturation solubility is separated. However, since this method uses a general-purpose iron pot having a Faudora vane, preparation of nano size particles is substantially difficult, and when separation of crystals is intended, it is difficult to make their crystal form uniform. Accordingly, a method of obtaining microparticles by dissolving an organic matter in an organic solvent and then pouring the resulting organic matter solution into a solvent in which the organic matter is lower soluble in the organic solvent is becoming popular as shown in Patent Document 2 wherein a good solvent in which a solute is highly soluble is mixed with a poor solvent in which the solute is low soluble, thereby decreasing the apparent solubility of the solute in the good solvent and separating the solute over saturation solubility to obtain microparticles. However, both the two methods described above are those separating a substance in a batch reaction container and a reaction iron pot, wherein stable production of microparticles of nano size or of uniform crystal form is extremely difficult. This is because, in the case of a separating reaction in a batch system generally using stirring operation, temperature gradient or concentration gradient and its accompanying disproportionation of a reaction site inevitably occur. Accordingly, temperature control and concentration control in a batch system are extremely difficult, thus inevitably a uniform reaction difficult. As a result, there arises necessity for prolongation of the reaction time, etc., to make control of all reaction conditions very difficult.

As shown in Patent Document 3, there is a method of obtaining microparticles by utilizing solubility difference with a micromixer or a microreactor. When the general microreactor is used, there are many advantages in the microdevice and system, but as the micro-flow path diameter is decreased, pressure loss is inversely proportional to the biquadrate of the flow path; that is, an extremely high feeding pressure becomes necessary thus making a pump for actually feeding a fluid hardly available. In addition, there are many problems; for example, a phenomena of clogging of a flow path with a product occurs when the reaction is accompanied by separation, a micro-flow path is clogged with bubbles generated by a reaction, a microscopic space is not effective or applicable to every reaction although the speed of molecular diffusion is fundamentally expected for the reaction. Actually, the reaction should be attempted by trial and error in order to select good results. Scaling up has been coped with a method of increasing the number of microreactors, but the number of microreactors which can be stuck is limited to several dozen, thus inherently aiming exclusively at products of high value, and the increase in the number of devices leads to an increase the absolute number of failure causes, and when the problem of clogging actually occurs, it can be very difficult to detect a problem site such as failure site.

DISCLOSURE OF INVENTION

An object of the present invention is to provide a method of separating nanoparticles by stirring and instantly uniform mixing plural kinds of fluids in a microscopic flow path, which is carried out on the basis of a microchemical process technology with a completely new concept that has solved tasks and problems of the conventional technology called "microchemical process technology", specifically by the principle of the apparatus shown in Patent Document 4 filed by the present applicant. In this apparatus utilizing the principle of mechanical seal, a microscopic distance between processing surfaces being capable of approaching to and separating from each other and being displaced relative to each other to form a forced thin film of a processed fluid to be supplied is realized by the balance between the supply pressure of the fluid supplied between the rotating processing surfaces and the pressure exerted between the rotating processing surfaces. Methods prior to the method based on the above principle are those that involve mechanically regulating the distance between the processing surfaces and cannot absorb heat generated by rotation and its accompanying deformation or run-out, thus making substantially impossible to reduce the minute space between the processing surfaces to 10 µm or less. That is, separation of nanoparticles by instant chemical/physicochemical reactions in a microscopic flow path can be realized by utilizing the principle of the apparatus in Patent Document 4 above, and as a result of the present inventor's extensive study, instant stirring/mixing/separation was made possible not only in a 1 mm or less flow path, but also surprisingly in a 0.1 to 10 µm microscopic flow path. And ideal separating conditions that can be essentially referred to as "microchemical process technology" can be created by the present invention. The object of the present invention is to produce nanoparticles by a new method of separating microparticles in a thin film fluid formed between processing surfaces arranged to be opposite to each other so as to be able to approach to and separate from each other, at least one of which rotates relative to the other.

To achieve the object, an aspect of the invention provides a method for producing nanoparticles, which comprises maintaining a minute space of 1 mm or less between two processing surfaces being capable of approaching to and separating from each other and rotating relative to each other, allowing the minute space maintained between the two processing surfaces to serve as a flow path of a fluid to be processed thereby forming a forced thin film of the processed fluid and separating nanoparticles in the forced thin film.

An aspect of the invention provides a method for producing nanoparticles, which comprises feeding plural kinds of fluids to be processed between two processing surfaces capable of approaching to and separating from each other and being displaced relative to each other, allowing the distance between the processing surfaces to be maintained in a minute space by the balance in pressure between a force in the approaching direction and a force in the separating direction, including the supply pressure of the fluids and the pressure exerted between the rotating processing surfaces, and allowing the minute space maintained between the two processing surfaces to serve as a flow path of the processed fluid, thereby forming a forced thin film of the processed fluid and separating nanoparticles in the forced thin film, wherein the plural kinds of the fluids are free of particles larger than the obtained nanoparticles.

An aspect of the invention provides the method for producing nanoparticles, wherein the processed fluid comprising plural kinds of fluids is stirred and mixed in the forced thin film between the two processing surfaces, thereby separating nanoparticles.

An aspect of the invention provides the method for producing nanoparticles, wherein the volume-average particle diameter in the particle size distribution of the obtained nanoparticles is 1 nm to 200 nm.

An aspect of the invention provides the method for producing nanoparticles, wherein the processed fluid containing nanoparticles after separation is further stirred in the forced thin film between the two processing surfaces and then discharged from the processing surfaces.

An aspect of the invention provides the method for producing nanoparticles, wherein in use of a forced ultrathin film rotary processing apparatus comprising a fluid pressure imparting mechanism that imparts pressure to a fluid to be processed, at least two processing members of a first processing member and a second processing member capable of approaching to and separating from the first processing member, and a rotation drive mechanism that rotates the first processing member and the second processing member relative to each other, wherein each of the processing members is provided with at least two processing surfaces of a first processing surface and a second processing surface disposed in a position where they are faced with each other, and the processing surfaces constitute part of a sealed flow path through which the pressurized processed fluid is passed; two or more kinds of processed fluids are uniformly mixed and separated between the processing surfaces, wherein at least the second processing member of the first and second processing members includes a pressure-receiving surface, and at least a part of the pressure-receiving surface is comprised of the second processing surface, wherein the pressure-receiving surface receives pressure applied to the processed fluid by the fluid pressure imparting mechanism and generates a moving force in the direction of separating the second processing surface from the first processing surface, and the two or more kinds of processed fluids are passed through the space between the first and second processing surfaces capable of approaching to and separating from each other and rotating relative to each other, whereby the processed fluid forms a fluid film of predetermined thickness and simultaneously pass through the space between the processing surfaces, to separate nanoparticles while the processed fluids are stirred and mixed in the forced thin film between the processing surfaces.

An aspect of the invention provides the method for producing nanoparticles, wherein the plural kinds of the fluids are free of particles larger than the obtained nanoparticles.

In the present invention, microscopic nanoparticles can be separated by reaction or the like of two or more processed fluids in the forced thin film under stirring/mixing. Out of the plurality of fluids, one or more processed fluids are mixed with another processed fluid in a space between the relative rotating processing surfaces, or they are introduced just before reaching the space between the processing surfaces and further previously kneaded until they reaches the space between the processing surfaces, and the processed fluids are subjected to stirring/mixing action in the forced thin film between the relatively rotating two processing surfaces, thereby realizing a desirable mixed state to realize an excellent separation effect. Particularly, none of the plurality of processed fluids contains particles larger than the obtained nanoparticles, and two or more processed fluids are reacted in the forced thin film under stirring/mixing, thereby separating microscopic nanoparticles, and by properly controlling the conditions, the nanoparticles of intended particle size can be obtained. In addition, the processed fluids are separated between the relatively rotating processing surfaces, thus the problem of clogging of the microscopic flow path with the product does not occur, and the continuous production becomes possible. Depending on the conditions, the separated nanoparticles may be subject to the action of stirring, dispersion, pulverization or the like between the relatively rotating processing surfaces.

BRIEF DESCRIPTION OF DRAWINGS

FIG. 2(A) to FIG. 2(D) each show a schematic vertical sectional view showing the concept of still another embodiment of the apparatus shown in FIG. 1.

FIG. 9(A) to FIG. 9(D) each show a schematic vertical sectional view showing the concept of still another embodiment of the apparatus shown in FIG. 1.

FIG. 29 is a diagram for explaining a pressure-receiving surface arranged in the processing member.

FIG. 30 is an electron micrograph of pigment nanoparticles.

FIG. 31 is an electron micrograph of pigment nanoparticles.

FIG. 32 is an electron micrograph of pigment nanoparticles.

FIG. 33 is a TEM photograph of silver particles.

FIG. 34 is a TEM photograph of platinum microparticles.

FIG. 35 is a TEM photograph of platinum microparticles.

FIG. 36 is a TEM photograph of platinum-palladium alloy microparticles.

FIG. 37 is a TEM photograph of platinum-palladium alloy microparticles.

FIG. 38 is a TEM photograph of nickel microparticles.

FIG. 39 is a TEM photograph of microparticles.

FIG. 40 is a microgram of an emulsion according to Example L1.

BEST MODE FOR CARRYING OUT THE INVENTION

An apparatus of the same principle as described in JP-A 2004-49957 filed by the present applicant, for example, can be used in the method of uniform stirring and mixing in a thin film fluid formed between processing surfaces arranged to be opposite to each other so as to be able to approach to and separate from each other, at least one of which rotates relative to the other.

Hereinafter, the fluid processing apparatus suitable for carrying out this method is described.

Figure 1A:
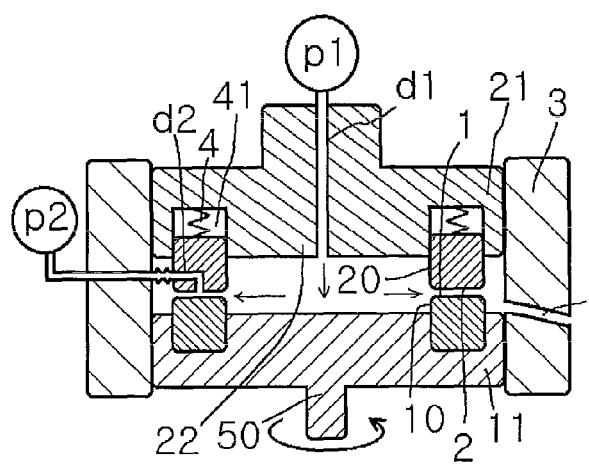
FIG. 1(A) is a schematic vertical sectional view showing the concept of the apparatus used for carrying out the present invention.

As shown in FIG. 1(A), this apparatus includes opposing first and second processing members 10 and 20, at least one of which rotates to the other. The opposing surfaces of both the processing members 10 and 20 serve as processing surfaces to process a fluid to be processed therebetween. The first processing member 1 includes a first processing surface 1, and the second processing member 20 includes a second processing surface 2.

Both the processing surfaces 1 and 2 are connected to a flow path of the fluid to constitute a part of the flow path of the fluid.

Specifically, this apparatus constitutes flow paths of at least two fluids to be processed and joins the flow paths together.

That is, this apparatus is connected to a flow path of a first fluid to form a part of the flow path of the first fluid and simultaneously forms a part of a flow path of a second fluid other than the first fluid. This apparatus joins both the flow paths together thereby mixing and reacting both the fluids between the processing surfaces 1 and 2. In the embodiment shown in FIG. 1(A), each of the flow paths is hermetically closed and made liquid-tight (when the processed fluid is a liquid) or air-tight (when the processed fluid is a gas).

Specifically, this apparatus as shown in FIG. 1(A) includes the first processing member 10, the second processing member 20, a first holder 11 for holding the first processing member 10, a second holder 21 for holding the second processing member 20, a surface-approaching pressure imparting mechanism 4, a rotation drive member, a first introduction part d1, a second introduction part d2, a fluid pressure imparting mechanism p1, a second fluid supply part p2, and a case 3.

Illustration of the rotation drive member is omitted.

At least one of the first processing member 10 and the second processing member 20 is able to approach to and separate from each other, and the processing surfaces 1 and 2 are able to approach to and separate from each other.

In this embodiment, the second processing member 20 approaches to and separates from the first processing member 10. On the contrary, the first processing member 10 may approach to and separate from the second processing member 20, or both the processing members 10 and 20 may approach to and separate from each other.

The second processing member 20 is disposed over the first processing member 10, and the lower surface of the second processing member 20 serves as the second processing surface 2, and the upper surface of the first processing member 10 serves as the first processing surface 1.

As shown in FIG. 1(A), the first processing member 10 and the second processing member 20 in this embodiment are circular bodies, that is, rings. Hereinafter, the first processing member 10 is referred to as a first ring 10, and the second processing member 20 as a second ring 20.

Both the rings 10 and 20 in this embodiment are metallic members having, at one end, a mirror-polished surface, respectively, and their mirror-polished surfaces are referred to as the first processing surface 1 and the second processing surface 2, respectively. That is, the upper surface of the first ring 10 is mirror-polished as the first processing surface 1, and the lower surface of the second ring is mirror-polished as the second processing surface 2.

At least one of the holders can rotate relative to the other holder by the rotation drive member. In FIG. 1(A), numerical 50 indicates a rotary shaft of the rotation drive member. The rotation drive member may use an electric motor. By the rotation drive member, the processing surface of one ring can rotate relative to the processing surface of the other ring.

In this embodiment, the first holder 11 receives drive power on the rotary shaft 50 from the rotation drive member and rotates relative to the second holder 21, whereby the first ring 10 integrated with the first holder 10 rotates relative to the second ring 20. Inside the first ring 10, the rotary shaft 50 is disposed in the first holder 11 so as to be concentric, in a plane, with the center of the circular first ring 10.

The first ring 10 rotates centering on the shaft center of the ring 10. The shaft center (not shown) is a virtual line referring to the central line of the ring 10.

In this embodiment as described above, the first holder 11 holds the first ring 10 such that the first processing surface 1 of the first ring 10 is directed upward, and the second holder 21 holds the second ring 20 such that the second processing surface 2 of the second ring 20 is directed downward.

Specifically, the first and second holders 11 and 21 include a ring-accepting concave part, respectively. In this embodiment, the first ring 11 is fitted in the ring-accepting part of the first holder 11, and the first ring 10 is fixed in the ring-accepting part so as not to rise from, and set in, the ring-accepting part of the first holder 11.

That is, the first processing surface 1 is exposed from the first holder 11 and faces the second holder 21.

Examples of the material for the first ring 10 include metal, ceramics, sintered metal, abrasion-resistant steel, metal subjected to hardening treatment, and rigid materials subjected to lining, coating or plating. The first processing member 10 is preferably formed of a lightweight material for rotation. A material for the second ring 20 may be the same as that for the first ring 10.

The ring-accepting part 41 arranged in the second holder 21 accepts the processing member 2 of the second ring 20 such that the processing member can rise and set.

The ring-accepting part 41 of the second holder 21 is a concave portion for mainly accepting that side of the second ring 20 opposite to the processing surface 2, and this concave portion is a groove which has been formed into a circle when viewed in a plane.

The ring-accepting part 41 is formed to be larger in size than the second ring 20 so as to accept the second ring 20 with sufficient clearance between itself and the second ring 20.

By this clearance, the second ring 20 in the ring-accepting part 41 can be displaced not only in the axial direction of the circular ring-accepting part 41 but also in a direction perpendicular to the axial direction. In other words, the second ring 20 can, by this clearance, be displaced relative to the ring-accepting part 41 to make the central line of the ring 20 unparallel to the axial direction of the ring-accepting part 41.

Hereinafter, that portion of the second holder 21 which is surrounded by the second ring 20 is referred to as a central portion 22.

In other words, the second ring 20 is displaceably accepted within the ring-accepting part 41 not only in the thrust direction of the ring-accepting part 41, that is, in the direction in which the ring 20 rises from and sets in the part 41, but also in the decentering direction of the ring 20 from the center of the ring-accepting part 41. Further, the second ring 20 is accepted in the ring-accepting part 41 such that the ring 20 can be displaced (i.e. run-out) to vary the width between itself upon rising or setting and the ring-accepting part 41, at each position in the circumferential direction of the ring 20.

The second ring 20, while maintaining the degree of its move in the above three directions, that is, the axial direction, decentering direction and run-out direction of the second ring 20 relative to the ring-accepting part 41, is held on the second holder 21 so as not to follow the rotation of the first ring 10. For this purpose, suitable unevenness (not shown) for regulating rotation in the circumferential direction of the ring-accepting part 41 may be arranged both in the ring-accepting part 41 and in the second ring 20. However, the unevenness should not deteriorate displacement in the degree of its move in the three directions.

The surface-approaching pressure imparting mechanism 4 supplies the processing members with force exerted in the direction of approaching the first processing surface 1 and the second processing surface 2 each other. In this embodiment, the surface-approaching pressure imparting mechanism 4 is disposed in the second holder 21 and biases the second ring 20 toward the first ring 10.

The surface-approaching pressure imparting mechanism 4 uniformly biases each position in the circumferential direction of the second ring 20, that is, each position of the processing surface 2, toward the first ring 10. A specific structure of the surface-approaching pressure imparting mechanism 4 will be described later.

As shown in FIG. 1(A), the case 3 is arranged outside the outer circumferential surfaces of both the rings 10 and 20, and accepts a product formed between the processing surfaces 1 and 2 and discharged to the outside of both the rings 10 and 20. As shown in FIG. 1(A), the case 3 is a liquid-tight container for accepting the first holder 10 and the second holder 20. However, the second holder 20 may be that which as a part of the case, is integrally formed with the case 3.

As described above, the second holder 21 whether formed as a part of the case 3 or formed separately from the case 3 is not movable so as to influence the distance between both the rings 10 and 20, that is, the distance between the processing surfaces 1 and 2. In other words, the second holder 21 does not influence the distance between the processing surfaces 1 and 2.

The case 3 is provided with an outlet 32 for discharging a product to the outside of the case 3.

The first introduction part d1 supplies a first fluid to the space between the processing surfaces 1 and 2.

The fluid pressure imparting mechanism p1 is connected directly or indirectly to the first introduction part d1 to impart fluid pressure to the first processed fluid. A compressor or a pump can be used in the fluid pressure imparting mechanism p1.

In this embodiment, the first introduction part d1 is a fluid path arranged inside the central part 22 of the second holder 21, and one end of the first introduction part d1 is open at the central position of a circle, when viewed in a plane, of the second ring 20 on the second holder 21. The other end of the first introduction part d1 is connected to the fluid pressure imparting mechanism p1 outside the second holder 20, that is, outside the case 3.

The second introduction part d2 supplies a second fluid to be reacted with the first fluid to the space between the processing surfaces 1 and 2. In this embodiment, the second introduction part is a fluid passage arranged inside the second ring 20, and one end of the second introduction part is open at the side of the second processing surface 2, and a second fluid-feeding part p2 is connected to the other end.

A compressor or a pump can be used in the second fluid-feeding part p2.

The first processed fluid pressurized with the fluid pressure imparting mechanism p1 is introduced from the first introduction part d1 to the space between the rings 10 and 20 and will pass through the space between the first processing surface 1 and the second processing surface 2 to the outside of the rings 10 and 20.

At this time, the second ring 20 receiving the supply pressure of the first fluid stands against the bias of the surface-approaching pressure imparting mechanism 4, thereby receding from the first ring 10 and making a minute space between the processing surfaces. The space between both the processing surfaces 1 and 2 by approach and separation of the surfaces 1 and 2 will be described in detail later.

A second fluid is supplied from the second introduction part d2 to the space between the processing surfaces 1 and 2, flows into the first fluid, and is subjected to a reaction promoted by rotation of the processing surface. Then, a reaction product formed by the reaction of both the fluids is discharged from the space between the processing surfaces 1 and 2 to the outside of the rings 10 and 20. The reaction product discharged to the outside of the rings 10 and 20 is discharged finally through the outlet of the case to the outside of the case.

The mixing and reaction of the processed fluid are effected between the first processing surface 1 and the second processing surface 2 by rotation, relative to the second processing member 20, of the first processing member 10 with the drive member 5.

Between the first and second processing surfaces 1 and 2, a region downstream from an opening m2 of the second introduction part d2 serves as a reaction chamber where the first and second processed fluids are reacted with each other. Specifically, as shown in FIG. 11(C) illustrating a bottom face of the second ring 20, a region H shown by oblique lines, outside the second opening m2 of the second introduction part in the radial direction r1 of the second ring 20, serves as the processing chamber, that is, the reaction chamber. Accordingly, this reaction chamber is located downstream from the openings m1 and m2 of the first introduction part d1 and the second introduction part d2 between the processing surfaces 1 and 2.

The first fluid introduced from the first opening m1 through a space inside the ring into the space between the processing surfaces 1 and 2, and the second fluid introduced from the second opening m2 into the space between the processing surfaces 1 and 2, are mixed with each other in the region H serving as the reaction chamber, and both the processed fluids are reacted with each other. The fluid will, upon receiving supply pressure from the fluid pressure imparting mechanism p1, move through the minute space between the processing surfaces 1 and 2 to the outside of the rings, but because of rotation of the first ring 10, the fluid mixed in the reaction region H does not move linearly from the inside to the outside of the rings in the radial direction, but moves from the inside to the outside of the ring spirally around the rotary shaft of the ring when the processing surfaces are viewed in a plane. In the region H where the fluids are thus mixed and reacted, the fluids can move spirally from inside to outside to secure a zone necessary for sufficient reaction in the minute space between the processing surfaces 1 and 2, thereby promoting their uniform reaction.

The product formed by the reaction becomes a uniform reaction product in the minute space between the first processing surface 1 and the second processing surface 2 and appears as microparticles particularly in the case of crystallization or separation.

By the balance among at least the supply pressure applied by the fluid pressure imparting mechanism p1, the bias of the surface-approaching pressure imparting mechanism 4, and the centrifugal force resulting from rotation of the ring, the distance between the processing surfaces 1 and 2 can be balanced to attain a preferable minute space, and further the processed fluid receiving the supply pressure applied by the fluid pressure imparting mechanism p1 and the centrifugal force by rotation of the ring moves spirally in the minute space between the processing surfaces 1 and 2, so that their reaction is promoted.

The reaction is forcedly effected by the supply pressure applied by the fluid pressure imparting mechanism p1 and the rotation of the ring. That is, the reaction occurs under forced uniform mixing between the processing surfaces 1 and 2 arranged opposite to each other so as to be able to approach to and separate from each other, at least one of which rotates relative to the other.

Accordingly, the crystallization and separation of the product formed by the reaction can be regulated by relatively easily controllable methods such as regulation of supply pressure applied by the fluid pressure imparting mechanism p1 and regulation of the rotating speed of the ring, that is, the number of revolutions of the ring.

As described above, this processing apparatus is excellent in that the space between the processing surfaces 1 and 2, which can exert influence on the size of a product, and the distance in which the processed fluid moves in the reaction region H, which can exert influence on production of a uniform product, can be regulated by the supply pressure and the centrifugal force.

The reaction processing gives not only deposit of the product but also liquids.

The rotary shaft 50 is not limited to the vertically arranged one and may be arranged in the horizontal direction or arranged at a slant. This is because during processing, the reaction occurs in such a minute space between the processing surfaces 1 and 2 that the influence of gravity can be substantially eliminated.

In FIG. 1(A), the first introduction part d1 extends vertically and coincides with the shaft center of the second ring 20 in the second holder 21. However, the first introduction part d1 is not limited to the one having a center coinciding with the shaft center of the second ring 20 and may be arranged in other positions in the central portion 22 of the second holder 21 as long as the first fluid can be supplied into the space surrounded by the rings 10 and 20, and the first introduction part d1 may extend obliquely as well as vertically.

Figure 12A:
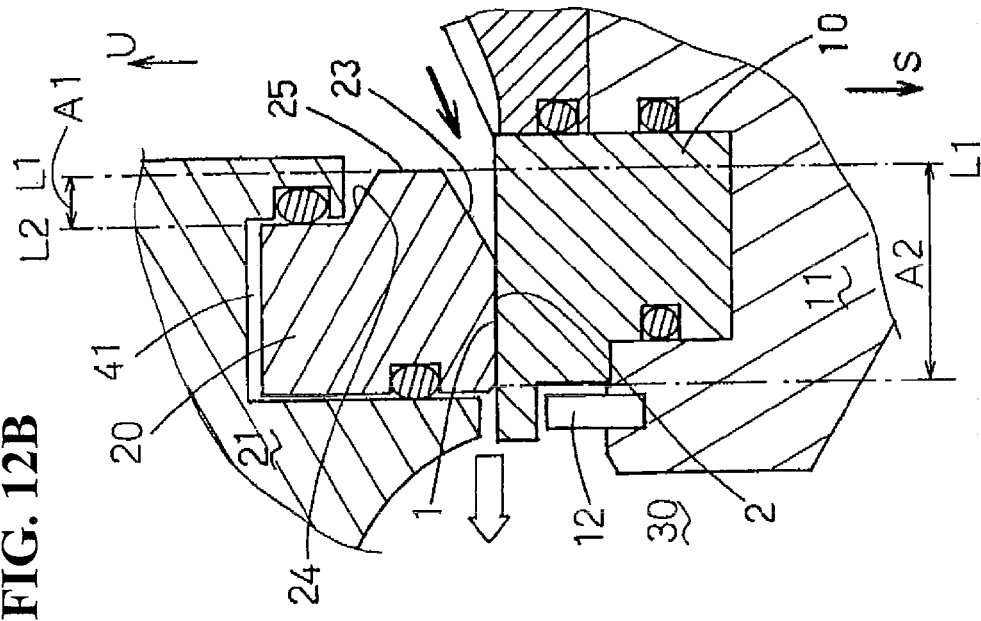
FIG. 12(A) is a schematic vertical sectional view showing an important part of another embodiment of a pressure-receiving surface in the apparatus shown in FIG. 1(A)

A more preferable embodiment of the apparatus is shown in FIG. 12(A). As shown in this figure, the second processing member 20 has the second processing surface 2 and a pressure-receiving surface 23 which is positioned inside, and situated next to, the second processing surface 2. Hereinafter, the pressure-receiving surface 23 is also referred to as a separation-regulating surface 23. As shown in the figure, the separation-regulating surface 23 is an inclined surface.

As described above, the ring-accepting part 41 is formed in the bottom (i.e. a lower part) of the second holder 21, and the second processing member 20 is accepted in the ring-accepting part 41. The second processing member 20 is held by the second holder 21 so as not to be rotated with a baffle (not shown). The second processing surface 2 is exposed from the second holder 21.

In this embodiment, a material to be processed is introduced inside the first processing member 10 and the second processing member 20 between the processing surfaces 1 and 2, and the processed material is discharged to the outside of the first processing member 10 and the second processing member 20.

The surface-approaching pressure imparting mechanism 4 presses by pressure the second processing surface 2 against the first processing surface 1 to make them contacted with or close to each other, and generates a fluid film of predetermined thickness by the balance between the surface-approaching pressure and the force, e.g. fluid pressure, of separating the processing surfaces 1 and 2 from each other. In other words, the distance between the processing surfaces 1 and 2 is kept in a predetermined minute space by the balance between the forces.

Specifically, the surface-approaching pressure imparting mechanism 4 in this embodiment is comprised of the ring-accepting part 41, a spring-accepting part 42 arranged in the depth of the ring-accepting part 41, that is, in the deepest part of the ring-accepting part 41, a spring 43, and an air introduction part 44.

However, the surface-approaching pressure imparting mechanism 4 may be the one including at least one member selected from the ring-accepting part 41, the spring-accepting part 42, the spring 43, and the air introduction part 44.

The ring-accepting part 41 has the second processing member 20 fit into it with play to enable the second processing member 20 to be displaced vertically deeply or shallowly, that is, vertically in the ring-accepting part 41.

One end of the spring 43 is abutted against the depth of the spring-accepting part 42, and the other end of the spring 43 is abutted against the front (i.e., the upper part) of the second processing member 20 in the ring-accepting part 41. In FIG. 1, only one spring 43 is shown, but a plurality of springs 44 are preferably used to press various parts of the second processing member 20. This is because as the number of springs 43 increases, pressing pressure can be given more uniformly to the second processing member 20. Accordingly, several to a few dozen springs 43 comprising a multi-spring type preferably attach to the second holder 21.

In this embodiment, air can be introduced through the air introduction part 44 into the ring-accepting part 41. By such introduction of air, air pressure together with pressure by the spring 43 can be given as pressing pressure from the space, as a pressurizing chamber, between the ring-accepting part 41 and the second processing member 20 to the second processing member 20. Accordingly, adjusting the pressure of air introduced through the air introduction part 44 can regulate the surface-approaching pressure of the second processing surface 2 toward the first processing surface 1 during operation. A mechanism of generating pressing pressure with another fluid pressure such as oil pressure can be utilized in place of the air introduction part 44 utilizing air pressure.

The surface-approaching pressure imparting mechanism 4 not only supplies and regulates a part of the pressing pressure, that is, the surface-approaching pressure, but also serves as a displacement regulating mechanism and a buffer mechanism.

Specifically, the surface-approaching pressure imparting mechanism 4 as a displacement regulating mechanism can maintain initial pressing pressure by regulating air pressure against the change in the axial direction caused by elongation or abrasion at the start of or in the operation. As described above, the surface-approaching pressure imparting mechanism 4 uses a floating mechanism of maintaining the second processing member 20 so as to be displaced, thereby also functioning as a buffer mechanism for micro-vibration or rotation alignment.

Now, the state of the thus constituted processing apparatus during use is described with reference to FIG. 1(A).

At the outset, a first fluid to be processed is pressurized with the fluid pressure imparting mechanism p1 and introduced through the first introduction part d1 into the internal space of the sealed case. On the other hand, the first processing member 10 is rotated with the rotation of the rotary shaft 50 by the rotation drive member. The first processing surface 1 and the second processing surface 2 are thereby rotated relatively with a minute space kept therebetween.

The first processed fluid is formed into a fluid film between the processing surfaces 1 and 2 with a minute space kept therebetween, and a second fluid to be processed which is introduced through the second introduction part d2 flows into the fluid film between the processing surfaces 1 and 2 to comprise a part of the fluid film. By this, the first and second processed fluids are mixed with each other, and a uniform reaction of both of the fluids being reacted with each other is promoted to form a reaction product. When the reaction is accompanied by separation, relatively uniform and fine particles can be formed. Even when the reaction is not accompanied by separation, a uniform reaction can be realized. The separated reaction product may be further finely pulverized by shearing between the first processing surface 1 and the second processing surface 2 with the rotation of the first processing surface 1. The first processing surface 1 and the second processing surface 2 are regulated to form a minute space of 1 μm to 1 mm, particularly 1 μm to 10 μm, thereby realizing a uniform reaction and enabling production of superfine particles of several nm in diameter.

The product is discharged from the processing surfaces 1 and 2 through an outlet 33 of the case 3 to the outside of the case. The discharged product is atomized in a vacuum or depressurized atmosphere with a well-known decompression device and converted into liquid in the atmosphere to collide with each other, then what trickled down in the liquid is able to be collected as degassed liquid.

In this embodiment, the processing apparatus is provided with a case, but may be carried out without a case. For example, a decompression tank for degassing, that is, a vacuum tank, is arranged, and the processing apparatus may be arranged in this tank. In this case, the outlet mentioned above is naturally not arranged in the processing apparatus.

As described above, the first processing surface 1 and the second processing surface 2 can be regulated to form a minute space in the order of μm which cannot be formed by arranging mechanical clearance. Now, this mechanism is described.

The first processing surface 1 and the second processing surface 2 are capable of approaching to and separating from each other, and simultaneously rotate relative to each other. In this example, the first processing surface 1 rotates, and the second processing surface 2 slides in the axial direction thereby approaching to and separating from the first processing surface.

In this example, therefore, the position of the second processing surface 2 in the axial direction is arranged accurately in the order of μm by the balance between forces, that is, the balance between the surface-approaching pressure and the separating pressure, thereby establishing a minute space between the processing surfaces 1 and 2.

As shown in FIG. 12(A), the surface-approaching pressure includes the pressure by air pressure (positive pressure) from the air introduction part 44 by the surface-approaching pressure imparting mechanism 4, the pressing pressure with the spring 43, and the like.

Figure 13:
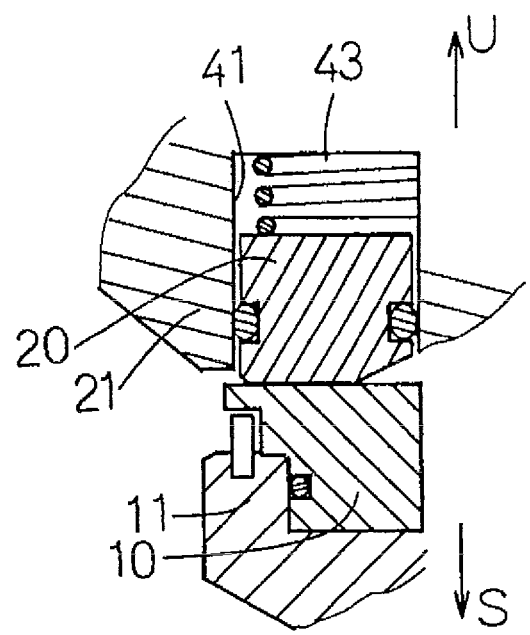
FIG. 13 is a schematic vertical sectional view showing an important part of another embodiment of a surface-approaching pressure imparting mechanism 4 in the apparatus shown in FIG. 12(A).
Figure 14:
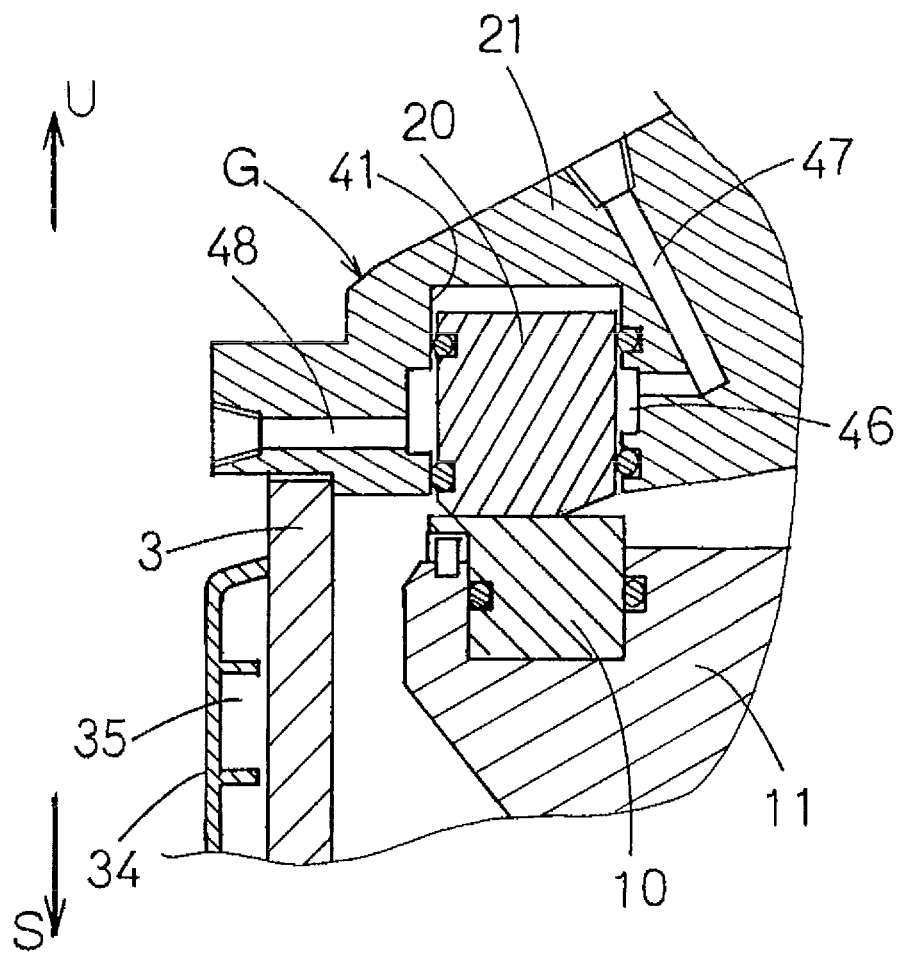
FIG. 14 is a schematic vertical sectional view showing an important part of another embodiment of the apparatus shown in FIG. 12(A), which is provided with a temperature regulating jacket.
Figure 15:
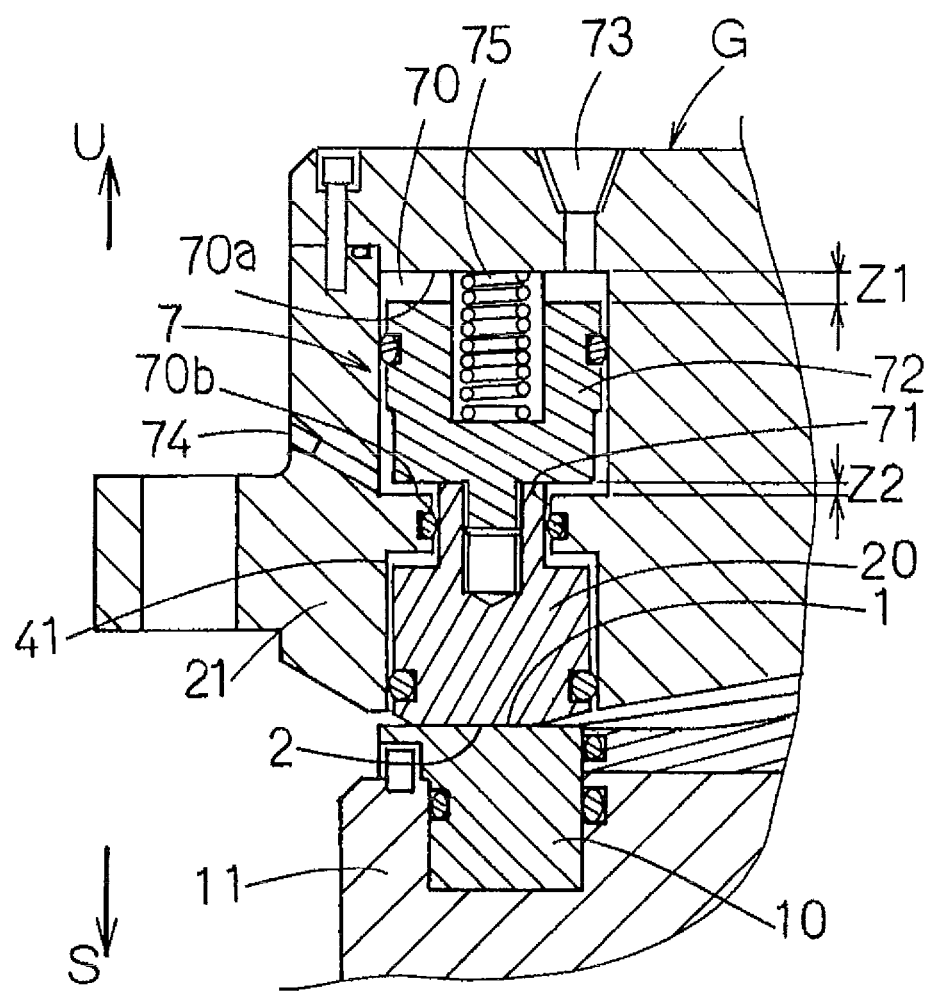
FIG. 15 is a schematic vertical sectional view showing an important part of still another embodiment of the surface-approaching pressure imparting mechanism 4 in the apparatus shown in FIG. 12(A).

The embodiments shown in FIG. 13 to FIG. 15 are shown by omitting the second introduction part d2 to simplify the drawings. In this respect, these drawings may be assumed to show sections at a position not provided with the second introduction part d2. In the figures, U and S show upward and downward directions respectively.

On the other hand, the separating force include the fluid pressure acting on the pressure-receiving surface at the separating side, that is, on the second processing surface 2 and the separation regulating surface 23, the centrifugal force resulting from rotation of the first processing member 1, and the negative pressure when negative pressure is applied to the air introduction part 44.

When the apparatus is washed, the negative pressure applied to the air introduction part 44 can be increased to significantly separate the processing surfaces 1 and 2 from each other, thereby facilitating washing.

By the balance among these forces, the second processing surface 2 while being remote by a predetermined minute space from the first processing surface 1 is stabilized, thereby realizing establishment with accuracy in the order of μm.

The separating force is described in more detail.

With respect to fluid pressure, the second processing member 20 in a closed flow path receives feeding pressure of a processed fluid, that is, fluid pressure, from the fluid pressure imparting mechanism p. In this case, the surfaces opposite to the first processing surface in the flow path, that is, the second processing surface 2 and the separation regulating surface 23, act as pressure-receiving surfaces at the separating side, and the fluid pressure is applied to the pressure-receiving surfaces to generate a separating force due to the fluid pressure.

With respect to centrifugal force, the first processing member 10 is rotated at high speed, centrifugal force is applied to the fluid, and a part of this centrifugal force acts as separating force in the direction in which the processing surfaces 1 and 2 are separated from each other.

When negative pressure is applied from the air introduction part 44 to the second processing member 20, the negative pressure acts as separating force.

In the foregoing description of the present invention, the force of separating the first and second processing surfaces 1 and 2 from each other has been described as a separating force, and the above-mentioned force is not excluded from the separating force.

By forming a balanced state of the separating force and the surface-approaching pressure applied by the surface-approaching pressure imparting mechanism 4 via the processed fluid between the processing surfaces 1 and 2 in the flow path of the closed processed fluid, a uniform reaction is realized between the processing surfaces 1 and 2, and simultaneously a fluid film suitable for crystallization and separation of microscopic reaction products is formed as described above. In this manner, this apparatus can form a forced fluid film between the processing surfaces 1 and 2 via which a minute space not achievable with a conventional mechanical apparatus can be kept between the processing surfaces 1 and 2, and microparticles can be formed highly accurately as the reaction product.

In other words, the thickness of the fluid film between the processing surfaces 1 and 2 is regulated as desired by regulating the separating force and surface-approaching pressure, thereby realizing a necessary uniform reaction to form and process microscopic products. Accordingly, when the thickness of the fluid film is to be decreased, the surface-approaching pressure or separating force may be regulated such that the surface-approaching pressure is made relatively higher than the separating force. When the thickness of the fluid film is to be increased, the separating force or surface-approaching pressure may be regulated such that the separating force is made relatively higher than the surface-approaching pressure.

When the surface-approaching pressure is increased, air pressure, that is, positive pressure is applied from the air introduction part 44 by the surface-approaching pressure imparting mechanism 4, or the spring 43 is changed to the one having higher pressing pressure, or the number of springs may be increased.

When the separating force is to be increased, the feeding pressure of the fluid pressure imparting mechanism p1 is increased, or the area of the second processing surface 2 or the separation regulating surface 23 is increased, or in addition, the rotation of the second processing member 20 is regulated to increase centrifugal force or reduce pressure from the air introduction part 44. Alternatively, negative pressure may be applied. The spring 43 shown is a pressing spring that generates pressing pressure in an extending direction, but may be a pulling spring that generates a force in a compressing direction to constitute a part or the whole of the surface-approaching pressure imparting mechanism 4.

When the separating force is to be decreased, the feeding pressure of the fluid pressure imparting mechanism p1 is reduced, or the area of the second processing surface 2 or the separation regulating surface 23 is reduced, or in addition, the rotation of the second processing member 20 is regulated to decrease centrifugal force or increase pressure from the air introduction part 44. Alternatively, negative pressure may be reduced.

Further, properties of a processed fluid, such as viscosity, can be added as a factor for increasing or decreasing the surface-approaching pressure and separating force, and regulation of such properties of a processed fluid can be performed as regulation of the above factor.

In the separating force, the fluid pressure exerted on the pressure-receiving surface at the separating side, that is, the second processing surface 2 and the separation regulating surface 23 is understood as a force constituting an opening force in mechanical seal.

In the mechanical seal, the second processing member 20 corresponds to a compression ring, and when fluid pressure is applied to the second processing member 20, the force of separating the second processing member 20 from the first processing member 10 is regarded as opening force.

More specifically, when the pressure-receiving surfaces at a separating side, that is, the second processing surface 2 and the separation regulating surface 23 only are arranged in the second processing member 20 as shown in the first embodiment, all feeding pressure constitutes the opening force. When a pressure-receiving surface is also arranged at the backside of the second processing member 20, specifically in the case of FIG. 12(B) and FIG. 17 described later, the difference between the feeding pressure acting as a separating force and the feeding pressure acting as surface-approaching pressure is the opening force.

Now, other embodiments of the second processing member 20 are described with reference to FIG. 12(B).

Figure 12B:
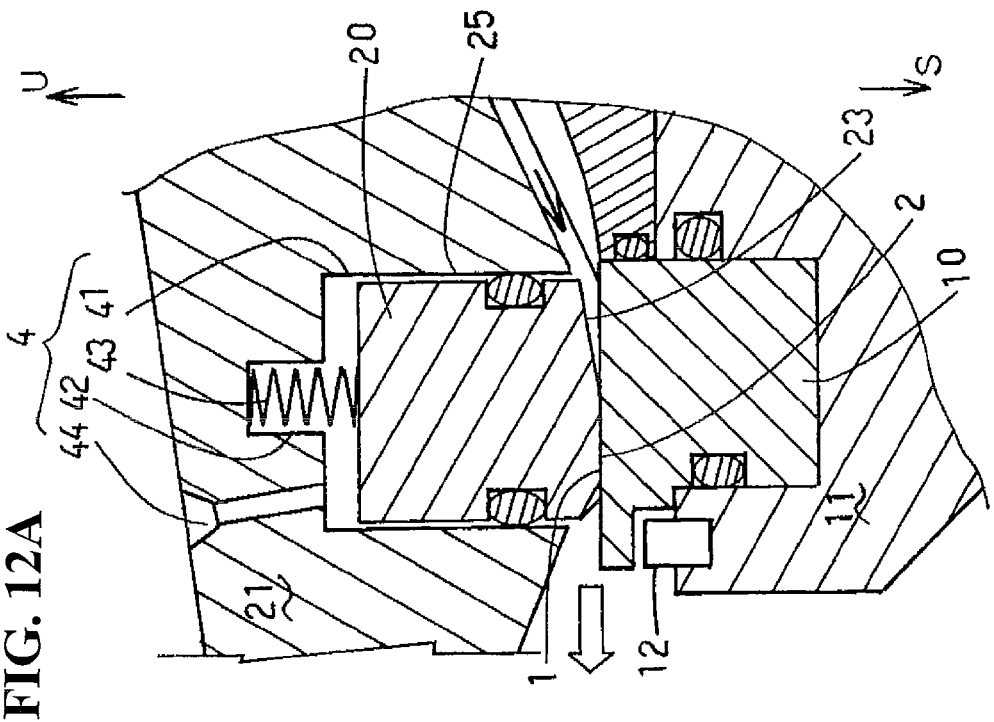
FIG. 12(B) is a schematic vertical sectional view showing an important part of still another embodiment of the apparatus.

As shown in FIG. 12(B), an approach regulating surface 24 facing upward, that is, at the other side of the second processing surface 2, is disposed at the inner periphery of the second processing member 20 exposed from the ring-accepting part 41.

That is, the surface-approaching pressure imparting mechanism 4 in this embodiment is comprised of a ring-accepting part 41, an air introduction part 44, and the approach regulating surface 24. However, the surface-approaching pressure imparting mechanism 4 may be one including at least one member selected from the ring-accepting part 41, the spring-accepting part 42, the spring 43, the air introduction part 44, and the approach regulating surface 24.

The approach regulating surface 24 receives predetermined pressure applied to a processed fluid to generate a force of approaching the second processing surface 2 to the first processing surface 1, thereby functioning in feeding surface-approaching pressure as a part of the surface-approaching pressure imparting mechanism 4. On the other hand, the second processing surface 2 and the separation regulating surface 23 receive predetermined pressure applied to a processed fluid to generate a force of separating the second processing surface 2 from the first processing surface 1, thereby functioning in feeding a part of the separating force.

The approach regulating surface 24, the second processing surface 2 and the separation regulating surface 23 are pressure-receiving surfaces receiving feeding pressure of the processed fluid, and depending on its direction, exhibits different actions, that is, generation of the surface-approaching pressure and generation of a separating force.

The ratio (area ratio A1/A2) of a projected area A1 of the approach regulating surface 24 projected on a virtual plane perpendicular to the direction of approaching and separating the processing surfaces, that is, in the direction of rising and setting of the second ring 20, to a total area A2 of the projected area of the second processing surface 2 and the separating side pressure-receiving area 23 of the second processing member 20 projected on the virtual plane is called balance ratio K which is important for regulation of the opening force.

Both the top of the approach regulating surface 24 and the top of the separating side pressure-receiving surface 23 are defined by the inner periphery 25 of the circular second regulating part 20, that is, by top line L1. Accordingly, the balance ratio is regulated for deciding the place where base line L2 of the approach regulating surface 24 is to be placed.

That is, in this embodiment, when the feeding pressure of the processed fluid is utilized as opening force, the total projected area of the second processing surface 2 and the separation regulating surface 23 is made larger than the projected area of the approach regulating surface 24, thereby generating an opening force in accordance with the area ratio.

The opening force can be regulated by the pressure of the processed fluid, that is, the fluid pressure, by changing the balance line, that is, by changing the area A1 of the approach regulating surface 24.

Sliding surface actual surface pressure P, that is, the fluid pressure out of the surface-approaching pressure, is calculated according to the following equation:

$$P = P1 \times (K-k) + Ps$$

wherein P1 represents the pressure of a processed fluid, that is, fluid pressure; K represents the balance ratio; k represents an opening force coefficient; and Ps represents a spring and back pressure.

By regulating this balance line to regulate the sliding surface actual surface pressure P, the space between the processing surfaces 1 and 2 is formed as a desired minute space, thereby forming a fluid film of a processed fluid to make the product minute and effecting uniform reaction processing.

Usually, as the thickness of a fluid film between the processing surfaces 1 and 2 is decreased, the product can be made finer. On the other hand, as the thickness of the fluid film is increased, processing becomes rough and the throughput per unit time is increased. By regulating the sliding surface actual surface pressure P on the sliding surface, the space between the processing surfaces 1 and 2 can be regulated to realize the desired uniform reaction and to obtain the minute product. Hereinafter, the sliding surface actual surface pressure P is referred to as surface pressure P.

From this relation, it is concluded that when the product is to be made coarse, the balance ratio may be decreased, the surface pressure P may be decreased, the space may be increased and the thickness of the film may be increased. On the other hand, when the product is to be made finer, the balance ratio may be increased, the surface pressure P may be increased, the space may be decreased and the thickness of the film may be decreased.

As a part of the surface-approaching pressure imparting mechanism 4, the approach regulating surface 24 is formed, and at the position of the balance line, the surface-approaching pressure may be regulated, that is, the space between the processing surfaces may be regulated.

As described above, the space is regulated in consideration of the pressing pressure of the spring 43 and the air pressure of the air introduction part 44. Regulation of the fluid pressure, that is, the feeding pressure of the processed fluid, and regulation of the rotation of the first processing member 10 for regulating centrifugal force, that is, the rotation of the first holder 11, are also important factors to regulate the space.

As described above, this apparatus is constituted such that for the second processing member 20 and the first processing member 10 that rotates relative to the second processing member 20, a predetermined fluid film is formed between the processing surfaces by pressure balance among the feeding pressure of the processed fluid, the rotation centrifugal force, and the surface-approaching pressure. At least one of the rings is formed in a floating structure by which alignment such as run-out is absorbed to eliminate the risk of abrasion and the like.

The embodiment shown in FIG. 1(A) also applies to the embodiment in FIG. 12(B) except that the regulating surface is arranged.

Figure 17:
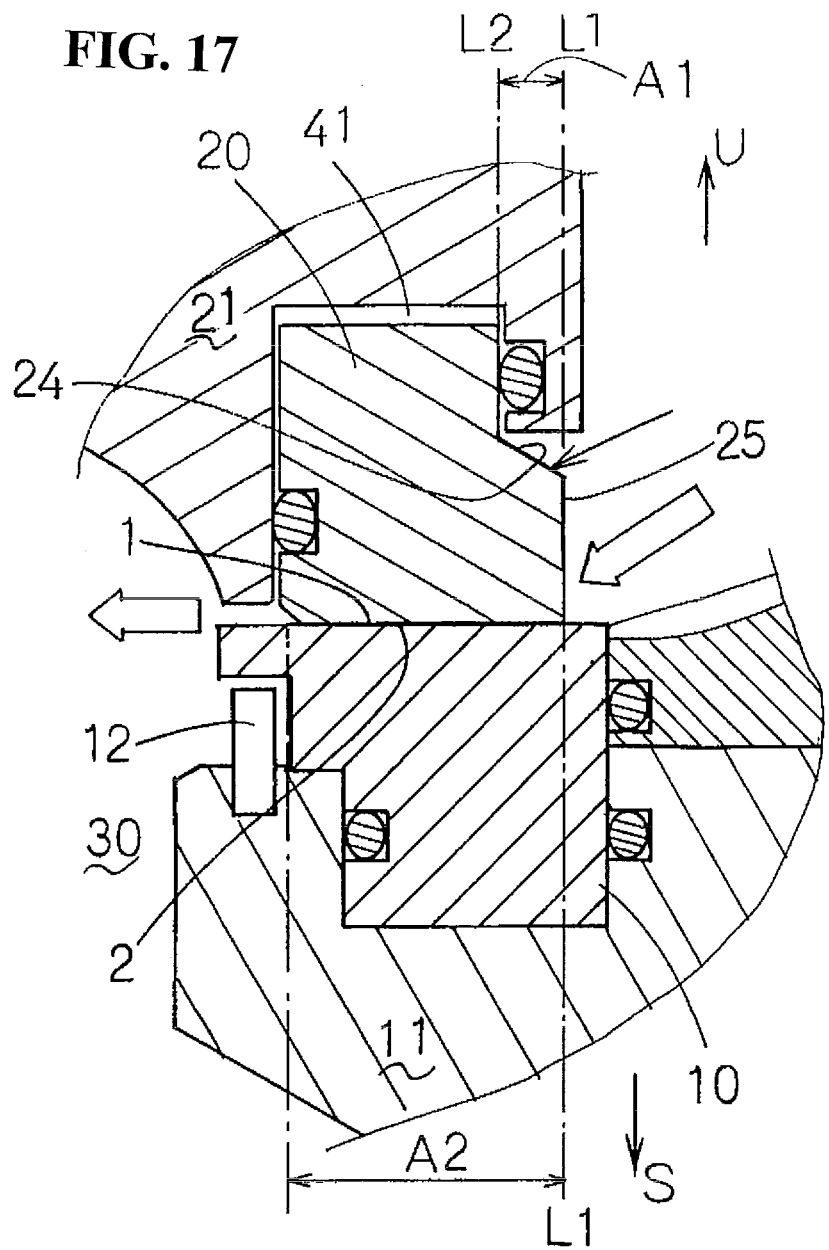
FIG. 17 is a schematic vertical sectional view showing an important part of still another embodiment of the apparatus shown in FIG. 12(A).

The embodiment shown in FIG. 12(B) can be carried out without arranging the pressure-receiving surface 23 on the separating side, as shown in FIG. 17.

When the approach regulating surface 24 is arranged as shown in the embodiment shown in FIG. 12(B) and FIG. 17, the area A1 of the approach regulating surface 24 is made larger than the area A2, whereby all of the predetermined pressure exerted on the processed fluid functions as surface-approaching pressure, without generating an opening force. This arrangement is also possible, and in this case, both the processing surfaces 1 and 2 can be balanced by increasing other separating force.

With the area ratio described above, the force acting in the direction of separating the second processing surface 2 from the first processing surface 1 is fixed as the resultant force exerted by the fluid.

In this embodiment, as described above, the number of springs 43 is preferably larger in order to impart uniform stress on the sliding surface, that is, the processing surface. However, the spring 43 may be a single coil-type spring as shown in FIG. 13. As shown in the figure, this spring is a single coil spring having a center concentric with the circular second processing member 20.

The space between the second processing member 20 and the second holder 21 is sealed air-tightly with methods well known in the art.

As shown in FIG. 14, the second holder 21 is provided with a temperature regulation jacket 46 capable of regulating the temperature of the second processing member 20 by cooling or heating. Numerical 3 in FIG. 14 is the above-mentioned case, and the case 3 is also provided with a jacket 35 for the same purpose of temperature regulation.

The temperature regulation jacket 46 for the second holder 21 is a water-circulating space formed at a side of the ring-accepting part 41 and communicates with paths 47 and 48 leading to the outside of the second holder 21. One of the paths 47 and 48 introduces a cooling or heating medium into the temperature regulation jacket 46, and the other discharges the medium.

The temperature regulation jacket 35 for the case 3 is a path for passing heating water or cooling water, which is arranged between the outer periphery of the case 3 and a covering part 34 for covering the outer periphery of the case 3.

In this embodiment, the second holder 21 and the case 3 are provided with the temperature regulation jacket, but the first holder 11 can also be provided with such a jacket.

As a part of the surface-approaching pressure imparting mechanism 4, a cylinder mechanism 7 shown in FIG. 15 may be arranged besides the members described above.

The cylinder mechanism 7 includes a cylinder space 70 arranged in the second holder 21, a communicating part 71 that communicates the cylinder space 70 with the ring-accepting part 41, a piston 72 that is accepted in the cylinder space 70 and connected via the communication part 71 to the second processing member 20, a first nozzle 73 that communicates to the upper part of the cylinder space 70, a second nozzle 74 in a lower part of the cylinder space 70, and a pressing body 75 such as spring between the upper part of the cylinder space 70 and the piston 72.

The piston 72 can slide vertically in the cylinder space 70, and the second processing member 20 can slide vertically with sliding of the piston 72, to change the gap between the first processing surface 1 and the second processing surface 2.

Although not shown in the figure, specifically, a pressure source such as a compressor is connected to the first nozzle 73, and air pressure, that is, positive pressure is applied from the first nozzle 73 to the upper part of the piston 72 in the cylinder space 70, thereby sliding the piston 72 downward, to allow the second processing member 20 to narrow the gap between the first and second processing surfaces 1 and 2. Although not shown in the figure, a pressure source such as a compressor is connected to the second nozzle 74, and air pressure, that is, positive pressure is applied from the second nozzle 74 to the lower part of the piston 72 in the cylinder space 70, thereby sliding the piston 72 upward, to allow the second processing member 20 to widen the gap between the first and second processing surfaces 1 and 2, that is, to enable it to move in the direction of opening the gap. In this manner, the surface-approaching pressure can be regulated by air pressure with the nozzles 73 and 74.

Even if there is a space between the upper part of the second processing member 20 in the ring-accepting part 41 and the uppermost part of the ring-accepting part 41, the piston 7 is arranged so as to abut against the uppermost part 70a of the cylinder space 70, whereby the uppermost part 70a of the cylinder space 70 defines the upper limit of the width of the gap between the processing surfaces 1 and 2. That is, the piston 7 and the uppermost part 70a of the cylinder space 70 function as a separation preventing part for preventing the separation of the processing surfaces 1 and 2 from each other, in other words, function in regulating the maximum opening of the gap between both the processing surfaces 1 and 2.

Even if the processing surfaces 1 and 2 do not abut on each other, the piston 7 is arranged so as to abut against a lowermost part 70b of the cylinder space 70, whereby the lowermost part 70b of the cylinder space 70 defines the lower limit of the width of the gap between the processing surfaces 1 and 2. That is, the piston 7 and the lowermost part 70b of the cylinder space 70 function as an approach preventing part for preventing the approaching of the processing surfaces 1 and 2 each other, in other words, function in regulating the minimum opening of the gap between both the processing surfaces 1 and 2.

In this manner, the maximum and minimum openings of the gap are regulated, while a distance z1 between the piston 7 and the uppermost part 70a of the cylinder space 70, in other words, a distance z2 between the piston 7 and the lowermost part 70b of the cylinder space 70, is regulated with air pressure by the nozzles 73 and 74.

The nozzles 73 and 74 may be connected to a different pressure source respectively, and further may be connected to a single pressure source alternatively or switched the connections to the sources.

The pressure source may be a source applying positive or negative pressure. When a negative pressure source such as a vacuum is connected to the nozzles 73 and 74, the action described above goes to the contrary.

In place of the other surface-approaching pressure imparting mechanism 4 or as a part of the surface-approaching pressure imparting mechanism 4, such cylinder mechanism 7 is provided to set the pressure of the pressure source connected to the nozzle 73 and 74, and the distances z1 and z2 according to the viscosity and properties of the fluid to be processed in a fashion to bring the thickness value of fluid film of the fluid to a desired level under a shear force to realize a uniform reaction for forming fine particles. Particularly, such cylinder mechanism 7 can be used to increase the reliability of cleaning and sterilization by forcing the sliding part open and close during cleaning and steam sterilization.

As shown in FIG. 16(A) to FIG. 16(C), the first processing surface 1 of the first processing member 10 may be provided with groove-like depressions 13 . . . 13 extending in the radial direction, that is, in the direction from the center to the outside of the first processing member 10. In this case, as shown in FIG. 16(A), the depressions 13 . . . 13 can be curved or spirally elongated on the first processing surface 1, and as shown in FIG. 16(B), the individual depressions 13 may be bent at a right angle, or as shown in FIG. 16(C), the depressions 13 . . . 13 may extend straight radially.

As shown in FIG. 16(D), the depressions 13 in FIG. 16(A) to FIG. 16(C) preferably deepen gradually in the direction toward the center of the first processing surface 1. The groove-like depressions 13 may continue in sequence or intermittence.

Formation of such depression 13 may correspond to the increase of delivery of the processed fluid or to the decrease of calorific value, while having effects of cavitation control and fluid bearing.

Figure 16:
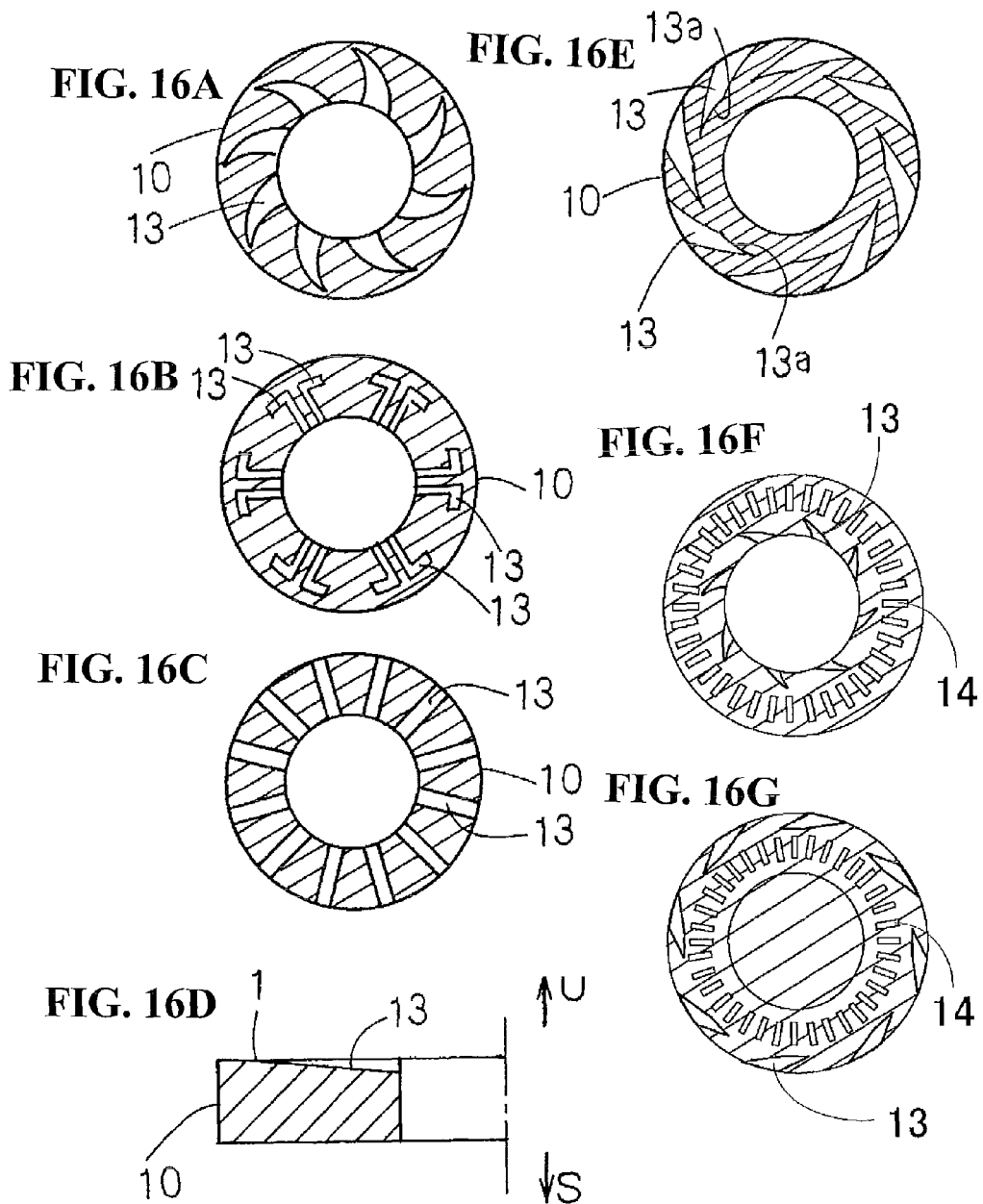
FIG. 16(A) is a schematic transverse sectional view showing an important part of still another embodiment of the apparatus shown in FIG. 12(A), FIG. 16(B), FIG. 16(C) and FIG. 16(E) to FIG. 16(G) are schematic transverse sectional views each showing an important part of still another embodiment of the apparatus.
FIG. 16(D) is a partially cut schematic vertical sectional view showing an important part of still another embodiment of the apparatus.

In the embodiments shown in FIG. 16, the depressions 13 are formed on the first processing surface 1, but may be formed on the second processing surface 2 or may be formed on both the first and second processing surfaces 1 and 2.

When the depressions 13 or tapered sections are not provided on the processing surface or are arranged unevenly on a part of the processing surface, the influence exerted by the surface roughness of the processing surfaces 1 and 2 on the processed fluid is greater than that by the above depressions 13. In this case, the surface roughness should be reduced, that is, the surface should be fine-textured, as the particle size of the processed fluid are to be decreased. Particularly, regarding the surface roughness of the processing surface, the mirror surface, that is, a surface subjected to mirror polishing is advantageous in realizing uniform reaction for the purpose of uniform reaction, and in realizing crystallization and separation of fine monodisperse reaction products for the purpose of obtaining microparticles.

In the embodiments shown in FIG. 13 to FIG. 17, structures other than those particularly shown are the same as in the embodiments shown in FIG. 1(A) or FIG. 11(C).

In the embodiments described above, the case is closed. Alternatively, the first processing member 10 and the second processing member 20 may be closed inside but may be open outside. That is, the flow path is sealed until the processed fluid has passed through the space between the first processing surface 1 and the second processing surface 2, to allow the processed fluid to receive the feeding pressure, but after the passing, the flow path may be opened so that the processed fluid after processing does not receive feeding pressure.

The fluid pressure imparting mechanism p1 preferably uses a compressor as a pressure device described above, but if predetermined pressure can always be applied to the processed fluid, another means may be used. For example, the own weight of the processed fluid can be used to apply certain pressure constantly to the processed fluid.

In summary, the processing apparatus in each embodiment described above is characterized in that predetermined pressure is applied to a fluid to be processed, at least two processing surfaces, that is, a first processing surface 1 and a second processing surface 2 capable of approaching to and separating from each other are connected to a sealed flow path through which the processed fluid receiving the predetermined pressure flows, a surface-approaching pressure of approaching the processing surfaces 1 and 2 each other is applied to rotate the first processing surface 1 and the second processing surface 2 relative to each other, thereby allowing a fluid film used for seal in mechanical seal to be generated out of the processed fluid, and the fluid film is leaked out consciously (without using the fluid film as seal) from between the first processing surface 1 and the second processing surface 2, contrary to mechanical seal, whereby reaction processing is realized between the processed fluid formed into a film between the surfaces 1 and 2, and the product is recovered.

By this epoch-making method, the space between the processing surfaces 1 and 2 can be regulated in the range of 1 μm to 1 mm, particularly 1 μm to 10 μm.

In the embodiment described above, a flow path for a sealed fluid is constituted in the apparatus, and the processed fluid is pressurized with the fluid pressure imparting mechanism p arranged at the side of the introduction part (for the first processing fluid) in the processing apparatus.

Alternatively, the flow path for the processed fluid may be opened without pressurization with the fluid pressure imparting mechanism p.

One embodiment of the processing apparatus is shown in FIG. 18 to FIG. 20. The processing apparatus illustrated in this embodiment is an apparatus including a degassing mechanism, that is, a mechanism of removing a liquid from the formed processed product thereby finally securing objective solids (crystals) only.

Figure 18A:
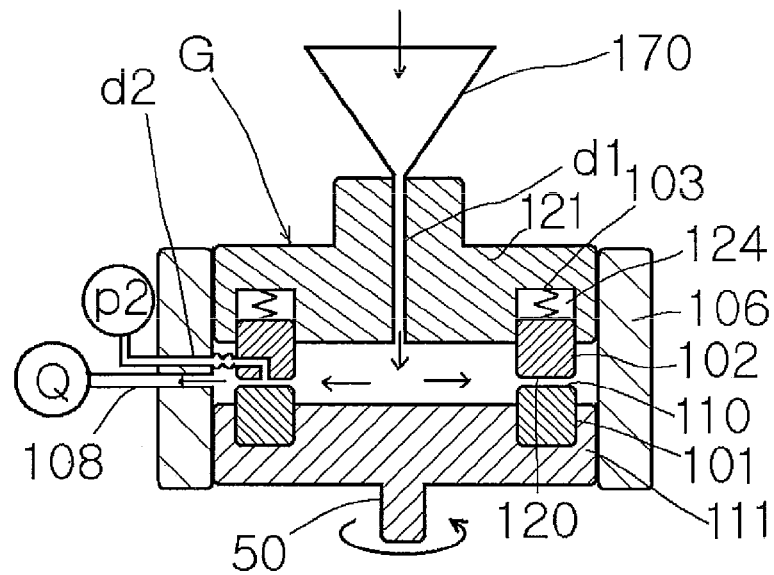
FIG. 18(A) is a schematic vertical sectional view showing the concept of still another embodiment of the apparatus used for carrying out the present invention.
Figure 18B:
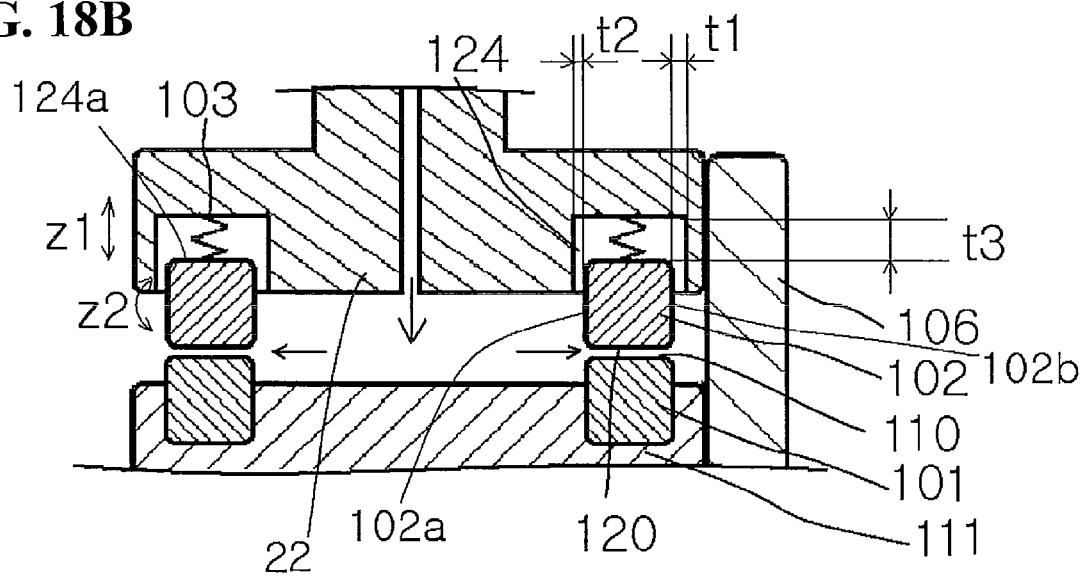
FIG. 18(B) is a partially cut explanatory view showing an important part of the apparatus.

FIG. 18(A) is a schematic vertical sectional view of the processing apparatus, and FIG. 18(B) is its partially cut enlarged sectional view. FIG. 19 is a plane view of the first processing member 1 arranged in the processing apparatus in FIG. 18. FIG. 20 is a partially cut schematic vertical sectional view showing an important part of the first and second processing members 1 and 2 in the processing apparatus.

As described above, the apparatus shown in FIG. 18 to FIG. 20 is the one into which a fluid as the object of processing, that is, a processed fluid, or a fluid carrying the object of processing, is to be introduced at atmospheric pressure.

In FIG. 18(B) and FIG. 20, the second introduction part d2 is omitted for simplicity of the drawing (these drawings can be regarded as showing a section at the position where the second introduction part d2 is not arranged).

As shown in FIG. 18(A), this processing apparatus includes a reaction apparatus G and a decompression pump Q. This reaction apparatus G includes a first processing member 101 as a rotating member, a first holder 111 for holding the processing member 101, a second processing member 102 that is a member fixed to the case, a second holder 121 having the second processing member 102 fixed thereto, a bias mechanism 103, a dynamical pressure generating mechanism 104 (FIG. 19(A)), a drive part which rotates the first processing member 101 with the first holder 111, a housing 106, a first introduction part d1 which supplies (introduces) a first processed fluid, and a discharge part 108 that discharges the fluid to the decompression pump Q. The drive part is not shown.

The first processing member 101 and the second processing member 102 are cylindrical bodies that are hollow in the center. The processing members 101 and 102 are members wherein the bottoms of the processing members 101 and 102 in a cylindrical form are processing surfaces 110 and 120 respectively.

Figure 19A:
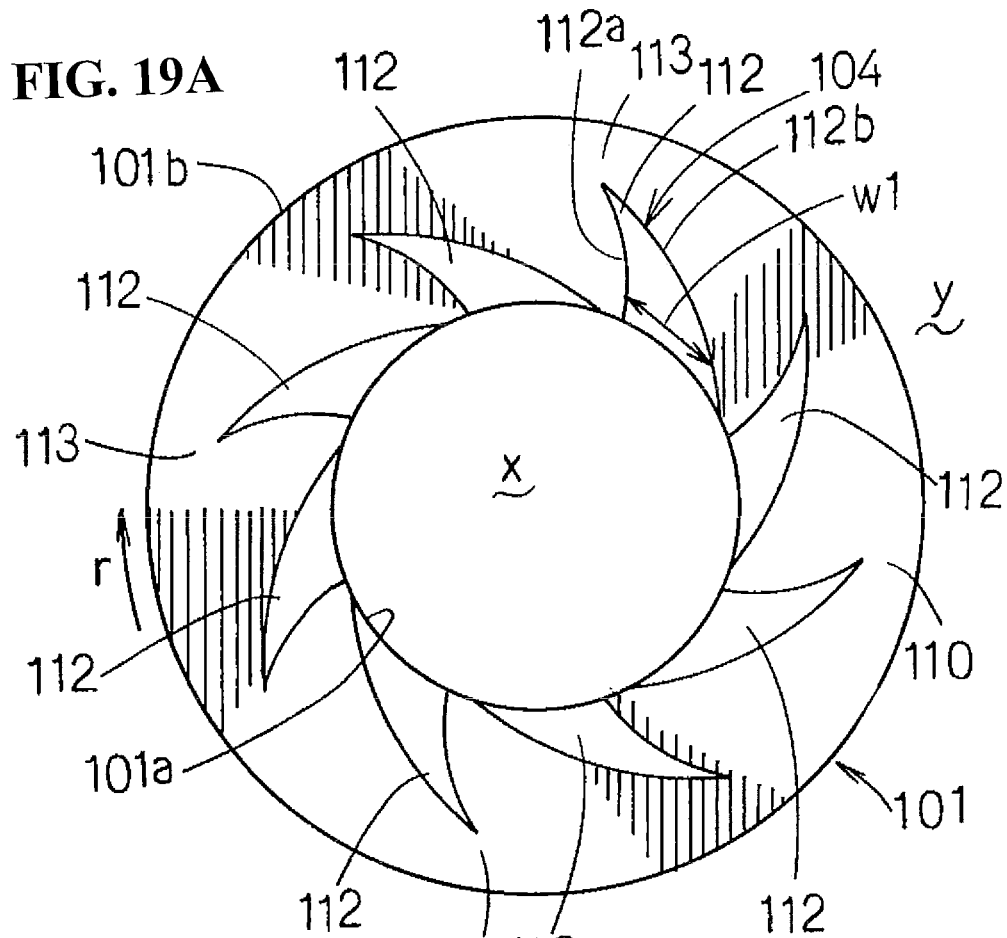
FIG. 19(A) is a plane view of a first processing member 1 in the apparatus shown in FIG. 12.

The processing surfaces 110 and 120 have a mirror-polished flat part. In this embodiment, the processing surface 120 of the second processing member 102 is a flat surface subjected as a whole to mirror polishing. The processing surface 110 of the first processing member 101 is a flat surface as a whole like the second processing member 102, but has a plurality of grooves 112 . . . 112 in the flat surface as shown in FIG. 19(A). The grooves 112 . . . 112 while centering on the first processing member 101 in a cylindrical form extend radially toward the outer periphery of the cylinder.

The processing surfaces 110 and 120 of the first and second processing members 101 and 102 are mirror-polished such that the surface roughness Ra comes to be in the range of 0.01 µm to 1.0 µm. By this mirror polishing, Ra is regulated preferably in the range of 0.03 µm to 0.3 µm.

The material for the processing members 101 and 102 is one which is rigid and capable of mirror polishing. The rigidity of the processing members 101 and 102 is preferably at least 1500 or more in terms of Vickers hardness. A material having a low linear expansion coefficient or high thermal conductance is preferably used. This is because when the difference in coefficient of expansion between a part which generates heat upon processing and other parts is high, distortion is generated and securement of suitable clearance is influenced.

As the material for the processing members 101 and 102, it is preferable to use particularly SIC, that is, silicon carbide, SIC having a Vickers hardness of 2000 to 2500, SIC having a Vickers hardness of 3000 to 4000 coated thereon with DLC (diamond-like carbon), WC, that is, tungsten carbide having a Vickers hardness of 1800, WC coated thereon with DLC, and boron ceramics represented by $ZrB_2$, BTC and $B_4C$ having a Vickers hardness of 4000 to 5000.

The housing 106 shown in FIG. 18, the bottom of which is not shown though, is a cylinder with a bottom, and the upper part thereof is covered with the second holder 121. The second holder 121 has the second processing member 102 fixed to the lower surface thereof, and the introduction part d1 is arranged in the upper part thereof. The introduction part d1 is provided with a hopper 170 for introducing a fluid or a processed material from the outside.

Although not shown in the figure, the drive part includes a power source such as a motor and a shaft 50 that rotates by receiving power from the power source.

As shown in FIG. 18(A), the shaft 50 is arranged in the housing 106 and extends vertically. Then, the first holder 111 is arranged on the top of the shaft 50. The first holder 111 is to hold the first processing member 101 and is arranged on the shaft 50 as described above, thereby allowing the processing surface 110 of the first processing member 101 to correspond to the processing surface 120 of the second processing member 102.

The first holder 111 is a cylindrical body, and the first processing member 101 is fixed on the center of the upper surface. The first processing member 101 is fixed so as to be integrated with the first holder 111, and does not change its position relative to the first holder 111.

On the other hand, a receiving depression 124 for receiving the second processing member 102 is formed on the center of the upper surface of the second holder 121.

The receiving depression 124 has a circular cross-section. The second processing member 102 is accepted in the cylindrical receiving depression 124 so as to be concentric with the receiving depression 124.

The structure of the receiving depression 124 is similar to that in the embodiment as shown in FIG. 1(A) (the first processing member 101 corresponds to the first ring 10, the first holder 111 to the first holder 11, the second processing member 102 to the second ring 20, and the second holder 121 to the second holder 21).

Then, the second holder 121 is provided with the bias mechanism 103. The bias mechanism 103 preferably uses an elastic body such as spring. The bias mechanism 103 corresponds to the surface-approaching pressure imparting mechanism 4 in FIG. 1(A) and has the same structure. That is, the bias mechanism 103 presses that side (bottom) of the second processing member 102 which is opposite to the processing surface 120 and biases each position of the second processing member 102 uniformly downward to the first processing member 101.

On the other hand, the inner diameter of the receiving depression 124 is made larger than the outer diameter of the second processing member 102, so that when arranged concentrically as described above, a gap t1 is arranged between outer periphery 102b of the second processing member 102 and inner periphery of the receiving depression 124, as shown in FIG. 18(B).

Similarly, a gap t2 is arranged between inner periphery 102a of the second processing member 102 and outer periphery of the central part 22 of the receiving depression 124, as shown in FIG. 18(B).

The gaps t1 and t2 are those for absorbing vibration and eccentric behavior and are set to be in a size to secure operational dimensions or more and to enable sealing. For example, when the diameter of the first processing member 101 is 100 mm to 400 mm, the gaps t1 and t2 are preferably 0.05 mm to 0.3 mm, respectively.

The first holder 111 is fixed integrally with the shaft 50 and rotated with the shaft 50. The second processing member 102 is not rotated relative to the second holder 121 by a baffle (not shown). However, for securing 0.1 micron to 10 micron clearance necessary for processing, that is, the minute gap t between the processing surfaces 110 and 120 as shown in FIG. 20(B), a gap t3 is arranged between the bottom of the receiving depression 124, that is, the top part, and the surface facing a top part 124a of the second processing member 102, that is, the upper part. The gap t3 is established in consideration of the clearance and the vibration and elongation of the shaft 150.

As described above, by the provision of the gaps t1 to t3, the first processing member 101 can move not only in the direction of approaching to and separating from the second processing member 102, but also relative to the center and direction of the processing surface 110, that is, relative to the directions z1 and z2.

That is, in this embodiment, the bias mechanism 103 and the gaps t1 to t3 constitute a floating mechanism, and by this floating mechanism, the center and inclination of at least the second processing member 102 are made variable in the small range of several µm to several mm. The run-out and expansion of the rotary shaft and the surface vibration and vibration of the first processing member 101 are absorbed.

The groove 112 on the polishing surface 110 of the first processing member 101 is described in more detail. The rear end of the groove 112 reaches the inner periphery 101a of the first processing member 101, and its top is elongated toward the outside y of the first processing member 101, that is, toward the outer periphery. As shown in FIG. 19(A), the sectional area of the groove 112 is gradually decreased in the direction from the center x of the circular first processing member 101 to the outside y of the first processing member 101, that is, toward the outer periphery.

Figure 19B:
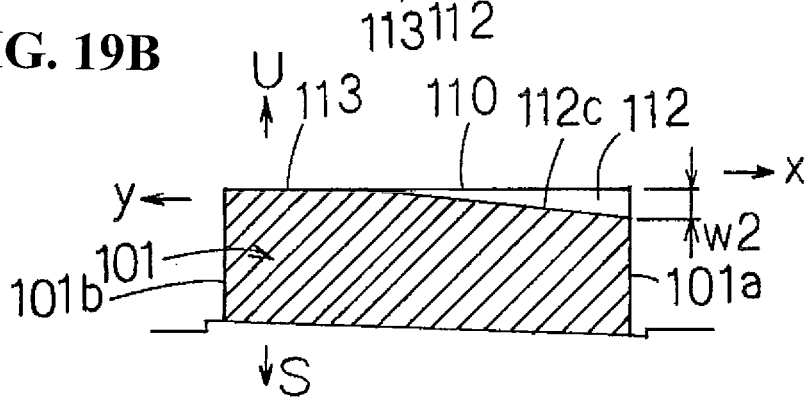
FIG. 19(B) is a schematic vertical sectional view showing an important part thereof.

The distance w1 of the left and right sides 112a and 112b of the groove 112 is decreased in the direction from the center x of the first processing member 101 to the outside y of the first processing member 101, that is, toward the outer periphery. As shown in FIG. 19(B), the depth w2 of the groove 112 is decreased in the direction from the center x of the first processing member 101 to the outside y of the first processing member 101, that is, toward the outer periphery. That is, the bottom 112c of the groove 112 is decreased in depth in the direction from the center x of the first processing member 101 to the outside y of the first processing member 101, that is, toward the outer periphery.

As described above, the groove 112 is gradually decreased both in width and depth toward the outside y, that is, toward the outer periphery, and its sectional area is gradually decreased toward the outside y. Then, the top of the groove 112, that is, the y side, is a dead end. That is, the top of the groove 112, that is, the y side does not reach the outer periphery 101b of the first processing member 101, and an outer flat surface 113 is interposed between the top of the groove 112 and the outer periphery 101b. The outer flat surface 113 is a part of the processing surface 110.

In the embodiment shown in FIG. 19, the left and right sides 112a and 112b and the bottom 112c of the groove 112 constitute a flow path limiting part. This flow path limiting part, the flat part around the groove 112 of the first processing member 101, and the flat part of the second processing member 102 constitute the dynamical pressure generating mechanism 104.

However, only one of the width and depth of the groove 112 may be constituted as described above to decrease the sectional area.

While the first processing member 101 rotates, the dynamical pressure generating mechanism 104 generates a force in the direction of separating the processing members 101 and 102 from each other to secure a desired minute space between the processing members 101 and 102 by a fluid passing through the space between the processing members 101 and 102. By generation of such dynamical pressure, a 0.1 μm to 10 μm minute space can be generated between the processing surfaces 110 and 120. A minute space like that can be regulated and selected depending on the object of processing, but is preferably 1 μm to 6 μm, more preferably 1 μm to 2 μm. This apparatus can realize a uniform reaction and form microparticles by the minute space, which are not achieved in the prior art.

The grooves 112 . . . 112 may extend straight from the center x to the outside y. In this embodiment, however, as shown in FIG. 19(A), the grooves 112 are curved to extend such that with respect to a rotation direction r of the first processing member 101, the center x of the groove 112 is positioned in front of the outside y of the groove 112.

In this manner, the grooves 112 . . . 112 are curved to extend so that the separation force by the dynamical pressure generating mechanism 104 can be effectively generated.

Then, the working of this apparatus is described.

A first processed fluid R which has been introduced from a hopper 17 and has passed through the first introduction part d1, passes through the hollow part of the circular second processing member 102, and the fluid that has received the centrifugal force resulting from rotation of the first processing member 101 enters the space between the processing members 101 and 102, and uniform reaction and generation of microparticles are effected and processed between the processing surface 110 of the rotating first processing member 101 and the processing surface 120 of the second processing member 102, then exits from the processing members 101 and 102 and is then discharged from the discharge part 108 to the side of the decompression pump Q. Hereinafter, the first processed fluid R is referred to simply as a fluid R, if necessary.

Figure 20A:
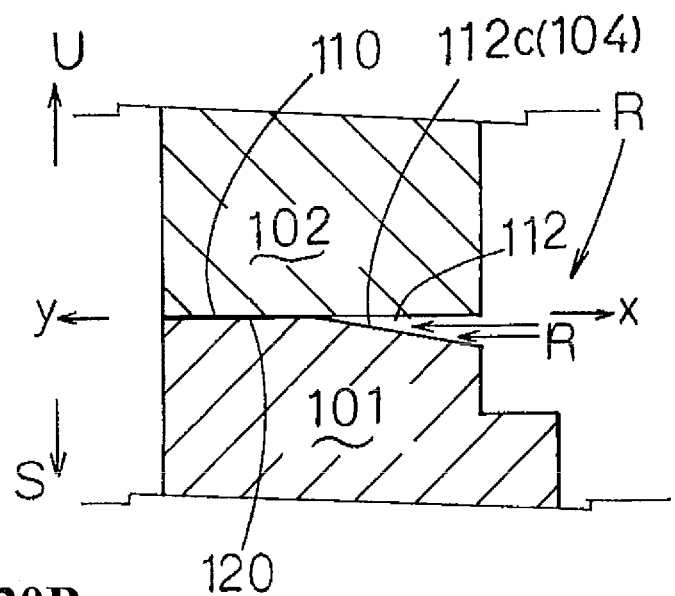
FIG. 20(A) is a schematic vertical sectional view showing an important part of first and second processing members 1 and 2 in the apparatus shown in FIG. 12.
Figure 20B:
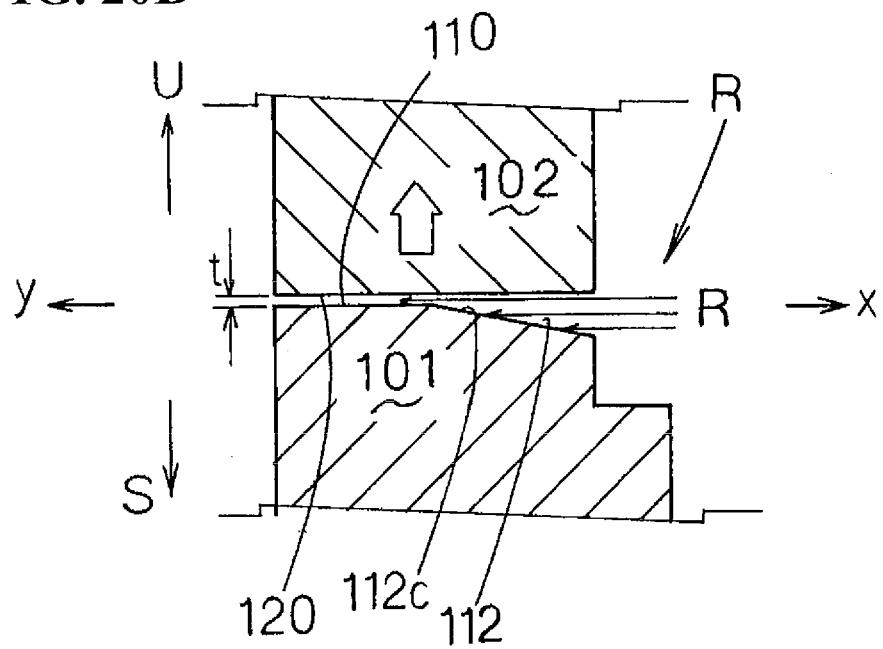
FIG. 20(B) is a schematic vertical sectional view showing an important part of the first and second processing members 1 and 2 with a minute gap.

In the foregoing description, the fluid R that has entered the hollow part of the circular second processing member 102 first enters the groove 112 of the rotating first processing member 101 as shown in FIG. 20(A). On the other hand, the processing surfaces 110 and 120 that are mirror-polished flat parts are kept airtight even by passing a gas such as air or nitrogen. Accordingly, even if the centrifugal force by rotation is received, the fluid cannot enter through the groove 112 into the space between the processing surfaces 110 and 120 that are pushed against each other by the bias mechanism 103. However, the fluid R gradually runs against both the sides 112a and 112b and the bottom 112c of the groove 112 formed as a flow path limiting part to generate dynamical pressure acting in the direction of separating the processing surfaces 110 and 120 from each other. As shown in FIG. 20(B), the fluid R can thereby exude from the groove 112 to the flat surface, to secure a minute gap t, that is, clearance, between the processing surfaces 110 and 120. Then, a uniform reaction and generation of microparticles are effected and processed between the mirror-polished flat surfaces. The groove 112 has been curved so that the centrifugal force is applied more accurately to the fluid to make generation of dynamical pressure more effectively.

In this manner, the processing apparatus can secure a minute and uniform gap, that is, clearance, between the mirror surfaces, that is, the processing surfaces 110 and 120, by the balance between the dynamical pressure and the bias force by the bias mechanism 103. By the structure described above, the minute gap can be as superfine as 1 μm or less.

By utilizing the floating mechanism, the automatic regulation of alignment between the processing surfaces 110 and 120 becomes possible, and the clearance in each position between the processing surfaces 110 and 120 can be prevented from varying against physical deformation of each part by rotation or generated heat, and the minute gap in each position can be maintained.

In the embodiment described above, the floating mechanism is a mechanism arranged for the second holder 121 only. Alternatively, the floating mechanism can be arranged in the first holder 111 instead of, or together with, the second holder 121.

Other embodiments of the groove 112 are shown in FIG. 21 to FIG. 23.

Figure 21A:
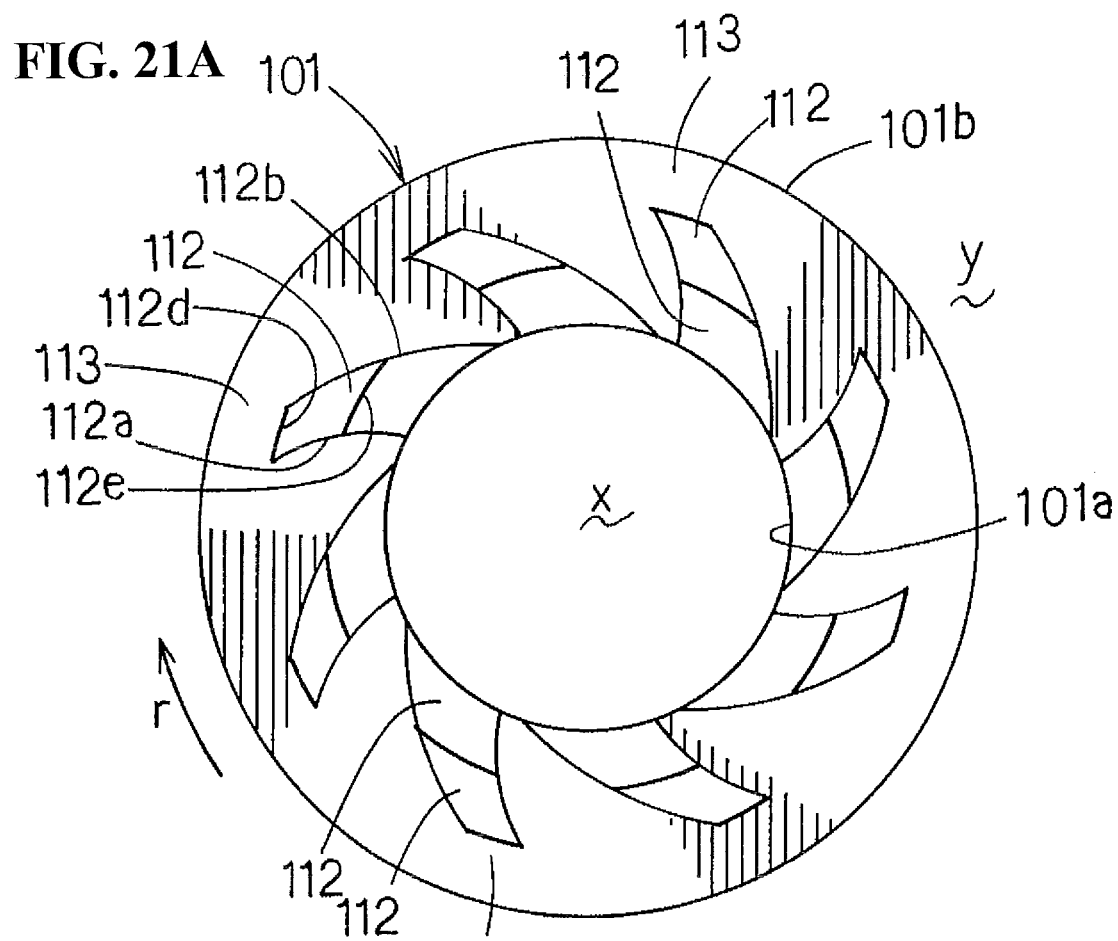
FIG. 21(A) is a plane view of another embodiment of the first processing member 1.
Figure 21B:
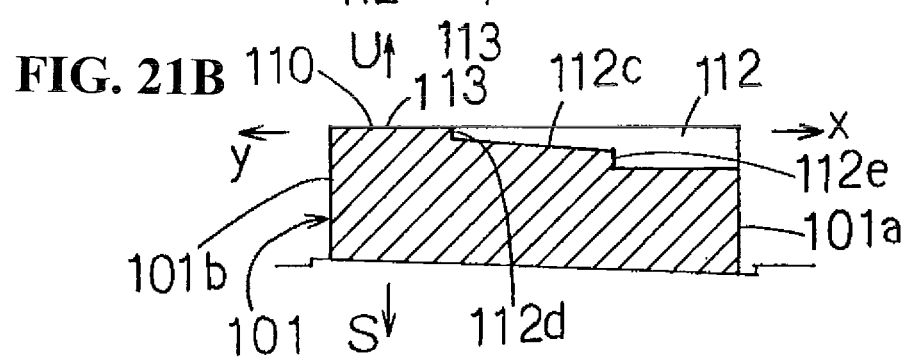
FIG. 21(B) is a schematic vertical sectional view showing an important part thereof.

As shown in FIG. 21(A) and FIG. 21(B), the groove 112 can be provided at the top with a flat wall surface 112d as a part of the flow path limiting part. In the embodiment shown in FIG. 14, a step 112e is arranged between the first wall surface 112d and the inner periphery 101a in the bottom 112c, and the step 112e also constitutes a part of the flow path limiting part.

Figure 22A:
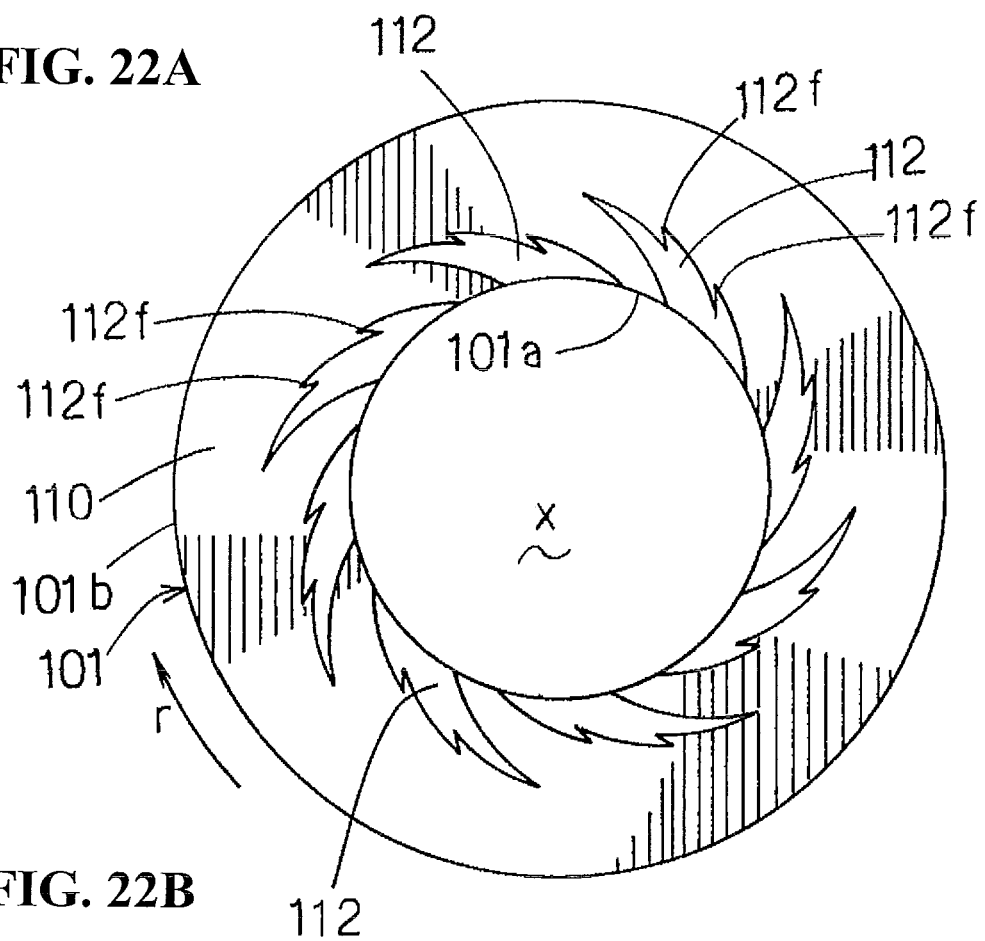
FIG. 22(A) is a plane view of still another embodiment of the first processing member 1.
Figure 22B:
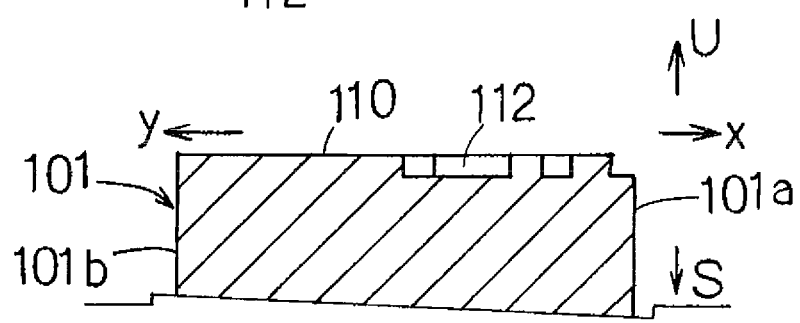
FIG. 22(B) is a schematic vertical sectional view showing an important part thereof.

As shown in FIG. 22(A) and FIG. 22(B), the groove 112 includes a plurality of branches 112f . . . 112f, and each branch 112f narrows its width thereby being provided with a flow path limiting part.

With respect to the embodiments in FIG. 14 and FIG. 15, structures other than those particularly shown are similar to those of embodiments as shown in FIG. 1(A), FIG. 11(C), and FIG. 18 to FIG. 20.

Figure 23A:
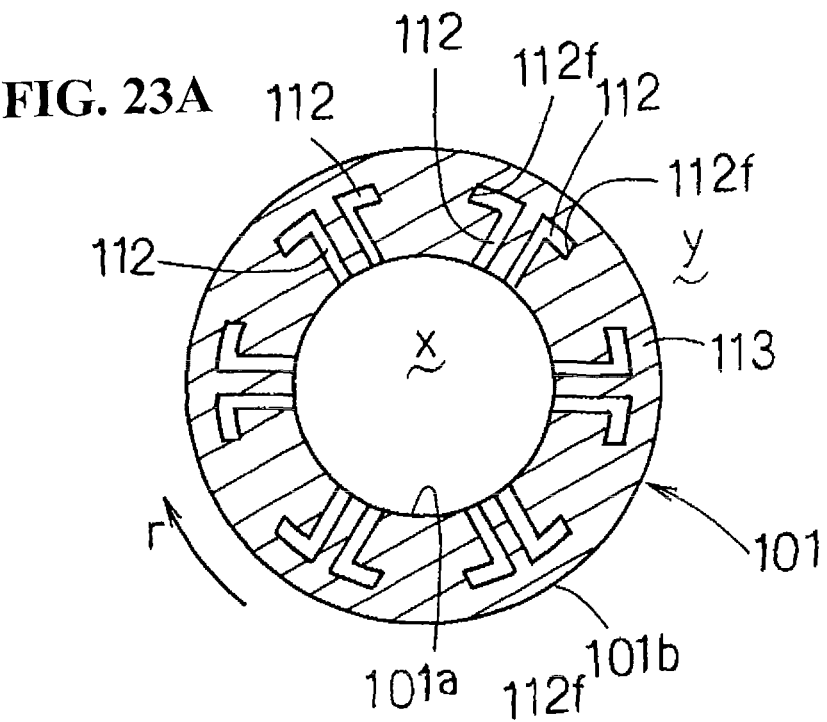
FIG. 23(A) is a plane view of still another embodiment of the first processing member 1.
Figure 23B:
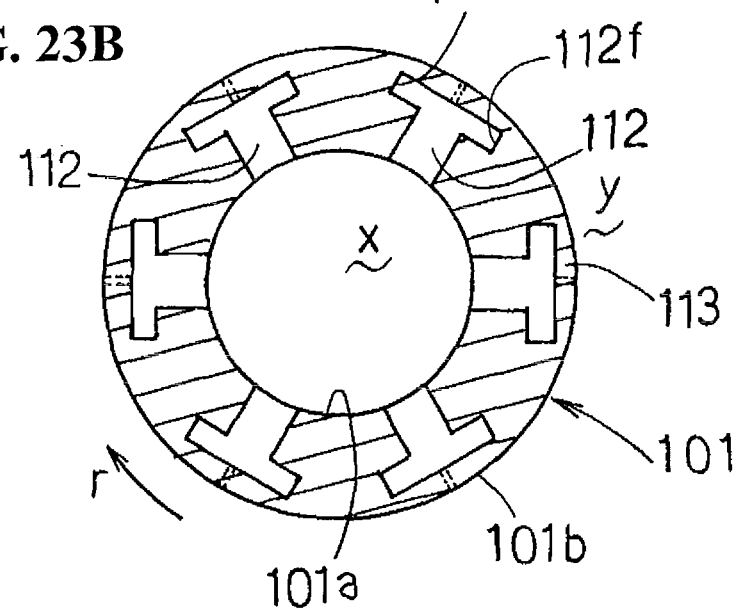
FIG. 23(B) is a plane view of still another embodiment of the first processing member 1.

In the embodiments described above, at least either the width or depth of the groove 112 is gradually decreased in size in the direction from inside to outside the first processing member 101, thereby constituting a flow path limiting part. Alternatively, as shown in FIG. 23(A) or FIG. 23(B), the groove 112 can be provided with a termination surface 112f without changing the width and depth of the groove 112, and the termination surface 112f of the groove 112 can serve as a flow path limiting part. As shown the embodiments in FIG. 19, FIG. 21 and FIG. 22, the width and depth of the groove 112 can be changed as described above thereby slanting the bottom and both sides of the groove 112, so that the slanted surfaces serves as a pressure-receiving part toward the fluid to generate dynamical pressure. In the embodiment shown in FIG. 23(A) and FIG. 23(B), on the other hand, the termination surface of the groove 112 serves as a pressure-receiving part toward the fluid to generate dynamical pressure.

In the embodiment shown in FIG. 23(A) and FIG. 23(B), at least one of the width and depth of the groove 112 may also be gradually decreased in size.

The structure of the groove 112 is not limited to the one shown in FIG. 19 and FIG. 21 to FIG. 23 and can be provided with a flow path limiting part having other shapes.

For example, in the embodiments shown in FIG. 19 and FIG. 21 to FIG. 23, the groove 112 does not penetrate to the outer side of the first processing member 101. That is, there is an outer flat surface 113 between the outer periphery of the first processing member 101 and the groove 112. However, the structure of the groove 112 is not limited to such embodiment, and the groove 112 may reach the outer periphery of the first processing member 101 as long as the dynamical pressure can be generated.

For example, in the case of the first processing member 101 shown in FIG. 23(B), as shown in the dotted line, a part having a smaller sectional area than other sites of the groove 112 can be formed on the outer flat surface 113.

The groove 112 may be formed so as to be gradually decreased in size in the direction from inside to outside as described above, and the part (terminal) of the groove 112 that had reached the outer periphery of the first processing member 101 may have the minimum sectional area (not shown). However, the groove 112 preferably does not penetrate to the outer periphery of the first processing member 101 as shown in FIG. 19 and FIG. 21 to FIG. 23, in order to effectively generate dynamical pressure.

Now, the embodiments shown in FIG. 18 to FIG. 23 are summarized.

This processing apparatus is a processing apparatus wherein a rotating member having a flat processing surface and a fixed member having a flat processing surface are opposite to each other so as to be concentric with each other, and while the rotating member is rotated, a material to be reacted is fed through an opening of the fixed member and subjected to a reaction between the opposite flat processing surfaces of both members, wherein the rotating member is provided with a pressurizing mechanism by which pressure is generated to maintain clearance without mechanically regulating clearance and enables 1 µm to 6 µm microscopic clearance not attainable by mechanical regulation of clearance, thereby significantly improving an ability to pulverize formed particles and an ability to uniformize the reaction.

That is, this processing apparatus have a rotating member and a fixed member each having a flat processing surface in the outer periphery thereof and has a sealing mechanism in a plane on the flat processing surface, thereby providing a high speed rotation processing apparatus generating hydrostatic force, hydrodynamic force, or aerostatic-aerodynamic force. The force generates a minute space between the sealed surfaces, and provides a reaction processing apparatus with a function of non-contact and mechanically safe and high-level pulvelization and uniformizing of reactions. One factor for forming this minute space is due to the rotation speed of the rotating member, and the other factor is due to a pressure difference between the introduction side and discharge side of a processed material (fluid). When a pressure imparting mechanism is not arranged in the introduction side, that is, when the processed material (fluid) is introduced at atmospheric pressure, there is no pressure difference, and thus the sealed surfaces should be separated by only the rotation speed of the rotating member. This is known as hydrodynamic or aerodynamic force.

Figure 24A:
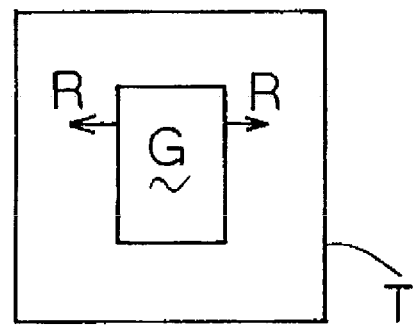
FIG. 24(A), FIG. 24(B) and FIG. 24(C) are diagrams showing embodiments other than those described above with respect to the method of separating a processed material after processing.
Figure 24B:
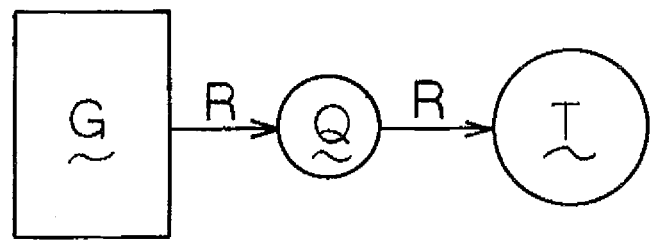

FIG. 18(A) shows the apparatus wherein a decompression pump Q is connected to the discharge part of the reaction apparatus G, but as described above, the reaction apparatus G may be arranged in a decompression tank T without arranging the housing 106 and the decomposition pump Q, as shown in FIG. 24(A).

In this case, the tank T is decompressed in a vacuum or in an almost vacuum, whereby the processed product formed in the reaction apparatus G is sprayed in a mist form in the tank T, and the processed material colliding with, and running down along, the inner wall of the tank T can be recovered, or a gas (vapor) separated from the processed material and filled in an upper part of the tank T, unlike the processed material running down along the wall, can be recovered to obtain the objective product after processing.

When the decompression pump Q is used, an airtight tank T is connected via the decompression pump Q to the processing apparatus G whereby the processed material after processing can be formed into mist to separate and extract the objective product.

Figure 24C:
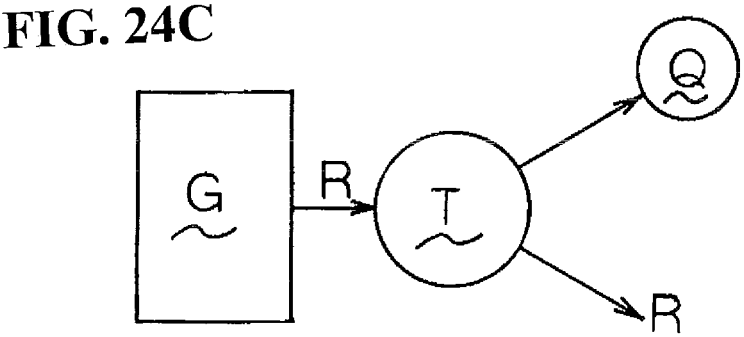

As shown in FIG. 24(C), the decompression pump Q is connected directly to the processing apparatus G, and the decompression pump Q and a discharge part for fluid R, different from the decompression pump Q, are connected to the tank T, whereby the objective product can be separated. In this case, a gasified portion is sucked by the decompression pump Q, while the fluid R (liquid portion) is discharged from the discharge part separately from the gasified portion.

In the embodiments described above, the first and second processed fluids are introduced via the second holders 21 and 121 and the second rings 20 and 102 respectively and mixed and reacted with each other.

Now, other embodiments with respect to introduction of fluids to be processed into the apparatus are described.

Figure 1B:
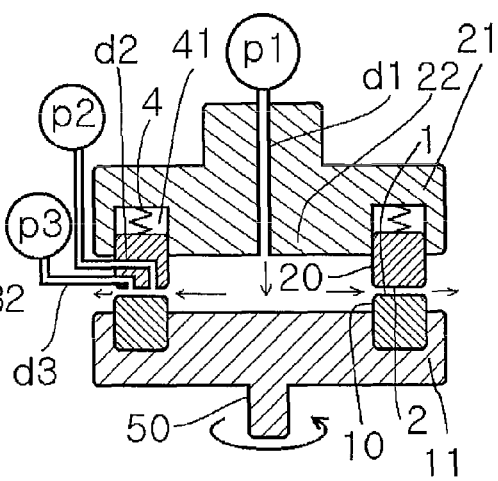
FIG. 1(B) is a schematic vertical sectional view showing the concept of another embodiment of the apparatus.

As shown in FIG. 1(B), the processing apparatus shown in FIG. 1(A) is provided with a third introduction part d3 to introduce a third fluid to be processed into the space between the processing surfaces 1 and 2, and the third fluid is mixed and reacted with the first processed fluid as well as the second processed fluid.

By the third introduction part d3, the third fluid to be mixed with the first processed fluid is fed to the space between the processing surfaces 1 and 2. In this embodiment, the third introduction part d3 is a fluid flow path arranged in the second ring 20 and is open at one end to the second processing surface 2 and has a third fluid feed part p3 connected to the other end.

In the third fluid feed part p3, a compressor or another pump can be used.

The opening of the third introduction part d3 in the second processing surface 2 is positioned outside, and more far from, the rotation center of the first processing surface 1 than the opening of the second introduction part d2. That is, in the second processing surface 2, the opening of the third introduction part d3 is located downstream from the opening of the second introduction part d2. A gap is arranged between the opening of the third introduction d3 and the opening of the second introduction part d2 in the radial direction of the second ring 20.

With respect to structures other than the third introduction d3, the apparatus shown in FIG. 1(B) is similar to that in the embodiment as in FIG. 1(A). In FIG. 1(B) and further in FIG. 1(C), FIG. 1(D) and FIG. 2 to FIG. 11 described later, the case 3 is omitted to simplify the drawings. In FIG. 9(B), FIG. 9(C), FIG. 10, FIG. 11(A) and FIG. 11(B), a part of the case 3 is shown.

Figure 1C:
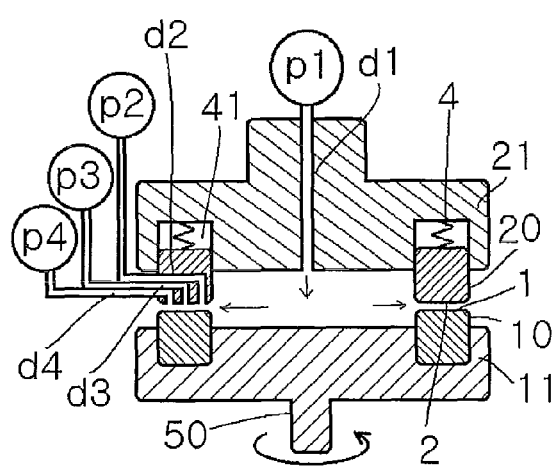
FIG. 1(C) is a schematic vertical sectional view showing the concept of still another embodiment of the apparatus.

As shown in FIG. 1(C), the processing apparatus shown in FIG. 1(B) is provided with a fourth introduction part d4 to introduce a fourth fluid to be processed into the space between the processing surfaces 1 and 2, and the fourth fluid is mixed and reacted with the first processed fluid as well as the second and third processed fluids.

By the fourth introduction part d4, the fourth fluid to be mixed with the first processed fluid is fed to the space between the processing surfaces 1 and 2. In this embodiment, the fourth introduction part d4 is a fluid flow path arranged in the second ring 20, is open at one end to the second processing surface 2, and has a fourth fluid feed part p4 connected to the other end.

In the fourth fluid feed part p4, a compressor or another pump can be used.

The opening of the fourth introduction part d4 in the second processing surface 2 is positioned outside, and more far from, the rotation center of the first processing surface 1 than the opening of the third introduction part d3. That is, in the second processing surface 2, the opening of the fourth introduction part d4 is located downstream from the opening of the third introduction part d3.

With respect to structures other than the fourth introduction part d4, the apparatus shown in FIG. 1(C) is similar to that in the embodiment as in FIG. 1(B).

Five or more introduction parts further including a fifth introduction part, a sixth introduction part and the like can be arranged to mix and react five or more fluids to be processed with one another (not shown).

Figure 1D:
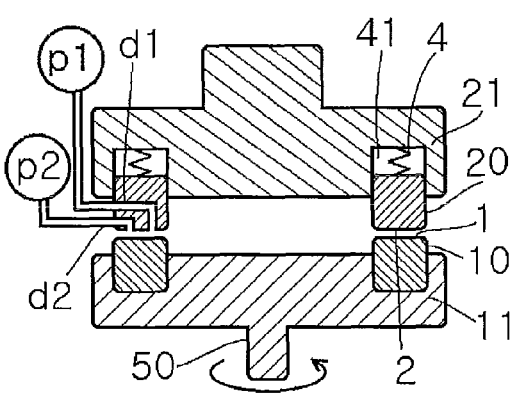
FIG. 1(D) is a schematic vertical sectional view showing the concept of still another embodiment of the apparatus.

As shown in FIG. 1(D), the first introduction part d1 arranged in the second holder 21 in the apparatus in FIG. 1(A) can, similar to the second introduction part d2, be arranged in the second processing surface 2 in place of the second holder 21. In this case, the opening of the first introduction part d1 is located at the upstream side from the second introduction part d2, that is, it is positioned nearer to the rotation center than the second introduction part d2 in the second processing surface 2.

In the apparatus shown in FIG. 1(D), the opening of the second introduction part d2 and the opening of the third introduction part d3 both are arranged in the second processing surface 2 of the second ring 20. However, arrangement of the opening of the introduction part is not limited to such arrangement relative to the processing surface. Particularly as shown in FIG. 2(A), the opening of the second introduction part d2 can be arranged in a position adjacent to the second processing surface 2 in the inner periphery of the second ring 20. In the apparatus shown in FIG. 2(A), the opening of the third introduction part d3 is arranged in the second processing surface 2 similarly to the apparatus shown in FIG. 1(B), but the opening of the second introduction part d2 can be arranged inside the second processing surface 2 and adjacent to the second processing surface 2, whereby the second processed fluid can be immediately introduced onto the processing surfaces.

In this manner, the opening of the first introduction part d1 is arranged in the second holder 21, and the opening of the second introduction part d2 is arranged inside the second processing surface 2 and adjacent to the second processing surface 2 (in this case, arrangement of the third introduction part d3 is not essential), so that particularly in reaction of a plurality of processed fluids, the processed fluid introduced from the first introduction part d1 and the processed fluid introduced from the second introduction part d2 are introduced, without being reacted with each other, into the space between the processing surfaces 1 and 2, and then both the fluids can be reacted first between the processing surfaces 1 and 2. Accordingly, the structure described above is suitable for obtaining a particularly reactive processed fluid.

The term "adjacent" is not limited to the arrangement where the opening of the second introduction part d2 is contacted with the inner side of the second ring 20 as shown in FIG. 2(A). The distance between the second ring 20 and the opening of the second introduction part d2 may be such a degree that a plurality of processed fluids are not completely mixed and reacted with one another prior to introduction into the space between the processing surfaces 1 and 2. For example, the opening of the second introduction part d2 may be arranged in a position near the second ring 20 of the second holder 21. Alternatively, the opening of the second introduction part d2 may be arranged on the side of the first ring 10 or the first holder 11.

In the apparatus shown in FIG. 1(B), a gap is arranged between the opening of the third introduction part d3 and the opening of the second introduction part d2 in the radial direction of the second ring 20, but as shown in FIG. 2(A), the second and third processed fluids can be introduced into the space between the processing surfaces 1 and 2, without providing such gap, thereby immediately joining both the fluids together. The apparatus shown in FIG. 2(A) can be selected depending on the object of processing.

In the apparatus shown in FIG. 1(D), a gap is also arranged between the opening of the first introduction part d1 and the opening of the second introduction part d2 in the radial direction of the second ring 20, but the first and second processed fluids can be introduced into the space between the processing surfaces 1 and 2, without providing such gap, thereby immediately joining both the fluids together. Such arrangement of the opening can be selected depending on the object of processing.

Figure 3A:
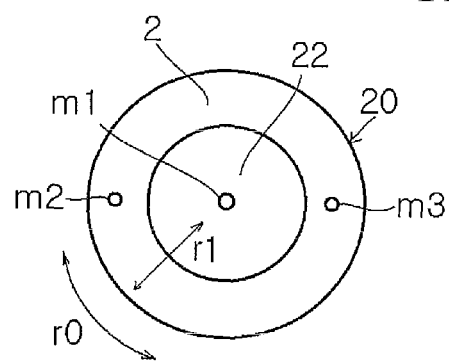
FIG. 3(A) is a schematic bottom view showing an important part of the apparatus shown in FIG. 2(C)

In the embodiment shown in FIG. 1(B) and FIG. 1(C), the opening of the third introduction part d3 is arranged in the second processing surface 2 downstream from the opening of the second introduction part d2, in other words, outside the opening of the second introduction part d2 in the radial direction of the second ring 20. Alternatively, as shown in FIG. 2(C) and FIG. 3(A), the opening of the third introduction part d3 and the opening of the second introduction part d2 can be arranged in the second processing surface 2 in positions different in a circumferential direction r0 of the second ring 20. In FIG. 3, numeral m1 is the opening (first opening) of the first introduction part d1, numeral m2 is the opening (second opening) of the second introduction part d2, numeral m3 is the opening (third opening) of the third introduction part d3, and numeral r1 is the radical direction of the ring.

When the first introduction part d1 is arranged in the second ring 20, as shown in FIG. 2(D), the opening of the first introduction part d1 and the opening of the second introduction part d2 can be arranged in the second processing surface 2 in positions different in the circumferential direction of the second ring 20.

Figure 3B:
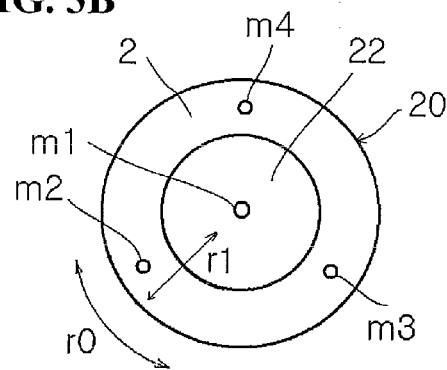
FIG. 3(B) is a schematic bottom view showing an important part of another embodiment of the apparatus.
Figure 3C:
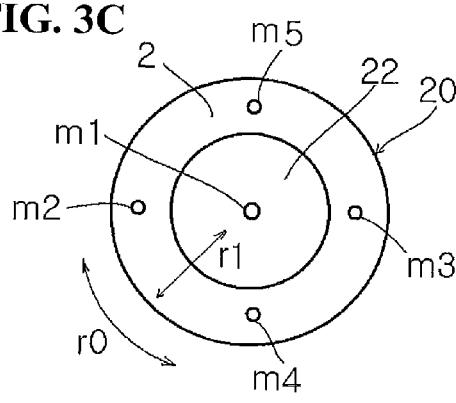
FIG. 3(C) is a schematic bottom view showing an important part of still another embodiment of the apparatus.

In the apparatus shown in FIG. 2(B), the openings of two introduction parts are arranged in the second processing surface 2 of the second ring 20 in positions different in the circumferential direction r0, but as shown in FIG. 3(B), the openings of three introduction parts can be arranged in positions different in the circumferential direction r0 of the ring, or as shown in FIG. 3(C), the openings of four introduction parts can be arranged in positions different in the circumferential direction r0 of the ring. In FIG. 3 (B) and FIG. 3(C), numeral m4 is the opening of the fourth introduction part, and in FIG. 3(C), numeral m5 is the opening of the fifth introduction part. Five or more openings of introduction parts may be arranged in positions different in the circumferential direction r0 of the ring (not shown).

In the apparatuses shown in FIG. 2(B), FIG. 2(D) and in FIG. 3(A) to FIG. 3(C), the second to fifth introduction parts can introduce different fluids, that is, the second, third, fourth and fifth fluids. On the other hand, the second to fifth openings m2 to m5 can introduce the same fluid, that is, the second fluid into the space between the processing surfaces. In this case, the second to fifth introduction parts are connected to the inside of the ring and can be connected to one fluid feed part, that is, the second fluid feed part p2 (not shown).

A plurality of openings of introduction parts arranged in positions different in the circumferential direction r0 of the ring can be combined with a plurality of openings of introduction parts arranged in positions different in the radial direction r1 of the ring.

Figure 3D:
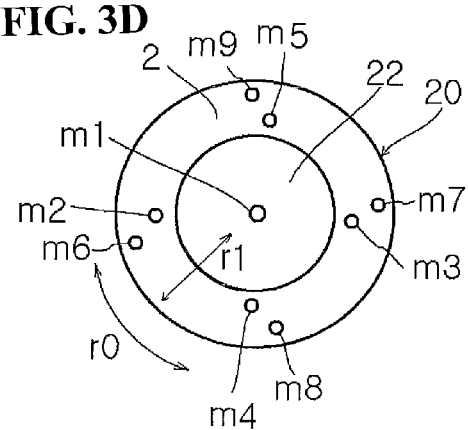
FIG. 3(D) is a schematic bottom view showing the concept of still another embodiment of the apparatus.

For example, as shown in FIG. 3(D), the openings m2 to m9 of eight introduction parts are arranged in the second processing surface 2, wherein four openings m2 to m5 of them are arranged in positions different in the circumferential direction r0 of the ring and identical in the radial direction r1 of the ring, and the other four openings m5 to m8 are arranged in positions different in the circumferential direction r0 of the ring and identical in the radial direction r1 of the ring. Then, the other openings m5 to m8 are arranged outside the radial direction r of the four openings m2 to m5. The outside openings and inside openings may be arranged in positions identical in the circumferential direction r0 of the ring, but in consideration of rotation of the ring, may be arranged in positions different in the circumferential direction r0 of the ring as shown in FIG. 3(D). In this case too, the openings are not limited to arrangement and number shown in FIG. 3(D).

Figure 3E:
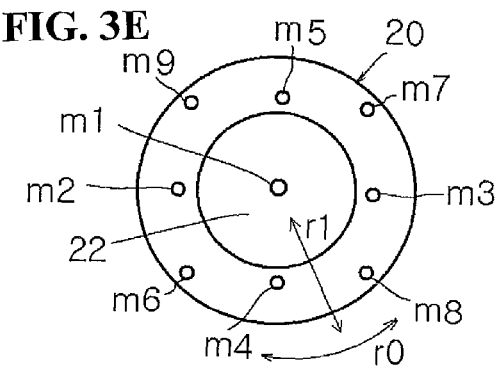
FIG. 3(E) is a schematic bottom view showing the concept of still another embodiment of the apparatus.

For example, as shown in FIG. 3(E), the outside opening in the radial direction can be arranged in the apex of a polygon, that is, in the apex of a rectangle in this case, and the inside opening in the radial direction can be positioned on one side of the rectangle. As a matter of course, other arrangements can also be used.

Figure 3F:
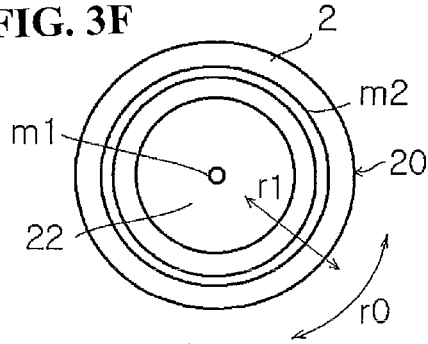
FIG. 3(F) is a schematic bottom view showing the concept of still another embodiment of the apparatus.

When the openings other than the first opening m1 feed the second processed fluid into the space between the processing surfaces, each of the openings may be arranged as continuous openings in the circumferential direction r0 as shown in FIG. 3(F), instead of being arranged discretely in the circumferential direction r0 of the processing surface.

Figure 4A:
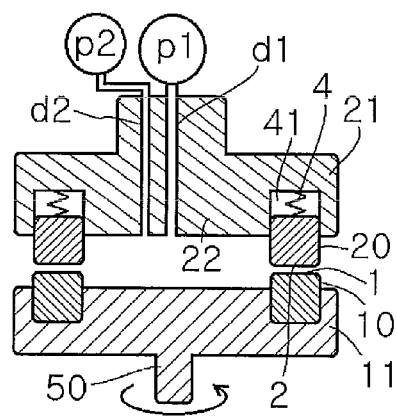
FIG. 4(A) to FIG. 4(D) each show a schematic vertical sectional view showing the concept of still another embodiment of the apparatus shown in FIG. 1.
Figure 4B:
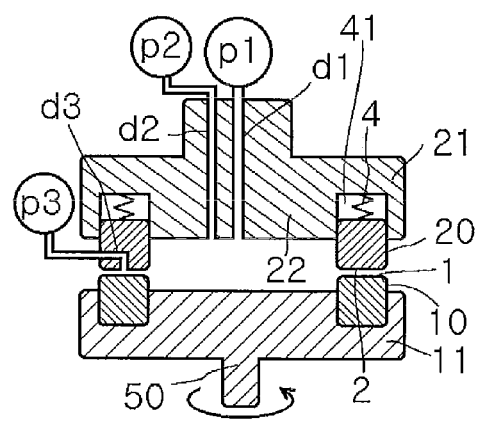
Figure 4C:
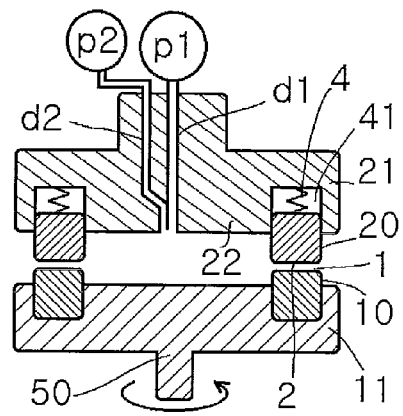
Figure 4D:
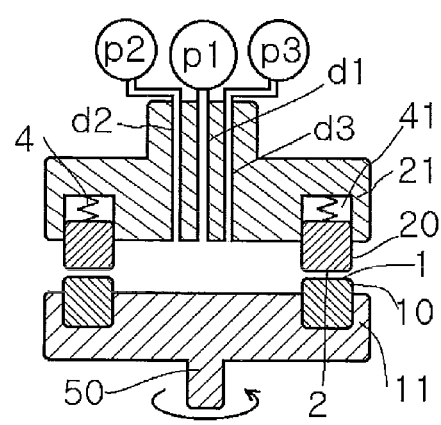

As shown in FIG. 4(A), depending on the object of processing, the second introduction part d2 arranged in the second ring 20 in the apparatus shown in FIG. 1(A) can be, similar to the first introduction part d1, arranged in the central portion 22 of the second holder 21. In this case, the opening of the second introduction part d2 is positioned with a gap outside the opening of the first introduction part d1 positioned in the center of the second ring 20. As shown in FIG. 4(B), in the apparatus shown in FIG. 4(A), the third introduction part d3 can be arranged in the second ring 20. As shown in FIG. 4(C), in the apparatus shown in FIG. 3(A), the second and third processed fluids can be introduced into the space inside the second ring 20 without arranging a gap between the opening of the first introduction part d1 and the opening of the second introduction part d2, so that both the fluids can immediately join together. As shown in FIG. 4(D), depending on the object of processing, in the apparatus shown in FIG. 3(A), the third introduction part d3 can be, similar to the second introduction part d2, arranged in the second holder 21. Four or more introduction parts may be arranged in the second holder 21 (not shown).

Figure 5A:
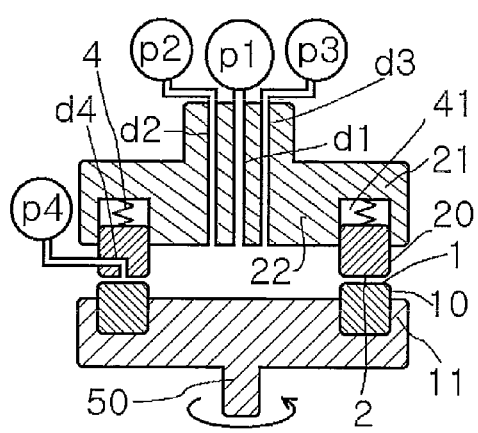
FIG. 5(A) to FIG. 5(D) each show a schematic vertical sectional view showing the concept of still another embodiment of the apparatus shown in FIG. 1.

As shown in FIG. 5(A), depending on the object of processing, in the apparatus shown in FIG. 4(D), the fourth introduction part d4 can be arranged in the second ring 20, so that the fourth processed fluid may be introduced into the space between the processing surfaces 1 and 2.

Figure 5B:
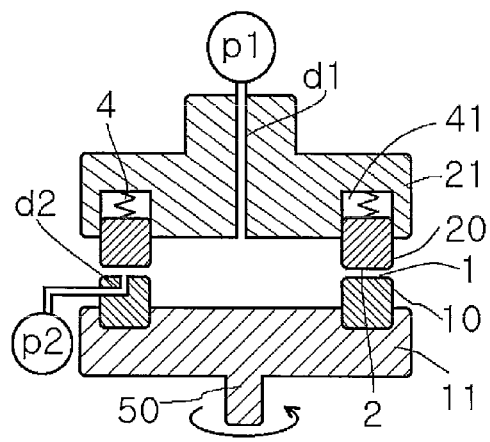

As shown in FIG. 5(B), in the apparatus shown in FIG. 1(A), the second introduction part d2 can be arranged in the first ring 10, and the opening of the second introduction part d2 can be arranged in the first processing surface 1.

Figure 5C:
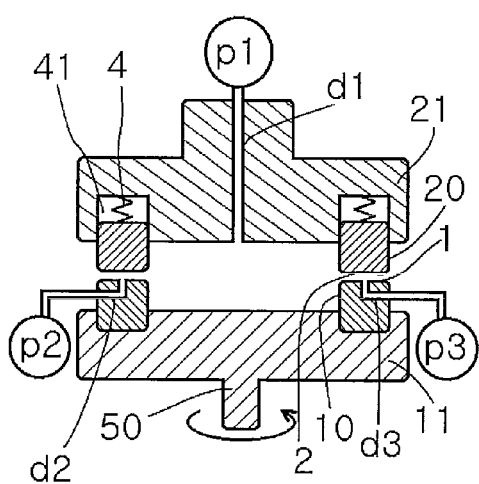

As shown in FIG. 5(C), in the apparatus shown in FIG. 5(B), the third introduction part d3 can be arranged in the first ring 10, and the opening of the third introduction part d3 and the opening of the second introduction part d2 can be arranged in the first processing surface 1 in positions different in the circumferential direction of the first ring 10.

Figure 5D:
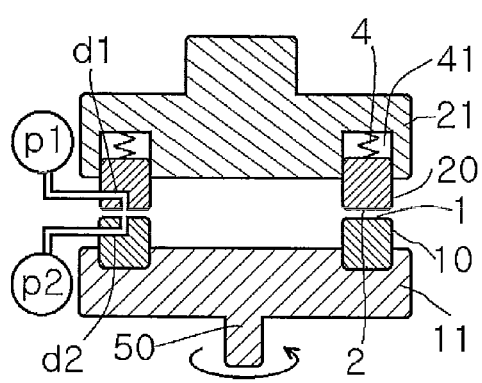

As shown in FIG. 5(D), in the apparatus shown in FIG. 5(B), the first introduction part d1 can be arranged in the second ring 20 instead of arranging the first introduction part d1 in the second holder 21, and the opening of the first introduction part d1 can be arranged in the second processing surface 2. In this case, the openings of the first and second introduction parts d1 and d2 are arranged in positions identical in the radial direction of the ring.

Figure 6A:
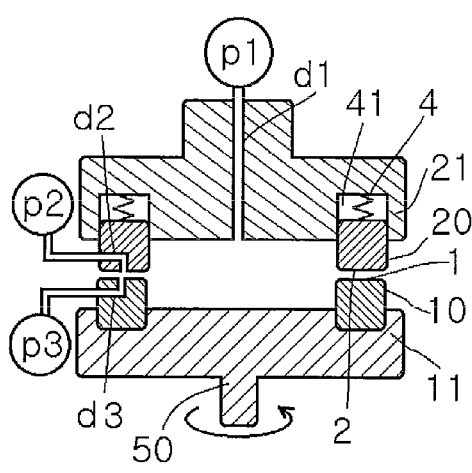
FIG. 6(A) to FIG. 6(D) each show a schematic vertical sectional view showing the concept of still another embodiment of the apparatus shown in FIG. 1.

As shown in FIG. 6(A), in the apparatus shown in FIG. 1(A), the third introduction part d3 can be arranged in the first ring 10, and the opening of the third introduction part d3 can be arranged in the first processing surface 1. In this case, both the openings of the second and third introduction parts d2 and d3 are arranged in positions identical in the radial direction of the ring. However, both the openings may be arranged in positions different in the radial direction of the ring.

Figure 6B:
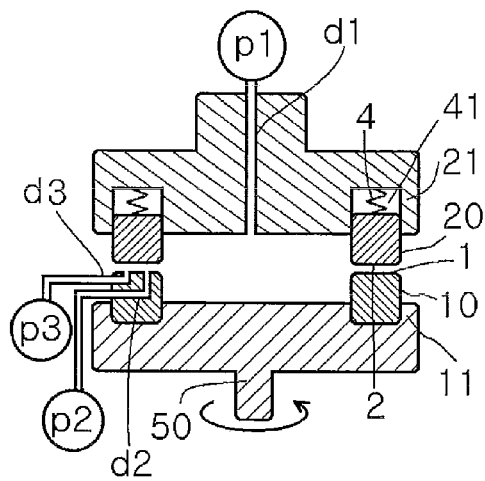

In the apparatus shown in FIG. 5(C), the openings are arranged in positions identical in the radial direction of the first ring 10 and simultaneously arranged in positions different in the circumferential direction (that is, rotation direction) of the first ring 10, but in this apparatus, as shown in FIG. 6(B), both the openings of the second and third introduction parts d2 and d3 can be arranged in positions different in the radical direction of the first ring 10. In this case, as shown in FIG. 6(B), a gap can be arranged between both the openings of the second and third introduction parts d2 and d3 in the radial direction of the first ring 10, or without arranging the gap, the second and third processed fluids may immediately join together (not shown).

Figure 6C:
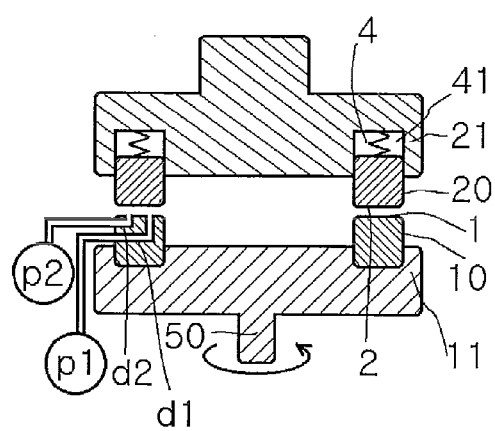

As shown in FIG. 6(C), the first introduction part d1 together with the second introduction part d2 can be arranged in the first ring 10 instead of arranging the first introduction part d1 in the second holder 21. In this case, in the first processing surface 1, the opening of the first introduction part d1 is arranged upstream (inside the radial direction of the first ring 10 from the opening of the second introduction part d2. A gap is arranged between the opening of the first introduction part d1 and the opening of the second introduction part d2 in the radial direction of the first ring 10. Alternatively, such gap may not be arranged (not shown).

Figure 6D:
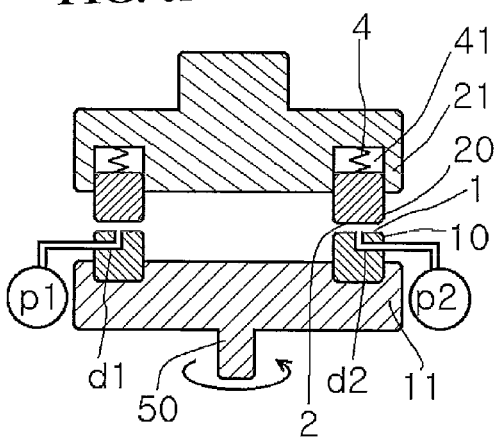

As shown in FIG. 6(D), both the openings of the first introduction part d1 and the second introduction part d2 can be arranged in positions different in the circumferential direction of the first ring 10 in the first processing surface 1 in the apparatus shown in FIG. 6(C).

In the embodiment shown in FIG. 6(C) and FIG. 6(D), three or more introduction parts may be arranged in the first ring 10, and in the second processing surface 2, so the respective openings may be arranged in positions different in the circumferential direction or in positions different in the radial direction of the ring (not shown). For example, the arrangement of openings in the second processing surface 2, shown in FIG. 3(B) to FIG. 3(F), can also be used in the first processing surface 1.

Figure 7A:
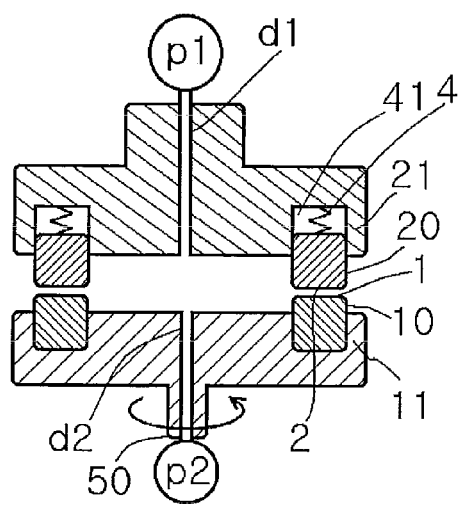
FIG. 7(A) to FIG. 7(D) each show a schematic vertical sectional view showing the concept of still another embodiment of the apparatus shown in FIG. 1.

As shown in FIG. 7(A), in the apparatus shown in FIG. 1(A), the second introduction part d2 can be arranged in the first holder 11 instead of arranging the part d2 in the second ring 20. In this case, the opening of the second introduction part d2 is arranged preferably in the center of the central shaft of rotation of the first ring 10, in the site surrounded with the first ring 10 on the upper surface of the first holder 11.

Figure 7B:
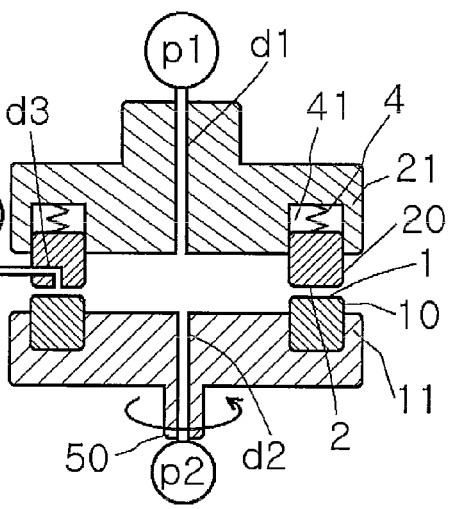

As shown in FIG. 7(B), in the embodiment shown in FIG. 7(A), the third introduction part d3 can be arranged in the second ring 20, and the opening of the third introduction part d3 can be arranged in the second processing surface 2.

Figure 7C:
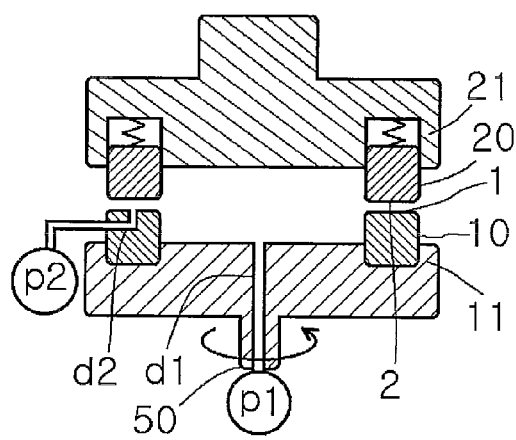

As shown in FIG. 7(C), the first introduction part d1 can be arranged in the first holder 11 instead of arranging the part d1 in the second holder 21. In this case, the opening of the first introduction part d1 is arranged preferably in the central shaft of rotation of the first ring 10, in the site surrounded with the first ring 10 on the upper surface of the first holder 11. In this case, as shown in the figure, the second introduction part d2 can be arranged in the first ring 10, and its opening can be arranged in the first processing surface 1. In this case, the second introduction part d2 can be arranged in the second ring 20, and its opening can be arranged in the second processing surface 2 (not shown).

Figure 7D:
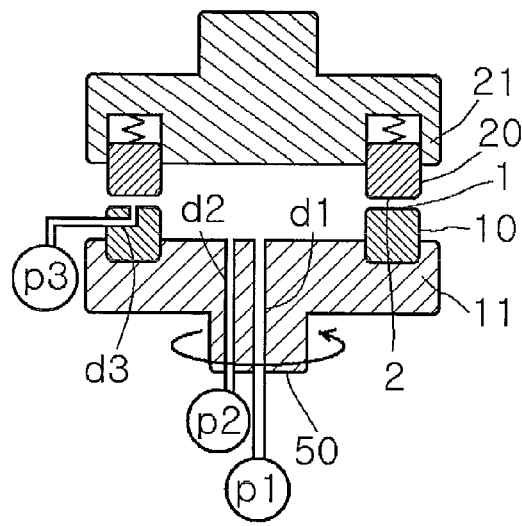

As shown in FIG. 7(D), the second introduction part d2 shown in FIG. 7(C) together with the first introduction part d1 can be arranged in the first holder 11. In this case, the opening of the second introduction part d2 is arranged in the site surrounded with the first ring 10 on the upper surface of the first holder 11. In this case, the second introduction part d2 arranged in the second ring 20 may serve as the third introduction part d3 in FIG. 7(C).

Figure 8A:
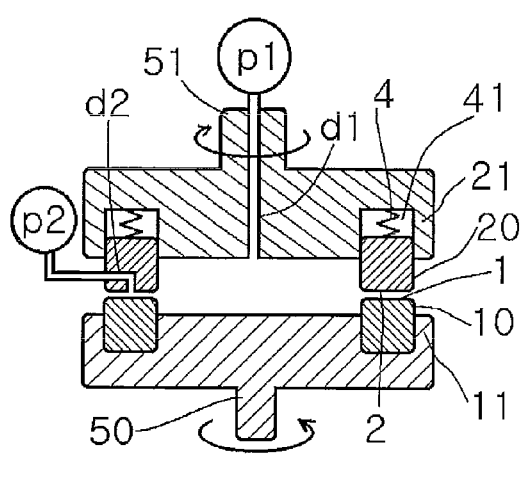
FIG. 8(A) to FIG. 8(D) each show a schematic vertical sectional view showing the concept of still another embodiment of the apparatus shown in FIG. 1.

In the embodiments shown in FIG. 1 to FIG. 7, the first holder 11 and the first ring 10 are rotated relative to the second holder 21 and the second ring 20, respectively. As shown in FIG. 8(A), in the apparatus shown in FIG. 1(A), the second holder 2 may be provided with a rotary shaft 51 rotating with the turning force from the rotation drive member, to rotate the second holder 21 in a direction opposite to the first holder 11. The rotation drive member may be arranged separately from the one for rotating the rotary shaft 50 of the first holder 11 or may receive power from the drive part for rotating the rotary shaft 50 of the first holder 11 by a power transmission means such as a gear. In this case, the second holder 2 is formed separately from the case, and shall, like the first holder 11, be rotatably accepted in the case.

Figure 8B:
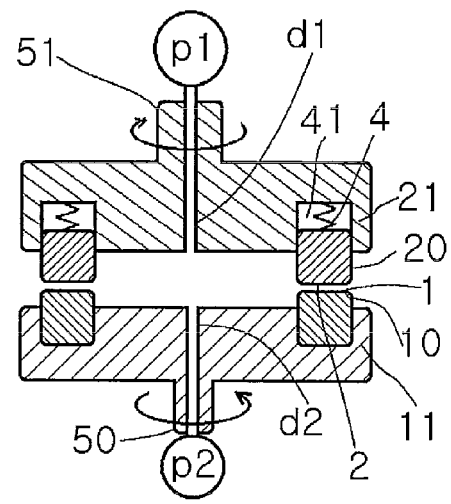

As shown in FIG. 8(B), in the apparatus shown in FIG. 8(A), the second introduction part d2 can be, similarly in the apparatus in FIG. 7(B), arranged in the first holder 11 in place of the second ring 20.

Figure 8C:
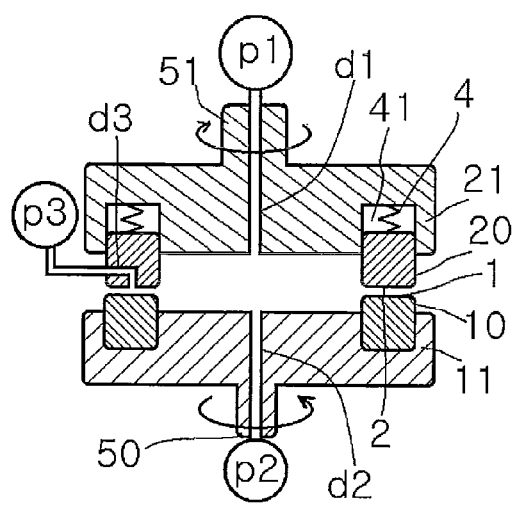

In the apparatus shown in FIG. 8(B), the second introduction part d2 can be arranged in the second holder 21 in place of the first holder 11 (not shown). In this case, the second introduction part d2 is the same as one in the apparatus in FIG. 7(A). As shown in FIG. 8(C), in the apparatus shown in FIG. 8(B), the third introduction part d3 can be arranged in the second ring 20, and the opening of the third introduction part d3 can be arranged in the second processing surface 2.

Figure 8D:
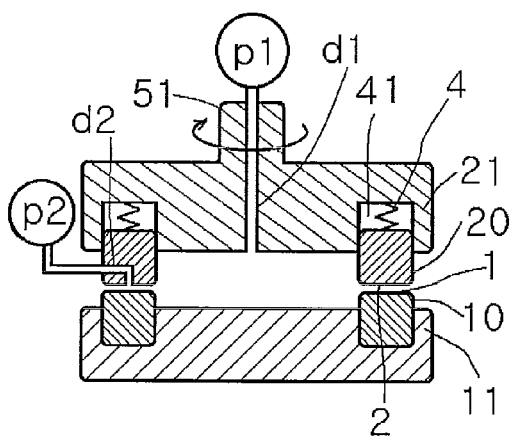

As shown in FIG. 8(D), the second holder 21 only can be rotated without rotating the first holder 11. Even in the apparatuses shown in FIG. 1(B) to FIG. 7, the second holder 21 together with the first holder 11, or the second holder 21 alone, can be rotated (not shown).

Figure 9A:
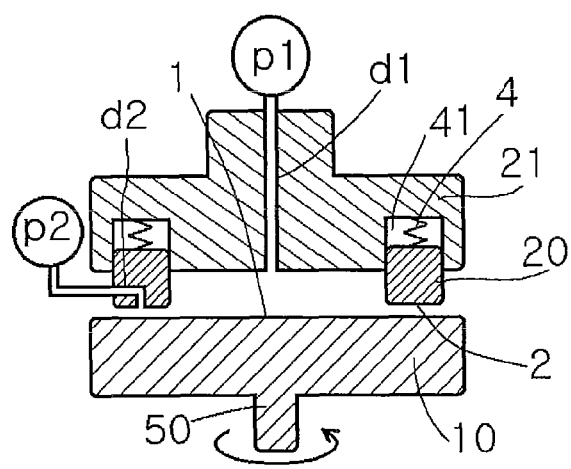

As shown in FIG. 9(A), the second processing member 20 is a ring, while the first processing member 10 is not a ring and can be a rotating member provided directly with a rotary shaft 50 similar to that of the first holder 11 in other embodiments. In this case, the upper surface of the first processing member 10 serves as the first processing surface 1, and the processing surface is an evenly flat surface which is not circular (that is, hollow-free). In the apparatus shown in FIG. 9(A), similarly in the apparatus in FIG. 1(A), the second introduction part d2 is arranged in the second ring 20, and its opening is arranged in the second processing surface 2.

Figure 9B:
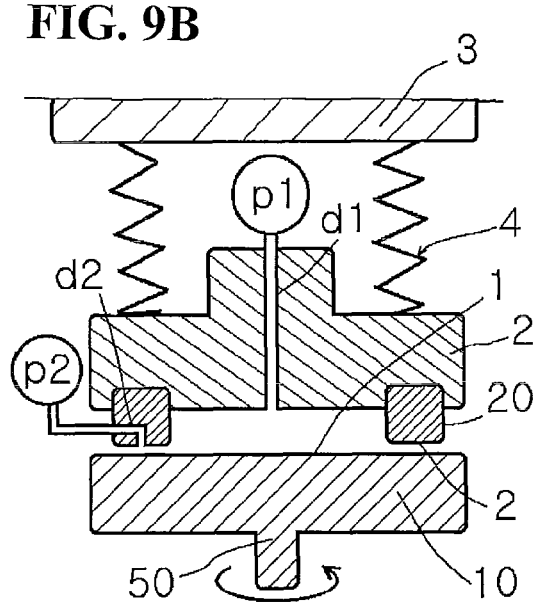
Figure 9C:
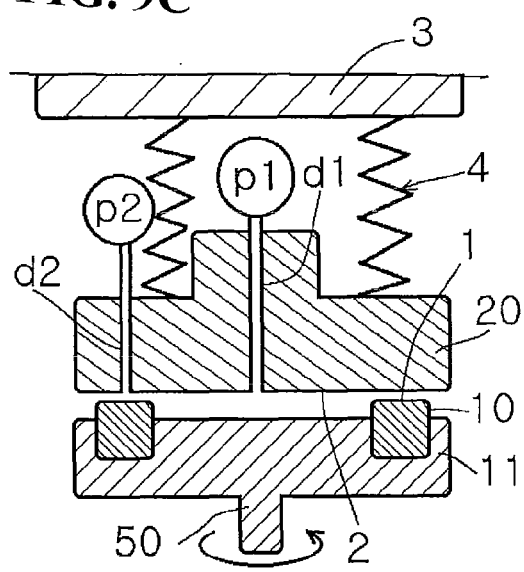
Figure 10A:
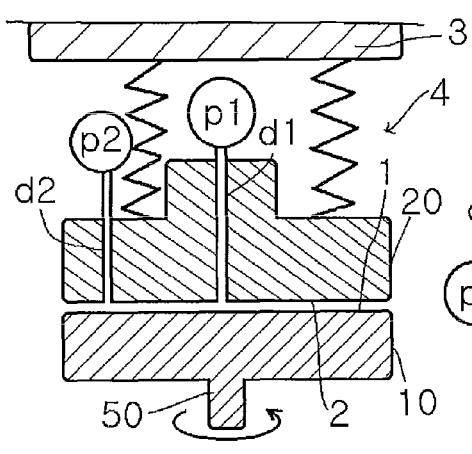
FIG. 10(A) to FIG. 10(D) each show a schematic vertical sectional view showing the concept of still another embodiment of the apparatus shown in FIG. 1.

As shown in FIG. 9(B), in the apparatus shown in FIG. 9(A), the second holder 21 is independent of the case 3, and a surface-approaching pressure imparting mechanism 4 such as an elastic body for approaching to and separating from the first processing member 10 provided with the second ring 20 can be provided between the case 3 and the second holder 21. In this case, as shown in FIG. 9(C), the second processing member 20 is not a ring, but is a member corresponding to the second holder 21, and the lower surface of the member can serve as the second processing surface 2. As shown in FIG. 10(A), in the apparatus shown in FIG. 9(C), the first processing member 10 is not a ring either, and in other embodiments similarly in the apparatus shown in FIG. 9 (A) and FIG. 9(B), the site corresponding to the first holder 11 can serve as the first processing member 10, and its upper surface can serve as the first processing surface 1.

In the embodiments described above, at least the first fluid is supplied from the first processing member 10 and the second processing member 20, that is, from the central part of the first ring 10 and the second ring 20, and after processing (mixing and reaction) of the other fluids, the processed fluid is discharged to the outside in the radial direction.

Figure 10B:
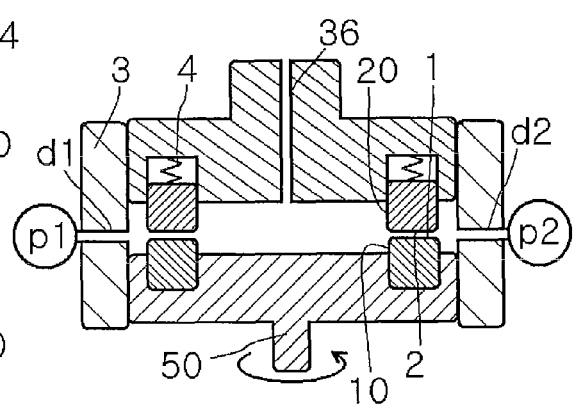

Alternatively, as shown in FIG. 10(B), the first fluid can be supplied in the direction from the outside to the inside of the first ring 10 and second ring 20. In this case, the outside of the first holder 11 and the second holder 21 is sealed with the case 3, the first introduction part d1 is arranged directly in the case 3, and the opening of the introduction part is arranged in a site inside the case and corresponding to the abutting position of the rings 10 and 20, as shown in the figure. In the apparatus in FIG. 1(A), a discharge part 36 is arranged in the position in which the first introduction part d1 is arranged, that is, in the central position of the ring 1 of the first holder 11. The opening of the second introduction part d2 is arranged in the opposite side of the opening of the case behind the central shaft of rotation of the holder. However, the opening of the second introduction part d may be, similar to the opening of the first introduction part d1, arranged in a site inside the case and corresponding to the abutting position of the rings 10 and 20. As described above, the embodiment is not limited to the one where the opening of the second introduction part\_d2 is formed to the opposite side of the opening of the first introduction part d1.

A discharge part 36 for the product after processing is arranged. In this case, the outside of the diameter of both rings 10 and 20 is on the upstream side, and the inside of both the rings 10 and 20 is on the downstream side.

Figure 10C:
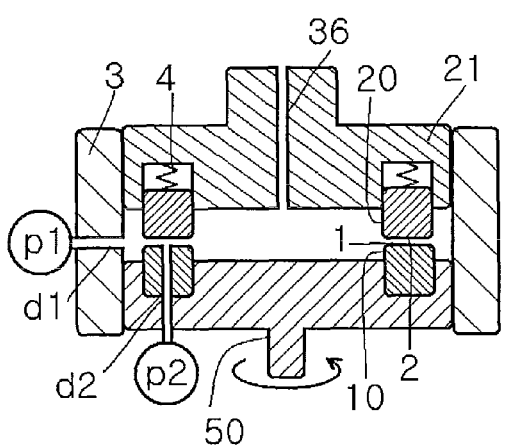
Figure 10D:
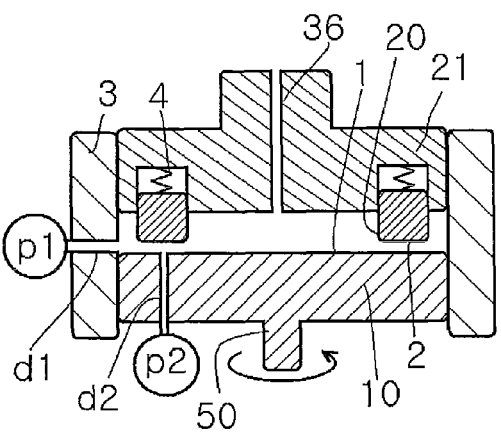

As shown in FIG. 10(C), in the apparatus shown in FIG. 10(B), the second introduction part d2, which is arranged in the side of the case 3, can be arranged in the first ring 10 in space of the mentioned position, and its opening can be arranged in the first processing surface 1. In this case, as shown in FIG. 10(D), the first processing member 10 is not formed as a ring. Similarly in the apparatuses shown in FIG. 9(B), FIG. 9(C) and FIG. 10(A), in other embodiments, the site corresponding to the first holder 11 is the first processing member 10, its upper surface being the first processing surface 1, the second introduction part d2 being arranged in the first processing member 10, and its opening may be arranged in the first processing surface 1.

Figure 11A:
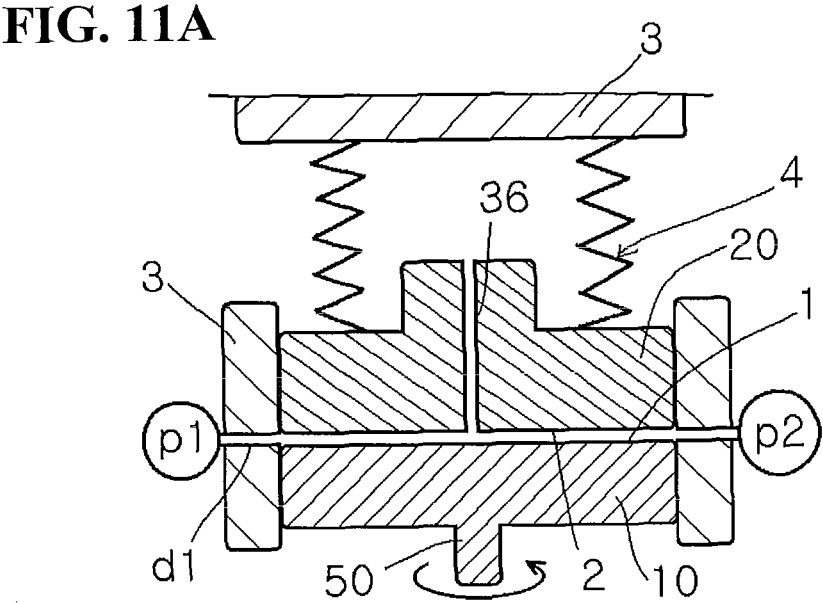
FIG. 11(A) and FIG. 11(B) each show a schematic vertical sectional view showing the concept of still another embodiment of the apparatus shown in FIG. 1.

As shown in FIG. 11(A), in the apparatus shown in FIG. 10(D), the second processing member 20 is not formed as a ring, and in other embodiments, the member corresponding to the second holder 21 serves as the second processing member 2, and its lower surface serves as the second processing surface 2. Then, the second processing member 20 is a member independent of the case 3, and the same surface-approaching pressure imparting mechanism 4 as one in the apparatuses shown in FIG. 9(C), FIG. 9(D) and FIG. 10(A) can be arranged between the case 3 and the second processing member 20.

Figure 11B:
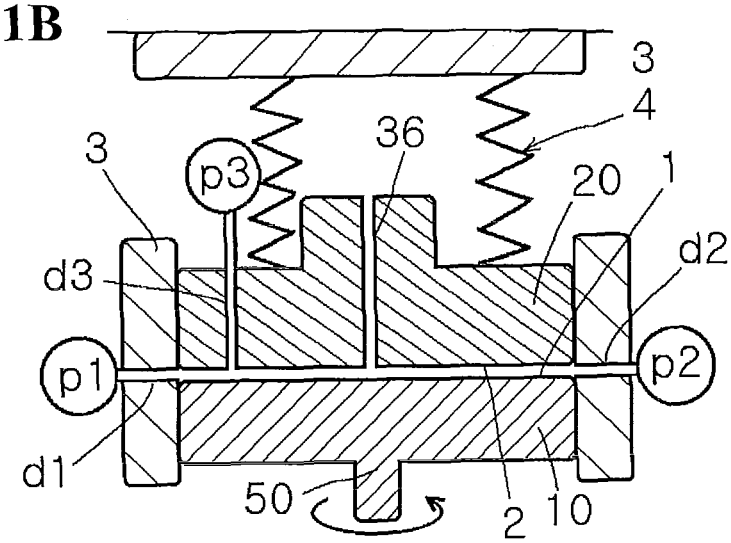
Figure 11C:
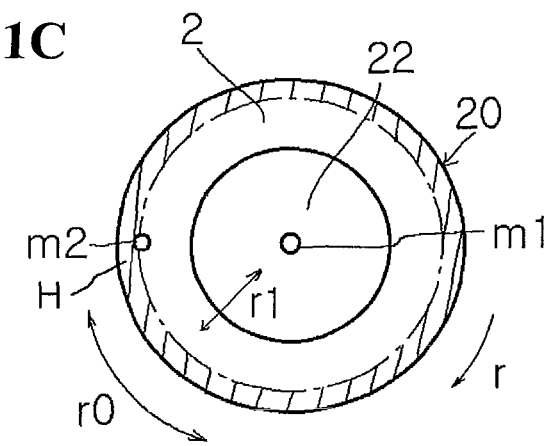
FIG. 11(C) is a schematic bottom view showing an important part of the apparatus shown in FIG. 1(A).

As shown in FIG. 11(B), the second introduction part d2 in the apparatus shown in FIG. 11(A) serves as the third introduction part d3, and separately the second introduction part d2 can be arranged. In this case, the opening of the second introduction part d2 is arranged upstream from the opening of the third introduction part d3 in the second processing surface 2.

In the apparatuses shown in FIG. 4 and the apparatuses shown in FIG. 5(A), FIG. 7 (A), FIG. 7(B), FIG. 7(D), FIG. 8(B) and FIG. 8(C), other processed fluids flow into the first processed fluid before reaching the processing surfaces 1 and 2, and these apparatuses are not suitable for the fluid which is rapidly crystallized or separated. However, these apparatuses can be used for the fluid having a low reaction speed.

The processing apparatus suitable for carrying out the method according to the present invention is summarized as follows.

As described above, the processing apparatus comprises a fluid pressure imparting mechanism that imparts predetermined pressure to a processed fluid, at least two processing members, that is, a first processing member 10 arranged in a sealed fluid flow path through which a processed fluid at the predetermined pressure flows and a second processing member 20 capable of approaching to and separating from the first processing member 10, at least two processing surfaces of a first processing surface 1 and a second processing surface 2 arranged in a position in which they are faced with each other in the processing members 10 and 20, and a rotation drive mechanism that relatively rotates the first processing member 10 and the second processing member 20, wherein at least two processed fluids are mixed and reacted between the processing surfaces 1 and 2. Of the first processing member 10 and the second processing member 20, at least the second processing member 20 has a pressure-receiving surface, at least a part of the pressure-receiving surface is comprised of the second processing surface 2, and the pressure-receiving surface receives pressure applied by the fluid pressure imparting mechanism to at least one of the fluids to generate a force to move in the direction of separating the second processing surface 2 from the first processing surface 1. In this apparatus, the processed fluid that has received said pressure passes through the space between the first processing surface 1 and the second processing surface 2 capable of approaching to and separating from each other, thereby generating a desired reaction between the processed fluids with the processed fluids being passed between the processing surfaces 1 and 2 and forming a fluid film of predetermined thickness.

In this processing apparatus, at least one of the first processing surface 1 and the second processing surface 2 is preferably provided with a buffer mechanism for regulation of micro-vibration and alignment.

In this processing apparatus, one of or both the first processing surface 1 and the second processing surface 2 is preferably provided with a displacement regulating mechanism capable of regulating the displacement in the axial direction caused by abrasion or the like thereby maintaining the thickness of a fluid film between the processing surfaces 1 and 2.

In this processing apparatus, a pressure device such as a compressor for applying predetermined feeding pressure to a fluid can be used as the fluid pressure imparting mechanism.

As the pressure device, a device capable of regulating an increase and decrease in feeding pressure is used. This is because the pressure device should be able to keep established pressure constant and should be able to regulate an increase and decrease in feeding pressure as a parameter to regulate the distance between the processing surfaces.

The processing apparatus can be provided with a separation preventing part for defining the maximum distance between the first processing surface 1 and the second processing surface 2 and preventing the processing surfaces 1 and 2 from separating from each other by the maximum distance or more.

The processing apparatus can be provided with an approach preventing part for defining the minimum distance between the first processing surface 1 and the second processing surface 2 and preventing the processing surfaces 1 and 2 from approaching to each other by the minimum distance or less.

The processing apparatus can be one wherein both the first processing surface 1 and the second processing surface 2 are rotated in opposite directions.

The processing apparatus can be provided with a temperature-regulating jacket for regulating the temperature of either or both of the first processing surface 1 and the second processing surface 2.

The processing apparatus is preferably one wherein at least a part of either or both of the first processing surface 1 and the second processing surface 2 is mirror-polished.

The processing apparatus can be one wherein one of or both the first processing surface 1 and the second processing surface 2 is provided with depressions.

The processing apparatus preferably includes, as a means for feeding one processed fluid to be reacted with another processed fluid, a separate introduction path independent of a path for another processed fluid, at least one of the first processing surface and the second processing surface is provided with an opening leading to the separate introduction path, and another processed fluid sent through the separate introduction path is introduced into the processed fluid.

The processing apparatus for carrying out the present invention comprises a fluid pressure imparting mechanism that imparts predetermined pressure to a fluid, at least two processing surfaces of a first processing surface 1 and a second processing surface 2 capable of approaching to and separating from each other which are connected to a sealed fluid flow path through which the processed fluid at the predetermined pressure is passed, a surface-approaching pressure imparting mechanism that imparts surface-approaching pressure to the space between the processing surfaces 1 and 2, and a rotation drive mechanism that relatively rotates the first processing surface 1 and the second processing surface 2, whereby at least two processed fluids are reacted between the processing surfaces 1 and 2, at least one processed fluid pressurized with the fluid pressure imparting mechanism is passed through the space between the first processing surface 1 and the second processing surface 2 rotating to each other and supplied with surface-approaching pressure, and another processed fluid is passed, so that the processed fluid pressurized with the fluid pressure imparting mechanism, while being passed between the processing surfaces and forming a fluid film of predetermined thickness, is mixed with another processed fluid, whereby a desired reaction is caused between the processed fluids.

The surface-approaching pressure imparting mechanism can constitute a buffer mechanism of regulating micro-vibration and alignment and a displacement regulation mechanism in the apparatus described above.

The processing apparatus for carrying out the present invention comprises a first introduction part that introduces, into the apparatus, at least one of two processed fluids to be reacted, a fluid pressure imparting mechanism p that is connected to the first introduction part and imparts pressure to the processed fluid, a second introduction part that introduces at least the other fluid of the two processed fluids to be reacted, at least two processing members, that is, a first processing member 10 arranged in a sealed fluid flow path through which the other processed fluid is passed and a second processing member 20 capable of relatively approaching to and separating from the first processing member 10, at least two processing surfaces, that is, a first processing surface 1 and a second processing surface 2 arranged so as to be opposite to each other in the processing members 10 and 20, a holder 21 that accepts the second processing member 20 so as to expose the second processing surface 2, a rotation drive mechanism that relatively rotates the first processing member 10 and the second processing member 20, and a surface-approaching pressure imparting mechanism 4 that presses the second processing member 20 against the first processing surface 1 such that the second processing surface 2 is contacted against or made close to the first processing surface 1, wherein the processed fluids are reacted between the processing surfaces 1 and 2, the holder 21 is provided with an opening of the first introduction part and is not movable so as to influence the space between the processing surfaces 1 and 2, at least one of the first processing member 10 and the second introduction part 20 is provided with an opening of the second introduction part, the second processing member 20 is circular, the second processing surface 2 slides along the holder 21 and approaches to and separates from the first processing surface 1, the second processing member 20 includes a pressure-receiving surface, the pressure-receiving surface receives pressure applied by the fluid pressure imparting mechanism p to the processed fluid to generate a force to move in the direction of separating the second processing surface 2 from the first processing surface 1, at least a part of the pressure-receiving surface is comprised of the second processing surface 2, one of the processed fluids to which pressure was applied is passed through the space between the first processing surface 1 and the second processing surface 2 rotating to each other and capable of approaching to and separating from each other, and the other processed fluid is supplied to the space between the processing surfaces 1 and 2, whereby both the processed fluids form a fluid film of predetermined thickness and pass through the space between both the processing surfaces 1 and 2, the passing processed fluid are mixed thereby promoting a desired reaction between the processed fluids, and the minimum distance for generating the fluid film of predetermined thickness is kept between the processing surfaces 1 and 2 by the balance between the surface-approaching pressure by the surface-approaching pressure imparting mechanism 4 and the force of separating the processing surfaces 1 and 2 from each other by the fluid pressure imparted by the fluid pressure imparting mechanism p.

In this processing apparatus, the second introduction part can be, similarly being connected to the first introduction part, arranged to be connected to a separate fluid pressure imparting mechanism and to be pressurized. The processed fluid introduced from the second introduction part is not pressurized by the separate fluid pressure imparting mechanism, but is sucked and supplied into the space between the processing surfaces 1 and 2 by negative pressure generated in the second introduction part by the fluid pressure of the processed fluid introduced into the first introduction part. Alternatively, the other processed fluid flows downward by its weight in the second introduction part and can be supplied into the space between the processing surfaces 1 and 2.

As described above, the apparatus is not limited to the one wherein the opening of the first introduction part as an inlet for feeding the other processed fluid into the apparatus is arranged in the second holder, and the opening of the first introduction part may be arranged in the first holder. The opening of the first introduction part may be formed with at least one of the processing surfaces. However, when the processed fluid to be previously introduced into the space between the processing surfaces 1 and 2 should, depending on the reaction, be supplied from the first introduction part, the opening of the second introduction part as an inlet for feeding the other processed fluid into the apparatus should be arranged downstream from the opening of the first introduction part in any of the processing surfaces.

As the processing apparatus for carrying out the present invention, the following apparatus can be used.

This processing apparatus comprises a plurality of introduction parts that separately introduce two or more processed fluids to be reacted, a fluid pressure imparting mechanism p that imparts pressure to at least one of the two or more processed fluids, at least two processing members, that is, a first processing member 10 arranged in a sealed fluid flow path through which the processed fluid is passed and a second processing member 20 capable of approaching to and separating from the first processing member 10, at least two processing surfaces 1 and 2, that is, a first processing surface 1 and a second processing surface 2 arranged in a position in which they are faced with each other in the processing members 10 and 20, and a rotation drive mechanism that relatively rotates the first processing member 10 and the second processing member 20, wherein the processed fluids are reacted between the processing surfaces 1 and 2, at least the second processing member 20 of the first processing member 10 and the second processing member 20 includes a pressure-receiving surface, at least a part of the pressure-receiving surface is comprised of the second processing surface 2, the pressure-receiving surface receives pressure applied by the fluid pressure imparting mechanism to the processed fluid to generate a force to move in the direction of separating the second processing surface 2 from the first processing surface 1, the second processing member 20 includes an approach regulating surface 24 that is directed to the opposite side of the second processing surface 2, the approach regulating surface 24 receives predetermined pressure applied to the processed fluid to generate a force to move in the direction of approaching the second processing surface 2 to the first processing surface 1, a force to move in the direction of separating the second processing surface 2 from the first processing surface 1 as a resultant force of total pressure received from the processed fluid is determined by the area ratio of the projected area of the approach regulating surface 24 in the approaching and separating direction to the projected area of the pressure-receiving surface in the approaching and separating direction, the processed fluid to which pressure was applied is passed through the space between the first processing surface 1 and the second processing surface 2 that rotate relative to each other and capable of approaching to and separating from each other, the other processed fluid to be reacted with the processed fluid is mixed in the space between the processing surfaces, and the mixed processed fluid forms a fluid film of predetermined thickness and simultaneously passes through the space between the processing surfaces 1 and 2, thereby giving a desired reaction product while passing through the space between the processing surfaces.

The processing method according to the present invention is summarized as follows. The processing method comprises applying predetermined pressure to a first fluid, connecting at least two processing surfaces, that is, a first processing surface 1 and a second processing surface 2, which are capable of approaching to and separating from each other, to a sealed fluid flow path through which the processed fluid that has received the predetermined pressure is passed, applying a surface-approaching pressure of approaching the first processing surface 1 and the second processing surface 2 each other, rotating the first processing surface 1 and the second processing surface 2 relative to each other, and introducing the processed fluid into the space between the processing surfaces 1 and 2, wherein the second processed fluid to be reacted with the processed fluid is introduced through a separate flow path into the space between the processing surfaces 1 and 2 thereby reacting both the processed fluids, the predetermined pressure applied to at least the first processed fluid functions as a separating force for separating the processing surfaces 1 and 2 from each other, and the separating force and the surface-approaching pressure are balanced via the processed fluid between the processing surfaces 1 and 2, whereby the distance between the processing surfaces 1 and 2 is kept in a predetermined minute space, the processed fluid is passed as a fluid film of predetermined thickness through the space between the processing surfaces 1 and 2, and when both the processed fluids are uniformly reacted with each other while passing and accompanied by separation, a desired reaction product is crystallized or separated.

Figure 25:
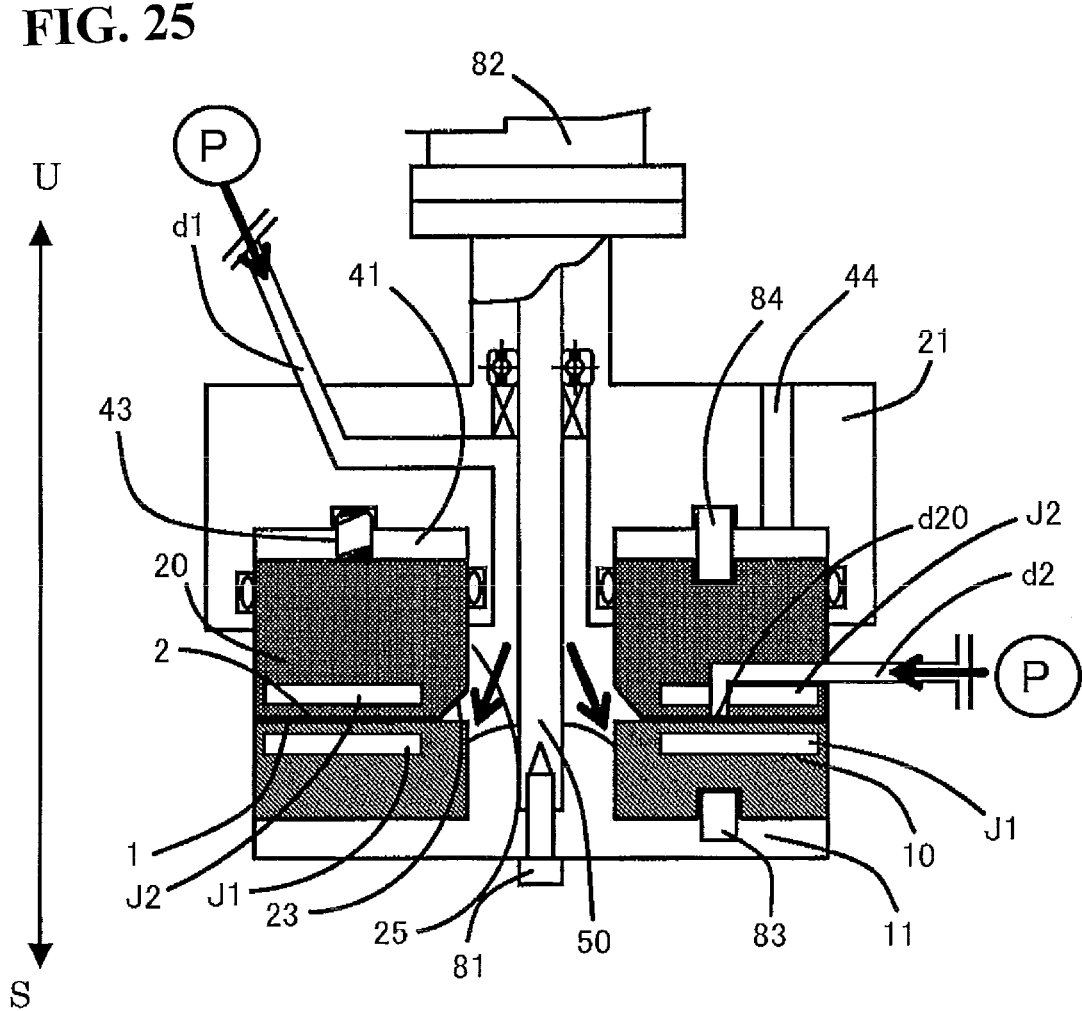
FIG. 25 is a schematic vertical sectional view showing outline of the apparatus of the present invention.
Figure 26A:
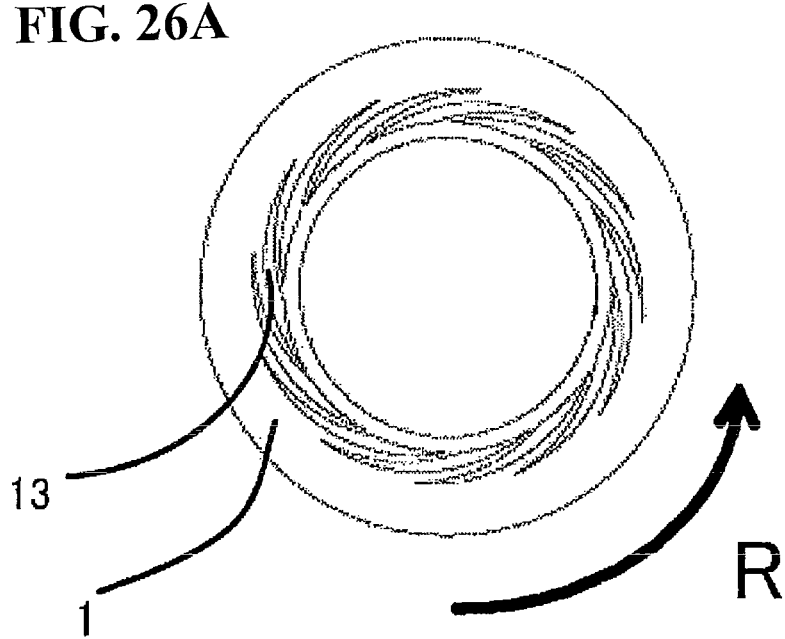
FIG. 26(A) is a schematic plane view of the first processing surface in the apparatus shown in FIG. 25.
Figure 26B:
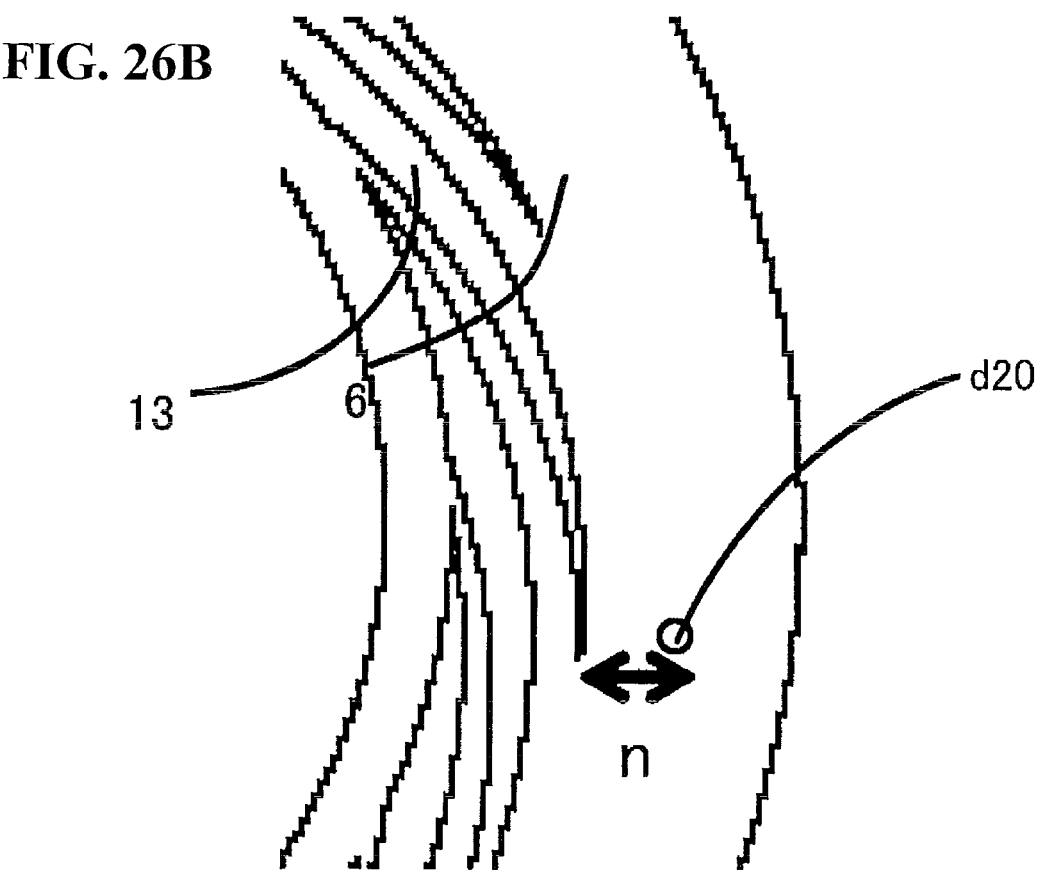
FIG. 26(B) is an enlarged view showing an important part of the first processing surface in the apparatus shown in FIG. 25.
Figure 27A:
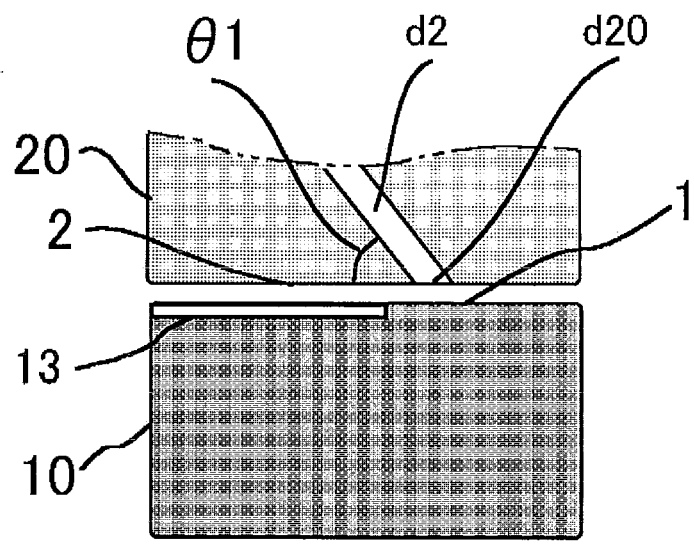
FIG. 27(A) is a sectional view of the second introduction path.
Figure 27B:
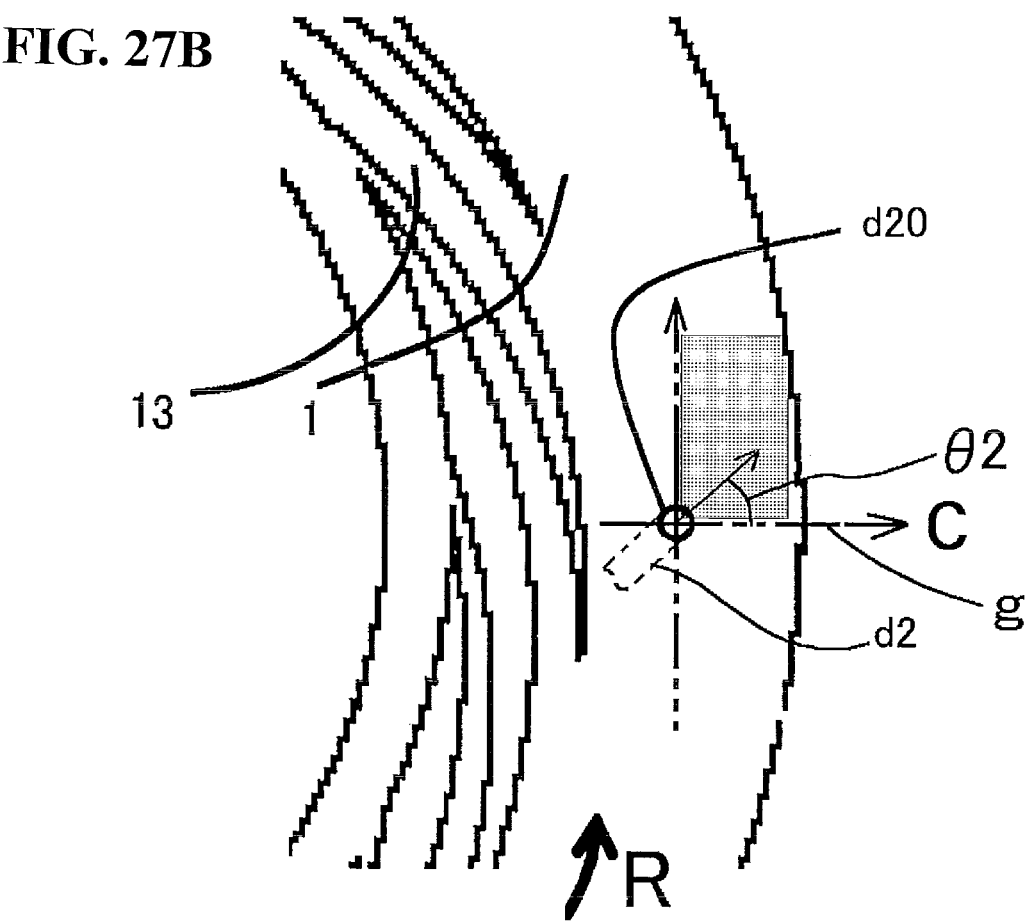
FIG. 27(B) is an enlarged view showing an important part of the processing surface for explaining the second introduction path.

Hereinafter, other embodiments of the present invention are described in detail. FIG. 25 is a schematic sectional view of a reaction apparatus wherein reactants are reacted between processing surfaces, at least one of which rotates relative to the other, and which are capable of approaching to and separating from each other. FIG. 26(A) is a schematic plane view of the first processing surface in the apparatus shown in FIG. 25, and FIG. 26(B) is an enlarged view of an important part of the processing surface in the apparatus shown in FIG. 25. FIG. 27(A) is a sectional view of the second introduction path, and FIG. 27(B) is an enlarged view of an important part for explaining the second introduction path.

In FIG. 25, arrows U and S show upward and downward directions respectively.

In FIG. 26 (A) and FIG. 27 (B), arrow R shows the direction of rotation.

In FIG. 27 (B), arrow C shows the direction of centrifugal force (radial direction).

This apparatus uses at least two fluids, at least one of which contains at least one kind of reactant, and the fluids join together in the space between the processing surfaces arranged to be opposite so as to able to approach to and separate from each other, at least one of which rotates relative to the other, thereby forming a thin film fluid, and the reactants are reacted in the thin film fluid.

As shown in FIG. 25, this apparatus includes a first holder 11, a second holder 21 arranged over the first holder 11, a fluid pressure imparting mechanism P and a surface-approaching pressure imparting mechanism. The surface-approaching pressure imparting mechanism is comprised of a spring 43 and an air introduction part 44.

The first holder 11 is provided with a first processing member 10 and a rotary shaft 50. The first processing member 10 is a circular body called a mating and provided with a mirror-polished first processing surface 1. The rotary shaft 50 is fixed to the center of the first holder 11 with a fixing device 81 such as a bolt and is connected at its rear end to a rotation drive device 82 (rotation drive mechanism) such as a motor, and the drive power of the rotation drive device 82 is transmitted to the first holder 1 thereby rotating the first holder 11. The first processing member 10 is integrated with the first holder 11 and rotated.

A receiving part capable of receiving the first processing member 10 is arranged on the upper part of the first holder 11, wherein the first processing member 10 has been fixed to the first holder 11 by insertion to the receiving part. The first processing member 10 has been fixed with a rotation-preventing pin 83 so as not to be rotated relative to the first holder 11. However, a method such as fitting by burning may be used for fixing in place of the rotation-preventing pin 83 in order to prevent rotation.

The first processing surface 1 is exposed from the first holder 11 and faced with the second holder 21. The material for the first processing surface includes ceramics, sintered metal, abrasion-resistant steel, other hardened metals, and rigid materials subjected to lining, coating or plating.

The second holder 21 is provided with a second processing member 20, a first introduction part d1 for introducing a fluid from the inside of the processing member, a spring 43 as a surface-approaching pressure imparting mechanism, and an air introduction part 44.

The second processing member 20 is a circular member called a compression ring and includes a second processing surface 2 subjected to mirror polishing and a pressure-receiving surface 23 (referred to hereinafter as separation regulating surface 23) which is located inside the second processing surface 2 and adjacent to the second processing surface 2. As shown in the figure, the separation regulating surface 23 is an inclined surface. The method of the mirror polishing to which the second processing surface 2 was subjected is the same as that to the first processing surface 1. The material for the second processing member 20 may be the same as one for the first processing member 10. The separation regulating surface 23 is adjacent to the inner periphery 25 of the circular second processing member 20.

A ring-accepting part 41 is formed in the bottom (lower part) of the second holder 21, and the second processing member 20 together with an O-ring is accepted in the ring-accepting part 41. The second processing member 20 is accepted with a rotation preventive 84 so as not to be rotated relative to the second holder 21. The second processing surface 2 is exposed from the second holder 21. In this state, the second processing surface 2 is faced with the first processing surface 1 of the first processing member 10.

The ring-accepting part 41 arranged in the second holder 21 is a depression for mainly accepting that side of the second ring 20 which is opposite to the processing surface 2 and is a groove formed in a circular form when viewed in a plane.

The ring-accepting part 41 is formed in a larger size than the second ring 20 and accepts the second ring 20 with sufficient clearance between itself and the second ring 20.

By this clearance, the second processing member 20 is accepted in the ring-accepting part 41 such that it can be displaced not only in the axial direction of the accepting part 41 but also in a direction perpendicular to the axial direction. The second processing member 20 is accepted in the ring-accepting part 41 such that the central line (axial direction) of the second processing member 20 can be displaced so as not to be parallel to the axial direction of the ring-accepting part 41.

The spring 43 is arranged as a processing member-biasing part in at least the ring-accepting part 41 of the second holder 21. The spring 43 biases the second processing member 20 toward the first processing member 10. As another bias method, air pressure such as one in the air introduction part 44 or another pressurization means for applying fluid pressure may be used to bias the second processing member 20 held by the second holder 21 in the direction of approaching the second processing member 20 to the first processing member 10.

The surface-approaching pressure imparting mechanism such as the spring 43 or the air introduction part 44 biases each position (each position in the processing surface) in the circumferential direction of the second processing member 20 evenly toward the first processing member 10. The first introduction part d1 is arranged on the center of the second holder 21, and the fluid which is pressure-fed from the first introduction part d1 to the outer periphery of the processing member is first introduced into the space surrounded with the second processing member 20 held by the second holder 21, the first processing member 10, and the first holder 11 that holds the first processing member 10. Then, the feeding pressure (supply pressure) of the fluid by the fluid pressure imparting mechanism P is applied to the pressure-receiving surface 23 arranged in the second processing member 20, in the direction of separating the second processing member 20 from the first processing member 10 against the bias of the biasing part.

Figure 29A:
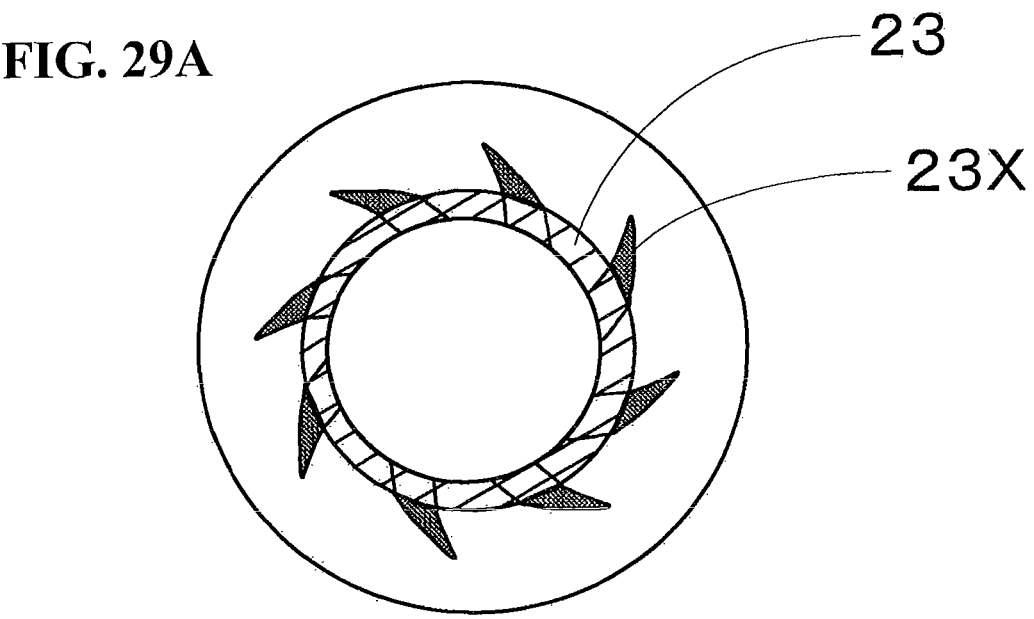
FIG. 29(A) is a bottom view of the second processing member.
Figure 29B:
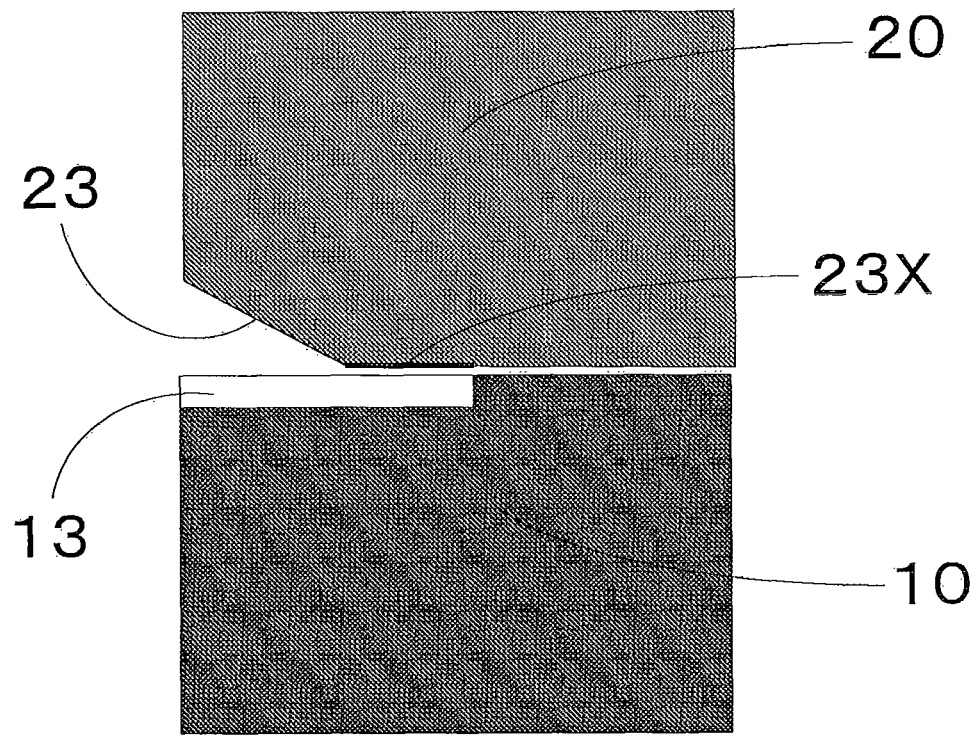
FIG. 29(B) is an enlarged sectional view showing an important part thereof.

For simplifying the description of other components, only the pressure-receiving surface 23 is described, and as shown in FIG. 29(A) and FIG. 29(B), properly speaking, together with the pressure-receiving surface 23, a part 23X not provided with the pressure-receiving surface 23, out of the projected area in the axial direction relative to the second processing member 20 in a grooved depression 13 described later, serves as a pressure-receiving surface and receives the feeding pressure (supply pressure) of the fluid by the fluid pressure imparting mechanism P.

The apparatus may not be provided with the pressure-receiving surface 23. In this case, as shown in FIG. 26(A), the effect (micro-pump effect) of introduction of the processed fluid into the space between the processing surfaces formed by rotation of the first processing surface 1 provided with the grooved depression 13 formed to function the surface-approaching pressure imparting mechanism may be used. The micro-pump effect is an effect by which the fluid in the depression advances with speed toward the end in the circumferential direction by rotation of the first processing surface 1 and then the fluid sent to the end of the depression 13 further receives pressure in the direction of inner periphery of the depression 13 thereby finally receiving pressure in the direction of separating the processing surface and simultaneously introducing the fluid into the space between the processing surfaces. Even if the first processing surface 1 is not rotated, the pressure applied to the fluid in the depression 13 arranged in the first processing surface 1 finally acts on the second processing surface 2 to be separated as a pressure-receiving surface.

For the depression 13 arranged on the processing surface, its total area in the horizontal direction relative to the processing surface, and the depth, number, and shape of depressions, can be established depending on the physical properties of a fluid containing reactants and reaction products.

The pressure-receiving surface 23 and the depression 13 may be arranged in the same apparatus.

The depression 13 is a depression having a depth of 1 μm to 50 μm, preferably 3 μm to 20 μm, which is arranged on the processing surface, the total area thereof in the horizontal direction is 5% to 50%, preferably 15% to 25%, based on the whole of the processing surface, the number of depressions is 3 to 50, preferably 8 to 24, and the depression extends in a curved or spiral form on the processing surface or bends at a right angle, having depth changing continuously, so that fluids with high to low viscosity, even containing solids, can be introduced into the space between the processing surfaces stably by the micro-pump effect. The depressions arranged on the processing surface may be connected to one another or separated from one another in the side of introduction, that is, inside the processing surface.

As described above, the pressure-receiving surface 23 is inclined. This inclined surface (pressure-receiving surface 23) is formed such that the distance in the axial direction between the upstream end in the direction of flow of the processed fluid and the processing surface of the processing member provided with the depression 13 is longer than the distance between the downstream end and the aforesaid processing surface. The downstream end of this inclined surface in the direction of flow of the processed fluid is arranged preferably on the projected area in the axial direction of the depression 13.

Figure 28A:
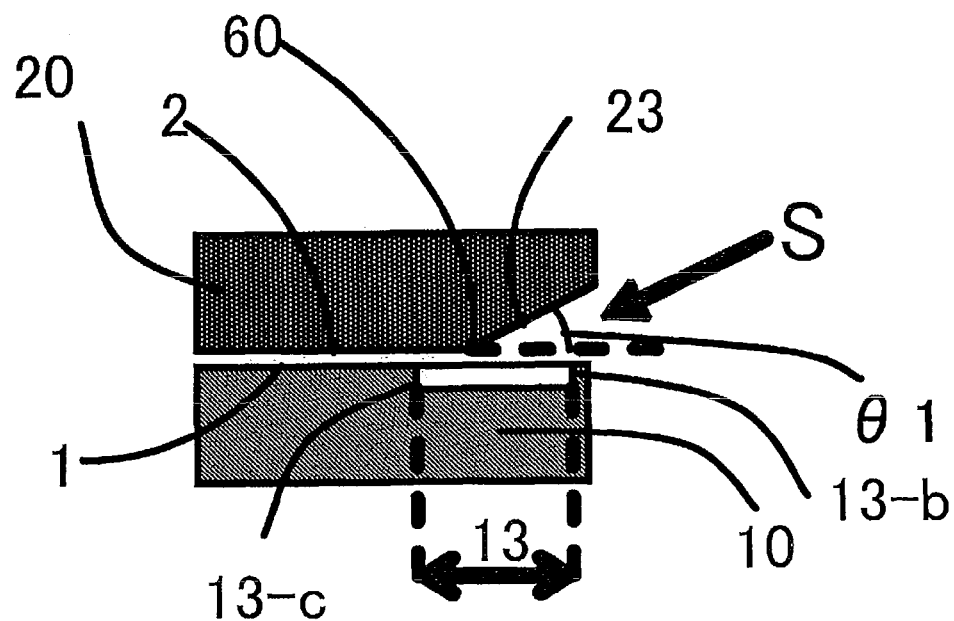
FIG. 28(A) and FIG. 28(B) are each an enlarged sectional view of an important part for explaining an inclined surface arranged in the processing member.
Figure 28B:
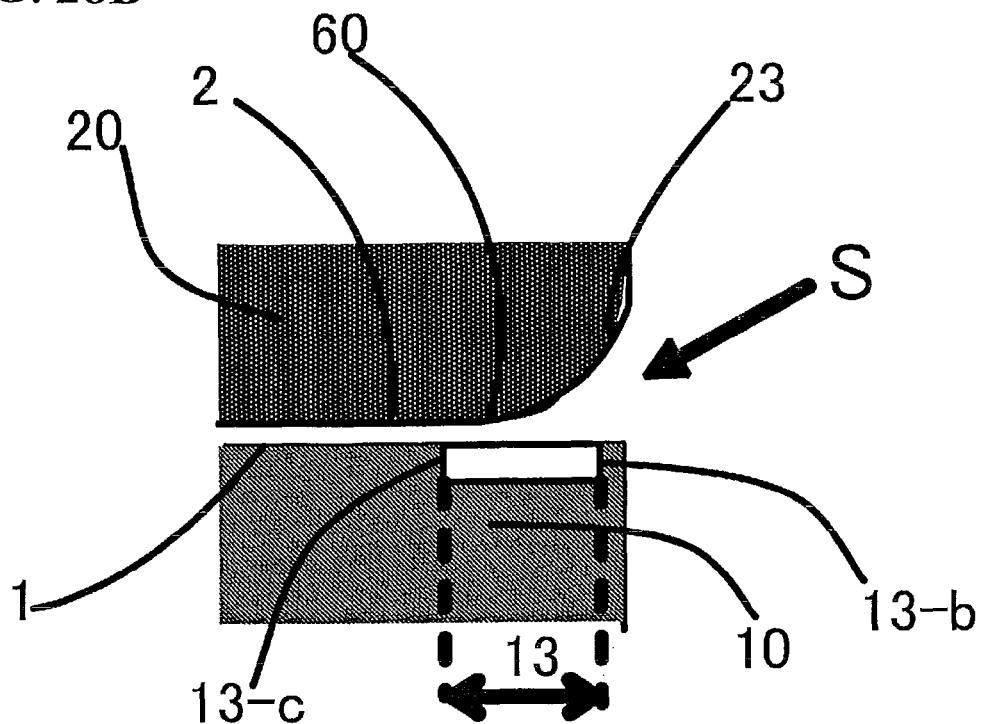

Specifically, as shown in FIG. 28(A), a downstream end 60 of the inclined surface (pressure-receiving surface 23) is arranged on the projected area in the axial direction of the depression 13. The angle θ1 of the inclined surface to the second processing surface 2 is preferably in the range of 0.1° to 85°, more preferably in the range of 10° to 55°, still more preferably in the range of 15° to 45°. The angle θ1 can vary depending on properties of the processed product before processing. The downstream end 60 of the inclined surface is arranged in the region extending from the position apart downstream by 0.01 mm from an upstream end 13-b to the position apart upstream by 0.5 mm from a downstream end 13-c in the depression 13 arranged in the first processing surface 1. The downstream end 60 of the inclined surface is arranged more preferably in the region extending from the position apart downstream by 0.05 mm from the upstream end 13-b to the position apart upstream by 1.0 mm from the downstream end 13-c. Like the angle of the inclined surface, the position of the downstream end 60 can vary depending on properties of a material to be processed. As shown in FIG. 28(B), the inclined surface (pressure-receiving surface 23) can be a curved surface. The material to be processed can thereby be introduced more uniformly.

The depressions 13 may be connected to one another or separated from one another as described above. When the depressions 13 are separated, the upstream end at the innermost peripheral side of the first processing surface 1 is 13-b, and the upstream end at the outermost peripheral side of the first processing surface 1 is 13-*c*.

In the foregoing description, the depression 13 was formed on the first processing surface 1 and the pressure-receiving surface 23 was formed on the second processing surface 2. On the contrary, the depression 13 may be formed on the second processing surface 2, and the pressure-receiving surface 23 may be formed on the first processing surface 1.

Alternatively, the depression 13 is formed both on the first processing surface 1 and the second processing surface 2, and the depression 13 and the pressure-receiving surface 23 are alternately arranged in the circumferential direction of each of the respective processing surfaces 1 and 2, whereby the depression 13 formed on the first processing surface 1 and the pressure-receiving surface 23 formed on the second processing surface 2 are faced with each other and simultaneously the pressure-receiving surface 23 formed on the first processing surface 1 and the depression 13 formed on the second processing surface 2 are faced with each other.

A groove different from the depression 13 can be formed on the processing surface. Specifically, as shown in FIG. 16(F) and FIG. 16(G), a radially extending novel depression 14 instead of the depression 13 can be formed outward in the radial direction (FIG. 16(F)) or inward in the radial direction (FIG. 16(G)). This is advantageous for prolongation of retention time between the processing surfaces or for processing a highly viscous fluid.

The groove different from the depression 13 is not particularly limited with respect to the shape, area, number of depressions, and depth. The groove can be formed depending on the object.

The second introduction part d2 independent of the fluid flow path introduced into the processing surface and provided with the opening d20 leading to the space between the processing surfaces is formed on the second processing member 20.

Specifically, as shown in FIG. 27(A), the direction of introduction of the second introduction part d2 from the opening d20 of the second processing surface 2 is inclined at a predetermined elevation angle (θ1) relative to the second processing surface 2. The elevation angle (θ1) is arranged at more than 0° and less than 90°, and when the reaction speed is high, the angle (θ1) is preferably arranged at 1° to 45°.

As shown in FIG. 27(B), the direction of introduction of the second processing surface 2 from the opening d20 has directionality in a plane along the second processing surface 2. The direction of introduction of the second fluid is in the direction in which a component on the processing surface is made apart in the radial direction and in the direction in which the component is forwarded in the rotation direction of the fluid between the rotating processing surfaces. In other words, a predetermined angle (θ2) exists facing the rotation direction R from a reference line g in the outward direction and in the radial direction passing through the opening d20.

The elevation angle (θ1) is arranged at more than 0° and less than 90°, and when the reaction speed is high, the angle (θ1) is preferably arranged at 1° to 45°.

The angle (θ2) is also arranged at more than 0° and less than 90° at which the fluid is discharged from the opening d20 in the shaded region in FIG. 27(B). When the reaction speed is high, the angle (θ2) may be small, and when the reaction speed is low, the angle (θ2) is preferably arranged larger. This angle can vary depending on various conditions such as the type of fluid, the reaction speed, viscosity, and the rotation speed of the processing surface.

The bore diameter of the opening d20 is preferably 0.2 μm to 3000 μm, more preferably 10 μm to 1000 μm. Even if the bore diameter of the opening d20 is relatively large, the diameter of the second introduction part d2 shall be 0.2 μm to 3000 μm, more preferably 10 μm to 1000 μm, and when the diameter of the opening d20 does not substantially influence the flow of a fluid, the diameter of the second introduction part d2 may be established in this range. Depending on whether the fluid is intended to be transferred straight or dispersed, the shape of the opening d20 is preferably changed and can be changed depending on various conditions such as the type of fluid, reaction speed, viscosity, and rotation speed of the processing surface.

The opening d20 in the separate flow path may be arranged at a position nearer to the outer diameter than a position where the direction of flow upon introduction by the micro-pump effect from the depression arranged in the first processing surface 1 is converted into the direction of flow of a spiral laminar flow formed between the processing surfaces. That is, in FIG. 26(B), the distance n from the outermost side in the radial direction of the processing surface of the depression arranged in the first processing surface 1 to the outside in the radial direction is preferably 0.5 mm or more. When a plurality of openings are arranged for the same fluid, the openings are arranged preferably concentrically. When a plurality of openings are arranged for different fluids, the openings are arranged preferably concentrically in positions different in radius. This is effective for the reactions such as cases (1) A+B→C and (2) C+D→E should occur in due order, but other case, i.e., A+B+C→F should not occur, or for circumventing a problem that an intended reaction does not occur due to insufficient contact among reactants.

The processing members are dipped in a fluid, and a fluid obtained by reaction between the processing surfaces can be directly introduced into a liquid outside the processing members or into a gas other than air.

Further, ultrasonic energy can be applied to the processed material just after being discharged from the space between the processing surfaces or from the processing surface.

Then, the case where temperature regulating mechanisms J1 and J2 are arranged in at least one of the first processing member 10 and the second processing member 20 for generating a temperature difference between the first processing surface 1 and the second processing surface 2 is described.

The temperature regulating mechanism is not particularly limited. A cooling part is arranged in the processing members 10 and 20 when cooling is intended. Specifically, a piping for passing ice water and various cooling media or a cooling element such as a Peltier device capable of electric or chemical cooling is attached to the processing members 10 and 20.

When heating is intended, a heating part is arranged in the processing members 10 and 20. Specifically, steam as a temperature regulating medium, a piping for passing various hot media, and a heating element such as an electric heater capable of electric or chemical heating is attached to the processing members 10 and 20.

An accepting part for a new temperature regulating medium capable of directly contacting with the processing members may be arranged in the ring-accepting part. The temperature of the processing surfaces can be regulated by heat conduction of the processing members. Alternatively, a cooling or heating element may be embedded in the processing members 10 and 20 and electrified, or a path for passing a cooling medium may be embedded, and a temperature regulating medium (cooling medium) is passed through the path, whereby the temperature of the processing surfaces can be regulated from the inside. By way of example, the temperature regulating mechanisms J1 and J2 which are pipes (jackets) arranged inside the processing members 10 and 20 are shown in FIG. 25.

By utilizing the temperature regulating mechanisms J1 and J2, the temperature of one of the processing surfaces is made higher than that of the other, to generate a temperature difference between the processing surfaces. For example, the first processing member 10 is heated to 60° C. by any of the methods, and the second processing member 20 is set at 15° C. by any of the methods. In this case, the temperature of the fluid introduced between the processing surfaces is changed from 60° C. to 15° C. in the direction from the first processing surface 1 to the second processing surface 2. That is, the fluid between the processing surfaces has a temperature gradient. The fluid between the processing surfaces initiates convection due to the temperature gradient, and a flow in a direction perpendicular to the processing surface is generated. The "flow in a direction perpendicular to the processing surface" refers to a flow in which components flowing in a direction perpendicular to at least the processing surface are contained in flowing components.

Even when the first processing surface 1 or the second processing surface 2 rotates, the flow in a direction perpendicular to the processing surface is continued, and thus the flow in a direction perpendicular to the processing surface can be added to a spiral laminar flow between the processing surfaces caused by rotation of the processing surfaces. The temperature difference between the processing surfaces is 1° C. to 400° C., preferably 5° C. to 100° C.

The rotary shaft 50 in this apparatus is not limited to a vertically arranged shaft. For example, the rotary shaft may be arranged at a slant. This is because the influence of gravity can be substantially eliminated by a thin fluid film formed between the processing surfaces 1 and 2 during processing. As shown in FIG. 25, the first introduction part d1 coincides with the shaft center of the second ring 20 in the second holder 21 and extends vertically. However, the first introduction part d1 is not limited to the one coinciding with the shaft center of the second ring 20, and as far as it can supply the first processing fluid to the space surrounded with the rings 10 and 20, the part d1 may be arranged at a position outside the shaft center in the central part 22 of the second holder 21 and may extend obliquely as well as vertically. Regardless of the angle at which the part d1 is arranged, a flow perpendicular to the processing surface can be generated by the temperature gradient between the processing surfaces.

When the temperature gradient of the fluid between the processing surfaces is low, heat conduction merely occurs in the fluid, but when the temperature gradient exceeds a certain border value, a phenomenon called Benard convection is generated in the fluid. This phenomenon is governed by Rayleigh number Ra, a dimensionless number, defined by the following equation:

$$Ra = L^3 \cdot g \cdot \beta \cdot \Delta T / (\alpha \cdot v)$$

wherein L is the distance between processing surfaces; g is gravitational acceleration; μ is coefficient of volumetric thermal expansion of fluid; v is dynamic viscosity of fluid; α is heat diffusivity of fluid; and ΔT is temperature difference between processing surfaces. The critical Rayleigh number at which Benard convection is initiated to occur, although varying depending on the properties of a boundary phase between the processing surface and the processed fluid, is regarded as about 1700. At a value higher than this value, Benard convection occurs. Under the condition where the Rayleigh number Ra is a large value of about $10^{10}$ or more, the fluid becomes a turbulent flow. That is, the temperature difference ΔT between the processing surfaces or the distance L between the processing surfaces in this apparatus are regulated such that the Rayleigh number Ra becomes 1700 or more, whereby a flow perpendicular to the processing surface can be generated between the processing surfaces, and the reaction procedures described above can be carried out.

However, the Benard convection hardly occurs when the distance between the processing surfaces is about 1 μm to 10 μm. Strictly, when the Rayleigh number is applied to a fluid between the processing surfaces having a distance of 10 μm or less therebetween to examine the conditions under which Benard convection is generated, the temperature difference should be several thousands of degrees or more in the case of water, which is practically difficult. Benard convection is one related to density difference in temperature gradient of a fluid, that is, to gravity. When the distance between the processing surfaces is 10 μm or less, there is high possibility of minute gravity field, and in such a place, buoyancy convection is suppressed. That is, it is the case where the distance between the processing surfaces is 10 μm or more that Benard convection actually occurs.

When the distance between the processing surfaces is about 1 μm to 10 μm, convection is generated not due to density difference but due to surface tension difference of a fluid resulting from temperature gradient. Such convection is Marangoni convection. This phenomenon is governed by Marangoni number Ma, a dimensionless number, defined by the following equation:

$$Ma = \sigma \cdot \Delta T \cdot L / (\rho \cdot v \cdot \alpha)$$

wherein L is the distance between processing surfaces; v is dynamic viscosity of fluid; α is heat diffusivity of fluid; ΔT is temperature difference between processing surfaces; ρ is density of fluid; and σ is temperature coefficient of surface tension (temperature gradient of surface tension). The critical Marangoni number at which Marangoni convection is initiated to occur is about 80, and under the conditions where the Marangoni number is higher than this value, Marangoni convection occurs. That is, the temperature difference ΔT between the processing surfaces or the distance L between the processing surfaces in this apparatus is regulated such that the Marangoni number Ma becomes 80 or more, whereby a flow perpendicular to the processing surface can be generated between the processing surfaces even if the distance therebetween is as small as 10 μm or less, and the reaction procedures described above can be carried out.

For calculation of Rayleigh number, the following equations were used.

$$Ra = \frac{L^3 \cdot \beta \cdot g}{v \cdot \alpha} \Delta T \qquad \text{[Equation 1]}$$

$$\Delta T = (T_1 - T_0)$$

$$\alpha = \frac{k}{\rho \cdot C_p}$$

L is the distance (m) between processing surfaces; β is coefficient of volumetric thermal expansion (1/K); g is gravitational acceleration (m/s²); v is dynamic viscosity (m²/s); α is heat diffusivity (m²/s); ΔT is temperature difference (K) between processing surfaces; ρ is density (kg/m³); Cp is isobaric specific heat (J/kg·K) k is heat conductivity (W/m·K) $T_1$ is temperature (K) at high temperature side in processing surface; and $T_0$ is temperature (K) at low temperature side in processing surface.

When the Rayleigh number at which Benard convection is initiated to occur is the critical Rayleigh number $Ra_C$, the temperature difference $\Delta T_{C1}$ is determined as follows:

$$\Delta T_{C1} = \frac{Ra_C \cdot v \cdot \alpha}{L^3 \cdot \beta \cdot g} \quad \text{[Equation 2]}$$

For calculation of Marangoni number, the following equations were used.

$$Ma = \frac{\sigma_t \cdot L}{\rho \cdot v \cdot \alpha} \Delta T \quad \text{[Equation 3]}$$

$$\Delta T = (T_1 - T_0)$$

$$\alpha = \frac{k}{\rho \cdot C_p}$$

L is the distance (m) between processing surfaces; $v$ is dynamic viscosity (m$^2$/s); $\alpha$ is heat diffusivity (m$^2$/s); $\Delta T$ is temperature difference (K) between processing surfaces; $\rho$ is density (kg/m$^3$); Cp is isobaric specific heat (J/kg·K); k is heat conductivity (W/m·K); $\sigma_t$ is surface tension temperature coefficient (N/m·k); $T_1$ is temperature (K) of a high-temperature surface out of processing surface; and $T_0$ is temperature (K) of a low-temperature surface out of processing surface.

When the Marangoni number at which Marangoni convection is initiated to occur is the critical Marangoni number $Ma_C$, the temperature difference $\Delta T_{C2}$ is determined as follows:

$$\Delta T_{C2} = \frac{Ma_C \cdot \rho \cdot v \cdot \alpha}{\sigma_t \cdot L} \quad \text{[Equation 4]}$$

Hereinafter, the reaction of production of nanoparticles in the present invention is described in more detail with reference to the following examples. However, the present invention is not limited to the following examples.

(A) Pigment Nanoparticles

Hereinafter, the reaction of forming pigment nanoparticles shown in for example FIG. 30 by the forced ultrathin film rotary reaction method is described.

(Acid Pasting Method)

When the forced ultrathin film rotary reaction method is used in the acid pasting method, water or an alkaline solution as a first fluid is introduced through one flow path, that is, the first introduction part d1 into the space between the processing surfaces 1 and 2 arranged to be opposite to each other so as to be able to approach to and separate from each other, at least one of which rotates relative to the other, thereby forming a first fluid film between the processing surfaces.

Then, a fluid having an acid including a reactant pigment substance dissolved therein (pigment acidic solution) is introduced as a second fluid directly through another flow path, that is, the second introduction part d2 into the first fluid film produced between the processing surfaces 1 and 2.

As described above, the first and second fluids are instantly mixed in an ultrathin film state kept between the processing surfaces 1 and 2, the distance of which is fixed by the pressure balance between the supply pressure of the fluid and the pressure exerted between the rotating processing surfaces, thereby effecting the reaction of forming pigment particles.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an n$^{th}$ solvent among a plurality of solvents present, and third or more solvents can also be present.

As described above, the first fluid is water or a solution including an alkaline solution. The water is preferably pureified water such as ion-exchange water, pure water or distilled water. The alkaline solution includes, for example, ammonia water, an aqueous solution of sodium hydroxide, and an aqueous solution of potassium hydroxide.

The strong acid used in a second fluid is not particularly limited and is not problematic as long as it shows solubility for pigments. In the case of an acidic aqueous solution, for example, sulfuric acid, hydrochloric acid, nitric acid or trifluoroacetic acid can be used. Preferably, a strong acid, particularly 95% or more concentrated sulfuric acid can be used.

For the purpose of control of the crystal form of the pigment and the quality control of the pigment, an organic solvent may be mixed in the first or second fluid. The organic solvent may be known one. Besides the organic solvent, a dispersant such as a block copolymer, a high-molecular polymer or a surfactant may be contained.

(Re-Precipitation Method)

Then, when the forced ultrathin film rotary reaction method is used in a re-precipitation method, a solvent which as the first solvent, becomes a poor solvent for the pigment but is compatible with a solvent described below, is introduced through one flow path, that is, the first introduction part d1, into the space between the processing surfaces 1 and 2 arranged to be opposite to each other so as to be able to approach to and separate from each other, at least one of which rotates relative to the other, thereby forming a first fluid film between the processing surfaces 1 and 2.

Then, a fluid containing an organic solvent having a pigment dissolved therein is introduced as a second fluid directly through another flow path, that is, the second introduction part d2 into the first fluid film produced between the processing surfaces 1 and 2.

As described above, the first and second fluids are instantly mixed in an ultrathin film state kept between the processing surfaces 1 and 2, the distance of which is fixed by the pressure balance between the supply pressure of the fluid and the pressure exerted between the processing surfaces 1 and 2, thereby effecting the reaction of forming pigment particles.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an n$^{th}$ solvent among a plurality of solvents present, and third or more solvents can also be present.

As described above, the first fluid is not particularly limited as long as it is a poor solvent for pigments and is compatible with a solvent dissolving the pigment forming the second fluid. The first fluid is preferably selected from water, alcohol solvents, ketone solvents, ether solvents, aromatic solvents, carbon disulfide, aliphatic solvents, nitrile solvents, sulfoxide solvents, halogen solvents, ester solvents, ionic solutions, and mixed solvents of two or more thereof.

The organic solvent used in the second fluid is not particularly limited and is not problematic as long as it shows solubility for pigments. Preferable examples of the organic solvent include amide solvents such as 1-methyl-2-pyrrolidinone, 1,3-dimethyl-2-imidazolidinone, 2-pyrrolidinone, ϵ-caprolactam, formamide, N-methylformamide, N,N-dimethylformamide, acetamide, N-methylacetamide, N,N-dimethylacetamide, N-methylpropanamide, and hexamethyl phosphoric triamide.

Further, a dispersant such as a block copolymer, a high-molecular polymer or a surfactant may be contained in the first or second fluid.

(pH Adjustment Method)

Then, when the forced ultrathin film rotary reaction method is used in a pH changing method, a pigment-separating solution that changes pH is introduced as a first fluid through one flow path, that is, the first introduction part d1 into the space between the rotating processing surfaces 1 and 2 to form a first fluid film between the processing surfaces.

Then, a pigment solution prepared by dissolving at least one kind of pigment in an acidic or alkaline pH adjusting solution or in a mixed solution of the pH adjusting solution and an organic solvent is introduced as a second fluid directly into the first fluid film produced between the processing surfaces 1 and 2.

As described above, the first and second fluids are instantly mixed in an ultrathin film state kept between the processing surfaces 1 and 2, the distance of which is fixed by the pressure balance between the supply pressure of the fluid and the pressure exerted between the rotating processing surfaces 1 and 2, thereby effecting the reaction of forming pigment particles.

Specifically, an organic pigment hardly soluble in a certain organic solvent, for example, is added to and dissolved in an alkaline solution prepared by adding an alkaline substance to the organic solvent, thereby forming an organic pigment solution (second fluid), and this organic pigment solution is added to a pigment-separating solution (first fluid) using water, another organic solvent, an organic solvent free from the alkali substance, or an acid-containing solvent, whereby the pH of the organic pigment solution is changed and the reaction of separating pigments can be carried out between the processing surfaces 1 and 2. In this case, the acid and alkali added for dissolving or separating pigments may be selected depending on the type of pigment.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ fluid among a plurality of fluids present, and third or more fluids can also be present.

As described above, the pigment-separating solution as a first fluid is a solution capable of changing the pH of the pigment solution and is not particularly limited as long as it does not show solubility for pigment that is intended to be separated, or has lower solubility for the pigment than that of the solvent contained in the pigment solution as a second fluid. The pigment-separating solution contains water, an organic solvent or a mixture thereof. The water is preferably purified water such as ion-exchange water, pure water or distilled water. The organic solvent includes, but is not limited to, monohydric alcohol solvents represented by methanol, ethanol, isopropanol and t-butanol, polyhydric alcohol solvents represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylol propane, amide solvents such as 1-methyl-2-pyrrolidinone, 1,3-dimethyl-2-imidazolidinone, 2-pyrrolidinone, ϵ-caprolactam, formamide, N-methylformamide, N,N-dimethylformamide, acetamide, N-methyl acetamide, N,N-dimethylacetamide, N-methylpropanamide, hexamethyl phosphoric triamide, urea and tetramethyl urea, polyhydric alcohol lower monoalkyl ether solvents such as ethylene glycol monomethyl (or ethyl) ether, diethylene glycol monomethyl (or ethyl) ether and triethylene glycol monoethyl (or butyl) ether, polyether solvents such as ethylene glycol dimethyl ether (monoglyme), diethylene glycol dimethyl ether (diglyme) and triethylene glycol dimethyl ether (triglyme), sulfur-containing solvents such as sulfolane, dimethylsulfoxide and 3-sulfolene, multifunctional solvents such as diacetone alcohol and diethanolamine, carboxylic acid solvents such as acetic acid, maleic acid, docosahexaenoic acid, trichloroacetic acid and trifluoroacetic acid, sulfonic acid solvents such as methanesulfonic acid and trifluorosulfonic acid, and benzene solvents such as benzene, toluene and xylene.

An acidic or alkaline pH adjusting solution prepared by adding an acidic or alkaline pH adjusting substance to a solvent may also be used. The pH adjusting substance in this case is not particularly limited. Alkaline pH adjusting substances include inorganic bases such as lithium hydroxide, sodium hydroxide, potassium hydroxide, calcium hydroxide and barium hydroxide, and organic alkalis such as trialkylamine, diazabicycloundecene, and metal alkoxides. Acidic pH adjusting substances include inorganic acids such as formic acid, nitric acid, sulfuric acid, hydrochloric acid and phosphoric acid, organic acids such as acetic acid, trifluoroacetic acid, oxalic acid, methanesulfonic acid and trifluoromethanesulfonic acid. These may be added in a solid state or may be added as an aqueous solution or an organic solvent solution.

The solvent used in the pigment solution as a second fluid may be the same solvent as one in the first fluid. However, a solvent having higher solubility for the pigment than that of the solvent contained in the first fluid is preferably selected. The same pH adjusting substance as one in the first fluid may be added to the solvent. The pH adjusting substance is preferably selected so that the second fluid shows higher solubility for the pigment than that of the solvent contained in the first fluid.

The solvent contained in the first and second fluids, and the mixed solution of the pH adjusting substance (pH adjusting solution), can be used in a solution state in which all substances are completely dissolved and in a suspended state.

For the purpose of control of the crystal form of the pigment and the quality control of the pigment, an organic solvent may be mixed in the first or second fluid. The organic solvent may be known one. Besides the organic solvent, a dispersant such as a high-molecular polymer or a block copolymer and a surfactant may be contained.

The pigment used in each of the methods described above includes, but is not limited to, known organic pigments such as polycyclic quinone pigments, perylene pigments, azoic pigments, indigo pigments, quinacridone pigments and phthalocyanine pigments.

The pigment includes pigments in the form of granular solids, dye compounds, and the like. Examples of the pigment include inorganic achromatic pigments, and organic and inorganic chromatic pigments. Colorless or light-colored pigments, metal-lustered pigments and the like may also be used. Newly synthesized pigments may also be used in the present invention. Specific examples of the pigments are shown below.

Examples of the black pigment include Raven 1060, Raven 1080, Raven 1170, Raven 1200, Raven 1250, Raven 1255, Raven 1500, Raven 2000, Raven 3500, Raven 5250, Raven 5750, Raven 7000, Raven 5000 ULTRA II, and Raven 1190 ULTRA II (manufactured by Colombian Chemicals Company). Other examples include Black Pearls L, Mogul-L, Regal 400R, Regal 660R, Regal 330R, Monarch 800, Monarch 880, Monarch 900, Monarch 1000, Monarch 1300, and Monarch 1400 (manufactured by Cabot Corporation). Further examples include Color Black FW1, Color Black FW2, Color Black FW200, Color Black 18, Color Black S160, Color Black S170, Special Black 4, Special Black 4A, Special Black 6, Printex 35, Printex U, Printex 140U, Printex V, and Printex 140V (manufactured by DeGussa Corporation). Still other examples include No. 25, No. 33, No. 40, No. 47, No. 52, No. 900, No. 2300, MCF-88, MA600, MA7, MA8, and MA100 (manufactured by Mitsubishi Chemical Corporation). However, the black pigment is not limited thereto.

Cyan pigments include C.I. Pigment Blue-1, C.I. Pigment Blue-2, and C.I. Pigment Blue-3. Other examples include C.I. Pigment Blue-15, C.I. Pigment Blue-15:2, C.I. Pigment Blue-15:3, and C.I. Pigment Blue-15:4. Still other examples include C.I. Pigment Blue-16, C.I. Pigment Blue-22, C.I. Pigment Blue-60, and the like.

Magenta pigments include C.I. Pigment Red-5, C.I. Pigment Red-7, and C.I. Pigment Red-12. Other examples include C.I. Pigment Red-48, C.I. Pigment Red-48:1, C.I. Pigment Red-57, and C.I. Pigment Red-112. Still other examples include C.I. Pigment Red-122, C.I. Pigment Red-123, C.I. Pigment Red-146, and C.I. Pigment Red-168. Further examples include C.I. Pigment Red-184, C.I. Pigment Red-202, C.I. Pigment Red-207, and the like.

Yellow pigments include C.I. Pigment Yellow-12, C.I. Pigment Yellow-13, C.I. Pigment Yellow-14, and C.I. Pigment Yellow-16. Other examples include C.I. Pigment Yellow-17, C.I. Pigment Yellow-74, C.I. Pigment Yellow-83, and C.I. Pigment Yellow-93. Still other examples include C.I. Pigment Yellow-95, C.I. Pigment Yellow-97, C.I. Pigment Yellow-98, and C.I. Pigment Yellow-114. Further examples include C.I. Pigment Yellow-128, C.I. Pigment Yellow-129, C.I. Pigment Yellow-151, C.I. Pigment Yellow-154, and the like.

Depending on the objective color, various pigments can be used in addition to the black, cyan, magenta and yellow pigments described above. Typical examples include violet pigments such as Pigment Violet-23, green pigments such as Pigment Green-7, and orange pigments such as Pigment Orange-43, and those that express colors as pigments can be used.

In the present invention, dyes can be used similarly to the pigments. Examples of such dyes include C.I. Solvent Blue, −33, −38, −42, −45, −53, −65, −67, −70, −104, −114, −115, and −135. Other examples include C.I. Solvent Red, −25, −31, −86, −92, −97, −118, −132, −160, −186, −187, and −219. Still other examples include C.I. Solvent Yellow, −1, −49, −62, −74, −79, −82, −83, −89, −90, −120, −121, −151, −153, −154, and the like.

Water-soluble dyes can also be used. Examples include direct dyes such as C.I. Direct Black, −17, −19, −22, −32, −38, −51, −62, −71, −108, −146, −154; C.I. Direct Yellow, −12, −24, −26, −44, −86, −87, −98, −100, −130, −142; C.I. Direct Red, −1, −4, −13, −17, −23, −28, −31, −62, −79, −81, −83, −89, −227, −240, −242, −243; C.I. Direct Blue, −6, −22, −25, −71, −78, −86, −90, −106, −199; C.I. Direct Orange, −34, −39, −44, −46, −60; C.I. Direct Violet, −47, −48; C.I. Direct Brown, −109; C.I. Direct Green, −59, and the like; acid dyes such as C.I. Acid Black, −2, −7, −24, −26, −31, −52, −63, −112, −118, −168, −172, −208; C.I. Acid Yellow, −11, −17, −23, −25, −29, −42, −49, −61, −71; C.I. Acid Red, −1, −6, −8, −32, −37, −51, −52, −80, −85, −87, −92, −94, −115, −180, −254, −256, −289, −315, −317; C.I. Acid Blue, −9, −22, −40, −59, −93, −102, −104, −113, −117, −120, −167, −229, −234, −254; C.I. Acid Orange, −7, −19; C.I. Acid Violet, −49, and the like; reactive dyes such as C.I. Reactive Black, −1, −5, −8, −13, −14, −23, −31, −34, −39; C.I. Reactive Yellow, −2, −3, −13, −15, −17, −18, −23, −24, −37, −42, −57, −58, −64, −75, −76, −77, −79, −81, −84, −85, −87, −88, −91, −92, −93, −95, −102, −111, −115, −116, −130, −131, −132, −133, −135, −137, −139, −140, −142, −143, −144, −145, −146, −147, −148, −151, −162, −163; C.I. Reactive Red, −3, −13, −16, −21, −22, −23, −24, −29, −31, −33, −35, −45, −49, −55, −63, −85, −106, −109, −111, −112, −113, −114, −118, −126, −128, −130, −131, −141, −151, −170, −171, −174, −176, −177, −183, −184, −186, −187, −188, −190, −193, −194, −195, −196, −200, −201, −202, −204, −206, −218, −221; C.I. Reactive Blue, −2, −3, −5, −8, −10, −13, −14, −15, −18, −19, −21, −25, −27, −28, −38, −39, −40, −41, −49, −52, −63, −71, −72, −74, −75, −77, −78, −79, −89, −100, −101, −104, −105, −119, −122, −147, −158, −160, −162, −166, −169, −170, −171, −172, −173, −174, −176, −179, −184, −190, −191, −194, −195, −198, −204, −211, −216, −217; C.I. Reactive Orange, −5, −7, −11, −12, −13, −15, −16, −35, −45, −46, −56, −62, −70, −72, −74, −82, −84, −87, −91, −92, −93, −95, −97, −99; C.I. Reactive Violet, −1, −4, −5, −6, −22, −24, −33, −36, −38; C.I. Reactive Green, −5, −8, −12, −15, −19, −23; C.I. Reactive Brown, −2, −7, −8, −9, −11, −16, −17, −18, −21, −24, −26, −31, −32, −33, and the like; C.I. Basic Black, −2; C.I. Basic Red, −1, −2, −9, −12, −13, −14, −27; C.I. Basic Blue, −1, −3, −5, −7, −9, −24, −25, −26, −28, −29; C.I. Basic Violet, −7, −14, −27; C.I. Food Black, −1, −2, and the like.

The dyes that can be used may be known or novel ones. For example, direct dyes, acid dyes, basic dyes, reactive dyes, water-soluble dyes of food colorant, fat-soluble (oil-soluble) dyes, or insoluble colorants of disperse dyes as described later can be used. These may be used in a solidified state. In this respect, oil-soluble dyes, for example, can be preferably used.

The oil-soluble dyes used herein refer to those dyes dissolved in an organic solvent and are also called fat-soluble dyes.

As surfactants and dispersants, various commercial products for use in dispersing pigments can be used. The surfactants and dispersants include, but are not limited to, those based on dodecylbenzenesulfonic acid such as Neogen R-K (Dai-ichi Kogyo Seiyaku Co., Ltd.), Solsperse 20000, Solsperse 24000, Solsperse 26000, Solsperse 27000, Solsperse 28000, and Solsperse 41090 (manufactured by Avecia Corporation), Disperbyk-160, Disperbyk-161, Disperbyk-162, Disperbyk-163, Disperbyk-166, Disperbyk-170, Disperbyk-180, Disperbyk-181, Disperbyk-182, Disperbyk-183, Disperbyk-184, Disperbyk-190, Disperbyk-191, Disperbyk-192, Disperbyk-2000, and Disperbyk-2001 (manufactured by BYK-Chemie), Polymer 100, Polymer 120, Polymer 150, Polymer 400, Polymer 401, Polymer 402, Polymer 403, Polymer 450, Polymer 451, Polymer 452, Polymer 453, EFKA-46, EFKA-47, EFKA-48, EFKA-49, EFKA-1501, EFKA-1502, EFKA-4540, and EFKA-4550 (manufactured by EFKA Chemical Corp.), Flowlen DOPA-158, Flowlen DOPA-22, Flowlen DOPA-17, Flowlen G-700, Flowlen TG-720W, Flowlen-730W, Flowlen-740W, and Flowlen 745W (manufactured by Kyoeisha Chemical Co., Ltd.), Ajisper PA-111, Ajisper PB-711, Ajisper PB-811, Ajisper PB-821, and Ajisper PW-911 (manufactured by Ajinomoto Co. Inc.), and Johncryl 678, Johncryl 679, and Johncryl 62 (manufactured by Johnson Polymer B.V.). These products may be used alone or in combination of two or more thereof.

In the present invention, specific examples of the block copolymer include acrylic or methacrylic block copolymers, block copolymers of polystyrene and other addition polymerization or condensation polymerization, and block copolymers having blocks such as polyoxyethylene and polyoxyalkylene. Conventionally known block copolymers can also be used. The block copolymers used in the present invention are preferably amphiphilic. Specific preferable forms include diblock copolymers having a hydrophobic segment and a hydrophilic segment having an organic acid or ionic base unit. Triblock copolymers having a hydrophobic segment, a hydrophilic segment having an organic acid or its ionic base unit, and another segment are preferably used. Triblock copolymers are used preferably in the form having a hydrophobic segment, a nonionic hydrophilic segment, and a hydrophilic segment having an organic acid or its ionic base unit, which are also preferably used for stabilization of their inclusion state. For example, when the triblock copolymer described above is used to prepare a dispersion using a pigment material and water as a solvent, the pigment can be included in micelles formed by the triblock copolymer, and a pigment-included ink composition can also be formed in this manner. Further, the particle size of particles in the dispersion composition can be very even and uniform. The dispersion composition including its dispersed state can be made highly stable. When these processes are conducted by the forced ultrathin film rotary reaction method, the particle size of particles in the pigment material dispersion is made highly even to further improve uniformity.

Besides the respective methods described above, a method for producing pigment nanoparticles by the forced ultrathin film rotary reaction method can be used to synthesize a pigment directly in the forced thin film. For example, in the case of an example of synthesis of a copper phthalocyanine pigment, the pigment can be directly synthesized by various reactions, represented by a method of obtaining a copper phthalocyanine pigment by reacting phthalic anhydride or its derivatives, copper or its compound, urea or its derivative, and a catalyst in or without an organic solvent. A step of pulverizing coarse pigment particles formed by a synthesis process is necessary in the previous methods but can be eliminated by the above method, and even if the pulverizing step is necessary, the pulverizing step can be achieved by giving shearing to the thin film, depending on operational conditions.

In the present invention, the mixing of fluids in the mixed flow path can be performed under the control of a laminar flow or under the control of a turbulent flow.

Further, the space between the processing surfaces may be heated or cooled, may be irradiated with microwaves. The space between the processing surfaces may also be irradiated with ultraviolet ray (UV) or may be supplied with ultrasonic energy. Particularly, when a temperature difference is set between the first processing surface 1 and the second processing surface 2, there is an advantage that the reaction can be promoted, since convection can be generated in a thin film fluid.

Specifically for heating or cooling, at least one of or both the processing member 10 and the processing member 20 can be provided, for example, with a heater or a jacket for passing a heat medium or a cooling medium, to heat or cool the thin film fluid. Alternatively, at least one of or both the processing member 10 and the processing member 20 can be provided with a microwave generator such as a magnetron for irradiation with microwave, thereby heating the processed fluid to promote the reaction. For irradiation with ultraviolet ray (UV), at least one of or both the processing member 10 and the processing member 20 may be provided, for example, with an element such as a UV lamp to irradiate the thin film fluid with ultraviolet (UV) from the corresponding processing surface. For supplying with ultrasonic energy, at least one of or both the processing member 10 and the processing member 20 can be provided, for example, with an ultrasonic wave oscillator. Alternatively, the mixing and reaction of fluids between the processing surfaces may be conducted in an ultrasonic wave atmosphere in a container.

The separation is conducted in a container capable of securing a depressurized or vacuum state, and at least a secondary side at which the fluid after processing is discharged can be depressurized or made vacuum to remove a gas generated during the separating reaction, to remove a gas contained in the fluid, or to remove the solvent of the fluid. Even when the separation of pigment nanoparticles and removal of the solvent are simultaneously conducted, the fluid containing pigment nanoparticles separated between the processing surfaces can thereby be discharged in an atomized state from the processing surfaces, so that the surface area of the fluid is increased and the efficiency of removal of the solvent is very high. Accordingly, processing of preparing pigment nanoparticles and removal of the solvent can be effected in substantially one step more easily than conventional.

As described above, the processing apparatus can be provided with a third introduction part d3 in addition to the first introduction part d1 and the second introduction part d2. In this case, for example, in the acid pasting method described above, water or an alkaline solution, a fluid containing an acid in which a pigment was dissolved, and an organic solvent for regulation of the crystal form of the pigment and for quality control of the pigment can be introduced separately through the respective introduction parts into the processing apparatus. For pH adjustment, a pigment-separating solution for changing pH, a fluid containing a pigment solution, and an organic solvent for regulation of the crystal form of the pigment and for quality control of the pigment can be introduced separately through the respective introduction parts into the processing apparatus. By doing so, the concentration and pressure of each solution can be controlled separately, and the reaction of forming pigment nanoparticles can be regulated more accurately. When the processing apparatus is provided with four or more introduction parts, the foregoing applies and fluids to be introduced into the processing apparatus can be subdivided in this manner.

The forced ultrathin film rotary reaction method in the present invention can freely change the Reynolds number of its minute flow path and can thus form pigment nanoparticles which are monodisperse and excellent in re-dispersibility, having an objective particle size, particle shape and crystal form. By their self-dischargeability, there is no clogging with products even in a reaction accompanied by separation, and a large pressure is not necessary. Accordingly, the method in the present invention is superior in safety, hardly mixed in with impurities, excellent in washing performance, thus can stably produce pigment nanoparticles. In addition, the method can be scaled up depending on the intended amount of production, thus can provide a highly productive method for producing pigment nanoparticles.

Hereinafter, the pigment nanoparticles are described in detail with reference to Examples, but the present invention is not limited to Examples.

In the following examples, the term "from the center" means "through the first introduction part d1" in the processing apparatus shown in FIG. 1(A), the first fluid refers to the first processed fluid, and the second fluid refers to the second processed fluid introduced "through the second introduction part d2" in the processing apparatus shown in FIG. 1(A).

A paste solution having copper phthalocyanine dissolved in conc. sulfuric acid and an aqueous solution containing a dispersant are allowed to join together in a thin film formed between the processing surfaces 1 and 2 arranged to be opposite to each other so as to be able to approach to and separate from each other, at least one of which rotates relative to the other, in the uniformly mixing and stirring reaction apparatus enabling the forced ultrathin film rotary reaction method as shown in FIG. 1(A), thereby separating pigment nanoparticles under uniform mixing in the thin film.

EXAMPLE A1

While an aqueous solution of Disperbyk-184 (manufactured by BYK-Chemie) was sent as a first fluid from the center at a supply pressure/back pressure of 0.02 MPa/0.01 MPa, at a revolution number of 1000 rpm and at a solution sending temperature of 20° C., an aqueous solution of 3% copper phthalocyanine pigment/98% conc. sulfuric acid was introduced at a rate of 10 ml/min as a second fluid into the space between the processing surfaces 1 and 2. A pigment nanoparticle dispersion was discharged from the processing surfaces. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the volume-average particle size was 14 nm and the CV value of its particle size distribution was 13%. The pigment nanoparticle dispersion was dialyzed with a dialysis tube against pure water for 24 hours and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the volume-average particle size was 14 nm, which was the same as that of the pigment nanoparticle dispersion just after being obtained by the forced ultrathin film rotary processing reaction method.

EXAMPLE A2

While an aqueous solution of Disperbyk-184 (manufactured by BYK-Chemie) was sent as a first fluid from the center at a supply pressure/back pressure of 0.02 MPa/0.01 MPa, at a revolution number of 1000 rpm and at a solution sending temperature of 20° C., an aqueous solution of 3% quinacridone pigment/98% conc. sulfuric acid was introduced at a rate of 10 ml/min. as a second fluid into the space between the processing surfaces 1 and 2. A pigment nanoparticle dispersion was discharged from the processing surfaces. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the volume-average particle size was 15 nm and the CV value of its particle size distribution was 14%. The pigment nanoparticle dispersion was dialyzed with a dialysis tube against pure water for 24 hours and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the volume-average particle size was 15 nm, which was the same as that of the pigment nanoparticle dispersion just after being obtained by the forced ultrathin film rotary processing reaction method.

COMPARATIVE EXAMPLE A1

While 20 g of an aqueous solution of Disperbyk-184 (manufactured by BYK-Chemie) was stirred at a solution temperature of 20° C. at 300 rpm in a beaker, 20 g of aqueous solution of 3% copper phthalocyanine pigment/98% conc. sulfuric acid was introduced. An aqueous copper phthalocyanine pigment dispersion was obtained. When the particle size distribution of the obtained pigment particle dispersion was measured with a particle size distribution measuring instrument utilizing a laser Doppler method (trade name: Microtrac UPA150, manufactured by Nikkiso Co., Ltd.), the volume-average particle size was 1345 nm. The pigment nanoparticle dispersion was dialyzed with a dialysis tube against pure water for 24 hours and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the volume-average particle size was 2882 nm, which was larger than that of the pigment nanoparticle dispersion obtained by the forced ultrathin film rotary processing reaction method.

COMPARATIVE EXAMPLE A2

While 20 g of an aqueous solution of Disperbyk-184 (manufactured by BYK-Chemie) was stirred at a solution temperature of 20° C. at 300 rpm in a beaker, 20 g of an aqueous solution of 3% quinacridone pigment/98% conc. sulfuric acid was introduced. An aqueous quinacridone pigment dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the volume-average particle size was 1833 nm. The pigment nanoparticle dispersion was dialyzed with a dialysis tube against pure water for 24 hours and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the volume-average particle size was 3345 nm, which was larger than that of the pigment nanoparticle dispersion obtained by the forced ultrathin film rotary processing reaction method.

EXAMPLE A3

While ion-exchange water was sent as a first fluid from the center at a supply pressure/back pressure of 0.01 MPa/0.01 MPa, at a revolution number of 1000 rpm and at a solution sending temperature of 25° C., a solution of 0.5% unsubstituted linear quinacridone pigment/1-methyl-2-pyrrolidone (NMP) was introduced at a rate of 10 ml/min as a second fluid into the space between the processing surfaces 1 and 2. A pigment nanoparticle dispersion was discharged from the processing surfaces. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the volume-average particle size was 18 nm and the CV value of its particle size distribution was 17%. The pigment nanoparticle dispersion was dialyzed with a dialysis tube against pure water for 24 hours and then dried to give pigment nanoparticle powders.

As a result of powder X-ray diffraction, it was considered that the resulting quinacridone pigment was γ-type. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the volume-average particle size was 18 nm, which was the same as that of the pigment nanoparticle dispersion just after being obtained by the forced ultrathin film rotary processing reaction method.

EXAMPLE A4

While methanol was sent as a first fluid from the center at a supply pressure/back pressure of 0.01 MPa/0.01 MPa, at a revolution number of 1000 rpm and at a solution sending temperature of 25° C., a solution of 0.5% unsubstituted linear quinacridone pigment/1-methyl-2-pyrrolidone (NMP) was introduced at a rate of 10 ml/min. as a second fluid into the space between the processing surfaces 1 and 2. A pigment nanoparticle dispersion was discharged from the processing surfaces. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the volume-average particle size was 20 nm and the CV value of its particle size distribution was 17%. The pigment nanoparticle dispersion was dialyzed with a dialysis tube against pure water for 24 hours and then dried to give pigment nanoparticle powders. As a result of powder X-ray diffraction, it was considered that the resulting quinacridone pigment was α-type. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the volume-average particle size was 20 nm, which was the same as that of the pigment nanoparticle dispersion just after being obtained by the forced ultrathin film rotary processing reaction method.

COMPARATIVE EXAMPLE A3

While 20 g of ion-exchange water was stirred at a solution temperature of 25° C. at 300 rpm in a beaker, 20 g of a solution of 0.5% unsubstituted linear quinacridone pigment/1-methyl-2-pyrrolidone (NMP) was introduced. An aqueous quinacridone pigment dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the volume-average particle size was 2243 nm. The pigment nanoparticle dispersion was dialyzed with a dialysis tube against pure water for 24 hours and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the volume-average particle size was 2882 nm, which was larger than that of the pigment nanoparticle dispersion obtained by the forced ultrathin film rotary processing reaction method.

COMPARATIVE EXAMPLE A4

While 20 g of methanol was stirred at a solution temperature of 25° C. at 300 rpm in a beaker, 20 g of a solution of 0.5% unsubstituted linear quinacridone pigment/1-methyl-2-pyrrolidone (NMP) was introduced. An aqueous quinacridone pigment dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the volume-average particle size was 3321 nm. The pigment nanoparticle dispersion was dialyzed with a dialysis tube against pure water for 24 hours and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the volume-average particle size was 4211 μm, which was larger than that of the pigment nanoparticle dispersion obtained by the forced ultrathin film rotary processing reaction method.

The results are shown in Table 1. Examples 1 to 4 and Comparative Examples 1 to 4 in the table shall be read as Examples A1 to A4 and Comparative Examples A1 to A4, respectively.

TABLE 1

| Examples | First Fluid | Second Fluid | Number of Revolutions [rpm] | Supply Pressure [MPaG] | Back Pressure [MPaG] | Temperature [° C.] | Average Particle Size [nm] | CV Value [%] | Re-dispersibility [%] | Crystal Form |
|---|---|---|---|---|---|---|---|---|---|---|
| Example 1 | Disperbyk-184 aqueous solution | 3% copper phthalocyanine/ 98% conc. sulfuric acid aqueous solution | 1000 | 0.02 | 0.01 | 20 | 14 | 13 | ⊙ | — |
| Example 2 | | 3% quinacridone/98% conc. sulfuric acid aqueous solution | 1000 | 0.02 | 0.01 | 20 | 15 | 14 | ⊙ | — |
| Comparative Example 1 | | 3% copper phthalocyanine/ 98% conc. sulfuric acid aqueous solution | Beaker test | | | 20 | 1345 | — | X | — |
| Comparative Example 2 | | 3% quinacridone/98% conc. sulfuric acid aqueous solution | | | | 20 | 1833 | — | X | — |
| Example 3 | Ion-exchange water | 0.5% quinacridone/NMP | 1000 | 0.01 | 0.01 | 25 | 18 | 17 | ⊙ | γ |
| Example 4 | Methanol | 0.5% quinacridone/NMP | 1000 | 0.01 | 0.01 | 25 | 20 | 17 | ⊙ | α |

TABLE 1-continued

| Examples | First Fluid | Second Fluid | Number of Revolutions [rpm] | Supply Pressure [MPaG] | Back Pressure [MPaG] | Temperature [° C.] | Average Particle Size [nm] | CV Value [%] | Re-dispersibility [%] | Crystal Form |
|---|---|---|---|---|---|---|---|---|---|---|
| Comparative Example 3 | Ion-exchange water | 0.5% quinacridone/NMP | Beaker test | | | 25 | 2243 | — | X | — |
| Comparative Example 4 | Methanol | 0.5% quinacridone/NMP | | | | 25 | 3321 | — | X | |

The pigment nanoparticles obtained in Example A1 were used to prepare an inkjet ink with the following composition.
Pigment obtained in Example A1: 5%
Low-molecular dispersant (Disperse Ayd W-28 manufactured by San Nopco Limited): 1%
0.75% antifoaming agent (Aqualen 1435 manufactured by Kyoeisha Chemical Co., Ltd.): 0.75%
Ion-exchange water: 89.25%
Polymer dispersant (Disperbyk-184 manufactured by BYK-Chemie): 4%

When the storage stability of the ink was evaluated by accelerating sedimentation of the pigment by centrifugal sedimentation, the pigment was hardly sedimented even after two years. With respect to head clogging, a certain amount of letters were printed, and then the ink was left for 30 minutes without capping, and when printing was initiated again, letters can be normally printed from the start. When bleeding and blurring of letters were visually evaluated for printing qualities, printing was clear without defects. With respect to weatherability, a weather meter test under conditions corresponding to sunlight irradiation for one year was conducted. As a result, the color change after the test was within 5%.

As is evident from the foregoing, the ink of the present invention is excellent in storage stability and does not cause head clogging, because its pigment is dispersed in the form of very microscopic particles, and is excellent in weatherability as an inkjet ink.

A solution containing Pigment Red 254 (structural name: diketopyrrolopyrrole, referred to hereinafter as PR-254) and an aqueous solution of a surfactant were joined together in a thin film fluid formed between the processing surfaces 1 and 2 arranged to be opposite to each other so as to be able to approach to and separate from each other, at least one of which rotates relative to the other, in the uniformly mixing and stirring reaction apparatus shown in FIG. 1(A), thereby uniformly mixing them in the thin film to separate pigment nanoparticles.

EXAMPLE A5

While an aqueous solution of dodecyl sodium sulfate was sent as a first fluid from the center at a supply pressure/back pressure of 0.02 MPa/0.01 MPa, at a revolution number of 1000 rpm and at a solution sending temperature of 20° C., a mixed suspended solution of 1.71 w/w % PR-254/82.32 w/w % dimethylsulfoxide (DMSO)/15.97 w/w % of 8 N aqueous potassium hydroxide solution was introduced at a rate of 1 ml/min. as a second fluid into the space between the processing surfaces 1 and 2. The pH of a pigment nanoparticle dispersion discharged from the processing surfaces was 11.6. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 13 nm. The pigment nanoparticle dispersion was dialyzed with a dialysis tube against pure water for 24 hours to remove dodecyl sodium sulfate, DMSO and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 13 nm, which was the same as that of the pigment nanoparticle dispersion just after being discharged from the processing surfaces.

EXAMPLE A6

While an aqueous solution of dodecyl sodium sulfate was sent as a first fluid from the center at a supply pressure/back pressure of 0.02 MPa/0.01 MPa, at a revolution number of 500 rpm and at a solution sending temperature of 20° C., a mixed solution of 1.71 w/w % PR-254/96.70 w/w % dimethylsulfoxide (DMSO)/1.59 w/w % of 8 N aqueous potassium hydroxide solution was introduced at a rate of 1 ml/min. as a second fluid into the space between the processing surfaces 1 and 2. The pH of a pigment nanoparticle dispersion discharged from the processing surfaces was 11.1. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 12 nm. The pigment nanoparticle dispersion was dialyzed with a dialysis tube against pure water for 24 hours to remove dodecyl sodium sulfate, DMSO and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 12 nm, which was the same as that of the pigment nanoparticle dispersion just after being discharged from the processing surfaces.

EXAMPLE A7

While a solution of propylene glycol monomethyl ether acetate (PGMEA) with Disperbyk-190 (manufactured by BYK-Chemie) was sent as a first fluid from the center at a supply pressure/back pressure of 0.05 MPa/0.01 MPa, at a revolution number of 1000 rpm and at a solution sending temperature of 20° C., a mixed solution of 2.55 w/w % PR-254/76.55 w/w % tetrahydrofuran (THF)/0.77 w/w % of sodium ethoxide/20.13 w/w % ethanol was introduced at a rate of 1 ml/min. as a second fluid into the space between the processing surfaces 1 and 2. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 17 nm. After sodium ethoxide, THF and the like were removed from the pigment nanoparticle dispersion, the dispersion was dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 17 nm, which was the same as that of the pigment nanoparticle dispersion just after being discharged from the processing surfaces.

COMPARATIVE EXAMPLE A5

While 100 g of an aqueous solution of dodecyl sodium sulfate was stirred at a solution temperature of 20° C. at 300 rpm in a beaker, 20 g of a mixed suspended solution of 1.71 w/w % PR-254/82.32 w/w % dimethylsulfoxide (DMSO)/15.97 w/w % of 8 N aqueous potassium hydroxide solution was introduced. A pigment nanoparticle dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 542 nm. The pigment nanoparticle dispersion was dialyzed with a dialysis tube against pure water for 24 hours to remove dodecyl sodium sulfate, DMSO and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 995 nm, which was larger than that of the pigment nanoparticle dispersion just after being obtained in the beaker.

COMPARATIVE EXAMPLE A6

While 100 g of an aqueous solution of dodecyl sodium sulfate was stirred at a solution temperature of 20° C. at 300 rpm in a beaker, 20 g of a mixed solution of 1.71 w/w % PR-254/96.70 w/w % dimethylsulfoxide (DMSO)/1.59 w/w % of 8 N aqueous potassium hydroxide solution was introduced. A pigment nanoparticle dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 489 nm. The pigment nanoparticle dispersion was dialyzed with a dialysis tube against pure water for 24 hours to remove dodecyl sodium sulfate, DMSO and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 985 nm, which was larger than that of the pigment nanoparticle dispersion just after being obtained in the beaker.

COMPARATIVE EXAMPLE A7

While 100 g of a solution of propylene glycol monomethyl ether acetate (PGMEA) with Disperbyk-190 (manufactured by BYK-Chemie) was stirred at a solution temperature of 20° C. at 300 rpm in a beaker, 20 g of a mixed solution of 2.55 w/w % PR-254/76.55 w/w % tetrahydrofuran (THF)/0.77 w/w % sodium ethoxide/20.13 w/w % ethanol was introduced. A pigment nanoparticle dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 791 nm. After the PGMEA, THF and the like were removed from the pigment nanoparticle dispersion, the dispersion was dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 1185 nm, which was larger than that of the pigment nanoparticle dispersion just after being obtained in the beaker.

From the forgoing, it was revealed that pigment nanoparticles formed in a thin film fluid formed between the processing surfaces arranged to be opposite to each other so as to be able to approach to and separate from each other, at least one of which rotates relative to the other, in use of a uniformly stirring and mixing reaction apparatus, are excellent in re-dispersibility even though they are microparticles of nano size.

EXAMPLE A8

A solution containing Pigment Red 177 (structural name: anthraquinone, referred to hereinafter as PR-177) used in color filter or the like and an aqueous solution of a surfactant were allowed to join together in a thin film fluid formed between the processing surfaces 1 and 2 arranged to be opposite to each other so as to be able to approach to and separate from each other, at least one of which rotates relative to the other, in use of a uniformly stirring and mixing reaction apparatus shown in FIG. 1(A), thereby uniformly mixing them in the thin film to separate pigment nanoparticles.

While an aqueous solution of Aqualon KH-10 (manufactured by Dai-ichi Kogyo Seiyaku Co., Ltd.) was sent as a first fluid from the center at a supply pressure/back pressure of 0.02 MPa/0.01 MPa, at a revolution number of 100 rpm and at a solution sending temperature of 20° C., 3.0 w/w % PR-177/97.0 w/w % conc. sulfuric acid solution was introduced at a rate of 1 ml/min. as a second fluid into the space between the processing surfaces 1 and 2. A pigment nanoparticle dispersion was discharged from the processing surfaces. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 17 nm. The pigment nanoparticle dispersion was dialyzed with a dialysis tube for 24 hours to remove Aqualon KH-10, sulfuric acid and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 17 nm, which was the same as that of the pigment nanoparticle dispersion just after being discharged from the processing surfaces.

A TEM photograph of the obtained pigment nanoparticles is shown in FIG. 31.

EXAMPLE A9

Then, a solution containing Pigment Green 7 (referred to hereinafter as PG-7) used in color filter or the like, and an aqueous surfactant solution, were allowed to join together in a thin film and mixed uniformly in the thin film to separate pigment nanoparticles.

While an aqueous solution of Aqualon KH-10 (manufactured by Dai-ichi Kogyo Seiyaku Co., Ltd.) was sent as a first fluid from the center at a supply pressure/back pressure of 0.02 MPa/0.01 MPa, at a revolution number of 500 rpm and at a solution sending temperature of 20° C., 0.2 w/w % PG-7/99.8 w/w % conc. sulfuric acid solution was introduced at a rate of 5 ml/min. as a second fluid into the space between the processing surfaces 1 and 2. A pigment nanoparticle dispersion was discharged from the processing surfaces. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 12 nm. The pigment nanoparticle dispersion was dialyzed with a dialysis tube for 24 hours to remove Aqualon KH-10, sulfuric acid and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 12 nm, which was the same as that of the pigment nanoparticle dispersion just after being discharged from the processing surfaces.

EXAMPLE A10

Then, a solution containing Pigment Yellow 128 (referred to hereinafter as PY-128) used in inkjet ink or the like, and an aqueous surfactant solution, were allowed to join together in a thin film and mixed uniformly in the thin film to separate pigment nanoparticles.

While an aqueous solution of dodecyl sodium sulfate was sent as a first fluid from the center at a supply pressure/back pressure of 0.05 MPa/0.01 MPa, at a revolution number of 1000 rpm and at a solution sending temperature of 20° C., a mixed solution of 1.22 w/w % PY-128/5.8 w/w % 8 N KOH aqueous solution/87.8 w/w % dimethylsulfoxide (DMSO)/5.1 w/w % ion-exchange water was introduced at a rate of 1 ml/min. as a second fluid into the space between the processing surfaces 1 and 2. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 13 nm. The pigment nanoparticle dispersion was dialyzed with a dialysis tube for 24 hours to remove the KOH, DMSO and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 13 nm, which was the same as that of the pigment nanoparticle dispersion just after being discharged from the processing surfaces. A TEM photograph of the obtained pigment nanoparticles is shown in FIG. 32.

EXAMPLE A11

Then, a solution containing Pigment Red 170 (referred to hereinafter as PR-170) used in inkjet ink or the like, and an aqueous surfactant solution, were allowed to join together in a thin film and mixed uniformly in the thin film to separate pigment nanoparticles.

While an aqueous solution of dodecyl sodium sulfate was sent as a first fluid from the center at a supply pressure/back pressure of 0.05 MPa/0.01 MPa, at a revolution number of 1000 rpm and at a solution sending temperature of 20° C., a mixed solution of 1.59 w/w % PR-170/1.70 w/w % 8 N KOH aqueous solution/75.7 w/w % dimethylsulfoxide (DMSO)/21.6 w/w % ion-exchange water was introduced at a rate of 1 ml/min. as a second fluid into the space between the processing surfaces 1 and 2. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 14 nm. The pigment nanoparticle dispersion was dialyzed with a dialysis tube for 24 hours to remove the KOH, DMSO and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 14 nm, which was the same as that of the pigment nanoparticle dispersion just after being discharged from the processing surfaces.

COMPARATIVE EXAMPLE A8

While 100 g of an aqueous solution of Aqualon KH-10 (manufactured by Dai-ichi Kogyo Seiyaku Co., Ltd.) was stirred at a solution temperature of 20° C. at 300 rpm in a beaker, 20 g of 3.0 w/w % PR-177/97.0 w/w % conc. sulfuric acid solution was introduced. A pigment nanoparticle dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 442 nm. The pigment nanoparticle dispersion was dialyzed with a dialysis tube for 24 hours to remove Aqualon KH-10, sulfuric acid and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 992 nm, which was larger than that of the pigment nanoparticle dispersion obtained in the beaker.

COMPARATIVE EXAMPLE A9

While 100 g of an aqueous solution of Aqualon KH-10 (manufactured by Dai-ichi Kogyo Seiyaku Co., Ltd.) was stirred at a solution temperature of 20° C. at 300 rpm in a beaker, 20 g of 0.2 w/w % PG-7/99.8 w/w % conc. sulfuric acid solution was introduced. A pigment nanoparticle dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 551 nm. The pigment nanoparticle dispersion was dialyzed with a dialysis tube for 24 hours to remove Aqualon KH-10, sulfuric acid and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 972 nm, which was larger than that of the pigment nanoparticle dispersion obtained in the beaker.

COMPARATIVE EXAMPLE A10

While 100 g of an aqueous solution of dodecyl sodium sulfate was stirred at a solution temperature of 20° C. at 300 rpm in a beaker, 20 g of a mixed solution of 1.22 w/w % PY-128/5.8 w/w % 8 N KOH aqueous solution/87.8 w/w % dimethylsulfoxide (DMSO)/5.1 w/w % ion-exchange water was introduced. A pigment nanoparticle dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 641 nm. The pigment nanoparticle dispersion was dialyzed with a dialysis tube for 24 hours to remove the dodecyl sodium sulfate, DMSO and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 1122 nm, which was larger than that of the pigment nanoparticle dispersion obtained in the beaker.

COMPARATIVE EXAMPLE A11

While 100 g of an aqueous solution of dodecyl sodium sulfate was stirred at a solution temperature of 20° C. at 300 rpm in a beaker, 20 g of a mixed solution (pH>16) of 1.59 w/w % PR-170/1.70 w/w % 8 N KOH aqueous solution/75.7 w/w % dimethylsulfoxide (DMSO)/21.6 w/w % ion-exchange water was introduced. A pigment nanoparticle dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 448 nm. The pigment nanoparticle dispersion was dialyzed with a dialysis tube for 24 hours to remove dodecyl sodium sulfate, DMSO and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 968 nm, which was larger than that of the pigment nanoparticle dispersion obtained in the beaker.

From the forgoing, it was revealed that pigment nanoparticles formed in a thin film fluid formed between the processing surfaces arranged to be opposite to each other so as to be able to approach to and separate from each other, at least one of which rotates relative to the other, in use of a uniformly stirring and mixing reaction apparatus, are excellent in re-dispersibility even though they are microparticles of nano size.

(B) Metal-Supported Carbon

Hereinafter, the reaction of forming metal-supported carbon according to the present invention is described.

This reaction occurs by forced uniform mixing between the processing surfaces 1 and 2 arranged to be opposite to each other so as to be able to approach to and separate from each other, at least one of which rotates relative to the other, in the apparatus shown in FIG. 1(A).

First, an aqueous solution prepared by dispersing carbon black and then adding a reducing agent is introduced as a first fluid through one flow path, that is, the first introduction part d1 into the space between the processing surfaces 1 and 2 arranged to be opposite to each other so as to be able to approach to and separate from each other, at least one of which rotates relative to the other, thereby forming a first fluid film between the processing surfaces.

Then, an aqueous solution or colloidal dispersion system of a reactant metal salt is introduced as a second fluid directly through another flow path, that is, the second introduction part d2 into the first fluid film produced between the processing surfaces 1 and 2.

The metal contained in the aqueous solution or colloidal dispersion system includes platinum, palladium, gold, silver, rhodium, iridium, ruthenium, osmium, cobalt, manganese, nickel, iron, chromium, molybdenum, and titanium, among which a noble metal is particularly preferable.

As described above, the first and second fluids are instantly mixed between the processing surfaces 1 and 2, the distance of which is fixed by the pressure balance between the supply pressure of the fluid and the pressure exerted between the rotating processing surfaces, thereby effecting the reaction of forming metal-supported carbon having metal microparticles supported on the surface of carbon black by a liquid-phase reduction method.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating $n^{th}$ an n solvent among a plurality of solvents present, and third or more solvents can also be present.

The amount and uniformity of metal-supported carbon and a metal catalyst, and the particle size of the metal to be supported, can be regulated by changing the revolution number of the processing members 10 and 20 or the supply pressure of each fluid, thereby changing the flow rate or Reynolds number of each fluid, or by changing the distance between the processing surfaces 1 and 2, or by changing the concentration of each fluid. Uniform metal-supported carbon can be formed, and the particle size of the supported metal can be regulated as intended.

The metal-supported carbon thus formed is removed from the processing apparatus by the centrifugal force generated by the processing surfaces 1 and 2, at least one of which rotates relative to the other, and therefore, great pressure is not necessary. Accordingly, the processing apparatus has self-discharging property to prevent clogging with the product, and depending on a necessary amount of production, the apparatus can grow in size by using general scale-up concept.

As described above, the processing apparatus can be provided with a third introduction part d3 in addition to the first introduction part d1 and the second introduction part d2. In this case, an aqueous solution having carbon black dispersed therein, an aqueous solution having a reducing agent added thereto, an aqueous solution of a metal salt or a colloid dispersion system, for example, can be introduced separately through the respective introduction parts into the processing apparatus. By doing so, the concentration and pressure of each solution can be controlled separately, and the reaction of forming metal-supported carbon can be regulated more accurately. When the processing apparatus is provided with four or more introduction parts, the foregoing applies and fluids to be introduced into the processing apparatus can be subdivided in this manner.

Then, a reaction of forming fullerene nanowhiskers/ nanofiber nanotubes is described. The fullerene used in the present invention is typically C60 or C70.

The reaction of separating crystals comprised of fullerene molecules and nanowhiskers/nanofiber nanotubes is generated by forced uniform mixing between the processing surfaces arranged to be opposite to each other so as to be able to approach to and separate from each other, at least one of which rotates relative to the other, in the production apparatus shown in FIG. 1(A).

First, a solution containing a first solvent having a reactant fullerene dissolved therein is introduced through one flow path, that is, the first introduction part d1 into the space between the processing surfaces 1 and 2 arranged to be opposite to each other so as to be able to approach to and separate from each other, at least one of which rotates relative to the other, thereby forming a first fluid film between the processing surfaces.

Then, a second solvent having a lower solubility for fullerene than the first solvent is introduced directly through another flow path, that is, the second introduction part d2 into the first fluid film produced between the processing surfaces 1 and 2.

When a solution having a catalyst dissolved in the second solvent is used, this solution is not particularly limited, but a solution in which at least one catalyst selected from Cu/ZnO/ $Al_2O_3$, $PtCl_4$, Cu, $Ru/PtCl_4$, Ru, and Pt is dissolved can be used to produce catalyst-supported crystals comprised of fullerene molecule and fullerene nanowhiskers/nanofiber nanotubes.

Alternatively, a solution obtained by adding a platinum derivative of fullerene to a solution containing the first solvent having fullerene dissolved therein can also be used to produce catalyst-supported or catalyst-containing fullerene molecule crystals and fullerene nanowhiskers/nanofiber nanotubes.

As described above, the first solvent-containing solution and the second solvent are stirred and mixed between the processing surfaces 1 and 2, the distance of which is fixed by the pressure balance between the supply pressure of the fluid and the pressure exerted between the rotating processing surfaces, thereby effecting the reaction of separating crystals comprising fullerene molecules and fullerene nanowhiskers/ nanofiber nanotubes.

To effect the reaction between the processing surfaces 1 and 2, the second fluid may be introduced through the first introduction part d1 and the solution containing the first solvent through the second introduction part d2, as opposed to the above description. That is, the expression "first" or "second" for each solvent has a meaning for merely discriminating an $n^{th}$ solvent among a plurality of solvents present, and third or more solvents can also be present.

The length and thickness of the obtained fullerene nanowhiskers/nanofiber nanotubes can be regulated by changing the revolution number and flow rate in the processing surfaces 1 and 2, the distance between the processing surfaces 1 and 2, and the concentrations of the catalyst and material.

The fullerene molecules constituting the obtained crystals and fullerene nanowhiskers/nanofiber nanotubes may be metal-included fullerene or fullerene derivatives.

The obtained crystals comprising fullerene molecules, and fullerene nanowhiskers/nanofiber nanotubes, may have a closed shape or may have a shape with an open hole.

For supporting the catalyst, the formed crystals comprising fullerene molecules and fullerene nanowhiskers/nanofiber nanotubes are heated in a vacuum heating furnace. Specifically, the material is heated to a temperature in the range of 300° C. to 1000° C.

As described above, the processing apparatus can be provided with a third introduction part d3 in addition to the first introduction part d1 and the second introduction part d2. In this case, the first solvent-containing solution, the second solvent, and a solution containing a stabilizer/dispersant can be introduced separately through the respective introduction parts into the processing apparatus. By doing so, the concentration and pressure of each solution can be controlled separately, and the separating reaction can be regulated more accurately. When the processing apparatus is provided with four or more introduction parts, the foregoing applies and fluids to be introduced into the processing apparatus can be subdivided in this manner.

A synthetic resin and a solvent are mixed with the fullerene nanowhiskers/nanofiber nanotubes thus obtained and the mixture is then molded into a film. The resulting film can be used to provide a membrane/electrode assembly of a fuel cell.

Then, the production apparatus of fullerene nanowhiskers/ nanofiber nanotubes of the present invention can be used to provide a hydrogen-generating apparatus.

Fullerene nanowhiskers/nanofiber nanotubes are formed to support at least one catalyst selected from $Cu/ZnO/Al_2O_3$, $PtCl_4$, Cu, $Ru/PtCl_4$, Ru, and Pt between the processing surfaces 1 and 2 arranged to be opposite to each other so as to be able to approach to and separate from each other, at least one of which rotates relative to the other, in the production apparatus. The fullerene nanowhiskers/nanofiber nanotubes having the catalyst carried therein or containing the catalyst in fullerene crystals are adhered to the production apparatus. Then, the space between the processing surfaces 1 and 2 can be charged with a liquid fuel or a gas fuel to generate hydrogen. Methanol, borohydride or the like can be used as the liquid fuel, and methane, butane or the like can be used as the gas fuel.

The present invention can provide a production method and a production apparatus in which the reaction of producing fullerene nanowhiskers/nanofiber nanotubes can be easily regulated and a hydrogen-generating apparatus using the method, and therefore, fullerene nanowhiskers/nanofiber nanotubes can be stably produced and mass-produced. Therefore, the present invention is industrially useful.

Hereinafter, the metal-supported carbon and fullerene nanowhiskers/nanofiber nanotubes are described in more detail with reference to Examples, but the present invention is not limited to Examples.

In following Examples, the term "from the center" means "through the first introduction part d1" in the processing apparatus shown in FIG. 1(A), the first fluid refers to the first processed fluid, and the second fluid refers to the second processed fluid introduced "through the second introduction part d2" in the processing apparatus shown in FIG. 1(A).

EXAMPLE B1

As shown in FIG. 1(A), an aqueous solution in which fructose is dissolved as a reducing agent and carbon black is dispersed was allowed to flow into an aqueous solution containing a metal compound in a thin film fluid formed between the processing surfaces 1 and 2 arranged to be opposite to each other so as to be able to approach to and separate from each other, at least one of which rotates relative to the other, in use of a uniformly stirring and mixing reaction apparatus as shown in FIG. 1(A), thereby mixing them uniformly in the thin film and simultaneously supporting metal microparticles by a liquid-phase reduction method.

While an aqueous solution of 2% carbon black (Ketjen Black EC manufactured by Lion Corporation)/ethanol/fructose was sent as a first fluid from the center at a supply pressure/back pressure of 0.30 MPa/0.01 MPa, at a revolution number of 1000 rpm and at a solution sending temperature of 80° C., a 5% dinitrodiammine platinum nitrate solution was introduced at a rate of 10 ml/min. as a second fluid into the space between the processing surfaces. A dispersion of platinum microparticles supported on the surface of carbon black was discharged from the processing surfaces.

By observation with TEM, it was confirmed that highly dispersed platinum microparticles having a particle size of about 1 nm were supported on carbon particles. The amount of supported platinum was 48%.

EXAMPLE B2

While an aqueous solution of 2% carbon black (Ketjen Black EC manufactured by Lion Corporation)/ethanol/fructose was sent as a first fluid from the center at a supply pressure/back pressure of 0.20 MPa/0.01 MPa, at a revolution number of 1000 rpm and at a solution sending temperature of 80° C., a 5% dinitrodiammine platinum nitrate solution was introduced at a rate of 10 ml/min. as a second fluid into the space between the processing surfaces. A dispersion of platinum microparticles supported on the surface of carbon black was discharged from the processing surfaces.

By observation with TEM, it was confirmed that highly dispersed platinum microparticles having a particle size of about 1 nm were supported on carbon particles. The amount of supported platinum was 44%.

EXAMPLE B3

While an aqueous solution of 2% carbon black (Ketjen Black EC manufactured by Lion Corporation)/ethanol/fructose was sent as a first fluid from the center at a supply pressure/back pressure of 0.20 MPa/0.01 MPa, at a revolution number of 2000 rpm and at a solution sending temperature of 80° C., a 5% dinitrodiammine platinum nitrate solution was introduced at a rate of 10 ml/min. as a second fluid into the space between the processing surfaces. A dispersion of platinum microparticles supported on the surface of carbon black was discharged from the processing surfaces.

By observation with TEM, it was confirmed that highly dispersed platinum microparticles having a particle size of about 1 nm were supported on carbon particles. The amount of supported platinum was 40%.

EXAMPLE B4

While an aqueous solution of 2% carbon black (Ketjen Black EC manufactured by Lion Corporation)/ethanol/fructose was sent as a first fluid from the center at a supply pressure/back pressure of 0.10 MPa/0.01 MPa, at a revolution number of 2000 rpm and at a solution sending temperature of 80° C., a 5% dinitrodiammine platinum nitrate solution was introduced at a rate of 10 ml/min. as a second fluid into the space between the processing surfaces. A dispersion of platinum microparticles supported on the surface of carbon black was discharged from the processing surfaces.

By observation with TEM, it was confirmed that highly dispersed platinum microparticles having a particle size of about 1 nm were supported on carbon particles. The amount of supported platinum was 40%.

COMPARATIVE EXAMPLE B1

While 100 g of an aqueous solution of 2% carbon black (Ketjen Black EC manufactured by Lion Corporation)/ethanol/fructose was stirred at a solution temperature of 80° C. at 300 rpm in a beaker, 20 g of a 5% dinitrodiammine platinum nitrate solution was introduced. A dispersion of platinum microparticles supported on the surface of carbon black was discharged from the processing surfaces. By observation with TEM, it was confirmed that platinum microparticles having a particle size of about 5 nm to 15 nm were supported unevenly on carbon particles. The amount of supported platinum was 12%.

EXAMPLE B5

In use of the apparatus for producing crystals comprising fullerene molecules and fullerene nanowhiskers/nanofiber nanotubes, as shown in FIG. 1, isopropyl alcohol (IPA) was introduced into the space between the processing surfaces 1 and 2 arranged to be opposite to each other so as to be able to approach to and separate from each other, at least one of which rotates relative to the other, fullerene (C60) dissolved in toluene was introduced through a different flow path into the thin film fluid between the processing surfaces 1 and 2, and the materials were uniformly stirred and mixed in the thin film fluid. The interface reaction in the forcibly stirred and mixed thin film was very swift to enable mass production.

EXAMPLE B6

In use of the same apparatus for producing fullerene nanowhiskers/nanofiber nanotubes as in Example B5, in place of isopropyl alcohol (IPA), a solution of $PtCl_4$, $Ru/PtCl_4$ catalyst in isopropyl alcohol (IPA) was used and subjected to interface reaction between the processing surfaces 1 and 2 arranged to be opposite to each other so as to be able to approach to and separate from each other, at least one of which rotates relative to the other, in the same manner as in Example B1. The resulting fullerene nanowhiskers/nanofiber nanotubes were heated to a temperature in the range of 300° C. to 1000° C. in a vacuum heating furnace. Pt, Ru/Pt catalyst-supported fullerene nanowhiskers/nanofiber nanotubes could be obtained. The produced fullerene nanowhiskers/nanofiber nanotubes had a large surface area.

EXAMPLE B7

The production apparatus to which the Pt, Ru/Pt catalyst-supported fullerene nanowhiskers/nanofiber nanotubes obtained in Example B6 had been adhered was charged with methanol. When the temperature was raised in the range of 200° C. to 600° C., hydrogen bubbles were generated.

EXAMPLE B8

A polymer electrolyte and a solvent were added to the Pt, Ru/Pt catalyst-supported fullerene nanowhiskers/nanofiber nanotubes obtained in Example B6 to prepare a paste, followed by screen-printing and drying of the paste. Nafion was used as the polymer electrolyte, and organic solvents such as ethylene glycol dimethyl ether and n-butyl acetate were used as the solvent. The resulting coating could be utilized as a membrane/electrode assembly (MEA structure) for use as a member of a polymer electrolyte fuel cell.

(C) Metal Microparticles

Hereinafter, the production of microparticles by reduction reaction of a metal compound according to the present invention is described.

This reaction occurs by forced uniform mixing between the processing surfaces 1 and 2 arranged to be opposite to each other so as to be able to approach to and separate from each other, at least one of which rotates relative to the other, in the apparatus shown in FIG. 1(A).

First, an aqueous solution containing a polymer dispersant and a reactant metal compound is introduced as a first fluid through one flow path, that is, the first introduction part d1 into the space between the processing surfaces 1 and 2 arranged to be opposite to each other so as to be able to approach to and separate from each other, at least one of which rotates relative to the other, thereby forming a first fluid film between the processing surfaces.

Then, an aqueous solution of a reducing agent is introduced as a second fluid directly through another flow path, that is, the second introduction part d2 into the first fluid film produced between the processing surfaces 1 and 2.

As described above, the first and second fluids join together in the space between the processing surfaces 1 and 2, the distance of which is fixed by the pressure balance between the supply pressure of the fluid and the pressure exerted between the rotating processing surfaces, thereby uniformly mixing them in the thin film to effect the reduction reaction. Then, a metal colloid solution containing reduced metal microparticles is discharged from the apparatus.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

The particle size of the resulting metal microparticles and the monodispersity of the metal colloid solution can be regulated by changing the number of revolutions of the processing surfaces 1 and 2, the distance between the processing surfaces 1 and 2, the flow rate of the thin film fluid, and the concentration of the material.

The metal microparticles obtained by the present invention are highly crystalline and excellent in re-dispersibility, the average particle size is 1 nm to 200 nm, and the CV value in the particle size distribution of the metal microparticles is 5% to 40%, preferably 10% to 20%.

The metal element serving as metal microparticles and contained in the metal compound used in the method for producing metal microparticles according to the present invention is not particularly limited, but is preferably a noble metal or copper. The noble metal includes, but is not limited to, gold, silver, ruthenium, rhodium, palladium, osmium, iridium, and platinum. Among them, gold, silver, platinum, and palladium are preferable. Further, elements shown in the chemical periodic table, such as iron, nickel, chromium, manganese, aluminum, molybdenum, niobium, and tantalum showing metallic physical properties at ordinary temperatures can be used in the production method.

The metal compound is not particularly limited either. Examples of the metal compound include tetrachloroauric (III) acid tetrahydrate (chloroauric acid), gold sulfite, potassium aurate, silver nitrate, silver acetate, silver(IV) perchlorate, hexachloroplatinum(IV), acid hexahydrate (chloroplatinic acid), potassium chloroplatinate, copper(II) chloride dihydrate, copper(II) acetate monohydrate, copper(II) sulfate, palladium(II) chloride dihydrate, rhodium(III) trichloride trihydrate, and the like. These can be used alone or as a mixture of two or more thereof.

The solvent is not particularly limited as long as it can dissolve the metal compound. For example, water and organic solvents can be mentioned. The organic solvents are not particularly limited. Examples of the organic solvents include C1 to C4 alcohols such as ethanol and ethylene glycol, ketones such as acetone, and esters such as ethyl acetate. The solvents can be used singly or as a mixture of two or more thereof. When the solvent is a mixture of water and an organic solvent, the organic solvent is preferably a water-soluble solvent such as acetone, methanol, ethanol, or ethylene glycol. In the present invention, the solvent is preferably water, an alcohol, or a mixed solution of water and alcohol, from the viewpoint of the solubility of the metal compound therein.

As the reducing agent used in the present invention, it is possible to use various reducing agents that can, in a liquid-phase reaction system, reduce metal element ions to separate them as metal microparticles. In the presence of a dispersant described later, the metal compound and the reducing agent are subjected to reduction reaction in a thin film fluid formed between the processing surfaces arranged to be opposite to each other so as to be able to approach to and separate from each other, at least one of which rotates relative to the other, thereby reducing a metal compound-derived metal ion into a metal without giving considerable heat energy.

In the reduction reaction in the forced ultrathin film rotary uniform mixing reaction method, the reaction temperature can be regulated by establishing the temperature of a fluid to be introduced and by directly regulating the temperature of the processing surfaces.

The reducing agent includes, for example, sodium borohydride, sodium hypophosphite, hydrazine, transition metal element ions (trivalent titanium ion, divalent cobalt ion, and the like), alcohols such as methanol, ethanol and 2-propanol, and ascorbic acid, as well as ethylene glycol, glutathione, organic acids (citric acid, malic acid, tartaric acid, and the like), reducing sugars (glucose, galactose, mannose, fructose, sucrose, maltose, raffinose, stachyose, and the like) and sugar alcohols, and sorbitol. Amines may be used as the reducing agent, and such amines include, for example, aliphatic amines such as propylamine, butylamine, hexylamine, diethylamine, dipropylamine, dimethylethylamine, diethylmethylamine, triethylamine, ethylenediamine, N,N,N',N'-tetramethylethylenediamine, 1,3-diaminopropane, N,N,N',N'-tetramethyl-1,3-diaminopropane, triethylenetetramine and tetraethylenepentamine; alicyclic amines such as piperidine, N-methylpiperidine, piperazine, N,N'-dimethylpiperazine, pyrrolidine, N-methylpyrrolidine, and morpholine; aromatic amines such as aniline, N-methylaniline, N,N-dimethylaniline, toluidine, anisidine, and phenetidine; and aralkylamines such as benzylamine, N-methylbenzylamine, N,N-dimethylbenzylamine, phenethylamine, xylylenediamine, N,N,N',N'-tetramethylxylylenediamine. Also, the above-mentioned amines include alkanolamines such as methylaminoethanol, dimethylaminoethanol, triethanolamine, ethanolamine, diethanolamine, methyldiethanolamine, propanolamine, 2-(3-aminopropylamino)ethanol, butanolamine, hexanolamine, and dimethylaminopropanol. Among them, alkanolamines are preferable, and dimethylethanolamine is more preferable.

As the dispersant, it is possible to use any dispersant showing excellent solubility in a solution and being capable of excellently dispersing separated metal microparticles in a solution. Various dispersants can be utilized, and examples include dispersants based on amines such as polyethylene imine and polyvinyl pyrrolidone, polymer dispersants based on hydrocarbons having in a molecule a carboxylic acid group, such as polyacrylic acid and carboxymethyl cellulose, poval (polyvinyl alcohol), and polymer dispersants having a polar group, such as copolymers having a polyethylene imine moiety and a polyethylene oxide moiety in a molecule. The molecular weight is preferably 100000 or less. Commercial products can also be used. The commercial product includes, for example, Solsperse 20000, Solsperse 24000, Solsperse 26000, Solsperse 27000, Solsperse 28000 and Solsperse 41090 (manufactured by Avecia Corporation), Disperbyk-160, Disperbyk-161, Disperbyk-162, Disperbyk-163, Disperbyk-166, Disperbyk-170, Disperbyk-180, Disperbyk-181, Disperbyk-182, Disperbyk-183, Disperbyk-184, Disperbyk-190, Disperbyk-191, Disperbyk-192, Disperbyk-2000 and Disperbyk-2001 (manufactured by BYK-Chemie), Polymer 100, Polymer 120, Polymer 150, Polymer 400, Polymer 401, Polymer 402, Polymer 403, Polymer 450, Polymer 451, Polymer 452, Polymer 453, EFKA-46, EFKA-47, EFKA-48, EFKA-49, EFKA-1501, EFKA-1502, EFKA-4540 and EFKA-4550 (manufactured by EFKA Chemical Corp.), Flowlen DOPA-158, Flowlen DOPA-22, Flowlen DOPA-17, Flowlen G-700, Flowlen TG-720W, Flowlen-730W, Flowlen-740W and Flowlen 745W (manufactured by Kyoeisha Chemical Co., Ltd.), Ajisper PA-111, Ajisper PB-711, Ajisper PB-811, Ajisper PB-821 and Ajisper PW-911 (manufactured by Ajinomoto Co. Inc.), and Johncryl 678, Johncryl 679 and Johncryl 62 (manufactured by Johnson Polymer B.V.). These products may be used alone or in combination of two or more thereof.

This dispersant is one for excellently dispersing, in a solution, the metal microparticles separated as described above, and thus the dispersant may be added to either the first or second fluid. Alternatively, an aqueous solution containing the dispersant only may be introduced into the space between the processing surfaces 1 and 2 arranged to be opposite to each other so as to be able to approach to and separate from each other, at least one of which rotates relative to the other, thereby mixing the dispersant in both the first and second fluids in the thin film.

As described above, the processing apparatus can be provided with a third introduction part d3 in addition to the first introduction part d1 and the second introduction part d2. In this case, an aqueous solution containing a polymer dispersant, an aqueous solution containing a metal compound and an aqueous solution of a reducing agent can be introduced separately through the respective introduction parts into the processing apparatus. By doing so, the concentration and pressure of each solution can be controlled separately, and the production reaction of metal microparticles can be regulated more accurately. When the processing apparatus is provided with four or more introduction parts, the foregoing applies and fluids to be introduced into the processing apparatus can be subdivided in this manner.

As other reduction reaction in the present invention, an electrochemical reduction method may be used in which the processing surfaces are formed of an electroconductive material, and an electric potential difference is applied across the processing surfaces, thereby transferring electrons between the processing surfaces.

Hereinafter, the reduction reaction of the metal compound is described in detail with reference to Examples, but the present invention is not limited to Examples.

In following Examples, the term "from the center" means "through the first introduction part d1" in the processing apparatus shown in FIG. 1 (A), and the first fluid refers to the first processed fluid, and the second fluid refers to the second processed fluid introduced "through the second introduction part d2" in the processing apparatus shown in FIG. 1 (A).

An aqueous solution containing the metal compound may be allowed to flow into an aqueous solution of the dispersant and the reducing agent in a thin film formed between the processing surfaces 1 and 2 arranged to be opposite to each other so as to be able to approach to and separate from each other, at least one of which rotates relative to the other, in use of a uniformly stirring and mixing reaction apparatus as shown in FIG. 1(A), thereby effecting separating reaction with uniformly mixing.

EXAMPLE C1

While 10% hydrazine aqueous solution was sent as a first fluid from the center at a supply pressure/back pressure of 0.02 MPa/0.01 MPa, at a revolution number of 1000 rpm and at a sending solution temperature of 80° C., an aqueous solution of 20% silver nitrate/2% polyvinyl pyrrolidone (molecular weight 20000), just after adjusted to pH 12 with ammonia water, was introduced at a rate of 10 ml/min. as a second fluid into the space between the processing surfaces 1 and 2. An aqueous colloidal silver solution having yellow plasmon absorption was discharged from the processing surfaces 1 and 2. A further discharged solution even when stored in a glass container did not show a silver mirror reaction without forming a film of silver on the wall surface of the container.

Then, the operation of centrifuging the obtained colloidal silver solution to remove impurities lighter than silver microparticles was repeatedly conducted, then the silver microparticles were washed with purified water and then measured for their particle size distribution with a particle size distribution measuring instrument utilizing a laser Doppler method (trade name: Microtrac UPA150, manufactured by Nikkiso Co., Ltd.), the average particle size was 4.4 nm, and the CV value of the particle size distribution was 13%. The yield of the silver particles was 95%.

EXAMPLE C2

While 10% hydrazine aqueous solution was sent as a first fluid from the center at a supply pressure/back pressure of 0.10 MPa/0.01 MPa, at a revolution number of 2000 rpm and at a sending solution temperature of 80° C., an aqueous solution of 20% silver nitrate/2% polyvinyl pyrrolidone (molecular weight 20000), just after adjusted to pH 12 with ammonia water, was introduced at a rate of 10 ml/min. as a second fluid into the space between the processing surfaces 1 and 2. An aqueous colloidal silver solution having yellow plasmon absorption was discharged from the processing surfaces 1 and 2. A further discharged solution even when stored in a glass container did not show a silver mirror reaction without forming a film of silver on the wall surface of the container.

Then, the operation of centrifuging the obtained colloidal silver solution to remove impurities lighter than silver microparticles was repeatedly conducted, then the silver microparticles were washed with purified water and then measured for their particle size distribution with a particle size distribution measuring instrument utilizing a laser Doppler method (trade name: Microtrac UPA150, manufactured by Nikkiso Co., Ltd.), the average particle size was 8.8 nm, and the CV value of the particle size distribution was 18%. The yield of the silver particles was 91%. A TEM photograph of the obtained silver particles is shown in FIG. 33. Since an interference pattern was observed in the particles, they were confirmed to be highly crystalline particles.

EXAMPLE C3

While 10% dimethylaminoethanol (DMAE) aqueous solution was sent as a first fluid from the center at a supply pressure/back pressure of 0.02 MPa/0.02 MPa, at a revolution number of 1000 rpm and at a sending solution temperature of 80° C., an aqueous solution of 20% silver nitrate/2% BYK-190 (manufactured by BYK-Chemie), just after adjusted to pH 12 with ammonia water, was introduced at a rate of 10 ml/min. as a second fluid into the space between the processing surfaces 1 and 2. An aqueous colloidal silver solution having yellow plasmon absorption was discharged from the processing surfaces 1 and 2. A further discharged solution even when stored in a glass container did not show a silver mirror reaction without forming a film of silver on the wall surface of the container.

Then, the operation of centrifuging the obtained colloidal silver solution to remove impurities lighter than silver microparticles was repeatedly conducted, then the silver microparticles were washed with purified water and then measured for their particle size distribution with a particle size distribution measuring instrument utilizing a laser Doppler method (trade name: Microtrac UPA150, manufactured by Nkkiso Co., Ltd.), the average particle size was 8.1 nm, and the CV value of the particle size distribution was 15%. The yield of the silver particles was 82%.

EXAMPLE C4

While 10% DMAE aqueous solution was sent as a first fluid from the center at a supply pressure/back pressure of 0.02 MPa/0.01 MPa, at a revolution number of 1000 rpm and at a sending solution temperature of 80° C., an aqueous solution of 20% silver nitrate/2% BYK-190 (manufactured by BYK-Chemie), just after adjusted to pH 12 with ammonia water, was introduced at a rate of 10 ml/min. as a second fluid into the space between the processing surfaces 1 and 2. An aqueous colloidal silver solution having yellow plasmon absorption was discharged from the processing surfaces 1 and 2. A further discharged solution even when stored in a glass container did not show a silver mirror reaction without forming a film of silver on the wall surface of the container.

Then, the operation of centrifuging the obtained colloidal silver solution to remove impurities lighter than silver microparticles was repeatedly conducted, then the silver microparticles were washed with purified water and then measured for their particle size distribution with a particle size distribution measuring instrument utilizing a laser Doppler method (trade name: Microtrac UPA150, manufactured by Nikkiso Co., Ltd.), the average particle size was 9.7 nm, and the CV value of the particle size distribution was 25%. The yield of the silver particles was 88%.

EXAMPLE C5

While 10% hydrazine aqueous solution was sent as a first fluid from the center at a supply pressure/back pressure of 0.02 MPa/0.01 MPa, at a revolution number of 1000 rpm and at a sending solution temperature of 80° C., an aqueous solution of 20% silver nitrate/18% copper nitrate/2% BYK-190 (manufactured by BYK-Chemie), just after adjusted to pH 12 with ammonia water, was introduced at a rate of 10 ml/min. as a second fluid into the space between the processing surfaces 1 and 2. An aqueous colloidal silver, copper or silver/copper alloy solution was discharged from the processing surfaces 1 and 2. A further discharged solution even when stored in a glass container did not show a silver mirror reaction without forming a film of silver on the wall surface of the container.

Then, the operation of centrifuging the obtained colloidal metal solution to remove impurities lighter than silver microparticles was repeatedly conducted, then the microparticles were washed with purified water and then measured for their particle size distribution with a particle size distribution measuring instrument utilizing a laser Doppler method (trade name: Microtrac UPA150, manufactured by Nikkiso Co., Ltd.), the average particle size was 8.3 nm, and the CV value of the particle size distribution was 13%. The compounding ratio (atomic ratio) of silver ion/copper ion was 10/9. The yield of the silver, copper, or silver/copper alloy particles was 94%.

EXAMPLE C6

While 10% DMAE aqueous solution was sent as a first fluid from the center at a supply pressure/back pressure of 0.02 MPa/0.02 MPa, at a revolution number of 1000 rpm and at a sending solution temperature of 80° C., an aqueous solution of 20% silver nitrate/18% copper nitrate/2% BYK-190 (manufactured by BYK-Chemie), just after adjusted to pH 12 with ammonia water, was introduced at a rate of 10 ml/min. as a second fluid into the space between the processing surfaces 1 and 2. An aqueous colloidal silver, copper or silver/copper alloy solution was discharged from the processing surfaces 1 and 2. A further discharged solution even when stored in a glass container did not show a silver mirror reaction without forming a film of silver on the wall surface of the container.

Then, the operation of centrifuging the obtained colloidal metal solution to remove impurities lighter than microparticles was repeatedly conducted, then the microparticles were washed with purified water and then measured for their particle size distribution with a particle size distribution measuring instrument utilizing a laser Doppler method (trade name: Microtrac UPA150, manufactured by Nikkiso Co., Ltd.), the average particle size was 9.9 nm, and the CV value of the particle size distribution was 15%. The compounding ratio (atomic ratio) of silver ion/copper ion was 10/9. The yield of the silver, copper, or silver/copper alloy particles was 90%.

COMPARATIVE EXAMPLE C1

While 20 g of 10% hydrazine aqueous solution was stirred at a solution temperature of 80° C. at 300 rpm in a beaker, 20 g of an aqueous solution of 20% silver nitrate/2% polyvinyl pyrrolidone (molecular weight 20000), just after adjusted to pH 12 with ammonia water, was introduced. An aqueous colloidal silver solution was obtained. However, when the discharged solution was stored in a glass container, it formed a silver film on the wall surface of the container to show a silver mirror reaction.

Then, the operation of centrifuging the obtained colloidal silver solution to remove impurities lighter than microparticles was repeatedly conducted, then the microparticles were washed with purified water and then measured for their particle size distribution with a particle size distribution measuring instrument utilizing a laser Doppler method (trade name: Microtrac UPA150, manufactured by Nikkiso Co., Ltd.), the average particle size was 230 nm, and the CV value of the particle size distribution was 120%.

COMPARATIVE EXAMPLE C2

While 20 g of 10% DMAE aqueous solution was stirred at a solution temperature of 80° C. at 300 rpm in a beaker, 20 g of an aqueous solution of 20% silver nitrate/18% copper nitrate/2% BYK-190 (manufactured by BYK-Chemie), just after adjusted to pH 12 with ammonia water, was introduced. An aqueous colloidal silver, copper or silver/copper alloy solution was obtained. However, when the discharged solution was stored in a glass container, it formed a silver and copper film on the wall surface of the container.

Then, the operation of centrifuging the obtained colloidal metal solution to remove impurities lighter than microparticles was repeatedly conducted, then the microparticles were washed with purified water and then measured for their particle size distribution with a particle size distribution measuring instrument utilizing a laser Doppler method (trade name: Microtrac UPA150, manufactured by Nikkiso Co., Ltd.), the average particle size was 300 nm, and the CV value of the particle size distribution was 140%. The compounding ratio (atomic ratio) of silver ion/copper ion was 10/3. The yield of the silver, copper, or silver/copper alloy particles was 9%.

The results are shown in Table 2. In the table, Examples 1 to 6 and Comparative Examples 1 to 2 shall be read as Examples C1 to C6 and Comparative Examples C1 to C2, respectively.

temperature of 45° C., a solution of hexachloroplatinic (IV) acid hexahydrate/BYK-190/1.0 N $H_2SO_4$ was introduced at a rate of 6 ml/min. as a second fluid into the space between the processing surfaces 1 and 2. An aqueous colloidal platinum solution was discharged from the processing surfaces 1 and 2. The operation of centrifuging the obtained colloidal platinum solution under the condition of 1,000,000 G×10 minutes to remove impurities lighter than platinum microparticles was repeatedly conducted, then the platinum microparticles were washed with purified water and then measured for their particle size distribution with a particle size distribution measuring instrument utilizing a laser Doppler method (trade name: Microtrac UPA150, manufactured by Nikkiso Co., Ltd.), and the average particle size was 4.2 nm. The colloidal platinum solution was dialyzed with a dialysis tube to remove BYK-190, sodium borohydride and the like and then dried to give platinum microparticle powders. When the powders were introduced again into ion-exchange water and then re-dispersed by stirring with a high-speed stirring dispersing machine (trade name: CLEARMIX manufactured by M Technique Co., Ltd.), a colloidal platinum solution was obtained again and its average particle size was 4.2 nm which

TABLE 2

| Example | First Fluid | Second Fluid | Number of Revolutions [rpm] | Supply Pressure [MPaG] | Back Pressure [MPaG] | Average Particle Size [nm] | CV Value [%] | Yield [%] | Silver Mirror Reaction |
|---|---|---|---|---|---|---|---|---|---|
| Example 1 | 10% hydrazine aqueous solution | 20% silver nitrate/2% polyvinyl pyrrolidone aqueous solution | 1000 | 0.02 | 0.01 | 4.4 | 13 | 95 | Absent |
| Example 2 | | | 2000 | 0.10 | 0.01 | 8.8 | 18 | 91 | Absent |
| Example 3 | 10% DMAE aqueous solution | 20% silver nitrate/2% BYK-190 aqueous solution | 1000 | 0.02 | 0.02 | 8.1 | 15 | 82 | Absent |
| Example 4 | | | 1000 | 0.02 | 0.01 | 9.7 | 25 | 88 | absent |
| Example 5 | 10% hydrazine aqueous solution | 20% silver nitrate/18% copper nitrate/2% BYK-190 aqueous solution | 1000 | 0.02 | 0.01 | 8.3 | 13 | 94 | Absent |
| Example 6 | 10% DMAE aqueous solution | 20% silver nitrate/18% copper nitrate/2% BYK-190 aqueous solution | 1000 | 0.02 | 0.02 | 9.9 | 15 | 90 | Absent |
| Comparative Example 1 | 10% hydrazine aqueous solution | 20% silver nitrate/2% polyvinyl pyrrolidone aqueous solution | Beaker test | | | 230 | 120 | 24 | Present |
| Comparative Example 2 | 10% DMAE aqueous solution | 20% silver nitrate/2% polyvinyl pyrrolidone aqueous solution | | | | 300 | 140 | 9 | Present |

EXAMPLE C7

While an aqueous solution of sodium borohydride/BYK-190/0.1 N NaOH was sent as a first fluid from the center at a supply pressure/back pressure of 0.05 MPa/0.01 MPa, at a revolution number of 1140 rpm and at a sending solution was the same as that of the colloidal platinum solution just after being discharged from the processing surfaces. When the resulting platinum microparticle powders were re-dispersed in toluene, its average particle size was similarly 4.2 nm. TEM photographs of the obtained platinum microparticles are shown in FIG. 34 and FIG. 35.

EXAMPLE C8

While an aqueous solution of sodium borohydride/BYK-190/0.1 N NaOH was sent as a first fluid from the center at a supply pressure/back pressure of 0.01 MPa/0.005 MPa, at a revolution number of 600 rpm and at a sending solution temperature of 55° C., a solution of platinum tetrachloride/palladium acetate/BYK-190/acetone/ethanol was introduced at a rate of 8 ml/min. as a second fluid into the space between the processing surfaces 1 and 2. An aqueous colloidal platinum-palladium alloy solution was discharged from the processing surfaces 1 and 2. The operation of centrifuging the obtained colloidal platinum-palladium alloy solution under the condition of 1,000,000 G×10 minutes to remove impurities lighter than platinum-palladium alloy microparticles was repeatedly conducted, then the platinum-palladium alloy microparticles were washed with purified water and then measured for their particle size distribution with a particle size distribution measuring instrument utilizing a laser Doppler method (trade name: Microtrac UPA150, manufactured by Nikkiso Co., Ltd.), and the average particle size was 5.1 nm. The colloidal platinum-palladium alloy solution was dialyzed with a dialysis tube to remove BYK-190, sodium borohydride and the like and then dried to give platinum-palladium microparticle powders. When the powders were introduced again into ion-exchange water and then re-dispersed by stirring with a high-speed stirring dispersing machine (trade name: CLEARMIX manufactured by M Technique Co., Ltd.), a colloidal platinum-palladium alloy solution was obtained again and its average particle size was 5.1 nm which was the same as that of the colloidal platinum-palladium solution just after being discharged from the processing surfaces. When the resulting platinum microparticle powders were re-dispersed in toluene, its average particle size was similarly 5.1 nm. TEM photographs of the obtained platinum-palladium alloy microparticles are shown in FIG. 36 and FIG. 37. As a result of the surface analysis by TEM-EDX analysis, the ratio of platinum (Pt) to palladium (Pd), that is, Pt/Pd was 73/27 (mol %). As a result of ICP emission spectrometry, the ratio of platinum (Pt) to palladium (Pd), that is, Pt/Pd was 77/23 (mol %). From the foregoing, it was confirmed that the obtained microparticles were platinum-palladium alloy particles.

EXAMPLE C9

While an aqueous solution of hydrazine/BYK-190 was sent as a first fluid from the center at a supply pressure/back pressure of 0.04 MPa/0.03 MPa, at a revolution number of 290 rpm and at a sending solution temperature of 85° C., an aqueous solution of copper nitrate dihydrate was introduced at a rate of 10 ml/min. as a second fluid into the space between the processing surfaces 1 and 2. An aqueous colloidal copper solution was discharged from the processing surfaces 1 and 2. A further discharged solution even when stored in a glass container did not form a film of copper on the wall surface of the container. The operation of centrifuging the obtained colloidal copper solution under the condition of 1,000,000 G×10 minutes to remove impurities lighter than copper microparticles was repeatedly conducted, then the copper microparticles were washed with purified water and then measured for their particle size distribution with a particle size distribution measuring instrument utilizing a laser Doppler method (trade name: Microtrac UPA150, manufactured by Nikkiso Co., Ltd.), and the average particle size was 4.4 nm. The copper microparticle dispersion was dialyzed with a dialysis tube to remove BYK-190, hydrazine and the like and then dried to give copper microparticle powders. When the powders were introduced again into ion-exchange water and then stirred with a high-speed stirring dispersing machine (trade name: CLEARMIX manufactured by M Technique Co., Ltd.), a copper microparticle dispersion was obtained again and the average particle size was 4.4 nm which was the same as that of the dispersion just after being discharged from the processing surfaces.

EXAMPLE C10

While an aqueous solution of 5.5% hydrazine/2.75% Disperbyk-190 was sent as a first fluid from the center at a supply pressure/back pressure of 0.02 MPa/0.05 MPa, at a revolution number of 1000 rpm and at a sending solution temperature of 25° C., an aqueous solution of 35% nickel sulfate hexahydrate/2.77 Disperbyk-190 was introduced at a rate of 2 ml/min. as a second fluid into the space between the processing surfaces 1 and 2. An aqueous nickel microparticle solution was discharged from the processing surfaces 1 and 2. Water for preparing the aqueous solution was ion-exchange water after deoxygenation by nitrogen bubbling.

Then, the operation of centrifuging the obtained colloidal nickel solution under the condition of 400,000 G×20 minutes with an ultracentrifuge (Optima™ MAX-XP Ultracentrifuge manufactured by Beckman Coulter Inc.) to remove impurities lighter than nickel microparticles was repeatedly conducted, then the nickel microparticles were washed with purified water and then measured for their particle size distribution with a particle size distribution measuring instrument utilizing a laser Doppler method (trade name: Nanotrac UPA-EX150, manufactured by Nikkiso Co., Ltd.), and the average particle size was 4.2 nm.

The resulting nickel microparticle dispersion was freeze-dried, and the resulting nickel microparticle powder was analyzed with an X-ray diffractometer (fully automatic general-purpose X-ray diffractometer, X'Pert PRO MPD, manufactured by PANalytivacl B.V.), and as a result, it was confirmed that the resulting nickel microparticles were amorphous. That is, in the present invention, highly crystalline metallic microparticles can be produced as shown in Example C2 above, and amorphous metallic microparticles can also be produced as shown in this Example C10.

The amorphous nickel microparticle powders obtained as described above were mixed with toluene and re-dispersed with an ultrasonic washing machine. According to the particle size distribution measurement result, the average particle size was 4.1 nm, and it was confirmed that the resulting amorphous nickel microparticles were excellent in re-dispersibility.

A TEM photograph of the obtained nickel microparticles is shown in FIG. 38.

COMPARATIVE EXAMPLE C3

While 100 g of an aqueous solution of sodium borohydride/BYK-190/0.1 N NaOH was stirred at a solution temperature of 45° C. at 300 rpm in a beaker, 20 g of an aqueous solution of hexachloroplatinic (IV) acid hexahydrate/BYK-190/1.0 N $H_2SO_4$ was introduced. A colloidal platinum solution was obtained. The operation of centrifuging the obtained colloidal platinum solution to remove impurities lighter than platinum microparticles was repeatedly conducted, then the platinum microparticles were washed with purified water and then measured for their particle size distribution with a particle size distribution measuring instrument utilizing a laser Doppler method (trade name: Microtrac UPA150, manufactured by Nikkiso Co., Ltd.), and the average particle size was 645 nm. The colloidal platinum solution was dialyzed with a dialysis tube to remove BYK-190, sodium borohydride and the like and then dried to give platinum microparticle powders. When the powders were introduced again into ion-exchange water and then stirred with a high-speed stirring dispersing machine (trade name: CLEARMIX manufactured by M Technique Co., Ltd.), a colloidal platinum solution was obtained again, and its average particle size was 335 nm which was larger than that of the colloidal platinum solution just after obtained in the beaker.

COMPARATIVE EXAMPLE C4

While 100 g of an aqueous solution of sodium borohydride/BYK-190/0.1 N NaOH was stirred at a solution temperature of 55° C. at 300 rpm in a beaker, 20 g of a solution of platinum tetrachloride/palladium acetate/BYK-190/acetone/ethanol was introduced. A colloidal platinum-palladium alloy solution was obtained. The operation of centrifuging the obtained colloidal platinum-palladium alloy solution to remove impurities lighter than platinum-palladium alloy microparticles was repeatedly conducted, then the platinum-palladium alloy microparticles were washed with purified water and then measured for their particle size distribution with a particle size distribution measuring instrument utilizing a laser Doppler method (trade name: Microtrac UPA150, manufactured by Nikkiso Co., Ltd.), and the average particle size was 756 nm. The colloidal platinum-palladium alloy solution was dialyzed with a dialysis tube to remove BYK-190, sodium borohydride and the like and then dried to give platinum-palladium alloy microparticle powders. When the powders were introduced again into ion-exchange water and then stirred with a high-speed stirring dispersing machine (trade name: CLEARMIX manufactured by M Technique Co., Ltd.), a colloidal platinum-palladium alloy solution was obtained again, and its average particle size was 881 nm which was larger than that of the colloidal platinum-palladium solution just after obtained in the beaker.

COMPARATIVE EXAMPLE C5

While 100 g of an aqueous solution of hydrazine/BYK-190 was stirred at a solution temperature of 85° C. at 300 rpm in a beaker, 20 g of an aqueous solution of copper nitrate dihydrate was introduced. A colloidal copper solution was obtained. The operation of centrifuging the obtained colloidal copper solution to remove impurities lighter than copper microparticles was repeatedly conducted, then the copper microparticles were washed with purified water and then measured for their particle size distribution with a particle size distribution measuring instrument utilizing a laser Doppler method (trade name: Microtrac UPA150, manufactured by Nikkiso Co., Ltd.), and the average particle size was 756 nm. The colloidal copper solution was dialyzed with a dialysis tube to remove BYK-190, hydrazine and the like and then dried to give copper microparticle powders. When the powders were introduced again into ion-exchange water and then stirred with a high-speed stirring dispersing machine (trade name: CLEARMIX manufactured by M Technique Co., Ltd.), a colloidal copper solution was obtained again, and its average particle size was 944 nm which was larger than that of the colloidal copper solution just after obtained in the beaker.

From the foregoing, it was revealed that metal nanoparticles formed in a thin film fluid formed between the processing surfaces arranged to be opposite to each other so as to be able to approach to and separate from each other, at least one of which rotates relative to the other, in use of the uniformly stirring and mixing reaction apparatus, are excellent in re-dispersibility even though they are microparticles of nano size.

COMPARATIVE EXAMPLE C6

While 100 ml of an aqueous solution of 5.5% hydrazine/2.75% Disperbyk-190 was stirred at a solution temperature of 25° C. at 300 rpm in a beaker, 1 ml of an aqueous solution of 35% nickel sulfate hexahydrate/2.77% Disperbyk-190 was introduced. An aqueous colloidal nickel solution was obtained.

Then, the operation of centrifuging the obtained colloidal nickel solution under the condition of 400,000 G×20 minutes with an ultracentrifuge (Optima™ MAX-XP Ultracentrifuge manufactured by Beckman Coulter Inc.) to remove impurities lighter than nickel microparticles was repeatedly conducted, then the nickel microparticles were washed with purified water and then measured for their particle size distribution with a particle size distribution measuring instrument utilizing a laser Doppler method (trade name: Nanotrac UPA-EX150, manufactured by Nikkiso Co., Ltd.), and the average particle size was 199.2 nm.

The resulting nickel microparticle dispersion was freeze-dried, and the resulting nickel microparticle powders were mixed with toluene and re-dispersed with an ultrasonic washing machine. According to the particle size distribution measurement result, the average particle size was 311.6 nm which was larger than that of the nickel dispersion just after obtained in the beaker.

(D) Biologically Ingestible Microparticles

Hereinafter, specific aspects of the method for producing biologically ingestible microparticles are described. First, a method of separating biologically ingestible microparticles by change in solubility is described.

In the thin film formed between the processing surfaces in the apparatus described above, a solution containing a first solvent in which at least one kind of biologically ingestible microparticle material to be formed into microparticles has been dissolved is mixed with a solvent capable of serving as a second solvent having a lower solubility for the biologically ingestible microparticle material than the first solvent, to separate biologically ingestible microparticles.

The biological ingestion material includes drugs. The present invention can be carried out using various drugs. The drug is preferably an organic substance occurring in a substantially pure state. The drug should be dispersible with low solubility in at least one kind of solvent and soluble in at least one kind of solvent. The low solubility means that the drug has a solubility of less than about 10 mg/mL, preferably less than about 1 mg/mL, in a solvent (for example, water) at a processing temperature (for example, room temperature). Solubility means that the drug is soluble in an amount of not less than 10 mg/mL. If necessary, the solvent may be heated or cooled. Preferably a dispersant (surfactant), a water-soluble polymer, a stabilizer, a preservative, a pH adjusting agent, and a tonicity agent are previously added to one of or both of the first and second solvent.

Suitable drugs can be selected from various known drugs including, for example, analgesic agents, anti-inflammatory agents, anthelmintic agents, antiarrhythmic agents, antibiotics (including penicillin), anticoagulants, antihypotensive drugs, antidiabetic agents, antiepileptic drugs, antihistaminic agents, anti-malignant tumor agents, anti-obesity drugs, anorectic drugs, antihypertensive agents, antimuscarinic drugs, antimycobacterial agents, antineoplastic agents, immunosuppressive agents, antithyroid agents, antibacterial agents, antiviral agents, anti-anxiety drugs (hypnotics and neuroleptics), astringents, β-adrenoreceptor blockers, blood preparations and plasma substitutes, myocardial inotropic agents, contrast media, corticosteroids, cough suppressants (expectorants and mucus-destructive agents), diagnostic agents, diagnostic image-forming agents, diuretic agents, dopaminergic agents (antiparkinson agents), hemostatic drugs, immunological agents, lipid regulatory agents, muscle relaxants, parasympathomimetic agents, parathyroid calcitonin and biphosphonates, prostaglandins, radioactive agents, sex hormones (including steroids), antiallergic agents, stimulants and anorexigenic agents, sympathomimetics, thyroid agents, vasodilators and xanthines, cataract remedies, and adrenal corticosteroids. The drugs are preferably those with low water solubility intended for oral administration or injections. Drugs of these classes and lists contained in each class can be found in "Martindale, The Extra Pharmacopoeia, $29^{th}$ edition, The Pharmaceutical Press, London, 1989". These drugs are commercially available or can be produced by methods known in the art.

Specific examples of drugs useful in the present invention include 17-α-pregno-2,4-diene-20-ino-[2,3-d]-isoxazole-17-ol (danazol), tacrolimus hydrate, progesterone, tranilast, benzbromarone, mefenamic acid, [6-methoxy-4-(1-methylethyl)-3-oxo-1,2-benzisothiazole-2(3H)-yl]methyl 2,6-dichlorobenzoate 1,1-dioxide (WIN 63, 394), 3-amino-1,2,4-benzotriazine-1,4-dioxide (WIN 59, 075), piposulfam, piposulfan, camptothecin, acetaminophen, acetylsalicylic acid, amiodarone, cholestyramine, colestipol, cromolyn sodium, albuterol, sucralfate, sulfasalazine, minoxidil, tempazepam, alprazolam, propoxyphene, auranofin, erythromycin, cyclosporine, aciclovir, ganciclovir, etoposide, melphalan, methotrexate, mitoxantrone, daunorubicin, doxorubicin, megasterol, tamoxifen, medroxyprogesterone, nystatin, terbutaline, amphotericin B, aspirin, ibuprofen, naproxen, indomethacin, diclofenac, ketoprofen, flurbiprofen, diflunisal, ethyl-3,5-diacetamide-2,4,6-triiodobenzoate (WIN 8883), ethyl(3,5-bis(acetylamino)2,4,6-triiodobenzoyloxy)acetate (WIN 12, 901) and ethyl-2-(3,5-bis(acetylamino)-2,4,6-triiodobenzoyloxy)acetate (WIN 16, 318).

In a preferable embodiment of the present invention, the drug is an immunosuppressive agent such as danazol or tacrolimus hydrate, an antiallergic drug such as tranilast, a steroid such as progesterone, an antiviral agent, an anti-malignant tumor agent or an anti-inflammatory agent.

Particularly preferable examples of the stabilizer and dispersant (surfactant) include sodium dodecylbenzene sulfonate, dodecyl sodium sulfate, tetradecyl sodium sulfate, pentadecyl sodium sulfate, octyl sodium sulfate, sodium oleate, sodium laurate, sodium stearate, calcium stearate, Tween 20 and Tween 80 (which are polyoxyethylene sorbitan fatty acid esters available from ICI Specialty Chemicals), polyvinyl pyrrolidone, tyloxapol, Pluronic F68 and F108 (which are ethylene oxide/propylene oxide block copolymers available from BASF), Tetronic 908 (T908) (which is a tetrafunctional block copolymer derived from an adduct of ethylenediamine to which ethylene oxide and propylene oxide are continuously added, available from BASF), dextran, lecithin, Aerosol OT (which is a dioctyl ester of sodium sulfosuccinate, available from American Cyanamid), Duponol P (which is sodium lauryl sulfate available from DuPont), Triton X-200 (which is an alkylaryl polyether sulfonate available from Rohm and Haas), Carbowax 3350 and 934 (which are polyethylene glycols available from Union Carbide), Crodesta F-110 (which is a mixture of sucrose stearate and sucrose distearate, available from Croda Inc.), Crodesta 5L-40 (which is available from Croda Inc.), and SA90HCO (which is $C_{18}H_{37}CH_2$—$(CON(CH_3)CH_2(CHOH)_4CH_2OH)_2$), as well as quaternary amine surfactants such as benzethonium chloride and benzalkonium chloride and nonionic surfactants such as polyoxyethylene higher alcohol ethers, glycerin fatty acid esters, polyoxyethylene hardened castor oil, polyoxyethylene fatty acid esters, polyoxyethylene nonyl phenyl ether, polyoxyethylene octyl phenyl ether, sorbitan fatty acid ester, propylene glycol fatty acid ester, fatty acid polyethylene glycol, polyglyceryn fatty acid ester, and sucrose fatty acid ester. These materials may be used properly depending on the objective biologically ingestible microparticles and the separating reaction.

The water-soluble polymer includes, for example, methyl cellulose, ethyl cellulose, propylmethyl cellulose, propyl cellulose, carboxymethyl cellulose, polyvinyl alcohol, and polyvinyl pyrrolidone.

The content of the drug in the present invention is not particularly limited. A highly concentrated suspension can be prepared and diluted to an intended concentration to prepare a pharmaceutical.

The stabilizer includes, for example, sodium edetate, sodium sulfite, sodium hydrogen sulfite, sodium thiosulfate, dibutyl hydroxy toluene, and tocopherol.

The preservative includes, for example, paraoxybenzoic acid ester, chlorobutanol, phenylethyl alcohol, benzalkonium chloride, benzethonium chloride, chlorhexidine gluconate, alkyl polyaminoethyl glycine, and sorbic acid.

The pH adjusting agent includes, for example, hydrochloric acid, sulfuric acid, acetic acid, lactic acid, citric acid, tartaric acid, malic acid, phosphoric acid, boric acid, sodium hydroxide, potassium hydroxide, calcium hydroxide, monoethanolamine, diethanolamine, diethylamine, ammonia and salts thereof.

The tonicity agent includes, for example, sodium chloride, potassium chloride, calcium chloride, and mannitol.

As the solvent used in a fluid containing at least one kind of biologically ingestible microparticle material in the present invention, water such as ultrapure water and ion-exchange water, a water-miscible organic solvent such as methyl alcohol, ethyl alcohol, acetone, dimethylformamide, dimethylacetamide and dimethylsulfoxide, and a water-immiscible organic solvent such as octane, cyclohexane, benzene, xylene, diethyl ether and ethyl acetate can be appropriately selected depending on the object.

The biologically ingestible microparticles of the present invention are not particularly limited as long as they are intended to be ingested by the living body. Examples of such microparticles include: those which, like drugs in pharmaceutical preparations, are intended to be absorbed into the living body to exhibit their effect in the living body; those which, like barium sulfate as a contrast medium, pass through the living body; carrier substances of a chemical component in a drug delivery system; those which, like cosmetics, are applied to a skin of the living body; and intermediates between foods and the above substances.

The separating reaction of microparticles occurs by forced uniform mixing between the processing surfaces 1 and 2 arranged to be opposite to each other so as to be able to approach to and separate from each other, at least one of which rotates relative to the other, in the apparatus shown in FIG. 1(A).

First, a solution containing the first solvent is introduced through one flow path, that is, the first introduction part d1 into the space between the processing surfaces 1 and 2 arranged to be opposite to each other so as to be able to approach to and separate from each other, at least one of which rotates relative to the other, thereby forming a first fluid film between the processing surfaces.

Then, a solvent capable of serving as the second solvent in which the intended material has lower solubility than in the first solvent is introduced directly through another flow path, that is, the second introduction part d2 into the first fluid film produced between the processing surfaces 1 and 2.

As described above, the first solvent-containing solution and the second solvent are mixed in the space between the processing surfaces 1 and 2, the distance of which is regulated by the pressure balance between the supply pressure of the fluid and the pressure exerted between the rotating processing surfaces 1 and 2, thereby effecting the separating reaction of microparticles.

To effect the reaction between the processing surfaces 1 and 2, the second fluid may be introduced through the first introduction part d1 and the first fluid through the second introduction part d2 (this applies to the Examples that follow), as opposed to the above description. That is, the expression "first" or "second" for each solvent has a meaning for merely discriminating an $n^{th}$ solvent among a plurality of solvents present, and a third or more solvents can also be present.

As described above, the processing apparatus can be provided with a third introduction part d3 in addition to the first introduction part d1 and the second introduction part d2. In this case, the first solvent-containing solution, the second solvent, and a solution containing a stabilizer/dispersant can be introduced separately through the respective introduction parts into the processing apparatus. By doing so, the concentration and pressure of each solution can be controlled separately, and the separating reaction can be regulated more accurately. When the processing apparatus is provided with four or more introduction parts, the foregoing applies and fluids to be introduced into the processing apparatus can be subdivided in this manner.

Then, the method of separating biologically ingestible microparticles by neutralization reaction or by pH change is described. The following method is characterized in that when biologically ingestible microparticles are produced by separating biologically ingestible microparticle materials in a fluid by neutralization reaction or pH change, the fluid is formed into a thin film fluid generated between the processing surfaces arranged to be opposite to each other so as to be able to approach to and separate from each other, at least one of which rotates relative to the other, thereby separating biologically ingestible microparticles by neutralization reaction or pH change.

Hereinafter, specific examples of the present invention are described in more detail with reference to examples of biologically ingestible barium sulfate microparticles ingested as a contrast medium into the living body. However, the present invention is not limited to these examples.

This reaction occurs by forced uniform mixing between the processing surfaces 1 and 2 arranged to be opposite to each other so as to be able to approach to and separate from each other, at least one of which rotates relative to the other, in the apparatus shown in FIG. 1(A).

First, a first fluid containing at least one kind of solution of a water-soluble barium salt such as barium chloride, barium hydroxide or barium acetate is introduced as a first fluid through one flow path, that is, the first introduction part d1 into the space between the processing surfaces 1 and 2 arranged to be opposite to each other so as to be able to approach to and separate from each other, at least one of which rotates relative to the other, thereby forming a first fluid film between the processing surfaces.

Then, a second fluid containing at least one kind of water-soluble sulfuric acid compound solution such as sulfuric acid or ammonium sulfate is introduced as a second fluid directly through another flow path, that is, the second introduction part d2 into the first fluid film produced between the processing surfaces 1 and 2.

As described above, the first fluid and second fluid are allowed to join together in a thin film fluid foemws between the processing surfaces 1 and 2, the distance of which is regulated by the pressure balance between the supply pressure of the fluid and the pressure exerted between the rotating processing surfaces. The first fluid and the second fluid are mixed in the thin film fluid, and the two substances are reacted. Specifically, the reaction of forming biologically ingestible barium sulfate microparticles can be carried out by neutralization reaction or by pH change.

Then, a method of obtaining biologically ingestible microparticles other than barium sulfate is described.

Here, the simplest chemical reaction formula (ion reaction formula) related to separation of barium sulfate exemplified above is as follows.

(Ionic Reaction Formula)

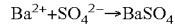

$$Ba^{2+} + SO_4^{2-} \rightarrow BaSO_4$$

The neutralization reaction in the present invention includes a neutralization reaction as the most fundamental acid-base reaction, that is, a neutralization reaction of negating the properties of both acid and base and simultaneously forming water and a salt, and a reaction wherein in the above ionic reaction formula, the cationic substance $Ba^{2+}$ and the anionic substance $SO_4^{2-}$ are reacted with each other to form the substance such as $BaSO_4$. The acid and base in this case may be those defined by Arrhenius, Broensted-Lowry, or Lewis.

Herein, the objective substance can be changed and obtained by changing the cationic or anionic substance to be used. The cationic or anionic substance is not particularly limited and may be a single atom ion such as $Na^+$ or $Cl-$, or a polyatomic ion such as $NH^{4+}$ or $CH_3COO^-$. The objective substance may also be a complex ion. Organic matters whose structure is partially ionized in solution as often observed particularly in medical drugs can also be used.

Both the first and second fluids may contain the same ion.

When the neutralization reaction is carried out, the reaction may be accompanied by change in solvent pH.

The particle size, monodispersity or crystal form of the biologically ingestible microparticles obtained in the present invention can be regulated by changing the number of revolutions of the processing surfaces 1 and 2, the distance between the processing surfaces 1 and 2, the flow rate and temperature of the thin film fluid, and the concentration of the starting materials.

The biologically ingestible microparticles obtained in the present invention have desired particle size distribution/particle diameter distribution, the degree of crystallinity is 50% or more based on the total mass of the obtained particles, and a fluid containing the particles is a stable dispersion over hours, free of coagulating sedimentation or particle aggregation after preparation. The distance between the processing surfaces arranged to be opposite to each other can be freely regulated, so the particle diameter can be controlled, and at least one of the processing surfaces can rotate relative to the other, thereby controlling the crystal form freely.

The dispersion obtained by the present invention is stable, and this dispersion is comprised of a liquid dispersing medium and the biologically ingestible microparticles. A pharmaceutical composition can be obtained by mixing a pharmaceutically acceptable carrier in the biologically ingestible microparticles or a dispersion containing the particles of the present invention.

When this dispersion is used as a suspended ophthalmic solution as shown in Examples below, the solution in which the intended drug is not dissolved shall be used and has preferably pH 3 to pH 9, more preferably pH 3.0 to pH 6.5, depending on physical properties of the drug. A pH value outside this range is not preferable because of high stimulation on the eye.

It is preferable that 90% of the obtained biologically ingestible microparticles in particle size distribution/particle diameter distribution have a particle size of 500 nm or less (that is, those particles having a particle diameter larger than 500 nm account for less than 10% of the particles). When 90% of the microparticles in particle size distribution/particle diameter distribution have a particle size of 500 nm or less, coarse particles serve as cores to prevent the phenomenon of aggregation, so that the surface area is increased and the apparent solubility is increased, and therefore, the corneal permeability of the active ingredient in the suspended ophthalmic solution is improved.

From the viewpoint of filtration sterilization, 90% of the particles in a suspended ophthalmic solution in particle size distribution/particle diameter distribution have a particle size of preferably 220 nm or less, whereby the solution can be sterilized by filtration and can be sterilized more inexpensively than in the conventional art.

The filtration sterilization filter that can be used may be any filter made of various materials as long as it is a commercial filter assured to be aseptic. Its materials include, for example, cellulose acetate, polycarbonate, polyvinylidene fluoride (PVDF), and the like.

The pore size of the filter is preferably 0.45 µm or less, and more preferably 0.22 µm or less. In the case of particle size distribution/particle diameter distribution higher than the above range, the filtration filter may be undesirably clogged and the yield may be decreased.

The dispersion stability of the suspended ophthalmic solution in the present invention can be improved by adding a surfactant and/or a water-soluble polymer to regulate the absolute value of zeta potential of the drug particles in the range of 20 mV to 150 mV. The amount of the surfactant/water-soluble polymer used in regulation of zeta potential varies depending on pH, but is preferably in the range of 0.05% to 3% in the suspended ophthalmic solution.

In this manner, a liquid dispersion (suspension) in which biologically ingestible microparticles having an average primary particle size of 0.5 nm to 10000 nm, preferably 1 nm to 500 nm, more preferably 30 nm to 200 nm have been dispersed can be prepared. When the dispersant is added to a solution containing biologically ingestible microparticle materials, a liquid dispersion (suspension) in which biologically ingestible microparticles coordinated thereon with the dispersant have been dispersed can be prepared, and the obtained biologically ingestible microparticles are made very excellent in re-dispersibility. Because contamination in the production process is low and the degree of crystallization can be highly controlled in separating crystals, this production method is particularly convenient for obtaining biologically ingestible microparticles which, like pharmaceuticals and cosmetics, are intended to be ingested into the living body.

The "particle size" used in this specification refers to an average particle size determined by usual particle size measuring methods known in the art such as a dynamic light scattering method/laser diffraction method.

The effective dose level of the treatment drug is an effective dose for obtaining a desired therapeutic response to a specific administered composition and method. Accordingly, the selected dose level depends on a specific drug, a desired therapeutic effect, administration route, desired treatment duration, and other factors. As described above, the pharmaceutical composition of the present invention exhibits a surprisingly high in vivo absorption ratio which will be described specifically in Examples below and is extremely useful.

The pharmaceutical composition of the present invention is considered particularly useful in oral and parenteral administration methods including intravenous injection. It is anticipated that water-sparingly-soluble drugs which could not be intravenously injected in a conventional way can be administered safely according to the present invention. Drugs which could not be orally administered due to poor bioavailability can be effectively administered according to the present invention.

Hereinafter, the present invention is described in detail with reference to Examples, but the present invention is not limited to Examples.

In following Examples, the term "from the center" means "through the first introduction part d1" in the processing apparatus shown in FIG. 1(A), the first fluid refers to the first processed fluid, and the second fluid refers to the second processed fluid introduced "through the second introduction part d2" in the processing apparatus shown in FIG. 1(A).

EXAMPLE D1

Production of Danazol Particles

A mixed solution of an aqueous solution having the drug dissolved therein, a solution having low solubility for the drug, and a polymer dispersant or a stabilizer is subjected to crystallization reaction in a thin film fluid formed between the processing surfaces 1 and 2 arranged to be opposite to each other so as to be able to approach to and separate from each other, at least one of which rotates relative to the other, in the uniformly dispersing, stirring and mixing reaction apparatus shown in FIG. 1(A).

While 0.1% aqueous solution of Tween 80 was sent as a first fluid from the center at a supply pressure/back pressure of 0.02 MPa/0.01 MPa, at a revolution number of 1000 rpm and at a sending solution temperature of 35° C., a solution prepared by dissolving powdery danazol in ethanol was introduced at a rate of 10 ml/min. as a second fluid into the space between the processing surfaces. The first and second fluids were mixed with each other in the thin film, and a danazol dispersion solution was discharged at a rate of 30 g/min. from the processing surfaces.

When the recovered danazol dispersion solution was measured with a particle size distribution measuring instrument utilizing a dynamic light scattering method as measurement principle (trade name: Microtrac UPA150, manufactured by Nikkiso Co., Ltd.), the (volume) average particle size was 65 nm and the CV value of its particle size distribution/particle diameter distribution was 17%. The recovered danazol dispersion solution was dissolved with ethanol, and when its contamination with foreign substance was confirmed with a particle counter (trade name: Particle Counter KS65, manufactured by Rion Co., Ltd.), there were 13 particles having a size of 10 µm or more and 1 particle having a size of 25 µm or more per mL (0.05% danazol solution).

Then, the recovered danazol dispersion solution was dried, and its substance when identified with an X-ray diffraction/ differential scanning calorimeter (DSC) and a Fourier transform infrared spectroscopy (FT-IR) instrument coincided with the danazol bulk powder and showed a crystallinity degree of 80%.

When the microparticles (average particle size 65 nm) of the present invention described above were administered as a nano suspension into a dog, the bioavailability (BA) thereof was 92.9%. Because the bioavailability (BA) of a commercial product (average particle size 10 μm) administered as a suspension was 5.1%, it can be said that the in vivo absorption ratio significantly improved.

The energy quantity required for pulverization was 1/32000 as compared with that required for pulverization with a pulverizing machine SS5-100 manufactured by the present applicant.

Then, the conditions were changed as follows. While 0.1% aqueous solution of Tween 80 was sent as a first fluid from the center at a supply pressure/back pressure of 0.10 MPa/0.02 MPa, at a revolution number of 1000 rpm and at a sending solution temperature of 35° C., a solution prepared by dissolving powdery danazol in ethanol was introduced at a rate of 10 ml/min. as a second fluid into the space between the processing surfaces. The first and second fluids were mixed with each other in the thin film, and a danazol dispersion solution was discharged at a rate of 70 g/min. from the processing surfaces.

When the recovered danazol dispersion solution was measured with a particle size distribution measuring instrument utilizing a dynamic light scattering method as measurement principle (trade name: Microtrac UPA150, manufactured by Nikkiso Co., Ltd.), the (volume) average particle size was 135 nm and the CV value of its particle size distribution/particle diameter distribution was 19%.

Then, the recovered danazol dispersion solution was dried, and its substance when identified with an X-ray diffraction/differential scanning calorimeter (DSC) and a Fourier transform infrared spectroscopy (FT-IR) instrument coincided with the danazol bulk powder and showed a crystallinity degree of 75%.

The conditions were further changed as follows. While water was sent as a first fluid from the center at a supply pressure/back pressure of 0.02 MPa/0.01 MPa, at a revolution number of 1000 rpm and at a sending solution temperature of 35° C., a solution prepared by dissolving powdery danazol in Tween 80-admixed ethanol was introduced at a rate of 10 ml/min. as a second fluid into the space between the processing surfaces. The first and second fluids were mixed with each other in the thin film, and a danazol dispersion solution was discharged at a rate of 30 g/min. from the processing surfaces.

When the recovered danazol dispersion solution was measured with a particle size distribution measuring instrument utilizing a dynamic light scattering method as measurement principle (trade name: Microtrac UPA150, manufactured by Nikkiso Co., Ltd.), the (volume) average particle size was 78 nm and the CV value of its particle size distribution/particle diameter distribution was 18%.

Then, the recovered danazol dispersion solution was dried, and its substance when identified with an X-ray diffraction/differential scanning calorimeter (DSC) and a Fourier transform infrared spectroscopy (FT-IR) instrument coincided with the danazol bulk powder and showed a crystallinity degree of 82%.

EXAMPLE D2

Production of Tacrolimus Hydrate Particles

While 0.1% aqueous solution of Tween 80 was sent as a first fluid from the center at a supply pressure/back pressure of 0.02 MPa/0.01 MPa, at a revolution number of 2000 rpm and at a sending solution temperature of 30° C., a solution prepared by dissolving tacrolimus hydrate in ethanol was introduced at a rate of 10 ml/min. as a second fluid into the space between the processing surfaces. The first and second fluids were mixed with each other in the thin film, and a tacrolimus hydrate dispersion solution was discharged at a rate of 30 g/min. from the processing surfaces.

When the recovered tacrolimus hydrate dispersion solution was measured with a particle size distribution measuring instrument utilizing a dynamic light scattering method as measurement principle (trade name: Microtrac UPA150, manufactured by Nikkiso Co., Ltd.), the (volume) average particle size was 116 nm and the CV value of its particle size distribution/particle diameter distribution was 16%.

Then, the recovered tacrolimus hydrate dispersion solution was dried, and its substance when identified with an X-ray diffraction/differential scanning calorimeter (DSC) and a Fourier transform infrared spectroscopy (FT-IR) instrument coincided with the tacrolimus bulk powder and showed a crystallinity degree of 90%.

Then, the conditions were changed as follows. While 0.1% aqueous solution of Tween 80 was sent as a first fluid from the center at a supply pressure/back pressure of 0.02 MPa/0.01 MPa, at a revolution number of 1000 rpm and at a sending solution temperature of 30° C., a solution prepared by dissolving tacrolimus hydrate in ethanol was introduced at a rate of 10 ml/min. as a second fluid into the space between the processing surfaces. The first and second fluids were mixed with each other in the thin film, and a tacrolimus hydrate dispersion solution was discharged at a rate of 20 g/min. from the processing surfaces.

When the recovered tacrolimus hydrate dispersion solution was measured with a particle size distribution measuring instrument utilizing a dynamic light scattering method as measurement principle (trade name: Microtrac UPA150, manufactured by Nikkiso Co., Ltd.), the (volume) average particle size was 98 nm and the CV value of its particle size distribution/particle diameter distribution was 13%.

Then, the recovered tacrolimus hydrate dispersion solution was dried, and its substance when identified with an X-ray diffraction/differential scanning calorimeter (DSC) and a Fourier transform infrared spectroscopy (FT-IR) instrument coincided with the tacrolimus bulk powder and showed a crystallinity degree of 95%.

EXAMPLE D3

Production of Tranilast Particles

While water was sent as a first fluid from the center at a supply pressure/back pressure of 0.02 MPa/0.01 MPa, at a revolution number of 1000 rpm and at a sending solution temperature of 27° C., a solution prepared by dissolving tranilast in a Tween 80-containing potassium hydroxide solution, pH 13 was introduced at a rate of 10 ml/min. as a second fluid into the space between the processing surfaces. The first and second fluids were mixed with each other in the thin film, and a tranilast dispersion solution was discharged at a rate of 30 g/min. from the processing surfaces.

When the recovered tranilast dispersion solution was measured with a particle size distribution measuring instrument utilizing a dynamic light scattering method as measurement principle (trade name: Microtrac UPA150, manufactured by Nikkiso Co., Ltd.), the (volume) average particle size was 120 nm and the CV value of its particle size distribution/particle diameter distribution was 15%.

Then, the recovered tranilast dispersion solution was dialyzed with a cellulose dialysis tube against purified water to remove the salt and then dried, and its substance when identified with an X-ray diffraction/differential scanning calorimeter (DSC) and a Fourier transform infrared spectroscopy (FT-IR) instrument coincided with the tranilast bulk powder and showed a crystallinity degree of 86%.

When the microparticles (average particle size 120 nm) of the present invention described above were formed into an O/W cream preparation and examined in a skin permeability test for 8 hours with a test skin (LSE-high), it showed 5-fold permeability as compared with the bulk powder (average particle size 45 μm).

EXAMPLES D4 TO D7

Separation of Barium Sulfate

An aqueous solution of barium chloride and an aqueous solution of sodium sulfate are subjected to neutralization reaction in a thin film fluid formed between the processing surfaces 1 and 2 arranged to be opposite to each other so as to be able to approach to and separate from each other, at least one of which rotates relative to the other, in the uniformly dispersing, stirring and mixing reaction apparatus as shown in FIG. 1 (A), thereby separating barium sulfate.

EXAMPLE D4

While 25% sodium sulfate aqueous solution was sent as a first fluid from the center at a supply pressure/back pressure of 0.02 MPa/0.01 MPa, at a revolution number of 500 rpm and at a sending solution temperature of 25° C., 17% barium chloride aqueous solution was introduced at a rate of 10 ml/min. as a second fluid into the space between the processing surfaces. The first and second fluids were mixed with each other in the thin film, and a barium sulfate dispersion solution was discharged at a rate of 20 g/min. from the processing surfaces.

Then, impurities were removed from this dispersion by a dialysis tube, and barium sulfate microparticles in this dispersion were observed with a transmission electron microscope (TEM). Randomly, 100 particles were selected therefrom, and their measured average primary particle size was 50 nm.

Further, the barium sulfate dispersion was vacuum-freeze dried to give powdery barium sulfate microscopes which were then introduced again into ion-exchange water and stirred with a high-speed stirring dispersing machine (trade name: CLEARMIX manufactured by M Technique Co., Ltd.), whereby a barium sulfate microparticle dispersion was obtained again, its average primary particle size was 50 nm which was the same as that of the barium sulfate dispersion before vacuum-freeze drying, and the resulting barium sulfate microparticle powders were thus confirmed to be excellent in re-dispersibility.

In Examples D5 to D7, the same sodium sulfate aqueous solution and barium chloride aqueous solution as in Example D1 were used to obtain a barium sulfate particle dispersion and barium sulfate powder by changing the number of revolutions, supply pressure and back pressure.

COMPARATIVE EXAMPLE D1

The sodium sulfate aqueous solution was added to the barium chloride aqueous solution under stirring with CLEARMIX (manufactured by M Technique Co., Ltd.) to form a barium sulfate microparticle dispersion. At this time, the number of revolutions of CLEARMIX was 20000 rpm, and stirring was conducted for 30 minutes. A barium sulfate microparticle dispersion having an average primary particle size of 900 nm was obtained. When re-dispersibility was confirmed in the same manner as in Examples, the particle size became 1700 nm after re-dispersion, indicating stronger aggregation than before vacuum freeze drying. The results are shown in Table 3. In the table, Examples 4 to 7 and Comparative Example 1 shall be read as Examples D4 to D7 and Comparative Example D1, respectively.

TABLE 3

| Example | First Fluid | Second Fluid | Number of Revolutions [rpm] | Supply Pressure [MPaG] | Back Pressure [MPaG] | Volume-Average Primary Particle Size [nm] | Re-dispersibility |
|---|---|---|---|---|---|---|---|
| 4 | 25% sodium sulfate aqueous solution | 17% barium chloride aqueous solution | 500 | 0.02 | 0.01 | 50 | ○ |
| 5 | | | | 0.04 | | 75 | ○ |
| 6 | | | 1000 | 0.04 | 0.01 | 40 | ○ |
| 7 | | | | | 0.05 | 30 | ○ |
| Comparative Example 1 | | | 20000 | — | — | 900 | X |

EXAMPLES D8 TO D10

Production of Fluorometholone-Suspended Ophthalmic Solution

While 0.05% solution of Tween 80 was sent as a first fluid from the center at a revolution number of 100 to 1000 rpm and at a sending solution temperature of 25° C., a solution prepared by dissolving fluorometholone in pyridine was introduced as a second fluid into the space between the processing surfaces. The first and second fluids were mixed with each other in the thin film, and a fluorometholone suspension was discharged from the processing surfaces. The recovered fluorometholone suspension was measured with a particle size distribution measuring instrument utilizing a dynamic light scattering method as measurement principle (trade name: Microtrac UPA150, manufactured by Nikkiso Co., Ltd.). The recovered fluorometholone suspension was dried, and its substance when identified with an X-ray diffraction/differential scanning calorimeter (DSC) and a Fourier transform infrared spectroscopy (FT-IR) instrument coincided with the fluorometholone bulk powder.

In Comparative Examples D2 and D3, on the other hand, fluorometholone bulk powder was preliminarily pulverized and dispersed at 20000 rpm for 30 min. with a homogenizer (CLEARMIX 2.2S manufactured by M Technique Co., Ltd.). In Comparative Example D1, the sample was thereafter further finely divided, pulverized and dispersed with an ultrathin film high-speed rotary pulverizer (SS5-100 manufactured by M Technique Co., Ltd.). In Comparative Example D4, none of the treatment was conducted, and only the pH adjustment of the bulk powder was conducted. Then, the bulk powder subjected to the above treatment was dissolved to prepare a suspension. The processing conditions and the particle size distribution/particle diameter distribution measurement results are shown in Table 4. In the table, Examples 8 to 10 and Comparative Examples 2 to 4 shall be read as Examples D8 to D10 and Comparative Examples D2 to D4, respectively (this applies to Tables 5 to 10).

TABLE 4

|  | Example 8 | Example 9 | Example 10 | Comparative Example 2 | Comparative Example 3 | comparative Example 4 |
|---|---|---|---|---|---|---|
| Homogenizer processing | absent | absent | absent | present | present | absent |
| Ultrathin film high-speed rotary pulverizing processing | absent | absent | absent | present | absent | absent |
| Mixing ratio of first fluid/second fluid | 4:1 | 2:1 | 2:1 | — | — | — |
| Discharge flow rate (mL/min) | 30 | 20 | 20 | — | — | — |
| Number of revolutions (rpm) Homogenizer/ultrathin film high-speed rotary pulverizing | 100 | 100 | 1000 | 20000/10000 | 20000/— | — |
| Final fluorometholone concentration | 0.08 | 0.05 | 0.05 | 0.05 | 0.05 | 0.05 |
| Median particle diameter (nm) | 218 | 186 | 96 | 1027 | 6287 | 33232 |
| 90% median diameter (nm) | 498 | 325 | 198 | 2479 | 20670 | 180815 |
| Amount of energy applied | $1.45 \times 10^{-6}$ | $1.45 \times 10^{-6}$ | $1.45 \times 10^{-3}$ | 47.20 | 0.90 | — |

<Confirmation of Aptitude for Filtering Sterilization>

The 6 test solutions in Examples D8 to D10 and Comparative Examples D2 to D4 were subjected to filtering sterilization treatment with a PVDF filter having 0.22 μm pores. The concentration of fluorometholone before and after filtering sterilization was measured by HPLC, and the yield during filtering sterilization was determined. The results are shown in Table 5.

When a first fluid that is 0.05% Tween 80 solution and a second fluid that is a solution of fluorometholone (solvent: acetone) were aseptically filtered with a 0.22 μm filter, then mixed at a revolution number of 100 rpm at a first fluid/second fluid ratio of 4/1 and discharged at a flow rate of 150 mL/min., powder having an average particle size of 2.2 μm was obtained. In the Comparative Examples, when the bulk powder was sterilized by dry heat and finely divided with a

TABLE 5

|  | Example 8 | Example 9 | Example 10 | Comparative Example 2 | Comparative Example 3 | comparative Example 4 |
|---|---|---|---|---|---|---|
| Concentration before filtration (%) | 0.0050 | 0.0052 | 0.0050 | 0.0051 | 0.0050 | 0.0051 |
| Concentration after filtration (%) | 0.0012 | 0.0046 | 0.0050 | not filterable | not filterable | not filterable |
| Yield (%) | 24.0 | 88.5 | 100.0 | — | — | — |

The yield with a PVDF filter having 0.45 μm pores is shown in Table 6.

homogenizer (18000 rpm for 30 min., CLEARMIX 2.2S manufactured by M Technique Co., Ltd.) and an ultrathin film

TABLE 6

|  | Example 8 | Example 9 | Example 10 | Comparative Example 2 | Comparative Example 3 | comparative Example 4 |
|---|---|---|---|---|---|---|
| Concentration before filtration (%) | 0.0049 | 0.0052 | 0.0051 | 0.0051 | 0.0050 | 0.0051 |
| Concentration after filtration (%) | 0.0040 | 0.0052 | 0.0051 | not filterable | not filterable | not filterable |
| Yield (%) | 81.6 | 100.0 | 100.0 | — | — | — | high-speed rotary pulverizer (SS5-100 manufactured by M Technique Co., Ltd.), the average particle size was 2.1 μm. The amount of applied energy necessary for the method of the present invention was about 1/30000 as compared with that necessary in the Comparative Examples described above.

EXAMPLES D11 TO D13

Production of Pirenoxine-Suspended Ophthalmic Solution

While 0.05 mol/L nitric acid aqueous solution was sent as a first fluid from the center at a revolution number of 100 to 1000 rpm and at a sending solution temperature of 25° C., a solution prepared by dissolving pirenoxine in 0.1 mol/L sodium hydroxide was introduced as a second fluid into the space between the processing surfaces. The first and second fluids were mixed with each other in the thin film, and a pirenoxine suspension was discharged from the processing surfaces. The recovered pirenoxine suspension was dialyzed with a dialysis tube against purified water to remove byproducts and then measured with a particle size distribution measuring instrument utilizing a dynamic light scattering method as measurement principle (trade name: Microtrac UPA150, manufactured by Nikkiso Co., Ltd.). The recovered pirenoxine suspension was dried, and its substance when identified with an X-ray diffraction/differential scanning calorimeter (DSC) and a Fourier transform infrared spectroscopy (FT-IR) instrument coincided with the pirenoxine bulk powder.

In Comparative Examples D5 and D6, on the other hand, pirenoxine bulk powders were preliminarily pulverized and dispersed at 18000 rpm for 30 min. with a homogenizer (CLEARMIX 2.2S manufactured by M Technique Co., Ltd.). In Comparative Example D1, the sample was thereafter further finely divided, pulverized and dispersed with an ultrathin film high-speed rotary pulverizer (SS5-100 manufactured by M Technique Co., Ltd.). In Comparative Example D7, none of the treatment was conducted, and only the pH adjustment of the bulk powders was conducted. Then, the bulk powders subjected to the above treatment were dissolved to prepare a suspension.

The processing conditions and the particle size distribution/particle diameter distribution measurement results are shown in Table 7.

TABLE 7

|  | Example 11 | Example 12 | Example 13 | Comparative Example 5 | Comparative Example 6 | Comparative Example 7 |
|---|---|---|---|---|---|---|
| Homogenizer processing | absent | absent | absent | present | present | absent |
| Ultrathin film high-speed rotary pulverizing processing | absent | absent | absent | present | absent | absent |
| Mixing ratio of first fluid/second fluid | 4:1 | 2:1 | 2:1 | — | — | — |
| Number of revolutions (rpm) Homogenizer/ ultrathin film high-speed rotary pulverizing | 100 | 100 | 1000 | 18000/10000 | 18000/— | — |
| Final pirenoxine concentration | 0.08 | 0.05 | 0.05 | 0.05 | 0.05 | 0.05 |
| Median particle diameter (nm) | 98 | 20 | 8 | 97 | 800 | 21970 |
| 90% median diameter (nm) | 186 | 105 | 89 | 198 | 5890 | 65860 |
| Amount of energy applied | $1.45 \times 10^{-6}$ | $1.45 \times 10^{-6}$ | $1.45 \times 10^{-3}$ | 46.96 | 0.66 | — |

The amount of applied energy necessary for pulverization was $1/3.2 \times 10^7$ to $1/3.2 \times 10^4$ relative to that by the ultrathin film high-speed rotary pulverizer (SS5-100 manufactured by M Technique Co., Ltd.), thus indicating excellent energy efficiency.

In Examples D11 to D13, when pH was adjusted to 3.0 to 5.5, the median particle size was 8 nm to 98 nm, and 90% particle size was 89 nm to 186 nm.

<Photostability test>

Each test solution, 10 mL, in Examples D11 to D13 and Comparative Examples D5 to D7 was placed in a glass transparent vial and irradiated with light from a 2000 Lux•hr light source in a photoirradiation testing machine. Each test solution in a vial was sampled with time, and the pirenoxine concentration was measured with HPLC, to evaluate the residual degree of pirenoxine (%). The results are shown in Table 8. The numerical values in the table are mean values in triplicate.

TABLE 8

| Number of days elapsed | Example 11 | Example 12 | Example 13 | Comparative Example 5 | Comparative Example 6 | Comparative Example 7 |
|---|---|---|---|---|---|---|
| 0 | 100.0 | 100.0 | 100.0 | 100.0 | 100.0 | 100.0 |
| 1 | 98.3 | 97.8 | 98.6 | 98.3 | 97.9 | 95.4 |
| 2 | 97.0 | 98.1 | 98.2 | 97.0 | 97.3 | 90.8 |
| 3 | 96.3 | 97.9 | 97.6 | 96.3 | 97.0 | 88.7 |
| 4 | 95.0 | 97.4 | 98.0 | 95.0 | 96.7 | 84.0 |
| 5 | 93.5 | 97.0 | 97.7 | 93.7 | 96.8 | 79.5 |
| 6 | 92.3 | 96.9 | 97.3 | 92.6 | 95.1 | 75.6 |
| 7 | 89.9 | 95.0 | 96.6 | 89.5 | 93.5 | 72.8 |
| 10 | 85.7 | 94.6 | 95.1 | 85.7 | 86.8 | 61.4 |
| 25 | 81.9 | 93.0 | 94.5 | 80.2 | 79.0 | 50.9 |

Mean value in triplicate

<Skin Permeability Test>

The cornea excised from Japanese domestic rabbit was fixed to a horizontal 2-chamber diffusion cell (effective area, 0.3 cm$^2$; cell volume, 5 mL; temperature, 32° C.) such that the corneal epithelium was faced with the donor side. A reservoir liquid was a phosphate isotonic buffer, pH 7.5. Each test solution in Example D1, Example D2 and Comparative Examples D1 to D3 was used at the donor side. The time when each test solution was added to the donor side was time 0, and the reservoir liquid was sampled with time. The pirenoxine concentration in the sampled solution was measured with HPLC, and pirenoxine that had moved in the cornea was evaluated. The results are shown in Table 9. The numerical values in the table are mean values in triplicate.

TABLE 9

| Time (hr) | Example 11 | Example 12 | Example 13 | Comparative Example 5 | Comparative Example 6 | Comparative Example 7 |
|---|---|---|---|---|---|---|
| 0.0 | 0.0 | 0.0 | 0.0 | 0.0 | 0.0 | 0.0 |
| 0.5 | 0.0 | 0.0 | 0.0 | 0.0 | 0.0 | 0.0 |
| 1.0 | 4.2 | 13.4 | 14.6 | 4.5 | 0.0 | 0.0 |
| 1.5 | 36.7 | 56.7 | 58.8 | 35.7 | 3.8 | 0.0 |
| 2.0 | 85.9 | 102.8 | 112.6 | 85.9 | 34.7 | 18.3 |
| 3.0 | 128.6 | 179.6 | 198.0 | 123.8 | 64.8 | 26.8 |
| 6.0 | 405.6 | 530.5 | 584.2 | 412.8 | 286.7 | 38.9 |

Unit (ng/mL): mean value in triplicate

<Confirmation of Aptitude for Filtering Sterilization>

The 6 test solutions in Examples D11 to D13 and Comparative Examples D5 to D7 were subjected to filtering sterilization treatment with a PVDF filter having 0.22 μm pores. The concentration of pirenoxine before and after filtering sterilization was measured by HPLC, and the yield during filtering sterilization was determined. The results are shown in Table 10.

TABLE 10

| | Example 11 | Example 12 | Example 13 | Comparative Example 5 | Comparative Example 6 | Comparative Example 7 |
|---|---|---|---|---|---|---|
| Concentration before filtration (%) | 0.0050 | 0.0052 | 0.0049 | 0.0052 | 0.0050 | 0.0051 |
| Concentration after filtration (%) | 0.0049 | 0.0052 | 0.0049 | 0.0051 | 0.0012 | not filterable |
| Yield (%) | 98.0 | 100.0 | 100.0 | 98.1 | 24.0 | — |

(E) Ceramics Nanoparticles

Hereinafter, the reaction of forming the ceramics nanoparticles of the present invention is described.

This reaction occurs by forced uniform mixing between the processing surfaces 1 and 2 arranged to be opposite to each other so as to be able to approach to and separate from each other, at least one of which rotates relative to the other, in the apparatus shown in FIG. 1(A).

First, a first fluid containing a pH adjusting agent is introduced as a first fluid through one flow path, that is, the first introduction part d1 into the space between the processing surfaces 1 and 2 arranged to be opposite to each other so as to be able to approach to and separate from each other, at least one of which rotates relative to the other, thereby forming a first fluid film between the processing surfaces.

Then, a fluid containing a reactant that is a ceramics material is introduced as a second fluid directly through another flow path, that is, the second introduction part d2 into the first fluid film produced between the processing surfaces 1 and 2.

As described above, the first and second fluids join together between the processing surfaces 1 and 2, the distance of which is regulated by the pressure balance between the supply pressure of the fluid and the pressure exerted between the rotating processing surfaces 1 and 2, thereby effecting the reaction of hydrolyzing the ceramics material to form ceramics nanoparticles.

To effect the reaction between the processing surfaces 1 and 2, the second fluid may be introduced the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

The particle size, monodispersity or crystal form of the obtained ceramics nanoparticles can be regulated by changing the number of revolutions of the processing surfaces 1 and 2, the distance between the processing surfaces 1 and 2, the flow rate of the thin film fluid, the concentration of material, and the temperature.

The CV value in the particle size distribution of the ceramic nanoparticles obtained in the present invention is 5% to 40%, preferably 10% to 20%.

The ceramics nanoparticles obtained by the method for producing ceramics nanoparticles according to the present invention include, but are not limited to, ceramics nanoparticles comprising alumina, zirconia, and barium titanate. Other ceramics include zeolite and cerium oxide.

The ceramic materials used in the method for producing ceramics nanoparticles according to the present invention are not particularly limited, but it is possible to use at least one metal alkoxide or metal salt selected from, for example, Al, Ba, Mg, Ca, La, Fe, Si, Ti, Zr, Pb, Sn, Zn, Cd, As, Ga, Sr, Bi, Ta, Se, Te, Hf, Mg, Ni, Mn, Co, S, Ge, Li, B, and Ce.

For example, the materials that can be used for alumina nanoparticles include aluminum alkoxides such as aluminum isopropoxide, aluminum salts such as aluminum nitrate and aluminum acetate, and alkali aluminates such as sodium aluminate.

The solvent that dissolves the ceramics materials, and the solvent for preparing a pH adjusting agent, are not particularly limited, and can be exemplified by water such as ion-exchange water, RO water and ultrapure water, alcohols such as methanol, ethanol and isopropyl alcohol (IPA), and organic solvents such as toluene and xylene.

In the present invention, ceramics materials to be mixed with the ceramics materials include, but are not limited to, metal alkoxides such as $Mg(OR)_2$, $Ca(OR)_2$, $La(OR)_3$, $Fe(OR)_2$, $Si(OR)_4$, $Ti(OR)_4$ and $Zr(OR)_4$ (R: an alkyl group), and metal salts such as $Ce(NO_3)_3$ and $In(NO_3)_3$.

The pH adjusting agent for pH control in hydrolysis of ceramics materials in the present invention is not particularly limited. In the case of acidity, an inorganic acid such as hydrochloric acid, nitric acid or sulfuric acid, and an organic acid such as citric acid and acetic acid are used, and in the case of alkalinity, an aqueous solution of sodium hydroxide, potassium hydroxide or ammonia water is used. Depending on the case, the pH adjusting agents illustrated above can be diluted or dissolved in the above solvents for use.

As described above, the processing apparatus can be provided with a third introduction part d3 in addition to the first introduction part d1 and the second introduction part d2. In this case, a pH adjusting agent, a solution of ceramics material and an agent for regulating hydrolysis rate can be introduced separately through the respective introduction parts into the processing apparatus. By doing so, the concentration and pressure of each solution can be controlled separately, and the reaction of forming ceramics nanoparticles can be regulated more accurately. When the processing apparatus is provided with four or more introduction parts, the foregoing is also applied, and fluids to be introduced into the processing apparatus can be subdivided in this manner.

Hereinafter, the present invention is described in detail with reference to Examples, but the present invention is not limited to Examples.

In following Examples, the term "from the center" means "through the first introduction part d1" in the processing apparatus shown in FIG. 1(A), the first fluid refers to the first processed fluid, and the second fluid refers to the second processed fluid introduced "through the second introduction part d2" in the processing apparatus shown in FIG. 1(A).

EXAMPLE E1

An aqueous solution adjusted to pH 2 with an aqueous solution of hydrochloric acid flows into an aqueous solution of IPA containing ceramics materials in a thin film fluid formed between the processing surfaces 1 and 2 arranged to be opposite to each other so as to be able to approach to and separate from each other, at least one of which rotates relative to the other, in use of a uniformly stirring and mixing reaction apparatus as shown in FIG. 1(A), thereby effecting hydrolysis reaction under uniform mixing in the thin film.

While an aqueous solution adjusted to pH 2 with an aqueous solution of hydrochloric acid was sent as a first fluid from the center at a supply pressure/back pressure of 0.30 MPa/0.01 MPa and at a revolution number of 1000 rpm, a solution of 4% aluminum isopropoxide/IPA was introduced at a rate of 10 ml/min. as a second fluid into the space between the processing surfaces 1 and 2. An alumina nanoparticle dispersion was discharged from the processing surfaces.

When the particle size distribution was measured with a particle size distribution measuring instrument utilizing a laser Doppler method (trade name: Microtrac UPA150, manufactured by Nikkiso Co., Ltd.), the average particle size was 11 nm and the CV value of the particle size distribution was 18%.

EXAMPLE E2

While an aqueous solution adjusted to pH 2 with an aqueous solution of hydrochloric acid was sent as a first fluid from the center at a supply pressure/back pressure of 0.10 MPa/0.01 MPa and at a revolution number of 1000 rpm, a solution of 4% aluminum isopropoxide/IPA was introduced at a rate of 10 ml/min. as a second fluid into the space between the processing surfaces 1 and 2. An alumina nanoparticle dispersion was discharged from the processing surfaces.

When the particle size distribution was measured with a particle size distribution measuring instrument utilizing a laser Doppler method (trade name: Microtrac UPA150, manufactured by Nikkiso Co., Ltd.), the average particle size was 10 nm and the CV value of the particle size distribution was 17%.

EXAMPLE E3

While an aqueous solution adjusted to pH 2 with an aqueous solution of hydrochloric acid was sent as a first fluid from the center at a supply pressure/back pressure of 0.30 MPa/0.01 MPa and at a revolution number of 2000 rpm, a solution of 4% aluminum isopropoxide/IPA was introduced at a rate of 10 ml/min. as a second fluid into the space between the processing surfaces 1 and 2. An alumina nanoparticle dispersion was discharged from the processing surfaces.

When the particle size distribution was measured with a particle size distribution measuring instrument utilizing a laser Doppler method (trade name: Microtrac UPA150, manufactured by Nikkiso Co., Ltd.), the average particle size was 14 nm and the CV value of the particle size distribution was 15%.

EXAMPLE E4

While an aqueous solution adjusted to pH 2 with an aqueous solution of hydrochloric acid was sent as a first fluid from the center at a supply pressure/back pressure of 0.30 MPa/ 0.01 MPa and at a revolution number of 1000 rpm, a solution of 10% aluminum isopropoxide/IPA was introduced at a rate of 10 ml/min. as a second fluid into the space between the processing surfaces 1 and 2. An alumina nanoparticle dispersion was discharged from the processing surfaces.

When the particle size distribution was measured with a particle size distribution measuring instrument utilizing a laser Doppler method (trade name: Microtrac UPA150, manufactured by Nikkiso Co., Ltd.), the average particle size was 11 nm and the CV value of the particle size distribution was 19%.

COMPARATIVE EXAMPLE E1

While 20 g of an aqueous solution adjusted to pH 2 with an aqueous solution of hydrochloric acid was stirred at 140 rpm in a beaker, 20 g of a solution of 4% aluminum isopropoxide/ IPA was introduced. An alumina nanoparticle dispersion was obtained.

When the particle size distribution was measured with a particle size distribution measuring instrument utilizing a laser Doppler method (trade name: Microtrac UPA150, manufactured by Nikkiso Co., Ltd.), the average particle size was 3200 nm and the CV value of the particle size distribution was 140%.

COMPARATIVE EXAMPLE E2

While 20 g of an aqueous solution adjusted to pH 2 with an aqueous solution of hydrochloric acid was stirred at 140 rpm in a beaker, 20 g of a solution of 10% aluminum isopropoxide/ IPA was introduced. An alumina nanoparticle dispersion was obtained.

When the particle size distribution was measured with a particle size distribution measuring instrument utilizing a laser Doppler method (trade name: Microtrac UPA150, manufactured by Nikkiso Co., Ltd.), the average particle size was 5500 nm and the CV value of the particle size distribution was 150%.

The results are shown in Table 11. In the table, Examples 1 to 4 and Comparative Examples 1 to 2 shall be read as Examples E1 to E4 and Comparative Examples E1 to E2, respectively.

As shown in FIG. 1(A), a solution of zinc nitrate in ethanol flows into a solution of KOH in ethanol in a thin film fluid formed between the processing surfaces 1 and 2 arranged to be opposite to each other so as to be able to approach to and separate from each other, at least one of which rotates relative to the other, in use of a uniformly stirring and mixing reaction apparatus, thereby effecting a separating reaction under uniform mixing in the thin film.

EXAMPLE E5

While an aqueous solution of BYK-190/0.08 N KOH in ethanol was sent as a first fluid from the center at a supply pressure/back pressure of 0.06 MPa/0.005 MPa, at a revolution number of 1000 rpm and at a sending solution temperature of 23° C., a solution of zinc nitrate hexahydrate in ethanol was introduced at a rate of 6 ml/min. as a second fluid into the space between the processing surfaces 1 and 2. A microparticle dispersion was discharged from the processing surfaces 1 and 2.

Then, the operation of centrifuging the obtained microparticle dispersion under the condition of 1,000,000 G×10 minutes to remove impurities lighter than the microparticles was repeatedly conducted, and then the microparticles were washed with purified water and then observed with a transmission electron microscope (TEM). One hundred particles were selected at random therefrom, and their measured average primary particle size was 11 nm. A TEM photograph of the obtained microparticles is shown in FIG. 39. The resulting microparticle dispersion was freeze-dried, and the resulting microparticle powders were analyzed with an X-ray diffractometer (fully automatic general-purpose X-ray diffractometer, X'Pert PRO MPD, manufactured by PANalytivacl), and as a result, it was confirmed that the resulting microparticles were zinc oxide microparticles.

Further, when the obtained zinc oxide microparticle powders were introduced again into ion-exchange water and stirred with a high-speed stirring dispersing machine (trade name: CLEARMIX manufactured by M Technique Co., Ltd.), a zinc oxide microparticle dispersion was obtained again, its average primary particle size was 11 nm which was the same as that of the zinc oxide dispersion before freeze drying, and the resulting zinc oxide microparticle powders were thus confirmed to be excellent in re-dispersibility.

COMPARATIVE EXAMPLE E3

While 100 g of a solution of BYK-190/0.08 N KOH in ethanol was stirred at 300 rpm at a solution temperature of 23°

TABLE 11

| Example | First Fluid | Second Fluid | Number of Revolutions [rpm] | Supply Pressure [MPaG] | Back Pressure [MPaG] | Average Particle Size [nm] | CV Value [%] |
|---|---|---|---|---|---|---|---|
| Example 1 | Aqueous hydrochloric acid (pH 2) | 4% aluminum isopropoxide/ IPA | 1000 | 0.30 | 0.01 | 11 | 18 |
| Example 2 | | | 1000 | 0.10 | 0.01 | 10 | 17 |
| Example 3 | | | 2000 | 0.30 | 0.01 | 14 | 15 |
| Example 4 | | 10% aluminum isopropoxide/ IPA | 1000 | 0.30 | 0.01 | 11 | 19 |
| Comparative Example 1 | | 4% aluminum isopropoxide/ IPA | Beaker test | | | 3200 | 140 |
| Comparative Example 2 | | 10% aluminum isopropoxide/ IPA | | | | 5500 | 150 |

C. in a beaker, 20 g of a solution of zinc nitrate hexahydrate was introduced. A zinc oxide microparticle dispersion was obtained.

Then, the operation of centrifuging the obtained zinc oxide microparticle dispersion under the condition of 1,000,000 G×10 minutes to remove impurities lighter than zinc oxide microparticles was repeatedly conducted, and then the zinc oxide microparticles were washed with purified water and then observed with a transmission electron microscope (TEM). One hundred particles were selected at random therefrom, and their measured average primary particle size was 381 nm.

From the foregoing, it was revealed that zinc oxide microparticles formed in a thin film fluid formed between the processing surfaces arranged to be opposite to each other so as to be able to approach to and separate from each other, at least one of which rotates relative to the other, in use of a uniformly stirring and mixing reaction apparatus, are excellent in re-dispersibility even though they are microparticles of nano size.

(F, G) Semiconductor Microparticles

Hereinafter, the reaction of forming the compound semiconductor microparticles of the present invention is described.

This reaction occurs by forced uniform mixing between the processing surfaces 1 and 2 arranged to be opposite to each other so as to be able to approach to and separate from each other, at least one of which rotates relative to the other, in the apparatus shown in FIG. 1(A).

First, a first fluid containing at least one kind of ion that is a semiconductor material is introduced as a first fluid through one flow path, that is, the first introduction part d1 into the space between the processing surfaces 1 and 2 arranged to be opposite to each other so as to be able to approach to and separate from each other, at least one of which rotates relative to the other, thereby forming a first fluid film between the processing surfaces.

Then, a second fluid containing at least one kind of ion that is a semiconductor material different from that contained in the first fluid is introduced as a second fluid directly through another flow path, that is, the second introduction part d2 into the first fluid film produced between the processing surfaces 1 and 2.

As described above, the first and second fluids join together in the space between the processing surfaces 1 and 2, the distance of which is regulated by the pressure balance between the supply pressure of the fluid and the pressure exerted between the rotating processing surfaces, thereby forming a thin film fluid between the processing surfaces. In the thin film fluid, the first and second fluids are mixed with each other so that the two ions are reacted with each other. Specifically, the reaction of forming compound semiconductor microparticles can be carried out by co-precipitation and separation.

To effect the reaction between the processing surfaces 1 and 2, the second fluid may be introduced through the first introduction part d1 and the first fluid through the second introduction part d2, as opposed to the above description. That is, the expression "first" or "second" for each fluid has a meaning for merely discriminating an $n^{th}$ n fluid among a plurality of fluids present, and third or more fluids can also be present.

The ion that is a semiconductor material may be contained either the first or second fluid. Alternatively, the same ion may be contained in both the first and second fluids.

The particle size, monodispersity or crystal form of the obtained compound semiconductor microparticles can be regulated by changing the number of revolutions of the processing surfaces 1 and 2, the distance between the processing surfaces 1 and 2, the flow rate and temperature of the thin film fluid, and the concentration of materials.

A first reverse micellar solution obtained by adding an aqueous solution containing at least one kind of ion having a semiconductor material element to a reverse micellar solution having a dispersant (illustrated below) and water added to an organic solvent, and a second reverse micellar solution containing at least one kind of ion having a semiconductor material element other than the ion contained in the first reverse micellar solution, may be used as the first and second fluids, respectively. That is, the reverse micelle method can be used to produce compound semiconductor microparticles.

The compound semiconductor microparticles obtained by the method for producing compound semiconductor microparticles according to the present invention are not particularly limited. Preferable examples include compound semiconductor particles of group II-VI compound semiconductors, group III-V compound semiconductors, group IV compound semiconductors and group I-III-VI compound semiconductors. Specific examples include ZnO, ZnS, ZnSe, ZnTe, CdO, CdS, CdMnS, CdSe, CdMnSe, CdTe, CdMnTe, HgS, HgSe, HgTe, InP, InAs, InSb, InN, GaN, GaP, GaAs, GaSb, $TiO_2$, $WO_3$, PbS, PbSe, MgTe, SiC, SiGe, AlAs, AlP, AlSb, AlS, AlGaAS, InGaAs, InGaP, InAlAs, InGaAlP, InGaAsP, and InGaN.

The compound semiconductor microparticles obtained by the method for producing compound semiconductor microparticles according to the present invention include group XIV elements in the periodic table, such as carbon, silicon, germanium and tin, group XV elements in the periodic table, such as phosphorus (black phosphorus), group XVI elements in the periodic table, such as selenium and tellurium, compounds comprising a plurality of group XIV elements in the periodic table, such as silicon carbide (SiC), compounds comprising group XIV element in the periodic table and group XVI element in the periodic table, such as tin(IV) oxide ($SnO_2$), tin(II, IV) sulfide ($Sn(II)Sn(IV)S_3$), tin(IV) sulfide ($SnS_2$), tin(II) sulfide (SnS), tin(II) selenide (SnSe), tin(II) telluride (SnTe), lead(II) sulfide (PbS), lead(II) selenide (PbSe), and lead(II) telluride (PbTe), compounds comprising group XIII element in the periodic table and group XV element in the periodic table, such as boron nitride (BN), boron phosphide (BP), boron arsenide (BAs), aluminum nitride (AlN), aluminum phosphide (AlP), aluminum arsenide (AlAs), aluminum antimonide (AlSb), gallium nitride (GaN), gallium phosphide (GaP), gallium arsenide (GaAs), gallium antimonide (GaSb), indium nitride (InN), indium phosphide (InP), indium arsenide (InAs), and indium antimonide (InSb), compounds comprising group XIII element in the periodic table and group XVI element in the periodic table, such as aluminum sulfide ($Al_2S_3$), aluminum selenide ($Al_2Se_3$), gallium sulfide ($Ga_2S_3$), gallium selenide ($Ga_2Se_3$), gallium telluride ($Ga_2Te_3$), indium oxide ($In_2O_3$), indium sulfide ($In_2S_3$), indium selenide ($In_2Se_3$), and indium telluride ($In_2Te_3$), compounds comprising group XIII element in the periodic table and group XVII element in the periodic table, such as thallium(I) chloride (TlCl), thallium(I) bromide (TlBr), and thallium(I) iodide (TlI), compounds comprising group XII element in the periodic table and group XVI element in the periodic table, such as zinc oxide (ZnO), zinc sulfide (ZnS), zinc selenide (ZnSe), zinc telluride (ZnTe), cadmium oxide (CdO), cadmium sulfide (CdS), cadmium selenide (CdSe), cadmium telluride (CdTe), mercury sulfide (HgS), mercury selenide (HgSe), and mercury telluride (HgTe), compounds comprising group XV element in the periodic table and group XVI element in the periodic table, such as arsenic(III) sulfide ($As_2S_3$), arsenic(III) selenide ($As_2Se_3$), arsenic(III) telluride ($As_2Te_3$), antimony(III) sulfide ($Sb_2S_3$), antimony(III) selenide ($Sb_2Se_3$), antimony(III) telluride ($Sb_2Te_3$), bismuth(III) sulfide ($Bi_2S_3$), bismuth(III) selenide ($Bi_2Se_3$), and bismuth(III) telluride ($Bi_2Te_3$), compounds comprising group XI element in the periodic table and group XVI element in the periodic table, such as copper(I) oxide ($Cu_2O$), compounds comprising group XI element in the periodic table and group XVII element in the periodic table, such as copper(I) chloride (CuCl), copper(I) bromide (CuBr), copper(I) iodide (CuI), silver chloride (AgCl), and silver bromide (AgBr), compounds comprising group X element in the periodic table and group XVI element in the periodic table, such as nickel(II) oxide (NiO), compounds comprising group IX element in the periodic table and XVI group element in the periodic table, such as cobalt(II) oxide (CoO) and cobalt(II) sulfide (CoS), compounds comprising group VIII element in the periodic table and group XVI element in the periodic table, such as triiron tetraoxide ($Fe_3O_4$) and iron(II) sulfide (FeS), compounds comprising group VII element in the periodic table and group XVI element in the periodic table, such as manganese(II) oxide (MnO), compounds comprising group VI element in the periodic table and group XVI element in the periodic table, such as molybdenum(IV) sulfide ($MoS_2$) and tungsten(IV) oxide ($WO_2$), compounds comprising group V element in the periodic table and group XVI element in the periodic table, such as vanadium(II) oxide (VO), vanadium(IV) oxide ($VO_2$), and tantalum(V) oxide ($Ta_2O_5$), compounds comprising group IV element in the periodic table and group XVI element in the periodic table, such as titanium oxides (such as $TiO_2$, $Ti_2O_5$, $Ti_2O_3$, and $Ti_5O_9$), compounds comprising group II element in the periodic table and group XVI element in the periodic table, such as magnesium sulfide (MgS) and magnesium selenide (MgSe), chalcogen spinels such as cadmium(II) chromium(III) oxide ($CdCr_2O_4$), cadmium(II) chromium(III) selenide ($CdCr_2Se_4$), copper(II) chromium(III) sulfide ($CuCr_2S_4$) and mercury(II) chromium(III) selenide ($HgCr_2Se_4$), and barium titanate ($BaTiO_3$).

The above-mentioned elements or the elements constituting the above-mentioned compounds are those elements that are semiconductor materials, and in a fluid, they are present as ions containing the elements. In the present invention, the elements serving as semiconductor materials, such as a sulfur (S) source in ZnS microparticles described below, may be present in forms (for example, a gas such as $H_2S$) other than ions in a fluid.

If the co-precipitation method is used in the method for producing compound semiconductor microparticles in a thin film fluid formed between the processing surfaces arranged to be opposite to each other so as to be able to approach to and separate from each other, at least one of which rotates relative to the other, thereby preparing ZnS microparticles for example, then an aqueous solution prepared by dissolving zinc (Zn) acetate, nitrate or the like in an aqueous solvent is used as a first fluid, while an aqueous solution prepared by dissolving a sulfur (S) source such as sodium sulfide($Na_2S$), or a gaseous sulfur (S) source such as hydrogen sulfide ($H_2S$), is used as a second fluid, whereby ZnS microparticles can be synthesized. In this case, when activating elements such as manganese (Mn), copper (Cu), silver (Ag), terbium (Tb), thulium (Tm), europium (Eu), samarium (Sm), fluorine (F), chlorine (Cl) and aluminum (Al) are added to the above aqueous solution, these elements are added as an activator for ZnS microparticles, thus allowing them to have their inherent luminescence property. The above aqueous solvent, although not particularly limited, can be purified water such as ion-exchange water or pure water, organic solvents such as alcohol, methanol, toluene and xylene, and mixed solvents thereof. The mixed solvent may be either a solution wherein solvents are uniformly compatible with one another or a suspension where solvents are not compatible with one another. For the purpose of regulating the solubility of the product after the co-precipitating reaction, alcohols such as methanol may be added.

A dispersant may also be added to the fluid. In the above case, this dispersant is coordinated on the surfaces of ZnS microparticles. The dispersant that can be used includes polyphosphoric acids such as hexaphosphoric acid, octaphosphoric acid, tetraphosphoric acid and triphosphoric acid, high-molecular organic acids of acetic acid, acrylic acid and methacrylic acid, high-molecular organic matters such as polyvinyl pyrrolidone, polyvinyl alcohol and sodium hexamethaphosphate, thiols such as 2-mercaptoethanol, mercaptoacetic acid, 2-mercaptoethylamine, β-thiodiglycol, and 2,2'-thiodiacetic acid, polystyrene, water-soluble organic matters such as phosphine oxides, and sodium diisooctyl sulfosuccinate (AOT).

For accelerating coordination with organic ligands, the space between the processing surfaces may be heated (warmed) or may be irradiated with ultraviolet ray (UV). Particularly, when a difference in temperature is set between the first processing surface 1 and the second processing surface 2, there is an advantage that since convection can be generated in a thin film fluid, the reaction can be promoted.

Simultaneously, a pH adjusting agent for regulating pH during reaction may be added. When the reaction conditions are made alkaline, strongly alkaline or weakly alkaline aqueous solutions such as an aqueous solution of sodium hydroxide, an aqueous solution of potassium hydroxide, an aqueous solution of calcium hydroxide, an aqueous solution of barium hydroxide, and ammonia water can be used as the pH adjusting agent.

When the reaction conditions are made acidic, strongly acidic or weakly acidic aqueous solutions such as an aqueous solution of hydrochloric acid, an aqueous solution of nitric acid, an aqueous solution of acetic acid and an aqueous solution of citric acid can be used.

A liquid dispersion (suspension) wherein ZnS microparticles having an average primary particle size of 1 nm to 30 nm, preferably 1 nm to 10 nm, and more preferably 2 nm to 7 nm, are dispersed in an aqueous solvent can be prepared. When the dispersant is added to an aqueous solution having Zn acetate or nitrate dissolved therein, a liquid dispersion (suspension) wherein ZnS microparticles coordinated thereon with the dispersant are dispersed can be prepared, and the resulting compound semiconductor microparticles become extremely excellent in re-dispersibility.

As described above, the processing apparatus can be provided with a third introduction part d3 in addition to the first introduction part d1 and the second introduction part d2. In this case, a pH adjusting agent, an aqueous solution of ions having elements as semiconductor materials, and a dispersant for example can be introduced separately through the respective introduction parts into the processing apparatus. By doing so, the concentration and pressure of each solution can be separately controlled, and the reaction of forming compound semiconductor microparticles can be regulated more accurately. When the processing apparatus is provided with four or more introduction parts, the foregoing applies and fluids to be introduced into the processing apparatus can be subdivided in this manner.

When salts of cadmium (Cd) or the like are used in place of Zn salt, liquid dispersions (suspensions) wherein compound semiconductor microparticles comprising sulfides such as cadmium sulfide (CdS) are dispersed can be prepared. When a selenium (Se) source such as sodium selenide ($Na_2Se$) is added in place of a sulfur (S) source such as sodium sulfide ($Na_2S$), liquid dispersions (suspensions) wherein compound semiconductor microparticles comprising of selenides such as zinc selenide (ZnSe) and cadmium selenide (CdSe) are dispersed can be prepared.

When an oxygen (O) source such as sodium hydroxide (NaOH) is added in place of a sulfur (S) source such as sodium sulfide ($Na_2S$), liquid dispersions (suspensions) wherein compound semiconductor microparticles comprised of oxides such as zinc oxide (ZnO) and cadmium oxide (CdO) are dispersed can be prepared.

If the reverse micelle method is used in the method for producing compound semiconductor microparticles in a thin film fluid formed between the processing surfaces arranged to be opposite to each other so as to be able to approach to and separate from each other, at least one of which rotates relative to the other, almost the same procedure as in the co-precipitation method described above can be used. For example when ZnS microparticles are prepared, a dispersant, for example sodium bis(2-ethylene hexyl)sulfosuccinate (referred to hereinafter as AOT) is introduced into an organic solvent (e.g. heptane) and water to prepare a reverse micellar solution as a first fluid. An aqueous solution of zinc acetate is introduced into the reverse micellar solution to prepare a zinc-containing reverse micellar solution. Then, a reverse micellar solution containing a sulfur (S) source such as sodium sulfide ($Na_2S$) is used as a second fluid, whereby a suspension containing ZnS microparticles is obtained. In this case, when activating elements such as manganese (Mn), copper (Cu), silver (Ag), terbium (Tb), thulium (Tm), europium (Eu), samarium (Sm), fluorine (F), chlorine (Cl) and aluminum (Al) are added to the reverse micellar solution, these elements are added as an activator for ZnS microparticles, thus allowing them to have their inherent luminescence property.

Hereinafter, the present invention is described in detail with reference to Examples, but the present invention is not limited to Examples.

In following Examples, the term "from the center" means "through the first introduction part d1" in the processing apparatus shown in FIG. 1(A), the first fluid refers to the first processed fluid, and the second fluid refers to the second processed fluid introduced "through the second introduction part d2" in the processing apparatus shown in FIG. 1(A).

EXAMPLE F1

An aqueous mixed solution of zinc and manganese flows into an aqueous solution of sodium sulfide in a thin film fluid formed between the processing surfaces 1 and 2 arranged to be opposite to each other so as to be able to approach to and separate from each other, at least one of which rotates relative to the other, in use of a uniformly stirring and mixing reaction apparatus as shown in FIG. 1(A), thereby effecting co-precipitating reaction under uniform mixing in the thin film.

While 0.2 mol/L zinc acetate aqueous solution to which manganese acetate tetrahydrate was added such that the amount of manganese reached 0.5 atom % based on the amount of zinc was sent as a first fluid from the center at a supply pressure/back pressure of 0.20 MPa/0.01 MPa, at a revolution number of 500 rpm and at a sending solution temperature of 25° C., 0.4 mol/L sodium sulfide aqueous solution to which 2-mercaptoethanol was added to a concentration of 1.0 mol/L was introduced at a rate of 10 ml/min. as a second fluid into the space between the processing surfaces 1 and 2. An Mn-containing ZnS microparticle dispersion was discharged from the processing surfaces.

From this dispersion, Mn-containing ZnS microparticles were collected using a dialysis tube, and the Mn-containing ZnS microparticles in this dispersion were observed with a transmission electron microscope (TEM). 100 particles were selected at random therefrom, and their measured average primary particle size was 4 nm.

Then, this dispersion was subjected to vacuum-freeze drying to remove the solvent. The obtained powdery Mn-containing ZnS microparticles were irradiated with light having a wavelength of 334 nm, and the resulting excitation emission spectrum was measured with a fluorescence spectrophotometer (FP-777 manufactured by Jasco Corporation). The fluorescence intensity showed a good value.

When the obtained powdery Mn-containing ZnS microparticles were introduced again into ion-exchange water and stirred with a high-speed stirring dispersing machine (trade name: CLEARMIX manufactured by M Technique Co., Ltd.), an Mn-containing ZnS microparticle dispersion was obtained again, its average primary particle size was 4 nm which was the same as that of the powdery Mn-containing ZnS microparticle dispersion before vacuum-freeze drying, and the resulting compound semiconductor microparticle powders were thus confirmed to be excellent in re-dispersibility.

EXAMPLE F2

While 0.2 mol/L zinc acetate aqueous solution to which manganese acetate tetrahydrate was added such that the amount of manganese reached 0.5 atom % based on the amount of zinc was sent as a first fluid from the center at a supply pressure/back pressure of 0.40 MPa/0.01 MPa, at a revolution number of 500 rpm and at a sending solution temperature of 25° C., 0.4 mol/L sodium sulfide aqueous solution to which 2-mercaptoethanol was added to a concentration of 1.0 mol/L was introduced at a rate of 10 ml/min. as a second fluid into the space between the processing surfaces 1 and 2. An Mn-containing ZnS microparticle dispersion was discharged from the processing surfaces.

From this dispersion, Mn-containing ZnS microparticles were collected using a dialysis tube, and the Mn-containing ZnS microparticles in this dispersion were observed with a transmission electron microscope (TEM). One hundred particles were selected at random therefrom, and their measured average primary particle size was 6 nm.

When powdery Mn-containing ZnS microparticles obtained in the same manner as in Example F1 were introduced again into ion-exchange water and stirred with a high-speed stirring dispersing machine (trade name: CLEARMIX manufactured by M Technique Co., Ltd.), an Mn-containing ZnS microparticle dispersion was obtained again, its average primary particle size was 6 nm which was the same as that of the powdery Mn-containing ZnS microparticle dispersion before vacuum-freeze drying, and the resulting compound semiconductor microparticle powders were thus confirmed to be excellent in re-dispersibility.

EXAMPLE F3

While 0.2 mol/L zinc acetate aqueous solution to which manganese acetate tetrahydrate was added such that the amount of manganese reached 0.5 atom % based on the amount of zinc was sent as a first fluid from the center at a supply pressure/back pressure of 0.40 MPa/0.01 MPa, at a revolution number of 500 rpm and at a sending solution temperature of 45° C., 0.4 mol/L sodium sulfide aqueous solution to which 2-mercaptoethanol was added to a concentration of 1.0 mol/L was introduced at a rate of 10 ml/min. as a second fluid into the space between the processing surfaces 1 and 2. An Mn-containing ZnS microparticle dispersion was discharged from the processing surfaces.

From this dispersion, Mn-containing ZnS microparticles were collected using a dialysis tube, and the Mn-containing ZnS microparticles in this dispersion were observed with a transmission electron microscope (TEM). One hundred particles were selected at random therefrom, and their measured average primary particle size was 4 nm.

When powdery Mn-containing ZnS microparticles obtained in the same manner as in Example F1 were introduced again into ion-exchange water and stirred with a high-speed stirring dispersing machine (trade name: CLEARMIX manufactured by M Technique Co., Ltd.), an Mn-containing ZnS microparticle dispersion was obtained again, its average primary particle size was 4 nm which was the same as that of the powdery Mn-containing ZnS microparticle dispersion before vacuum-freeze drying, and the resulting compound semiconductor microparticle powders were thus confirmed to be excellent in re-dispersibility.

EXAMPLE F4

While 0.2 mol/L zinc acetate aqueous solution to which manganese acetate tetrahydrate was added such that the amount of manganese reached 0.5 atom % based on the amount of zinc was sent as a first fluid from the center at a supply pressure/back pressure of 0.20 MPa/0.01 MPa, at a revolution number of 1000 rpm and at a sending solution temperature of 25° C., 0.4 mol/L sodium sulfide aqueous solution to which 2-mercaptoethanol was added to a concentration of 1.0 mol/L was introduced at a rate of 10 ml/min. as a second fluid into the space between the processing surfaces 1 and 2. An Mn-containing ZnS microparticle dispersion was discharged from the processing surfaces.

From this dispersion, Mn-containing ZnS microparticles were collected using a dialysis tube, and the Mn-containing ZnS microparticles in this dispersion were observed with a transmission electron microscope (TEM). One hundred particles were selected at random therefrom, and their measured average primary particle size was 10 nm.

When powdery Mn-containing ZnS microparticles obtained in the same manner as in Example F1 were introduced again into ion-exchange water and stirred with a high-speed stirring dispersing machine (trade name: CLEARMIX manufactured by M Technique Co., Ltd.), an Mn-containing ZnS microparticle dispersion was obtained again, its average primary particle size was 10 nm which was the same as that of the powdery Mn-containing ZnS microparticle dispersion before vacuum-freeze drying, and the resulting compound semiconductor microparticle powders were thus confirmed to be excellent in re-dispersibility.

EXAMPLE F5

While 0.2 mol/L zinc acetate aqueous solution to which manganese acetate tetrahydrate was added such that the amount of manganese reached 0.5 atom % based on the amount of zinc was sent as a first fluid from the center at a supply pressure/back pressure of 0.20 MPa/0.01 MPa, at a revolution number of 1000 rpm and at a sending solution temperature of 52° C., 0.4 mol/L sodium sulfide aqueous solution to which 2-mercaptoethanol was added to a concentration of 1.0 mol/L was introduced at a rate of 10 ml/min. as a second fluid into the space between the processing surfaces 1 and 2. An Mn-containing ZnS microparticle dispersion was discharged from the processing surfaces.

From this dispersion, Mn-containing ZnS microparticles were collected using a dialysis tube, and the Mn-containing ZnS microparticles in this dispersion were observed with a transmission electron microscope (TEM). One hundred particles were selected at random therefrom, and their measured average primary particle size was 4 nm.

When powdery Mn-containing ZnS microparticles obtained in the same manner as in Example F1 were introduced again into ion-exchange water and stirred with a high-speed stirring dispersing machine (trade name: CLEARMIX manufactured by M Technique Co., Ltd.), an Mn-containing ZnS microparticle dispersion was obtained again, its average primary particle size was 4 nm which was the same as that of the Mn-containing ZnS microparticle dispersion before vacuum-freeze drying, and the resulting compound semiconductor microparticle powders were thus confirmed to be excellent in re-dispersibility.

COMPARATIVE EXAMPLE F1

While 20 g of 0.2 mol/L zinc acetate aqueous solution to which manganese acetate tetrahydrate was added such that the amount of manganese reached 0.5 atom % based on the amount of zinc was stirred at 300 rpm at a solution temperature of 25° C. in a beaker, 20 g of 0.4 mol/L sodium sulfide aqueous solution to which 2-mercaptoethanol was added to a concentration of 1.0 mol/L was introduced. An Mn-containing ZnS microparticle dispersion was obtained. From the obtained Mn-containing ZnS microparticle dispersion, Mn-containing ZnS microparticles were collected using a dialysis tube and observed with a transmission electron microscope (TEM). One hundred particles were selected at random therefrom, and their measured average primary particle size was 950 nm. When Mn-containing ZnS microparticles obtained in the same manner as in Example F1 were introduced again into ion-exchange water and stirred with a high-speed stirring dispersing machine (trade name: CLEARMIX manufactured by M Technique Co., Ltd.), an Mn-containing ZnS microparticle dispersion was obtained again, but strong aggregation of Mn-containing ZnS microparticles was observed.

The results are shown in Table 12. In the table, Examples 1 to 5 and Comparative Example 1 shall be read as Examples F1 to F5 and Comparative Example F1, respectively.

TABLE 12

| Example | First Fluid | Second Fluid | Number of Revolutions [rpm] | Supply Pressure [MPaG] | Back Pressure [MPaG] | Processing Temperature [° C.] | Volume-Average Primary Particle Size [nm] | Re-dispersibility |
|---|---|---|---|---|---|---|---|---|
| 1 | Zinc acetate aq. (0.2 mol/L), manganese acetate aq. (0.5 Zn %) | Sodium sulfide aq. (0.4 mol/L), 2-mercaptoethanol aq. (1.0 mol/L) | 500 | 0.2 | 0.01 | 25 | 4 | ○ |
| 2 | | | | 0.4 | | | 6 | ○ |
| 3 | | | | | | 45 | 4 | ○ |
| 4 | | | 1000 | 0.2 | 0.01 | 25 | 10 | ○ |
| 5 | | | | | | 52 | 4 | ○ |
| Comparative Example 1 | | | Beaker test | | | 25 | 950 | X |

Hereinafter, the reaction of forming the semiconductor microparticles of the present invention by reduction is described.

This reaction occurs by forced uniform mixing between the processing surfaces 1 and 2 arranged to be opposite to each other so as to be able to approach to and separate from each other, at least one of which rotates relative to the other, in the apparatus shown in FIG. 1(A).

First, a first fluid containing at least one kind of reducing agent is introduced as a first fluid through one flow path, that is, the first introduction part d1 into the space between the processing surfaces 1 and 2 arranged to be opposite to each other so as to be able to approach to and separate from each other, at least one of which rotates relative to the other, thereby forming a first fluid film between the processing surfaces.

Then, a second fluid containing at least one kind of semiconductor element-containing compound is introduced directly through another flow path, that is, the second introduction part d2 into the first fluid film produced between the processing surfaces 1 and 2.

As described above, a thin film fluid is formed between the processing surfaces 1 and 2, the distance of which is regulated by the pressure balance between the supply pressure of the fluid and the pressure exerted between the rotating processing surfaces. Then, the first fluid and the second fluid join together in this thin film fluid and mixed thereby reacting the semiconductor element-containing compound with the reducing agent. Specifically, the reaction of reducing the semiconductor element to form semiconductor microparticles can be effected.

To effect the reaction between the processing surfaces 1 and 2, the second fluid may be introduced through the first introduction part d1 and the first fluid through the second introduction part d2, as opposed to the above description. That is, the expression "first" or "second" for each fluid has a meaning for merely discriminating an $n^{th}$ fluid among a plurality of fluids present, and third or more fluids can also be present.

The semiconductor element-containing compound may be contained in either the first or second fluid, or the same semiconductor element-containing compound may be contained in both the first and second fluids.

The particle size, monodispersity or crystal form of the obtained semiconductor microparticles can be regulated by changing the number of revolutions of the processing surfaces 1 and 2, the distance between the processing surfaces 1 and 2, the flow rate and temperature of the thin film fluid, and the concentration and type of materials.

As a first fluid, a first reverse micellar solution obtained by adding a dispersant (illustrated below) and an aqueous solution (polar solution) containing at least one kind of reducing agent to an organic solvent, and a second reverse micellar solution obtained by adding a dispersant and an aqueous solution (polar solution) containing at least one kind of semiconductor element-containing compound to an organic solvent, may be used as the first and second fluids, respectively. That is, a reverse-micelle method may be used to produce semiconductor microparticles.

In the present invention, when silicon microparticles for example are to be produced by the method for producing semiconductor microparticles in a thin film fluid formed between the processing surfaces arranged to be opposite to each other so as to be able to approach to and separate from each other, at least one of which rotates relative to the other, a reducing agent solution wherein hydrazine sulfate or the like is dissolved in a solvent such as water is used as a first fluid, and a solution wherein a silicon compound such as silicon tetrachloride ($SiCl_4$) is used as a second fluid, whereby silicon microparticles in a mono-element system can be synthesized.

The reducing agent is not particularly limited, and examples include not only hydrazine sulfate mentioned above but also sodium borohydride, sodium hypophosphite, hydrazine, transition metal element ions (trivalent titanium ion, divalent cobalt ion, and the like), alcohols such as methanol, ethanol and 2-propanol, and ascorbic acid, as well as ethylene glycol, glutathione, organic acids (citric acid, malic acid, tartaric acid, etc.), reducing sugars (glucose, galactose, mannose, fructose, sucrose, maltose, raffinose, stachyose, and the like) and sugar alcohols, and sorbitol. Amines may be used as the reducing agent, and such amines include, for example, aliphatic amines such as propylamine, butylamine, hexylamine, diethylamine, dipropylamine, dimethylethylamine, diethylmethylamine, triethylamine, ethylenediamine, N,N,N',N'-tetramethylethylenediamine, 1,3-diaminopropane, N,N,N',N'-tetramethyl-1,3-diaminopropane, triethylenetetramine and tetraethylenepentamine; alicyclic amines such as piperidine, N-methylpiperidine, piperazine, N,N'-dimethylpiperazine, pyrrolidine, N-methylpyrrolidine, and morpholine; aromatic amines such as aniline, N-methylaniline, N,N-dimethylaniline, toluidine, anisidine, and phenetidine; and aralkylamines such as benzylamine, N-methylbenzylamine, N,N-dimethylbenzylamine, phenethylamine, xylylenediamine, N,N,N',N'-tetramethylxylylenediamine. Also, the above-mentioned amines include alkanolamines such as methylaminoethanol, dimethylaminoethanol, triethanolamine, ethanolamine, diethanolamine, methyldiethanolamine, propanolamine, 2-(3-aminopropylamino)ethanol, butanolamine, hexanolamine, and dimethylaminopropanol. Alkali metal/naphthalene complexes, $EI_2$ (E=a rare earth element such as samarium, ytterbium or europium), and metal complexes represented by $M^+Z^-$ (Z=an electron-withdrawing molecule selected from aromatic molecules, M=an alkali metal) may also be used. Specific examples include, but are not limited to, alkali metal arene comprising an alkali metal atom (lithium, sodium, potassium and the like) and an aromatic molecule, which include not only the alkali metal/naphthalene complexes but also alkali metal/biphenyl complexes, and alkali metal/4,4'-ditert-butyl biphenyl complexes, and rare earth iodides such as samarium diiodide ($SmI_2$), ytterbium diiodide ($YbI_2$), and europium diiodide ($EuI_2$). Besides, magnesium/anthracene complexes can also be used. These reducing agents can be used in combination. $LiBH_4$, $LiAlH_4$, and $LiBH(CH_2CH_3)_3$ can also be used. Among them, suitable ones may be selected and used depending on the object. Heterogeneous solid catalysts such as lithium, sodium, potassium and magnesium can also be used, but homogenous catalysts are preferably used from the viewpoint of uniformity between the processing surfaces.

The silicon compounds used herein include, but are not limited to, silicon element-containing ones, for example halogenated silane ($SiX_4$, X=halogen element) such as silicon tetrachloride ($SiCl_4$) and silane bromide ($SiBr_4$) and alkoxy silane ($SiOR_4$, OR=alkoxy group) such as tetraethoxy silane ($SiOEt_4$, OEt=ethoxy group). When semiconductor microparticles other than silicon are produced, the semiconductor compounds used include, but are not limited to, germanium halide ($GeX_4$), alkoxy germanium ($GeOR_4$), tin halide ($SnX_4$), alkoxy tin ($SnOR_4$), and carbon halide ($CX_4$) such as carbon tetrabromide.

When semiconductor microparticles are produced, a compound containing a semiconductor element selected from the group comprising silicon, germanium, carbon and tin can be combined with a compound containing other elements as activating elements. The other elements are not particularly limited. The compound containing other elements can be combined, for example, with a compound containing a metal element selected from the group comprising lead, titanium, vanadium, zirconium, hafnium, phosphorus and boron, to produce semiconductor microparticles containing the metal element.

Sources of lead, titanium, vanadium, zirconium, hafnium, phosphorus and boron elements are not particularly limited. Examples of usable sources include compounds such as lead halide ($PbX_4$), alkoxy lead ($PbOR_4$), titanium halide ($TiX_4$), alkoxy titanium ($TiOR_4$), vanadium halide ($VX_4$), zirconium halide ($ZrX_4$), alkoxy zirconium ($ZrOR_4$), hafnium halide ($HfX_4$), alkoxy hafnium ($HfOR_4$), and boron halide ($BX_3$).

In this case, fluids containing compounds containing semiconductor elements such as silicon for example, can simultaneously contain compounds containing germanium, carbon, tin and the other elements to prepare semiconductor microparticles in a multi-element system. Alternatively, a fluid containing a reducing agent, and a fluid containing a semiconductor element comprising silicon are used as the first and second fluids respectively, and a fluid containing a semiconductor element other than silicon is used as the third fluid, whereby silicone microparticles can be covered with a semiconductor comprising another semiconductor element.

As the solvent, a water solvent such as water, ion-exchange water or ultrapure water or an organic solvent such as toluene, xylene or alcohol can be used.

When semiconductor microparticles are formed with an organic solvent, an inert organic solvent not reacting with the reducing agent and silicon chloride mentioned above can be used and is selected appropriately depending on the compounds mentioned above. Such usable organic solvents include, for example, ethylene glycol dimethyl ether (referred to hereinafter as glyme), tetrahydrofuran, diethyl ether, and solvents having an ether linkage.

Further, the space between the processing surfaces may be heated (warmed) or cooled, may be irradiated with ultraviolet ray (UV) or microwaves, or may be supplied with ultrasonic energy. Particularly, the semiconductor microparticles are substances whose particle size or crystalline form is greatly influenced by the temperature environment under which they are formed, and when the thin film formed between the processing surfaces is directly heated or cooled, the temperature control can be strictly and effectively performed under the reaction conditions. When a difference in temperature is set between the first processing surface 1 and the second processing surface 2, there is an advantage that since convection can be generated in a thin film fluid, the reaction can be promoted.

Specifically for heating (warming) as described above, at least one of the processing members 10 and 20 can be provided for example with a heater or a jacket for passing a heat medium, to heat (warm) the thin film fluid. For irradiation with ultraviolet ray (UV), at least one of or both of the processing member 10 and the processing member 20 can be provided, for example, with an element such as UV lamp to irradiate the thin film fluid with ultraviolet ray (UV) from the corresponding processing surface. Alternatively, at least one of or both of the processing member 10 and the processing member 20 can be provided with a microwave generator such as magnetron for irradiation with microwaves, thereby heating the processed fluid to promote the reaction. For supplying with ultrasonic energy, at least one of or both of the processing member 10 and the processing member 20 can be provided, for example, with an ultrasonic wave oscillator.

The reaction is conducted in a container capable of securing a depressurized or vacuum state, and a secondary side at which the fluid (semiconductor microparticle dispersion) after processing is discharged can be depressurized or made vacuous to remove a gas generated when the fluids join together, to remove a gas contained in the fluid, or to remove the solvent of the fluid. By doing so, the semiconductor microparticle-containing fluid between the processing surfaces is discharged in an atomized state from the processing surfaces, even when processing of semiconductor microparticles and removal of the solvent are simultaneously conducted, so that the surface area of the fluid is increased, and the efficiency of removal of the solvent is extremely high. Accordingly, preparation and processing of semiconductor microparticles and removal of the solvent can be effected in substantially one step more easily than conventional.

The reaction can be conducted in a container that can be filled with an inert gas, and the dispersion after processing may be discharged under an inert-gas atmosphere. The semiconductor element-containing compound can be prevented from undergoing a reaction not intended in the present invention, caused by moisture or oxygen in the atmosphere. The inert gas is not particularly limited as long as a gas inert to the starting material and reaction product is selected depending on the object. Examples of the inert gas include an argon gas and nitrogen gas.

The reaction can be conducted in a container capable of temperature regulation to cool, e.g. the fluid (semiconductor microparticle dispersion) just after being discharged. By doing so, the semiconductor microparticles obtained by the reaction can be rapidly cooled to a stable temperature range for the microparticles. Alternatively, the container may be heated to improve the efficiency of solvent removal and gas removal.

Simultaneously, a pH adjusting agent for regulating pH during reaction may be added. When the reaction conditions are made alkaline, strongly alkaline or weakly alkaline aqueous solutions such as an aqueous solution of sodium hydroxide, an aqueous solution of potassium hydroxide, an aqueous solution of calcium hydroxide, an aqueous solution of barium hydroxide, and ammonia water can be used as the pH adjusting agent, but not particularly limited thereto. When the reaction conditions are made acidic, strongly acidic or weakly acidic aqueous solutions such as an aqueous solution of hydrochloric acid, an aqueous solution of nitric acid, an aqueous solution of acetic acid and an aqueous solution of citric acid can be used as the pH adjusting agent, but not particularly limited thereto. Because the reduction reaction is influenced by the pH of the solution, pH adjustment is effective for the reaction of semiconductor microparticles with a reducing agent as in the present invention.

A dispersant may also be added if necessary to the fluid. In the above case, this dispersant is coordinated on the surfaces of semiconductor microparticles. The dispersant may, although not particularly limited, be that which when the semiconductor microparticles are handled as a dispersant, protects the surfaces of the semiconductor microparticles for the purpose of preventing the semiconductor microparticles from aggregating in a dispersion medium or for the purpose of changing pharmaceutical, fluorescence or emission characteristics. The dispersant that can be used includes polyphosphoric acids such as hexaphosphoric acid, octaphosphoric acid, tetraphosphoric acid and triphosphoric acid, high-molecular organic acids of acetic acid, acrylic acid and methacrylic acid, high-molecular organic matters such as polyvinyl pyrrolidone, polyvinyl alcohol and sodium hexamethaphosphate, thiols such as 2-mercaptoethanol, mercaptoacetic acid, 2-mercaptoethylamine, β-thiodiglycol and 2,2'-thiodiacetic acid, organic matters such as polystyrene and phosphine oxides, and sodium diisooctyl sulfosuccinate (AOT).

As described above, the processing apparatus can be provided with a third introduction part d3 in addition to the first introduction part d1 and the second introduction part d2. In this case, a pH adjusting agent, a solution of a compound containing semiconductor elements, and a reducing agent for example can be introduced separately through the respective introduction parts into the processing apparatus. By doing so, the concentration and pressure of each solution can be separately controlled, and the reaction of forming semiconductor microparticles can be regulated more accurately. When the processing apparatus is provided with four or more introduction parts, the foregoing applies and fluids to be introduced into the processing apparatus can be subdivided in this manner. It is also effective that a reducing agent such as a lithium/DBB complex (referred to hereinafter as LDBB complex) obtained by reacting lithium, 4,4'-ditert-butylbiphenyl complex (referred to hereinafter as DBB complex) and tetrahydrofuran as starting materials is formed in situ between the processing surfaces and synthesized just before the actual reduction reaction of semiconductor elements.

A dispersion (suspension) wherein semiconductor microparticles having an average primary particle size of 0.8 nm to 100 nm, preferably 1 nm to 50 nm, more preferably 1 nm to 20 nm, are dispersed in an aqueous solvent or in an organic solvent can be prepared. When the dispersant is added to an aqueous solution having a reducing agent or a semiconductor element-containing compound dissolved therein, a dispersion (suspension) wherein semiconductor microparticles coordinated thereon with the dispersant are dispersed can be prepared, and the resulting semiconductor microparticles become extremely excellent in re-dispersibility. The semiconductor microparticles obtained by the production method of the present invention can also be used for the purpose of solar batteries and the like. Semiconductor microparticles prepared by hydrophilizing the surfaces of semiconductor microparticles obtained by the production method of the present invention can be used preferably in measurement of biologically relevant substances such as antigen, antibody and DNA and environment-related substances such as dioxin. When semiconductor microparticles which are monodisperse and have a sharp particle size distribution are used in marker substances for molecule-recognizing antibodies, extremely highly accurate measurement can be conducted. The semiconductor nanoparticles of the present invention can be used in displays, fluorescent lights, and marker substances for biologically relevant substances. When the semiconductor nanoparticles of the present invention is comprised of a relatively low toxic substance, the nanoparticles can also be used in a cell imaging system for examining cellular kinetics and the like.

In the present invention, if the reverse micelle method is used in the method for producing semiconductor microparticles in a thin film fluid formed between the processing surfaces arranged to be opposite to each other so as to be able to approach to and separate from each other, at least one of which rotates relative to the other, the foregoing also applies. For example, when silicone microparticles are prepared, a solution of $LiAlH_4$ in THF is used as a first fluid. Then, a suitable dispersant, for example tetraoctyl ammonium bromide and silicon tetrachloride, are added to an organic solvent such as toluene to prepare a silicon microparticle-containing suspension as a reverse micellar solution for use as a second fluid. In this case, when compounds comprising activating elements such as lead, titanium, vanadium, zirconium, hafnium, phosphorus and boron element are added as activating elements, these elements are added as an activator for silicon microparticles, thus allowing them to have their inherent luminescence property and fluorescence property.

The resulting semiconductor microparticles may be subjected to surface stabilization treatment. The surface stabilization treatment is a treatment for preventing a phenomenon caused typically in chlorine-terminated semiconductor microparticles placed in air by which chlorine atoms on the surfaces of the microparticles react with water in the air to form hydroxyl groups on the surfaces. For example, when hydroxyl group-terminated silicone microparticles are contacted with one another, hydrolysis is easily generated by heat even at room temperature or so, and oxidation degradation starts at the surface to generate gelled silicone. Therefore, the surface stabilization treatment is an important operation.

In the method of surface stabilization treatment, for example, a chlorine-terminated silicone microparticle dispersion solution is first cooled in the vicinity of 0° C., and a solution of hexyl magnesium bromide dissolved in diethyl ether is added thereto dropwise. After the mixture is reacted in the vicinity of 0° C., a freezing medium is removed, and the temperature of the reaction mixture is naturally increased to room temperature under stirring. By doing so, the objective alkyl group (hexyl group)-terminated silicon nanoparticles are formed.

The alkyl group-terminated silicon nanoparticles can be extracted and purified from byproducts in the solution to obtain the objective alkyl group-terminated silicon nanoparticles.

As such surface stabilization treatment, there is a method of using an organic lithium reagent. A solution containing the chlorine-terminated silicon nanoparticles is cooled to 0° C., and a solution having hexyl lithium dissolved in diethyl ether is added thereto and stirred, the temperature of the mixture is naturally increased to room temperature, and the mixture is reacted. By doing so, alkyl group (hexyl group)-terminated silicon nanoparticles like those using hexyl magnesium bromide can be formed.

Besides, the chlorine-terminated silicon microparticles are once hydrogen-terminated and then subjected again to surface termination with an organic reagent (for example an alkene) containing a carbon-carbon double bond. A solution containing the chlorine-terminated silicon nanoparticles is cooled to 0° C., and a glyme solution having lithium aluminum hydride dissolved therein is added thereto under stirring, the temperature of the mixture is naturally increased to room temperature, and the mixture is further reacted, thereby surface-modifying the nanoparticles to give hydrogen-terminated silicone microparticles. Then, methanol is added thereto, and the unreacted lithium aluminum hydride is quenched. Thereafter, a catalytic amount of a solution of reaction catalyst chloroplatinate in isopropanol is added, and then the mixture is reacted with one kind of alkene, hexene, under reflux. By doing so, alkyl group (hexyl group)-terminated silicon nanoparticles like those using a Grignard reagent or organic lithium reagent can be formed.

Functional groups other than the hexyl group in the surface stabilization treatment include, but are not limited to, the following. In particular, compounds having a carbon-carbon double bond are preferably used.

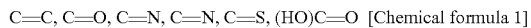

C=C, C=O, C=N, C≡N, C=S, (HO)C=O [Chemical formula 1]

The molecule having a carbon-carbon double bond at a terminal include, but are not limited to, molecules represented by the general formula: $H_2C=CH-(CH_2)_{n-1}-X$ wherein X represents a functional group, and n represents a positive integer. The functional group X includes, for example, amino groups such as $-NR_2$, $-NR'R$, $-NHR$ and $-NH_2$, and $-CR"R'R$, $-CR'_2R$, $-CR_3$, $-CHR_2$, $-CHR'R$, $-CH_2R$, $-CH_3$, $-SR$, $-SH$, $-I$, $-Br$, $-Cl$, and $-F$, wherein R", R', and R each represent an organic saturated compound group or another reactive functional group not reacting with Si—H on the surface of the particle. In this case, the surfaces of the particles can be subjected to surface treatment with another compound reacting with other reactive functional group.

When a molecule having a reactive functional group at a terminal and a hydrophilic group is used as the molecule having a reactive functional group at the terminal, the semiconductor microparticles obtained by the reduction step can be hydrophilized. The molecule having a reactive functional group at a terminal and a hydrophilic group includes, but is not limited to, molecules having a carbon-carbon double bond at the terminal and a hydrophilic group, such as allylamine.

The catalyst used in reacting the surfaces of the semiconductor nanoparticles obtained by the reduction step, with the molecule having a carbon-carbon double bond at a terminal is not particularly limited, and for example, $H_2PtCl_6$ and the like can be used. In the reduction step, the kind of catalyst can be appropriately selected from which, for example, proceeds the reaction just under stirring at room temperature or initiates it by heat or light, after the catalyst is added.

In the step of surface stabilization treatment, the surface stabilization treatment of microparticles in a semiconductor microparticle dispersion discharged from the processing surfaces may be conducted in a general beaker, flask or tank in the same manner as in the known method, or the surface stabilization treatment of the semiconductor microparticles can be carried out between the processing surfaces in the present invention. That is, a fluid containing a reducing agent as a first fluid, a fluid containing a semiconductor element-containing compound as a second fluid, and a fluid containing a surface processing stabilizer as a third fluid can be used to carry out all treatments in substantially one step.

Hereinafter, the present invention is described in detail with reference to Examples, but the present invention is not limited to Examples.

In following Examples, the term "from the center" means "through the first introduction part d1" in the processing apparatus shown in FIG. 1(A), the first fluid refers to the first processed fluid, and the second fluid refers to the second processed fluid introduced "through the second introduction part d2" in the processing apparatus shown in FIG. 1(A).

EXAMPLE G1

A silicon compound is allowed to flow into a reducing agent in a thin film between the processing surfaces 1 and 2 arranged to be opposite to each other so as to be able to approach to and separate from each other, at least one of which rotates relative to the other, in use of a uniformly stirring and mixing reaction apparatus shown in FIG. 1(A), thereby uniformly mixing and reducing the silicon compound in the thin film to obtain silicon microparticles.

(Preparation of First Fluid)

Lithium (30 mmol) was weighed out in a flask and sufficiently dried with argon gas. Then, 200 ml solution of 40 mmol DBB in anhydrous tetrahydrofuran (referred to hereinafter as THF) was poured via a dropping funnel into it, and the reaction solution was stirred with a stirrer at room temperature to form an LDBB complex (LDBB/THF solution).

While the LDBB/THF solution prepared above was sent as a first fluid from the center at a supply pressure/back pressure of 0.05 MPa/0.01 MPa, at a revolution number of 500 rpm and at a sending solution temperature of −50° C., silicon tetrachloride was introduced at a rate of 0.5 ml/min. as a second fluid into the space between the processing surfaces 1 and 2. A silicon semiconductor microparticle dispersion was discharged into an argon gas atmosphere.

For surface stabilization treatment, the temperature of the discharged fluid was regulated in the vicinity of 0° C., and then a solution of 20 mmol hexyl magnesium bromide in diethyl ether was added dropwise thereto. After the mixture was reacted for about 30 minutes in the vicinity of 0° C., a freezing medium is removed, and the temperature of the reaction mixture was naturally increased to room temperature and stirred for 24 hours. The objective alkyl group (hexyl group)-terminated silicon nanoparticles were formed.

For extracting and purifying the alkyl group-terminated silicon nanoparticles from the solution, 100 ml hexane was then poured into the flask and sufficiently stirred, and the silicon nanoparticles were completely dissolved. A hexane solution extracted by a pipette was washed 3 times with purified water through a separatory funnel, and remaining lithium salt and magnesium salt were removed. The hexane solution washed with water was dehydrated by passing it through magnesium sulfate. Then, DBB and hexane were removed respectively by column separation, whereby the objective alkyl group-terminated silicon nanoparticles were obtained.

By observation with an electron microscope and a transmission electron microscope, the average particle size of the silicon moiety of the alkyl group-terminated silicon nanoparticles was confirmed to be about 2.5 nm. According to compositional analysis of constituent elements, chlorine and oxygen were not detected, so highly pure microparticles were obtained.

With respect to fluorescence characteristics, a hexane solution of the alkyl group-terminated silicon nanoparticles gave a fluorescence spectrum having a peak emission wavelength of 450 nm and a spectrum half-width of about 55 nm by UV excitation at 350 nm. The fluorescence quantum efficiency as determined with rhodamine 6G pigment as a standard gave a value of about 44%. From the foregoing, an efficiently emitting silicone semiconductor material was obtained by the synthesis method of the present invention.

EXAMPLES G2 TO G4

The procedures in Examples G2 to G4 were the same as in Example G1 except that the sending solution temperature was changed.

The results are shown in Table 13. In the table, Examples 1 to 4 shall be read as Examples G1 to G4, respectively.

TABLE 13

| Example | First Fluid | Second Fluid | Number of Revolutions [rpm] | Supply Pressure [MPaG] | Back Pressure [MPaG] | Processing Temperature [°C.] | Average Primary Particle Size [nm] | Peak Emission Wavelength [nm] | Spectrum Half-Width [nm] |
|---|---|---|---|---|---|---|---|---|---|
| 1 | LDBB/THF solution | Silicon tetrachloride | 500 | 0.05 | 0.01 | −50 | 2.5 | 450 | 55 |
| 2 | | | | | | −70 | 4.0 | 650 | 65 |
| 3 | | | | | | −80 | 5.6 | 810 | 75 |
| 4 | | | | | | −90 | 8.1 | 970 | 80 |

COMPARATIVE EXAMPLE G1

While 20 g of the LDBB/THF solution prepared in Example G1 was stirred as a first fluid at 300 rpm at a solution temperature of −50° C. in a beaker, 20 g of silicon tetrachloride was introduced. A dispersion of silicon semiconductor microparticles was obtained. The surface stabilization treatment of the obtained semiconductor microparticles and the removal of DBB and hexane from the dispersion were conducted in the same manner as in Example G1. From observation with an electron microscope and observation with a transmission electron microscope, the average particle size of the silicon portion of the alkyl group-terminated silicon nanoparticles was confirmed to be about 44.2 nm.

EXAMPLE G5

A silicon compound was allowed to flow, by a reverse-micelle method, into a reducing agent in a thin film between the processing surfaces 1 and 2 arranged to be opposite to each other so as to be able to approach to and separate from each other, at least one of which rotates relative to the other, in use of a uniformly stirring and mixing reaction apparatus shown in FIG. 1(A), thereby uniformly mixing and reducing the silicon compound in the thin film to obtain silicon microparticles.

While a reverse micellar solution obtained by adding 92 µl $SiCl_4$ and 1.5 g tetraoctyl ammonium bromide to 100 ml toluene and then stirring the mixture at 8000 rpm for 10 minutes with CLEARMIX 1.5S (manufactured by M Technique Co., Ltd.) was sent as a first fluid from the center at a supply pressure/back pressure of 0.08 MPa/0.01 MPa, at a revolution number of 1000 rpm and at a sending solution temperature of 30° C., 1.0 M $LiAlH_4$/THF solution was introduced at a rate of 1.0 ml/min as a second fluid into the space between the processing surfaces 1 and 2. A silicon semiconductor microparticle dispersion was discharged.

Methanol was added to the discharged silicon semiconductor microparticle dispersion. 2 mL of 1-heptene and a solution of 0.1 M $H_2PtCl_6$ in 0.1 mL of isopropanol were added to the resulting semiconductor nanoparticle solution and stirred at 8000 rpm for 3 hours with CLEARMIX 1.5S (manufactured by M Technique Co., Ltd.). For purification of the resulting solution, toluene and heptene were first removed from the solution by a rotary evaporator. Then, hexane was added thereto, n-methylformamide 2 was added thereto, and the mixture was purified by transferring it to a separatory funnel, stirring it and then removing the unreacted reducing agent and surfactant transferred to the n-methylformamide. The operation after addition of n-methylformamide was conducted further twice, to give semiconductor microparticles comprising Si capped with 1-heptene in hexane.

EXAMPLES G6 TO G8

Examples G6 to G8 were carried out in the same procedures as in Example G5 except that the number of revolutions and supply pressure were changed.

The results are shown in Table 14. In the table, Examples 5 to 8 shall be read as Examples G5 to G8, respectively.

TABLE 14

| Example | First Fluid | Second Fluid | Number of Revolutions [rpm] | Supply Pressure [MPaG] | Back Pressure [MPaG] | Processing Temperature [°C.] | Average Primary Particle Size [nm] |
|---|---|---|---|---|---|---|---|
| 5 | 1. OMLiAlH4/ THF solution | Toluene/SiCl4/tetraoctyl ammonium bromide reverse micellar solution | 1000 | 0.08 | 0.01 | 30 | 2 |
| 6 | | | | 0.05 | | | 3.0 |
| 7 | | | 2000 | 0.08 | | | 1.8 |
| 8 | | | | 0.05 | | | 3.4 |

COMPARATIVE EXAMPLE 2

While 20 g of a reverse micellar solution obtained by adding 92 µl $SiCl_4$ and 1.5 g tetraoctyl ammonium bromide to 100 ml toluene and then stirring the mixture at 8000 rpm for 10 minutes with CLEARMIX 1.5S (manufactured by M Technique Co., Ltd.) was stirred at 300 rpm at a solution temperature of 30° C. in a beaker, 60 g of 1.0 M LiAlH$_4$/THF solution was introduced. 2 mL of 1-heptene and a solution of 0.1 M H$_2$PtCl$_6$ in 0.1 mL of isopropanol were added to the resulting semiconductor nanoparticle solution and stirred at 8000 rpm for 3 hours with CLEARMIX 1.5S (manufactured by M Technique Co., Ltd.). For purification of the resulting solution, toluene and heptene were first removed from the solution by a rotary evaporator. Then, hexane was added thereto, n-methylformamide 2 was added thereto, and the mixture was purified by transferring it to a separatory funnel, stirring it and then removing the unreacted reducing agent and surfactant transferred to the n-methylformamide. The operation after addition of n-methylformamide was conducted further twice, to give semiconductor microparticles comprising Si capped with 1-heptene in hexane. The average particle size of the semiconductor microparticles comprising Si was confirmed to be 44.2 nm.

EXAMPLE G9

A silicone compound was allowed by a reverse micelle method to flow into a reducing agent in a thin film fluid formed between the processing surfaces 1 and 2 arranged to be opposite to each other so as to be able to approach to and separate from each other, at least one of which rotates relative to the other, in use of a uniformly stirring and mixing reaction apparatus as shown in FIG. 1(A), thereby reducing the silicon compound under uniform mixing in the thin film to give silicone microparticles.

While 0.1 mol/L hydrazine sulfate aqueous solution was sent as a first fluid from the center at a supply pressure/back pressure of 0.20 MPa/0.01 MPa, at a revolution number of 1000 rpm and at a sending solution temperature of 80° C., 0.1 mol/L silicon tetrachloride aqueous solution was introduced at a rate of 1.0 ml/min. as a second fluid into the space between the processing surfaces. A silicon semiconductor microparticle dispersion was discharged. After impurities were removed from the dispersion, the silicon semiconductor microparticles in the dispersion were observed with a transmission electron microscope (TEM). One hundred particles were selected at random therefrom, and their measured average primary particle size was 5.1 nm. The quantum efficiency as determined with a fluorescence spectrophotometer FP-650 (manufactured by Jasco Corporation) was 58%. The active oxygen production rate at 27° C. as determined with LUMI COUNTER 2500 was 0.5 ml/min/g.

EXAMPLES G10 TO G12

Examples G10 to G12 were carried out in the same procedures as in Example G9 except that the sending solution temperature was changed.

The results are shown in Table 15. In the table, Examples 9 to 12 shall be read as Examples G9 to G12, respectively.

TABLE 15

| Example | First Fluid | Second Fluid | Number of Revolutions [rpm] | Supply Pressure [MPaG] | Back Pressure [MPaG] | Particle Size [nm] | Processing Temperature [° C.] | Quantum Efficiency [%] | Active Oxygen Production Rate [ml/min · g] |
|---|---|---|---|---|---|---|---|---|---|
| 9 | 0.1 mol/L hydrazine sulfate aqueous solution | 0.1 mol/L silicon tetrachloride aqueous solution | 1000 | 0.2 | 0.01 | 5.1 | 80 | 58 | 0.5 |
| 10 | | | | | | 5.1 | 50 | 45 | 1.1 |
| 11 | | | | | | 5.1 | 40 | 21 | 2.4 |
| 12 | | | | | | 5.1 | 30 | 2 | 3.1 |

COMPARATIVE EXAMPLE G3

While 20 g of 0.1 mol/L hydrazine sulfate aqueous solution was stirred at 300 rpm at a solution temperature of 30° C. in a beaker, 20 g of 0.1 mol/L silicon tetrachloride aqueous solution was introduced. After impurities were removed from the obtained dispersion of silicon semiconductor microparticles, the silicon semiconductor microparticles in this dispersion were observed with a transmission electron microscope (TEM). One hundred particles were selected at random therefrom, and their measured average primary particle size was 33.5 nm.

(H) Titanium Dioxide Superfine Particles

Hereinafter, the reaction of forming the titanium dioxide superfine particles of the present invention is described.

This reaction occurs by forced uniform mixing between the processing surfaces 1 and 2 arranged to be opposite to each other so as to be able to approach to and separate from each other, at least one of which rotates relative to the other, in the apparatus shown in FIG. 1(A).

First, a fluid containing an aqueous solvent for hydrolyzing a titanium compound is introduced as a first fluid from one flow path, that is, the first introduction part d1 into the space between the processing surfaces 1 and 2 arranged to be opposite to each other so as to be able to approach to and separate from each other, at least one of which rotates relative to the other, thereby forming a first fluid film between the processing surfaces.

Then, a fluid containing at least one kind of titanium compound is introduced as a second fluid directly through another flow path, that is, the second introduction part d2 into the first fluid film produced between the processing surfaces 1 and 2.

As described above, a thin film fluid is formed between the processing surfaces 1 and 2, the distance of which is regulated by the pressure balance between the supply pressure of the fluid and the pressure exerted between the rotating processing surfaces. Then, the first fluid and the second fluid are allowed to join together in this thin film fluid and mixed thereby hydrolyzing the titanium compound to effect the reaction of forming (separating) titanium dioxide superfine particles.

To effect the reaction between the processing surfaces 1 and 2, the second fluid may be introduced through the first introduction part d1 and the first fluid through the second introduction part d2, as opposed to the above description. That is, the expression "first" or "second" for each fluid has a meaning for merely discriminating an $n^{th}$ fluid among a plurality of fluids present, and third or more fluids can also be present.

The titanium compound may be contained in either the first or second fluid, or the same or different titanium compounds may be contained in both the first and second fluids.

The particle size, monodispersity or crystal form of the obtained titanium dioxide superfine particles can be regulated by changing the number of revolutions of the processing surfaces 1 and 2, the distance between the processing surfaces 1 and 2, the flow rate and temperature of the thin film fluid, and the concentration of materials.

As the solvent used in a fluid containing at least one kind of titanium compound in the present invention, water, a water-miscible organic solvent such as methyl alcohol, ethyl alcohol, acetone, dimethylformamide, dimethylacetamide and dimethylsulfoxide, and a water-immiscible organic solvent such as octane, cyclohexane, benzene, xylene, diethyl ether and ethyl acetate can be appropriately selected depending on the type of the titanium compound used and the reaction form.

A reverse micellar solution obtained by adding a dispersant (illustrated below) and water to an organic solvent, and a non-aqueous solution containing at least one kind of titanium compound in a non-aqueous solvent, may be used as the first and second fluids, respectively. That is, the reverse micelle method can be used to produce titanium dioxide superfine particles. The second fluid may be an aqueous solution containing a titanium compound or a reverse micellar solution containing a titanium compound.

The titanium compound is not particularly limited, and it is possible to use at least one member selected from tetraalkoxy titanium such as tetramethoxy titanium, tetraethoxy titanium, tetra-n-propoxy titanium, tetraisopropoxy titanium, tetra-n-butoxy titanium, tetraisobutoxy titanium, tetra-t-butoxy titanium and derivatives thereof, and titanium tetrachloride, titanyl sulfate, titanium citrate and titanium tetranitrate.

Besides the titanium compound, a metal compound containing an element (activating element) forming a solid solution in titanium dioxide may also be contained in at least one of the fluids. The metal compound containing an element forming a solid solution in titanium dioxide is not particularly limited, and can be exemplified by at least one kind of metal alkoxides selected from Al, Ba, Mg, Ca, La, Fe, Si, Zr, Pb, Sn, Zn, Cd, As, Ga, Sr, Bi, Ta, Se, Te, Hf, Ni, Mn, Co, S, Cr, V, Ge, Li and B, or salts thereof. In addition, any elements in the periodic table can be contained in the metal compound containing an element forming a solid solution in titanium dioxide.

By incorporating the activating element in this way, in other words, by doping with the activating element, the maximum absorption wavelength of titanium dioxide can be shifted toward longer wavelengths to enable the titanium dioxide catalyst to work under visible light or to improve the performance of the catalyst as a photocatalyst, an antibacterial agent, a deodorant, an optical material or an electronics material.

A dispersant can also be added to at least one of the fluids. In the above case, this dispersant is coordinated on the surfaces of titanium dioxide superfine particles. Although this dispersant is not particularly limited, it is possible to use at least one member selected from polymer dispersion stabilizers like celluloses such as starch, methyl cellulose and ethyl cellulose, polyacrylamide, polyethylene oxide and poly(hydroxystearic acid-g-methyl ethacrylate-co-methacrylic acid) copolymer, nonionic surfactants, anionic surfactants, amphoteric surfactants; or high-molecular organic acids like polyphosphoric acids such as hexaphosphoric acid, octaphosphoric acid, tetraphosphoric acid and triphosphoric acid, acetic acid, acrylic acid, methacrylic acid, and high-molecular organic matters like polyvinyl pyrrolidone, polyvinyl alcohol and sodium hexamethaphosphate; or sodium diisooctyl sulfosuccinate (AOT).

A pH adjusting agent can be added to at least one of the fluids in order to regulate the pH during the reaction. The pH adjusting agent is not particularly limited. When the reaction conditions are made alkaline, it is possible to employ, as the pH adjusting agent, strongly alkaline or weakly alkaline aqueous solutions such as an aqueous solution of sodium hydroxide, an aqueous solution of potassium hydroxide, an aqueous solution of calcium hydroxide and an aqueous solution of barium hydroxide, amines such as tetramethyl ammonium hydroxide, tetraethyl ammonium hydroxide, tetrapropyl ammonium hydroxide, tetrabutyl ammonium hydroxide, monoethanolamine, diethanolamine, triethanolamine, tetramethyl ammonium chloride, tetraethyl ammonium chloride, tetrapropyl ammonium chloride, tetrabutyl ammonium chloride, octylamine, laurylamine and stearylamine, polymeric amines comprising the above amines and salts thereof, and ammonia water.

When the reaction conditions are made acidic, strongly acidic or weakly acidic aqueous solutions such as an aqueous solution of hydrochloric acid, an aqueous solution of nitric acid, an aqueous solution of acetic acid and an aqueous solution of citric acid can be used. By pH adjustment, primary particles of titanium dioxide microparticles produced between the processing surfaces can be obtained in a non-aggregated state, the rate of crystallization can be increased, and the crystal form can be regulated.

Hydrogen peroxide can be added to at least one of the fluids in order to regulate the crystal form and the degree of crystallization simultaneously. By doing so, there is an advantage that crystallization, amorphous microparticles, and crystal forms such as anatase, brookite and rutile structure can be easily regulated, and particularly when titanium dioxide superfine particles whose crystal form is rutile type are obtained, addition of hydrogen peroxide is effective.

When hydrogen peroxide is added, crystallization can be conducted at a relatively low temperature of about 40° C., and thus the temperature control of the fluid can be easily controlled in addition to the foregoing advantage.

In addition to an alkaline aqueous solution as the aforementioned pH adjusting agent, it is possible to add at least one diol or triol selected from ethylene glycol, propylene glycol, trimethylene glycol, 1,2-butanediol, 1,3-butanediol, 1,4-butanediol, 2,3-butanediol, 1,5-pentanediol, 2-butene-1,4-diol, hexylene glycol, octylene glycol, glycerin, hexaglycerol, and 1,2,6-hexanetriol.

As an action in the production of titanium dioxide superfine particles, it is raised that chemical absorption of this diol or triol onto a specific surface of nucleated titanium oxide causes inhibition of growth of the specific surface, thereby being able to obtain a specific shape or crystal form. It is suitable, for example, when highly crystalline titanium dioxide superfine particles of anatase type are obtained. The addition of diol or triol is also effective for the purpose of maintaining a state of high dispersibility with its surface modification.

A mixture and/or a solid solution of glass containing silicon oxide and/or silicon and a substance containing at least one kind of silicon-containing composite oxide, which is then dissolved in at least one kind of hydrochloric acid, sulfuric acid and nitric acid, can be added to at least one of the fluids. By doing so, a titanium dioxide compound having photocatalytic ability, wherein silicon oxide or a silicon oxide composite oxide is contained in titanium dioxide particles, can be separated and is convenient where such titanium dioxide compound is necessary.

A chlorine ion-containing acid such as hydrochloric acid is added to at least one of the fluids, and then at least one kind of Bronsted base such as nitrate ion and phosphate ion can be added thereto. In this case, as a titanium compound, titanium tetrachloride which generates hydrogen chloride upon hydrolysis is preferable because the amount of hydrochloric acid added can be reduced. Addition of such acid is convenient for forming titanium dioxide of brookite type for example. The fluid to which the Bronsted base is added may be a fluid to which the acid was added or may be another fluid.

An oxide represented by aluminum oxide, zirconium oxide, silicon oxide, antimony oxide, tin oxide or zinc oxide, and an organometallic compound such as a metal chelate compound, a cyclic metal oligomer or a metal alkoxide, containing at least one member selected from aluminum, zirconium, antimony, tin, zinc and titanium, can be added to at least one of the fluids. By covering the surfaces of titanium dioxide superfine particles with a coating layer comprising the above substance, the photocatalytic activity of the particles can be regulated. Titanium dioxide of rutile type is said to have no photocatalytic activity compared with titanium dioxide of anatase type, but actually has a photocatalytic activity. As the photocatalytic activity of titanium dioxide of rutile type can be sufficiently regulated, it is convenient when the superfine particles of titanium dioxide of rutile type, the surfaces of which were treated with the oxide, and the organometallic compound are contained. This surface coverage is effective for titanium dioxide of another crystal form.

By surface coverage with the oxide or organometallic compound, the photocatalytic activity of the titanium dioxide superfine particles can be sufficiently regulated, and thus its effect can be utilized particularly when used in an antireflective coating on the display surface of a flat panel display (FPD) for a liquid crystal display (LCD), plasma display panel (PDP) and electroluminescence display (EL).

To at least one of the fluids can be added electrification regulators: for example, polymerizable monomers like styrene and styrene derivatives such as chlorostyrene and methylstyrene, acrylic acid and acrylic acid derivatives such as methyl acrylate, methacrylic acid and methacrylic acid derivatives such as methyl methacrylate; non-resin electrification regulators like metal complexes of organic compounds having a carboxyl group or a nitrogen-containing group, calixarene compounds, metal-containing dyes and nigrosine; electrification regulating resins like quaternary ammonium group- or quaternary ammonium base-containing copolymers, sulfonic acid group- or sulfonate base-containing copolymers and carboxylic acid group- or carboxylate base-containing copolymers. Addition of the polymerizable monomers is convenient for titanium dioxide superfine particles and the electrification regulator to be uniformly dispersed and dissolved in the polymerizable monomers. Addition of the electrification regulator is convenient when the titanium dioxide superfine particles are used for various purposes such as electronic paper, electrophotographic developers, LCD spacers, and photochromic particles.

Besides the titanium compound, calcium carbonate and phosphoric acid, or hydroxyapatite may be contained in at least one of the fluids. This is convenient for preparation of a porous titanium dioxide material arranged on the surface of a skeleton of a porous material comprising a titanium dioxide/apatite composite or calcium phosphate.

Such porous titanium dioxide material can activate actions such as decomposition, removal, deodorization, anti-bacterium, antifouling and antifogging. Accordingly, the porous titanium dioxide material can be preferably used for antifouling, deodorization and bacteria elimination for coatings, fiber products, sick house syndrome-resolving agents, building materials, interior materials for automobiles, furniture, home electric appliances, household equipments, and tableware, or various purposes such as a detoxifying agent for wastewater and exhaust gas in industry, a medical material, and the like.

For promotion of coordination with organic ligands, promotion of crystallization, or alteration of crystal form, the space between the processing surfaces may be heated (warmed), may be irradiated with ultraviolet ray (UV) or may be supplied with ultrasonic energy. Particularly, when a difference in temperature is set between the first processing surface 1 and the second processing surface 2, convection can be generated in a thin film fluid so that the reaction and the aforementioned purpose can be promoted, which is an advantage.

For heating (warming) as described above, more specifically, at least one of the processing members 10 and 20 can be provided for example with a heater or a jacket for passing a heat medium, to heat (warm) the thin film fluid. For irradiation with ultraviolet ray (UV), at least one of the processing member 10 and the processing member 20 can be provided, for example, with an element such as UV lamp to irradiate the thin film fluid with ultraviolet ray (UV) from the corresponding processing surface. For supplying with ultrasonic energy, at least one of the processing member 10 and the processing member 20 can be provided, for example, with an ultrasonic wave oscillator.

A dispersion (suspension) wherein titanium dioxide superfine particles having a volume-average primary particle size of 0.5 nm to 1000 nm, preferably 1 nm to 30 nm, more preferably 1 nm to 10 nm, are dispersed in a solvent can be prepared. When the dispersant is added to at least one of an aqueous solution having the titanium compound dissolved therein and an aqueous solvent for hydrolysis, a dispersion (suspension) wherein titanium dioxide superfine particles coordinated thereon with the dispersant are dispersed can be prepared, and the resulting titanium dioxide superfine particles become extremely excellent in re-dispersibility.

As described above, the processing apparatus can be provided with a third introduction part d3 in addition to the first introduction part d1 and the second introduction part d2. In this case, a pH adjusting agent, an aqueous solution containing at least one kind of titanium compound, and a dispersant for example can be introduced separately through the respective introduction parts into the processing apparatus. By doing so, the concentration and pressure of each solution can be separately controlled, and the reaction of forming titanium dioxide superfine particles can be regulated more accurately. When the processing apparatus is provided with four or more introduction parts, the foregoing applies and fluids to be introduced into the processing apparatus can be subdivided in this manner.

The foregoing also applies to the case where a reverse-micelle method is used in the method for producing titanium dioxide superfine particles in a thin film fluid between the processing surfaces arranged to be opposite to each other so as to be able to approach to and separate from each other, at least one of which rotates relative to the other, according to the present invention. For example, water and a suitable dispersant such as sodium bis(2-ethylhexyl)sulfonate (AOT) or polyoxyethylene (20) sorbitan oleate are introduced into a suitable organic solvent such as isooctane, to prepare a reverse micellar solution. Then, a solution containing titanium tetrabutoxide (TNBT) diluted at a predetermined concentration with 1-butanol is used as a second fluid, thereby obtaining a suspension containing titanium dioxide superfine particles.

Hereinafter, the present invention is described in detail with reference to Examples, but the present invention is not limited by Examples.

In following Examples, the term "from the center" means "through the first introduction part d1" in the processing apparatus shown in FIG. 1(A), the first fluid refers to the first processed fluid, and the second fluid refers to the second processed fluid introduced "through the second introduction part d2" in the processing apparatus shown in FIG. 1(A).

EXAMPLE H1

A titanium tetrachloride solution is uniformly mixed in a thin film formed between the processing surfaces 1 and 2 arranged to be opposite to each other so as to be able to approach to and separate from each other, at least one of which rotates relative to the other, in use of a uniformly stirring and mixing reaction apparatus shown in FIG. 1(A), thereby performing hydrolysis reaction.

While an aqueous solution adjusted to pH 2 with an aqueous solution of hydrochloric acid was sent as a first fluid from the center at a supply pressure/back pressure of 0.20 MPa/0.01 MPa, at a revolution number of 1000 rpm and a sending solution temperature of 95° C., an aqueous solution of titanium tetrachloride (Ti content, 15.4% by mass) was introduced as a second fluid at a rate of 3 ml/min. between the processing surfaces 1 and 2. A liquid dispersion of titanium dioxide was discharged from the processing surfaces. The temperature of the discharged liquid was also 95° C. For removing, by electrodialysis, the residual chlorine formed by the reaction, the resulting liquid dispersion of titanium dioxide was subjected to electrodialysis with an electrodialyzer G3 manufactured by Asahi Kasei Corporation while the pH of the dispersion was monitored, thereby giving a liquid dispersion of titanium dioxide.

The obtained liquid dispersion of titanium dioxide was dried in a drying oven at 120° C. to give titanium dioxide powders. The crystalline ratio of the titanium dioxide superfine particles thus obtained was measured in the following manner.
(Crystalline Ratio)

In X-ray diffractometry, the powder was measured with a powder X-ray diffractometer manufactured by Panalytical. The crystalline ratio was determined by Rietveld analysis software attached to the apparatus. The product was 98.2% rutile-type titanium dioxide.
(Primary Particle Size)

The liquid dispersion of titanium dioxide was dried on an electroconductive specimen support and observed at 100,000-fold or more magnification with a scanning electron microscope, and the particle size range in one visual field was determined. The primary particle size was 10 nm to 15 nm. The shape of the particles was spherical.
(Re-Dispersibility)

The obtained titanium dioxide powder was compounded so as to form a liquid dispersion of 10 w/w % titanium dioxide/1 w/w % polyvinyl pyrrolidone and then stirred with a high-speed stirring dispersing machine (trade name: CLEARMIX manufactured by M Technique Co., Ltd.), to give a titanium dioxide superfine particle dispersion again, and this aqueous titanium dioxide dispersion was dried in a drying oven at 120° C. to give titanium dioxide powders again. The powders were observed at 100,000-fold or more magnification with a scanning electron microscope, and the particle size range in one visual field was determined. The primary particle size was 10 nm to 15 nm. It was confirmed that the resulting titanium dioxide superfine particle powders were excellent in re-dispersibility.

EXAMPLE H2

A liquid dispersion of titanium dioxide was obtained in the same manner as in Example H1 except that the number of revolution was 2000 rpm.

EXAMPLE H3

A liquid dispersion of titanium dioxide was obtained in the same manner as in Example H1 except that the number of revolution was 3000 rpm.

EXAMPLE H4

A liquid dispersion of titanium dioxide was obtained in the same manner as in Example H1 except that the supply pressure was 0.10 MPa.

EXAMPLE H5

A liquid dispersion of titanium dioxide was obtained in the same manner as in Example H1 except that the supply pressure was 0.30 MPa.

EXAMPLE H6

A liquid dispersion of titanium dioxide was obtained in the same manner as in Example H1 except that the back pressure was 0.10 MPa.

COMPARATIVE EXAMPLE H1

While 200 g of an aqueous solution adjusted to pH 2 with an aqueous solution of hydrochloric acid was stirred at 140 rpm at a solution temperature of 95° C. in a beaker, 20 g of an aqueous solution of titanium tetrachloride (Ti content, 15.4% by mass) was introduced. A liquid dispersion of titanium dioxide was obtained in the same manner as in Examples described above.

EXAMPLE H7

While an aqueous solution adjusted to pH 1 with an aqueous solution of hydrochloric acid was sent as a first fluid from the center at a supply pressure/back pressure of 0.30 MPa/0.01 MPa, at a revolution number of 1000 rpm and a sending solution temperature of 95° C., titanium tetraisopropoxide (first grade, Wako Pure Chemical Industries, Ltd.) was introduced as a second fluid at a rate of 4 ml/min. between the processing surfaces 1 and 2. A titanium dioxide particle dispersion was discharged from the processing surfaces.
(Primary Particle Size)

The liquid dispersion of titanium dioxide was dried on an electroconductive specimen support and observed at 100,000-fold or more magnification with a scanning electron microscope, and the particle size range in one visual field was determined. The primary particle size was 10 nm to 20 nm. The shape of the particles was spherical.
(Re-Dispersibility)

The obtained titanium dioxide powder was compounded so as to form a liquid dispersion of 10 w/w % titanium dioxide/1 w/w % polyvinyl pyrrolidone and then stirred with a high-speed stirring dispersing machine (trade name: CLEARMIX manufactured by M Technique Co., Ltd.), to give a titanium dioxide dispersion again, and this aqueous titanium dioxide dispersion was dried in a drying oven at 120° C. to give titanium dioxide powder again. The powder was observed at 100,000-fold or more magnification with a scanning electron microscope, and the particle size range in one visual field was determined. The primary particle size was 10 nm to 20 nm. It was confirmed that the resulting titanium dioxide superfine particle powder was excellent in re-dispersibility.

EXAMPLE H8

A liquid dispersion of titanium dioxide was obtained in the same manner as in Example H7 except that the number of revolution was 2000 rpm.

EXAMPLE H9

A liquid dispersion of titanium dioxide was obtained in the same manner as in Example H7 except that the number of revolution was 3000 rpm.

EXAMPLE H10

A liquid dispersion of titanium dioxide was obtained in the same manner as in Example H7 except that the supply pressure was 0.10 MPa.

COMPARATIVE EXAMPLE H2

While 200 g of an aqueous solution adjusted to pH 1 with an aqueous solution of hydrochloric acid was stirred at 140 rpm at a solution temperature of 95° C. in a beaker, 20 g of titanium tetraisopropoxide (first grade, Wako Pure Chemical Industries, Ltd.) was introduced. A liquid dispersion of titanium dioxide was obtained in the same manner as in the Examples described above.

The results are shown in Table 16. In the table, Examples 1 to 10 and Comparative Examples 1 to 2 shall be read as Examples H1 to H10 and Comparative Examples H1 to H2, respectively.

other so as to be able to approach to and separate from each other, at least one of which rotates relative to the other, in the apparatus shown in FIG. 1(A).

First, a fluid containing at least one kind of magnetic material is introduced through one flow path, that is, the first introduction part d1 into the space between the processing surfaces 1 and 2 arranged to be opposite to each other so as to be able to approach to and separate from each other, at least one of which rotates relative to the other, thereby forming a first fluid film between the processing surfaces.

Then, a fluid containing at least one kind of a magnetic microparticle-separating agent such as a reducing agent is introduced directly as a second fluid through another flow path, that is, the second introduction part d2 into the first fluid film produced between the processing surfaces 1 and 2.

As described above, a thin film fluid is formed between the processing surfaces 1 and 2, the distance of which is regulated by the pressure balance between the supply pressure of the fluid and the pressure exerted between the rotating processing surfaces. Then, the first fluid and the second fluid are allowed to join together in this thin film fluid and mixed, thereby separating magnetic microparticles to effect the reaction of forming magnetic microparticles. From the reaction processing apparatus, a magnetic fluid containing magnetic microparticles is removed.

To effect the reaction between the processing surfaces 1 and 2, the second fluid may be introduced through the first introduction part d1 and the first fluid through the second introduction part d2, as opposed to the above description. That is, the expression "first" or "second" for each fluid has a meaning for merely discriminating an $n^{th}$ n fluid among a plurality of fluids present, and third or more fluids can also be present.

The particle size, monodispersity, and crystallinity and degree of crystallization of the obtained magnetic microparticles can be regulated by changing the number of revolutions of the processing surfaces 1 and 2, the distance between the processing surfaces 1 and 2, the flow rate and temperature of the thin film fluid, and the concentration of materials.

TABLE 16

| Example | First Fluid | Second Fluid | Number of Revolutions [rpm] | Supply Pressure [MPa] | Back Pressure [MPa] | Primary Particle Size [nm] | Re-dispersibility |
|---|---|---|---|---|---|---|---|
| 1 | Hydrochloric | Titanium | 1000 | 0.20 | 0.01 | 10-15 | ○ |
| 2 | acid | tetrachloride | 2000 | | | 10-25 | ○ |
| 3 | aqueous | aqueous solution | 3000 | | | 8-33 | ○ |
| 4 | solution | (Ticontent, 15.4 | 1000 | 0.10 | | 3-15 | ○ |
| 5 | (pH 2) | mass %) | | 0.30 | | 12-17 | ○ |
| 6 | | | | 0.20 | 0.10 | 10-17 | ○ |
| Comparative Example 1 | | | Beaker Test | | | 20-331 | X |
| 7 | Hydrochloric | Titanium | 1000 | 0.30 | 0.01 | 10-20 | ○ |
| 8 | acid | tetraisopropoxide | 2000 | | | 2-8 | ○ |
| 9 | aqueous | | 3000 | | | 12-972 | ○ |
| 10 | solution | | 1000 | 0.10 | | 21-41 | ○ |
| Comparative Example 2 | (pH 1) | | Beaker Test | | | 98-687 | X |

(I) Magnetic Microparticles

Hereinafter, the reaction of forming magnetic microparticles according to the present invention is described.

This reaction occurs by forced uniform mixing between the processing surfaces 1 and 2 arranged to be opposite to each Even when a reverse micelle method is used as a method of synthesizing a magnetic body, that is, when a first reverse micellar solution obtained by adding a dispersant and an aqueous solution of a magnetic material to an organic solvent, and a second reverse micellar solution containing at least one kind of a magnetic microparticle-separating agent, are used as the first and second fluids respectively, a magnetic fluid and magnetic microparticles can be prepared.

The metal contained in the magnetic microparticles obtained by the production method of the present invention is not particularly limited as long as the metal has magnetism in the form of an element or compound. The metal contained is preferably at least one transition element selected from nickel, cobalt, iridium, iron, platinum, gold, silver, manganese, chromium, palladium, yttrium, and lanthanides (neodymium, samarium, gadolinium and terbium).

The magnetic microparticles may contain elements other than those described above. Examples of such elements include copper, zinc, magnesium, rhenium, bismuth and silicon.

The magnetic microparticles described above may have physical properties other than magnetism, for example physical properties of semiconductors. For example, there are magnetic semiconductor microparticles comprising $CdCr_2Se_4$ and EuX (X represents a VI group element such as S, Se or the like) having a Curie temperature lower than 150 K.

In addition, there are magnetic semiconductor microparticles comprising mixed crystal semiconductors wherein 3d transition metals such as Mn are mixed as magnetic elements in group II-VI compound semiconductors, group III-V compound semiconductors, group IV compound semiconductors and group I-III-VI compound semiconductor. In this example, there is CdMnTe or CdHgMnTe as typical group II-VI DMS (dilute magnetic semiconductor). As typical group III-V DMS, there are InMnAs (50 K), GaMnAs (160 K), and InGaMnAs (130 K). The numbers shown in parentheses indicate ferromagnetic transition temperatures, and each of the substances shows ferromagnetism at low temperatures.

Other examples include magnetic microparticles comprising BeMnZnSe.

On the other hand, the magnetic microparticles may be those not having the physical properties mentioned above. For example, iron-copper alloys, iron-platinum alloys, nickel, nickel-iron alloys, cobalt, cobalt-iron alloys, manganese, manganese-iron alloys, titanium, titanium-iron alloys, vanadium, vanadium-copper alloys, and magnetite ($Fe_3O_4$) are magnetic bodies which do not have physical properties of semiconductors.

However, even if each material unit has its single physical property, the product has a plurality of physical properties derived from each of the materials, in the case a different kind of material from the above is added to microparticles comprising a single material, or plural kinds of microparticles comprising a single material are aggregated to form aggregates. In the present invention, therefore, a product containing at least magnetic microparticles is regarded as a magnetic product as far as among plural physical properties of the product, its magnetism is utilized. For example, an aggregate exhibiting physical properties both as a magnetic material and as a semiconductor is regarded as a magnetic product as far as its physical properties as a magnetic material are mainly utilized.

The magnetic product includes, for example, a product utilizing its fixed magnetic pole (a permanent magnet), a product utilizing a phenomenon of shifting its magnetic pole (a core of an electric magnet, an aggregating agent comprising a magnet-binding polymer, a magnetism-imparting agent, and the like), a product utilizing partial magnetism shifting (magnetic recording media such as magnetic disk) and a product blocking a magnetic field (a magnetic wave-shielding material and the like). The magnetic product is not limited to solid one and may be a powdery product (toner for printer, and the like) and a liquid product (magnetic fluid).

As the method for producing these magnetic products, various methods can be used. For example, the magnetic products can be produced by solidifying and molding, in various shapes, a large number of microparticles containing magnetic microparticles and other materials, by mixing, in a resin or the like, a large number of microparticles containing magnetic microparticles, or by allowing a large number of microparticles containing magnetic microparticles to be adhered, by a means such as coating, deposition or sputtering, to the surface of a disk or the like. Further, a magnetic product can be produced by dispersing, in a colloidal state, a large number of microparticles containing magnetic microparticles in a fluid.

In the present invention, when magnetic microparticles are obtained in a thin film fluid formed between the processing surfaces arranged to be opposite to each other so as to be able to approach to and separate from each other, at least one of which rotates relative to the other, thereby preparing magnetic microparticles comprising a metal such as FeCu (iron-copper alloy) microparticles, then an aqueous solution having an iron salt such as ferrous chloride and a copper salt such as copper sulfate dissolved in an aqueous solvent is used as a first fluid, and an aqueous solution wherein a reducing agent serving as a magnetic microparticle-separating agent such as hydrazine or dimethyl aminoethanol is dissolved is used as a second fluid, whereby FeCu microparticles can be prepared. The aqueous solvent is not limited, and purified water such as ion-exchange water and pure water can be used.

The reducing agent used as a magnet microparticle-separating agent is not particularly limited. Examples of the reducing agent include sodium borohydride, sodium hypophosphite, hydrazine, transition metal element ions (trivalent titanium ion, divalent cobalt ion, and the like), alcohols such as methanol, ethanol and 2-propanol, and ascorbic acid, as well as ethylene glycol, glutathione, organic acids (citric acid, malic acid, tartaric acid, and the like), reducing sugars (glucose, galactose, mannose, fructose, sucrose, maltose, raffinose, stachyose, and the like) and sugar alcohols, and sorbitol. Amines may be used as the reducing agent, and such amines include, for example, aliphatic amines such as propylamine, butylamine, hexylamine, diethylamine, dipropylamine, dimethylethylamine, diethylmethylamine, triethylamine, ethylenediamine, N,N,N',N'-tetramethylethylenediamine, 1,3-diaminopropane, N,N,N',N'-tetramethyl-1,3-diaminopropane, triethylenetetramine and tetraethylenepentamine; alicyclic amines such as piperidine, N-methylpiperidine, piperazine, N,N'-dimethylpiperazine, pyrrolidine, N-methylpyrrolidine, and morpholine; aromatic amines such as aniline, N-methylaniline, N,N-dimethylaniline, toluidine, anisidine, and phenetidine; and aralkylamines such as benzylamine, N-methylbenzylamine, N,N-dimethylbenzylamine, phenethylamine, xylylenediamine, and N,N,N',N'-tetramethylxylylenediamine. Also, the above-mentioned amines include alkanolamines such as methylaminoethanol, dimethylaminoethanol, triethanolamine, ethanolamine, diethanolamine, methyldiethanolamine, propanolamine, 2-(3-aminopropylamino) ethanol, butanolamine, hexanolamine, and dimethylaminopropanol.

In the reaction, a nitrogen-containing gas, a mixed gas of nitrogen and hydrogen, or an ammonia gas may be introduced into the space between the processing surfaces in order to nitride magnetic microparticles. Similarly, when an oxide coating is formed on magnetic microparticles, a mixed gas of oxygen and an inert gas at a suitable oxygen concentration can be introduced into the space between the processing surfaces. For promoting each treatment, the space between the processing surfaces may be heated (warmed), may be irradiated with ultraviolet ray (UV), or may be supplied with ultrasonic energy.

When magnetic microparticles comprising a metal oxide such as magnetite ($F_{e3}O_4$) microparticles are prepared, an aqueous solution wherein a divalent iron ion salt such as ferrous chloride, ferrous nitrate or ferrous sulfate and a trivalent iron ion salt such as ferric chloride are dissolved in a divalent/trivalent iron ion ratio of 1/2, and an aqueous solution wherein an alkaline co-precipitating agent such as sodium hydroxide, potassium hydroxide or ammonia is dissolved as a magnetic microparticle-separating agent, can be used as the first and second fluids respectively to prepare magnetite microparticles. The aqueous solvent is not particularly limited, and purified water such as ion-exchange water or pure water can be used. For various purposes, a water-soluble organic solvent such as methanol can be mixed.

When magnetic microparticles comprising a metal sulfide are prepared, an aqueous solution wherein cobalt nitrate as a magnetic body and another metal (e.g. copper) nitrate are dissolved, and an aqueous solution wherein a sulfur (S) source such as sodium sulfide ($Na_2S$), or a gaseous sulfur (S) source such as hydrogen sulfide ($H_2S$), is dissolved as a magnet microparticle-separating agent, can be used as the first and second fluids respectively to prepare magnetic microparticles. These products can also be subjected to nitridization, oxidization, heating and UV treatment, depending on the object.

A dispersant which is to be coordinated on the surfaces of magnetic microparticles can be added to at least one of the fluids. The dispersant is not particularly limited, and various dispersants having excellent dispersibility in solution and being capable of dispersing separated magnetic microparticles excellently in solution can be used. Particularly, a polymer dispersant can be preferably used. Various polymer dispersants can be used. Examples of such polymer dispersants include polymer dispersants having a polar group like polymer dispersants such as polyethylene imine and polyvinyl pyrrolidone, hydrocarbon polymer dispersants having in molecules a carboxylic acid group such as polyacrylic acid and carboxymethyl cellulose, and copolymers like POVAL (polyvinyl alcohol) or having in one molecule a polyethylene imine moiety and a polyethylene oxide moiety. Their molecular weight is preferably 100,000 or less. Commercial products can also be used. The commercial products include Solsperse 20000, Solsperse 24000, Solsperse 26000, Solsperse 27000, Solsperse 28000 and Solsperse 41090 (manufactured by Avecia Corporation), Disperbyk-160, Disperbyk-161, Disperbyk-162, Disperbyk-163, Disperbyk-166, Disperbyk-170, Disperbyk-180, Disperbyk-181, Disperbyk-182, Disperbyk-183, Disperbyk-184, Disperbyk-190, Disperbyk-191, Disperbyk-192, Disperbyk-2000 and Disperbyk-2001 (manufactured by BYK-Chemie), Polymer 100, Polymer 120, Polymer 150, Polymer 400, Polymer 401, Polymer 402, Polymer 403, Polymer 450, Polymer 451, Polymer 452, Polymer 453, EFKA-46, EFKA-47, EFKA-48, EFKA-49, EFKA-1501, EFKA-1502, EFKA-4540 and EFKA-4550 (manufactured by EFKA Chemical Corp.), Flowlen DOPA-158, Flowlen DOPA-22, Flowlen DOPA-17, Flowlen G-700, Flowlen TG-720W, Flowlen-730W, Flowlen-740W and Flowlen 745W (manufactured by Kyoeisha Chemical Co., Ltd.), Ajisper PA-111, Ajisper PB-711, Ajisper PB-811, Ajisper PB-821 and Ajisper PW-911 (manufactured by Ajinomoto Co. Inc.), and Johncryl 678, Johncryl 679 and Johncryl 62 (manufactured by Johnson Polymer B.V.). These products may be used alone or in combination of two or more thereof.

It is also possible to use high-molecular organic acids such as oleic acid, erucic acid, linoleic acid, polyphosphoric acids such as hexaphosphoric acid, octaphosphoric acid, tetraphosphoric acid, triphosphoric acid, acetic acid, acrylic acid, and methacrylic acid; high-molecular organic matters such as polyvinyl pyrrolidone, polyvinyl alcohol and sodium hexamethaphosphate; thiols such as 2-mercaptoethanol, mercaptoacetic acid, 2-mercaptoethylamine, β-thiodiglycol, 2,2'-thiodiacetic acid; or polystyrene and phosphine oxides.

A pH adjusting agent for regulating pH during reaction may be added as necessary. When the reaction conditions are made alkaline, strongly alkaline or weakly alkaline aqueous solutions such as an aqueous solution of sodium hydroxide, an aqueous solution of potassium hydroxide, an aqueous solution of calcium hydroxide, an aqueous solution of barium hydroxide, and ammonia water can be used as the pH adjusting agent.

When the reaction conditions are made acidic, strongly acidic or weakly acidic aqueous solutions such as an aqueous solution of hydrochloric acid, an aqueous solution of nitric acid, an aqueous solution of acetic acid and an aqueous solution of citric acid can be used.

In addition, the space between the processing surfaces may be heated (warmed), may be irradiated with ultraviolet ray (UV), or may be supplied with ultrasonic energy. Particularly, when a difference in temperature is set between the first processing surface 1 and the second processing surface 2, there is an advantage that since convection can be generated in a thin film fluid, the reaction can be promoted.

Specifically for heating (warming), at least one of the processing members 10 and 20 can be provided for example with a heater or a jacket for passing a heat medium, to heat (warm) the thin film fluid. For irradiation with ultraviolet ray (UV), at least one of the processing member 10 and the processing member 20 can be provided, for example, with an element such as UV lamp to irradiate the thin film fluid with ultraviolet ray (UV) from the corresponding processing surface. For supplying with ultrasonic energy, at least one of the processing member 10 and the processing member 20 can be provided, for example, with an ultrasonic wave oscillator.

The separation is conducted in a container capable of securing a depressurized or vacuum state, and a secondary side at which the fluid after processing is discharged can be depressurized or made vacuous to remove a gas generated during the separating reaction, to remove a gas contained in the fluid, or to remove the solvent of the fluid. It follows that even when separation of magnetic microparticles and removal processing of the solvent are simultaneously conducted, a fluid containing magnetic microparticles separated between the processing surfaces is discharged in an atomized state from the processing surfaces, and therefore, the surface area of the fluid can be increased and the efficiency of removal of the solvent becomes extremely high. Accordingly, preparation and processing of magnetic microparticles and removal of the solvent can be effected in substantially one step more easily than conventional.

In this manner, a magnetic fluid that is a liquid dispersion (suspension) wherein magnetic microparticles having a volume-average particle size of 0.5 nm to 1000 nm, preferably 1 nm to 30 nm, more preferably 5 nm to 11 nm, dispersed in an aqueous solvent can be prepared. When a dispersant is added to an aqueous solution having metal nitrate or the like dissolved therein, a magnetic fluid that is a liquid dispersion (suspension) wherein magnetic microparticles having the dispersant coordinated thereon are dispersed can be prepared, and the resulting magnetic microparticles are very excellent in re-dispersibility. Accordingly, a magnetic fluid in accordance with the intended use can be conveniently prepared again.

As described above, the processing apparatus can be provided with a third introduction part d3 in addition to the first introduction part d1 and the second introduction part d2. In this case, a pH adjusting agent, an aqueous solution of a metal ion, a dispersant, and a magnetic microparticle-separating agent for example can be introduced separately through the respective introduction parts into the processing apparatus. By doing so, the concentration and pressure of each solution can be separately controlled, and the reaction of forming magnetic microparticles can be regulated more accurately. When the processing apparatus is provided with four or more introduction parts, the foregoing applies and fluids to be introduced into the processing apparatus can be subdivided in this manner.

The foregoing substantially applies where a reverse micelle method is used in the method for producing magnetic microparticles in a thin film fluid formed between the processing surfaces arranged to be opposite to each other so as to be able to approach to and separate from each other, at least one of which rotates relative to the other, in the present invention. For example, when FePt microparticles are prepared, water and a suitable dispersant such as cetyl trimethyl ammonium bromide or pentaethylene glycol dodecyl ether is added to a suitable organic solvent such as an alkane having 7 to 12 carbon atoms, such as heptane, octane or nonane, or to an ether such as diethyl ether or dipropyl ether, to prepare a reverse micellar solution. An aqueous solution of iron and platinum compounds such as iron or platinum nitrate, sulfate, hydrochloride, acetate or metal carbonyl is added to the reverse micellar solution, to prepare a reverse micellar solution containing iron and platinum compounds as a first fluid. Then, a reverse micellar solution containing a reducing agent that is a magnetic microparticle-separating agent is used as a second fluid to obtain FePt microparticle-containing suspension.

Hereinafter, the present invention is described in detail with reference to Examples, but the present invention is not limited by Examples.

An aqueous mixed solution of iron and copper is reduced in a thin film formed between the processing surfaces 1 and 2 arranged to be opposite to each other so as to be able to approach to and separate from each other, at least one of which rotates relative to the other, in use of a uniformly stirring and mixing reaction apparatus shown in FIG. 1(A), thereby giving magnetic microparticles under uniform mixing in the thin film.

In following Examples, the term "from the center" means "through the first introduction part d1" in the processing apparatus shown in FIG. 1(A), the first fluid refers to the first processed fluid, and the second fluid refers to the second processed fluid introduced "through the second introduction part d2" in the processing apparatus shown in FIG. 1(A).

EXAMPLE I1

While 10% hydrazine aqueous solution was sent as a first fluid from the center at a supply pressure/back pressure of 0.02 MPa/0.01 MPa, at a revolution number of 1000 rpm and at a sending solution temperature of 80° C., an aqueous solution of 20% ferrous sulfate/18% copper sulfate/2% BYK-190 (manufactured by BYK-Chemie), just after adjusted to pH 12 with ammonia water, was introduced at a rate of 10 ml/min. as a second fluid into the space between the processing surfaces 1 and 2. An aqueous iron-copper alloy colloidal solution, that is, a magnetic fluid, was discharged from the processing surfaces 1 and 2.

Then, impurities were removed with a dialysis tube from the resulting aqueous iron-copper alloy colloidal solution, and iron-copper alloy microparticles in this dispersion were observed with a transmission electron microscope (TEM). One hundred particles were selected at random therefrom, and their measured average primary particle size was 9.3 nm. The compounding ratio of iron ion/copper ion (ratio in the number of atoms) was 10/9. The yield of the iron copper particles was 94%. When the obtained iron/copper alloy microparticles were confirmed with a transmission microscope, the shape of the particles was spherical.

EXAMPLE I2

While an aqueous solution of 0.3 mol/L caustic soda (sodium hydroxide) was sent as a first fluid from the center at a supply pressure/back pressure of 0.40 MPa/0.01 MPa, at a revolution number of 500 rpm and at a sending solution temperature of 95° C., a starting metal salt mixture wherein ferric chloride hexahydrate, cobalt chloride hexahydrate, nickel chloride hexahydrate, and chromium chloride hexahydrate, that is, 0.25 mol/l $Fe^{3+}$ aqueous solution, 0.10 mol/l $Co^{2+}$ aqueous solution, 0.10 mol/l $Ni^{2+}$ aqueous solution, and 0.10 mol/l $Cr^{3+}$ aqueous solution were mixed such that $Fe^{3+}/Co^{2+}/Ni^{2+}/Cr^{3+}$ became 2/1/0.3/0.3, was introduced at a rate of 10 ml/min. as a second fluid into the space between the processing surfaces 1 and 2. A black microparticle dispersion, that is, a magnetic fluid, was discharged from the processing surfaces.

As a result of elementary analysis of precipitates obtained by filtering a part of the obtained black microparticle dispersion, Fe was 47.6%, Co 14.1%, Ni 2.9%, and Cr 2.4%. When the particle size distribution was measured with a particle size distribution measuring instrument utilizing a laser Doppler method (trade name: Microtrac UPA150, manufactured by Nikkiso Co., Ltd.), the volume-average particle size was 18 nm. As a result of magnetic measurement with a physical property measurement system (PPMS), saturated magnetization sa of these particles was $57.2 \times 10^{-6}$ Wb·m/kg, and holding power HcJ was 421 kA/m.

Further, the black microparticle dispersion was washed with pure water and then vacuum-dried to give black microparticle powders. When the powders were introduced again into ion-exchange water and stirred with a high-speed stirring dispersing machine (trade name: CLEARMIX manufactured by M Technique Co., Ltd.), a black microparticle dispersion was obtained again, its volume-average particle size was 18 nm which was the same as before vacuum-freeze drying, and the resulting black microparticle powders were thus confirmed to be excellent in re-dispersibility.

EXAMPLE I3

An alkane solution having aerosol OT, decane and 2 ml oleylamine mixed therein was added to and mixed with a reducing agent aqueous solution having $NaBH_4$ dissolved in water (deoxygenation: not higher than 0.1 mg/l), and the resulting reverse micellar solution (0.9% $NaBH_4$/18.8% deoxygenated water/12.7% aerosol OT/65.9% decane/1.7% oleylamine) was sent as a first fluid from the center at a supply pressure/back pressure of 0.10 MPa/0.01 MPa, at a revolution number of 1000 rpm and a sending solution temperature of 50° C. A alkane solution having aerosol OT and decane mixed therein was added to and mixed with a metal salt aqueous solution prepared by dissolving iron triammonium trioxalate ($Fe(NH_4)_3(C_2O_4)_3$) and potassium chloroplatinate ($K_2PtCl_4$) in water (deoxygenated), and the resulting reverse micellar solution (1.1% $Fe(NH_4)_3(C_2O_4)_3$/0.9% $K_2PtCl_4$/18.9% deoxygenated water/12.8% aerosol OT/66.3% decane) was introduced as a second fluid at a rate of 10 ml/min. into the space between the processing surfaces 1 and 2. A magnetic fluid, that is, a reverse micellar solution containing a microparticle dispersion was discharged from the processing surfaces.

To destroy the resulting reverse micelle, a mixed solution of water/methanol (1/1) was added to the micelle to separate it into aqueous and oil phases. The nanoparticles were dispersed in the oil phase. The oil phase was washed five times with a mixed solution of water/methanol (3/1).

Thereafter, the nanoparticles were sedimented by flocculation with methanol. The supernatant was removed, and hentane was added to re-disperse the nanoparticles. Sedimentation with methanol and dispersion with heptane were repeated further 3 times, and heptane was finally added to the nanoparticles to prepare a FePt (iron-platinum alloy) nanoparticle dispersion wherein the mass ratio of water to the surfactant (water/surfactant) was 2.

Impurities were removed with a dialysis tube from the resulting FePt nanoparticle dispersion, and iron-copper alloy microparticles in this dispersion were observed with a transmission electron microscope (TEM). One hundred particles were selected at random therefrom, and their measured average primary particle size was 4.0 nm.

COMPARATIVE EXAMPLE I1

While an aqueous solution of 0.3 mol/L caustic soda was stirred at 20000 rpm at a solution temperature of 95° C. with a high-speed stirring dispersing machine (trade name: CLEARMIX manufactured by M Technique Co., Ltd.), a starting metal salt mixture wherein ferric chloride hexahydrate, cobalt chloride hexahydrate, nickel chloride hexahydrate, and chromium chloride hexahydrate, that is, 0.25 mol/l $Fe^{3+}$ aqueous solution, 0.10 mol/l $Co^{2+}$ aqueous solution, 0.10 mol/l $Ni^{2+}$ aqueous solution, and 0.10 mol/l $Cr^{3+}$ aqueous solution were mixed such that $Fe^{3+}/Co^{2+}/Ni^{2+}/Cr^{3+}$ became 2/1/0.3/0.3, was introduced. A black microparticle dispersion, that is, a magnetic fluid, was obtained.

When the particle size distribution of the resulting black microparticles was measured with a particle size distribution measuring instrument utilizing a laser Doppler method (trade name: Microtrac UPA150, manufactured by Nikkiso Co., Ltd.), the volume-average particle size was 970 nm.

When black microparticle powder obtained in the same manner as in Example 12 was introduced again into ion-exchange water and stirred with a high-speed stirring dispersing machine (trade name: CLEARMIX manufactured by M Technique Co., Ltd.), a black microparticle dispersion was obtained again, and its volume-average particle size was 1640 nm which was larger than before vacuum-freeze drying.

The amount of energy necessary for obtaining the magnetic microparticles in Examples was not higher than 1/10 relative to that in Comparative Examples, although the volume-average particle size was made smaller in Examples. From the foregoing, it was found that the production method in Examples is superior in energy efficiency.

(J) Biologically Ingestible Material (Dispersion)

Hereinafter, the operation of obtaining the biologically ingestible material of the present invention by dispersion is described.

Specifically, a first fluid (fluid to be processed), that is, a liquid dispersing solvent and a second fluid (fluid to be processed), that is, an oil phase component containing an oil-soluble pharmacologically active substance, are kept in independent states and passed through independent pathways corresponding to the respective fluids and introduced into the space between the processing surfaces arranged to be opposite to each other so as to be able to approach to and separate from each other, at least one of which rotates relative to the other, thereby forming a thin film fluid and mixing the fluids in the thin film fluid to give a biologically ingestible material in the form of microparticles having a desired particle size. This biologically ingestible material is removed from the space between the processing surfaces as an O/W dispersion having the first fluid as a continuous phase in which the second fluid occurs as a dispersed phase. When a surfactant is used, it may be added appropriately to the first or second fluid or both of the fluids.

As used herein, the pharmacologically active substance refers to a substance itself or compound having a physiological or pharmacological action on a living thing. The pharmacologically active substance means for example medically effective components in pharmaceuticals, quasi drugs, foods, food additives, health foods, cosmetics, and vitamin preparations.

Alternatively, a first fluid (fluid to be processed), that is, an oil dispersing solvent and a second fluid (fluid to be processed), that is, a water phase component containing a water-soluble pharmacologically active substance, are kept in independent states and passed through independent pathways corresponding to the respective fluids and introduced into the space between the processing surfaces arranged to be opposite to each other so as to be able to approach to and separate from each other, at least one of which rotates relative to the other, thereby forming a thin film fluid and mixing the fluids in the thin film fluid to give a biologically ingestible material in the form of microparticles having a desired particle size. This biologically ingestible material is removed from the space between the processing surfaces as a W/O dispersion which like the above dispersion, has the first fluid as a continuous phase in which the second fluid occurs as a dispersed phase.

As described above, the fluids are mixed in the thin film fluid, and thus the biologically ingestible material can be directly prepared without using a heterogeneous preliminarily dispersed preparation, and since a uniform mixing site is always given, the biologically ingestible material having an objective particle size can be easily obtained.

As described above, the fluids are kept in independent states and introduced into the space between the processing surfaces, the fluids can be mixed in a thin film fluid formed therebetween, and thus a preliminary mixing step which has been conventionally necessary can be omitted. The biologically ingestible material can thereby be obtained with lower energy than conventional.

The expression "first" or "second" for each solvent has a meaning for merely discriminating an $n^{th}$ fluid among a plurality of fluids present, and third or more fluids can also be present. Use of three or more fluids is useful for production of complex emulsion particles and liposomes containing oil phase and water phase components.

In production of the biologically ingestible material, various substances in addition to a pharmaceutically active substance can be added as necessary to a dispersed phase or a continuous phase. For example, low- or high-molecular-weight modifying substances such as amino acids, peptides, transferrin, and sugars such as galactose and mannose are introduced via independent pathways into the thin film fluid and can thereby be mixed with the fluids to stabilize the surface of the biologically ingestible material with the desired modifying substance. The pharmacologically active substance is not limited to the combination mentioned above and may be added to the fluid in either the dispersed phase or continuous phase or to both the fluids depending on the case.

The particle size of the biologically ingestible material obtained by the procedure described above does not necessitate preliminary mixing of the continuous phase with the dispersed phase, and therefore, energy can be applied uniformly without generating heterogeneous mixed particles, thus enabling more uniform dispersion than conventional. The distance between the first processing member and the second processing member can be freely regulated to control the particle size.

In production of the biologically ingestible material, a decompression pump Q is used as shown in FIG. 18(A), so that the space outside the first processing member 10 and the second processing member 20, that is, around the flow path through which a processed fluid passes is decompressed (e.g. vacuumized) thereby removing gases such as air and dissolved oxygen, low-boiling organic solvents, steam and the like contained in the processed fluid in the process of forming emulsions and liposomes. By doing so, the fluid containing the biologically ingestible material obtained by mixing between the processing surfaces is discharged in an atomized state from the processing surfaces, and thus the surface area of the fluid is increased to bring about an advantage of very high efficiency of removal of the gas and solvent. The treated material (biologically ingestible material) from which the gas or solvent was thus removed is excellent in stability for a long time.

In the method of producing liposomes as the biologically ingestible material, one or more kinds of natural or synthetic phospholipid, or hydrogenated derivatives thereof, or mixture thereof are contained in at lease one of the dispersed phase and continuous phase in the processed fluid.

Specific examples of the phospholipid include glycerophospholipids such as phosphatidyl choline, phosphatidyl ethanolamine, phosphatidyl serine, phosphatidic acid, phosphatidyl glycerol, phosphatidyl inositol, cardiolipin, egg-yolk lecithin, soybean lecithin, hydrogenated egg-yellow lecithin and hydrogenated soybean lecithin, sphingophospholipids selected from sphingomyelin, ceramide phosphoryl ethanolamine, ceramide phosphoryl glycerol and the like, plasmalogens, and glycerolipids such as digalactosyl diglyceride, galactosyl diglyceride sulfate ester and the like.

In addition to the foregoing, amphiphilic compounds, ionic and nonionic surfactants, glycosphingolipids (for example, galactosyl ceramide, glycosyl ceramide, galactosyl ceramide sulfate ester, lactosyl ceramide, ganglioside G7, ganglioside G6, ganglioside G4), physiological bile salts (for example, sodium cholate, sodium dehydrocholate, sodium deoxycholate, sodium glycocholate and sodium taurocholate), saturated and unsaturated fatty acids or fatty alcohols, ethoxylated fatty acids or fatty alcohols, and esters and ethers thereof, alkylaryl-polyether alcohols (for example, tyloxapol), esters and ethers between sugars or sugar alcohols and fatty acids or fatty alcohols, acetylated or ethoxylated mono- and diglycerides, synthetic biodegradable polymers (for example, polyoxyethylene and polyoxypropylene oxide block copolymers), ethoxylated sorbitan esters or sorbitan ethers, amino acids, polypeptides and proteins (for example, gelatin and albumin), and sterols (for example, phytosterols, cholesterols, and tocopherols).

When the compositional components of the biologically ingestible material have unsaturated fatty acids, an inert gas such as nitrogen gas or argon gas is introduced onto the processing surfaces, and the treatment is conducted preferably in this atmosphere. For example, the space outside the first processing member and the second processing member, that is, around the flow path through which the processed fluid passes, is filled with the inert gas.

In production of the biologically ingestible material, the liquid dispersing solvent used in the continuous phase or the water phase component used in the dispersed phase may be pharmacologically acceptable liquids and are not particularly limited. Examples of such liquids include water, a buffer solution, ethanol, propylene glycol, dimethylsulfoxide (DMSO), methyl isobutyl ketone (MIBK), and mixtures thereof. Among them, water or a buffer solution is preferable.

In production of the biologically ingestible material, the oil dispersing solvent used in the continuous phase or the oil phase component used in the dispersed phase include natural oils such as soybean oil and olive oil, and synthetic oils.

When a component having a phase transition temperature is contained in components in the dispersed phase for production of the biologically ingestible material, the phase transition temperature of the thin film fluid formed between the processing surfaces is regulated in the temperature range of +5° C. to +45° C., and thereafter, the biologically ingestible material obtained in the thin film fluid is rapidly cooled to the phase transition temperature or less, thereby giving the desired biologically ingestible material. The reason for rapid cooling is to prevent the produced biologically ingestible material from flocculation, coalescence or creaming.

For example, the phase transition temperature of phospholipids is 23° C. to 24° C. for dimyristoyl phosphatidyl choline, 41.0° C. to 41.5° C. for dipalmitoyl phosphatidyl choline, 54.1° C. to 58.0° C. for distearoyl phosphatidyl choline, and about 53° C. for hydrogenated soybean lecithin.

The obtained liposomes and microemulsion particles can be aseptically filtered with a filter having 0.45 µm pores, more preferably 0.22 µm pores.

Production of visible aggregates of the liposomes and microemulsion particles obtained by the present invention was not confirmed for 1 month or more in a cold and dark place (4° C.). Accordingly, the liposomes and microemulsion particles obtained by the present invention are excellent in stability. The obtained biologically ingestible material having a volume-average particle size of 10 nm to 400 nm in the particle size distribution is particularly excellent in stability.

The biologically ingestible material obtained by the present invention is not particularly limited as long as it is intended to be ingested into the living body. Examples include pharmaceutical preparations exhibiting some effects in the living body, such as drug capsules, transdermal pharmaceuticals, oral pharmaceuticals, immune adjuvants, artificial red blood cells and artificial platelets, carrier substances of pharmaceutical ingredients in a drug delivery system, gene delivery vectors, creams, lotions, hair-growth drugs, and hair tonics which like cosmetics, are applied onto the skin, and foods, food additives, healthy foods, and flavors.

In the method for producing the biologically ingestible material in the present invention as described above, the preliminarily dispersing step which has been essential is made unnecessary, and the influences, in the preliminarily dispersed state, out of nonuniformity on the coordination of various drugs, the heat history, and the amount of energy applied can be eliminated, and a uniform particle size can be obtained since new mixing sites are always provided. Also, the distance between the first processing member and the second processing member can be freely regulated so that the particle size can be freely controlled. The working process can thereby be simplified, the desired particles can be obtained in a shorter time than conventional, and the process is excellent in energy efficiency and productivity.

Hereinafter, the present invention is described in detail with reference to Examples, but the present invention is not limited by Examples. Examples J1 to J4 and J9 to J21 are concerned with liposomes, and Examples J5 to J8 are concerned with microemulsion particles.

In following Examples, the term "from the center" means "through the first introduction part d1" in the processing apparatus shown in FIG. 1(A), the first fluid refers to the first processed fluid, and the second fluid refers to the second processed fluid introduced "through the second introduction part d2" in the processing apparatus shown in FIG. 1(A).

EXAMPLE J1

While a mixed solution of 240 g of 20% aqueous trehalose solution and 60 g of 10% aqueous mannitol solution was heated to 85° C. and sent as a first fluid from the center at a supply pressure/back pressure of 0.13 MPa/0.12 MPa and at a revolution number of 5000 rpm, a solution prepared by mixing 12 g of hydrogenated soybean lecithin, 6 g of cholesterol, 24 g of 1,3-butylene glycol and 1.2 g of paraben and dissolving the mixture by heating was introduced as a second fluid into the space between the processing surfaces 1 and 2, such that the first and second fluids were mixed and discharged at a rate of 90 ml/min. The processing time is 3.3 min. per 300 g material to be processed. The discharged solution after being discharged from each processing member was rapidly cooled to 35° C. or less.

When the solution after processing was measured with a particle size distribution measuring instrument utilizing a dynamic light scattering method as measurement principle (trade name: Microtrac UPA150, manufactured by Nikkiso Co., Ltd.), the (volume) average particle size was 45.8 nm.

EXAMPLE J2

While a mixed solution of 240 g of 20% aqueous trehalose solution and 60 g of 10% aqueous mannitol solution was heated to 85° C. and sent as a first fluid from the center at a supply pressure/back pressure of 0.11 MPa/0.12 MPa and at a revolution number of 8000 rpm, a solution prepared by mixing 12 g of hydrogenated soybean lecithin, 6 g of cholesterol, 24 g of 1,3-butylene glycol and 1.2 g of paraben and dissolving the mixture by heating was introduced as a second fluid into the space between the processing surfaces 1 and 2, such that the first and second fluids were mixed and discharged at a rate of 90 ml/min. The processing time is 3.3 min. per 300 g material to be processed. The discharged solution after being discharged from each processing member was rapidly cooled to 35° C. or less.

When the solution after processing was measured with a particle size distribution measuring instrument utilizing a dynamic light scattering method as measurement principle (trade name: Microtrac UPA150, manufactured by Nikkiso Co., Ltd.), the (volume) average particle size was 21.6 nm.

EXAMPLE J3

While a mixed solution of 240 g of 20% aqueous trehalose solution and 60 g of 10% aqueous mannitol solution was heated to 85° C. and sent as a first fluid from the center at a supply pressure/back pressure of 0.14 MPa/0.12 MPa and at a revolution number of 3000 rpm, a solution prepared by mixing 12 g of hydrogenated soybean lecithin, 6 g of cholesterol, 24 g of 1,3-butylene glycol and 1.2 g of paraben and dissolving the mixture by heating was introduced as a second fluid into the space between the processing surfaces 1 and 2, such that the first and second fluids were mixed and discharged at a rate of 90 ml/min. The processing time is 3.3 min. per 300 g material to be processed. The discharged solution after being discharged from each processing member was rapidly cooled to 35° C. or less.

When the solution after processing was measured with a particle size distribution measuring instrument utilizing a dynamic light scattering method as measurement principle (trade name: Microtrac UPA150, manufactured by Nikkiso Co., Ltd.), the (volume) average particle size was 60.9 nm.

EXAMPLE J4

While a mixed solution of 240 g of 20% aqueous trehalose solution and 60 g of 10% aqueous mannitol solution was heated to 85° C. and sent as a first fluid from the center at a supply pressure/back pressure of 0.14 MPa/0.25 MPa and at a revolution number of 5000 rpm, a solution prepared by mixing 12 g of hydrogenated soybean lecithin, 6 g of cholesterol, 24 g of 1,3-butylene glycol and 1.2 g of paraben and dissolving the mixture by heating was introduced as a second fluid into the space between the processing surfaces 1 and 2, such that the first and second fluids were mixed and discharged at a rate of 30 ml/min. The discharged solution after being discharged from each processing member was rapidly cooled to 35° C. or less.

When the solution after processing was measured with a particle size distribution measuring instrument utilizing a dynamic light scattering method as measurement principle (trade name: Microtrac UPA150, manufactured by Nikkiso Co., Ltd.), the (volume) average particle size was 36.8 nm.

COMPARATIVE EXAMPLE J1

210 g of 20% aqueous trehalose solution and 52.5 g of 10% aqueous mannitol solution were added to a solution prepared by mixing 10.5 g of hydrogenated soybean lecithin, 5.25 g of cholesterol, 21 g of 1,3-butylene glycol and 1.05 g of paraben and dissolving the mixture by heating, and then the mixture was regulated at a temperature of 85° C., processed for 10 minutes at 18000 rpm with a rotor/17000 rpm with a screen in a homogenizer (trade name: CLEARMIX W Motion manufactured by M Technique Co., Ltd.), and then cooled to 35° C. at 6000 rpm with a rotor/6000 rpm with a screen.

When the solution after processing was measured with a particle size distribution measuring instrument utilizing a dynamic light scattering method as measurement principle (trade name: Microtrac UPA150, manufactured by Nikkiso Co., Ltd.), the (volume) average particle size was 63.8 nm.

COMPARATIVE EXAMPLE J2

210 g of 20% aqueous trehalose solution and 52.5 g of 10% aqueous mannitol solution were added to a solution prepared by mixing 10.5 g of hydrogenated soybean lecithin, 5.25 g of cholesterol, 21 g of 1,3-butylene glycol and 1.05 g of paraben and dissolving the mixture by heating, and then the mixture was coarsely dispersed with a homogenizer (CLEARMIX) at 8000 rpm and then processed at a revolution number of 5000 rpm at 85° C. with an emulsifying/dispersing machine (SS5 manufactured by M Technique Co., Ltd.) such that the solution was discharged at a rate of 30 ml/min.

When the solution after processing was measured with a particle size distribution measuring instrument utilizing a dynamic light scattering method as measurement principle (trade name: Microtrac UPA150, manufactured by Nikkiso Co., Ltd.), the (volume) average particle size was 56.8 nm.

TABLE 17

|  | Example 1 | Example 2 | Example 3 | Example 4 | Comparative Example 1 | Comparative Example 1 |
|---|---|---|---|---|---|---|
| Number of Revolutions (rpm) | 5000 | 8000 | 3000 | 5000 | 18000/17000 | 5000 |
| Processing Time (min) | 3.3 | 3.3 | 3.3 | 10 | 10 | 10 |
| Particle Size $D_{50}$ (nm) | 45.8 | 21.6 | 60.9 | 36.8 | 63.8 | 56.8 |
| Degree of Energy Applied (—) | 0.074 | 0.351 | 0.019 | 0.257 | 1 | 0.93 |

Note:
The processing amount in every case was 300 g, and the final concentration in the composition was made constant. The processing time in Examples 1 to 4 was a time required for processing 300 g material.

As shown in Table 17 (in the table, Examples 1 to 4 and Comparative Examples 1 to 2 shall be read as Examples J1 to J4 and Comparative Examples J1 to J2, respectively), the amount of energy required for forming liposomes in Examples in the present invention, as compared with Comparative Example J1, was about 1/14 for Example J1, about 1/3 for Example J2, about 1/53 for Example J3, and about 1/4 for Example J4. The amount of energy required for forming liposomes in Examples in the present invention, as compared with in Comparative Example J2 was about 1/13 for Example J1, about 1/3 for Example J2, about 1/49 for Example J3, and about 1/4 for Example J4. From this result, it can be seen that the production methods in Examples are excellent in energy efficiency.

EXAMPLE J5

While a solution prepared by mixing 22.1 g of conc. glycerin and a pH adjusting agent (aqueous solution of sodium hydroxide) with 853.5 g of injection water was sent as a first fluid from the center at a supply pressure/back pressure of 0.020 MPa/0.01 MPa and at a revolution number of 1000 rpm, a solution prepared by adding 5 mg of prostaglandin E1 to a mixed solution of 100 g of refined olive oil, 18 g of highly refined egg-yolk lecithin and 2.4 g of oleic acid and then dissolving it under stirring was introduced as a second fluid into the space between the processing surfaces 1 and 2 such that the first and second fluids were mixed and discharged at a rate of 50 ml/min. The processing time is 6 min. per 300 g material to be processed.

After processing, the solution was measured with a particle size distribution measuring instrument utilizing a laser diffraction/scattering method as measurement principle (trade name: SALD-7000, manufactured by Shimadzu Corporation), indicating that the (volume) average particle size was 70.4 nm.

EXAMPLE J6

While a solution prepared by mixing 22.1 g of conc. glycerin and a pH adjusting agent (aqueous solution of sodium hydroxide) with 853.5 g of injection water was sent as a first fluid from the center at a supply pressure/back pressure of 0.010 MPa/0.01 MPa and at a revolution number of 2000 rpm, a solution prepared by adding 5 mg of prostaglandin E1 to a mixed solution of 100 g of refined olive oil, 18 g of highly refined egg-yolk lecithin and 2.4 g of oleic acid and then dissolving it under stirring was introduced as a second fluid into the space between the processing surfaces 1 and 2 such that the first and second fluids were mixed and discharged at a rate of 50 ml/min. The processing time is 6 min. per 300 g material to be processed.

After processing, the solution was measured with a particle size distribution measuring instrument utilizing a laser diffraction/scattering method as measurement principle (trade name: SALD-7000, manufactured by Shimadzu Corporation), indicating that the (volume) average particle size was 38.3 nm.

EXAMPLE J7

While a solution prepared by mixing 22.1 g of conc. glycerin and a pH adjusting agent (aqueous solution of sodium hydroxide) with 853.5 g of injection water was sent as a first fluid from the center at a supply pressure/back pressure of 0.015 MPa/0.01 MPa and at a revolution number of 1500 rpm, a solution prepared by adding 5 mg of prostaglandin E1 to a mixed solution of 100 g of refined olive oil, 18 g of highly refined egg-yolk lecithin and 2.4 g of oleic acid and then dissolving it under stirring was introduced as a second fluid into the space between the processing surfaces 1 and 2 such that the first and second fluids were mixed and discharged at a rate of 50 ml/min. The processing time is 6 min. per 300 g material to be processed.

After processing, the solution was measured with a particle size distribution measuring instrument utilizing a laser diffraction/scattering method as measurement principle (trade name: SALD-7000, manufactured by Shimadzu Corporation), indicating that the (volume) average particle size was 68.5 nm.

EXAMPLE J8

While a solution prepared by mixing 22.1 g of conc. glycerin and a pH adjusting agent (aqueous solution of sodium hydroxide) with 853.5 g of injection water was sent as a first fluid from the center at a supply pressure/back pressure of 0.040 MPa/0.01 MPa and at a revolution number of 1500 rpm, a solution prepared by adding 5 mg of prostaglandin E1 to a mixed solution of 100 g of refined olive oil, 18 g of highly refined egg-yolk lecithin and 2.4 g of oleic acid and then dissolving it under stirring was introduced as a second fluid into the space between the processing surfaces 1 and 2 such that the first and second fluids were mixed and discharged at a rate of 100 ml/min. The processing time is 3 min. per 300 g material to be processed.

After processing, the solution was measured with a particle size distribution measuring instrument utilizing a laser diffraction/scattering method as measurement principle (trade name: SALD-7000, manufactured by Shimadzu Corporation), indicating that the (volume) average particle size was 70.1 nm.

COMPARATIVE EXAMPLE J3

6.65 g of conc. glycerin was added to and mixed with 257.08 g of injection water under stirring. Separately, 30.12 g of refined olive oil, 5.42 g of highly refined egg-yolk lecithin and 0.73 g of oleic acid were dissolved under stirring, and then 1.5 mg of prostaglandin E1 was added thereto and dissolved under stirring. The resulting solution was added to the previously prepared mixture of injection water and glycerin, then processed for 10 minutes at 18000 rpm with a rotor/17000 rpm with a screen in a homogenizer (trade name: CLEARMIX W Motion manufactured by M Technique Co., Ltd.) and adjusted to about pH 5 with sodium hydroxide to give a fat emulsion of prostaglandin E1.

After processing, the solution was measured with a particle size distribution measuring instrument utilizing a laser diffraction/scattering method as measurement principle (trade name: SALD-7000, manufactured by Shimadzu Corporation), indicating that the (volume) average particle size was 117.3 nm.

COMPARATIVE EXAMPLE J4

6.65 g of conc. glycerin was added to and mixed with 257.08 g of injection water under stirring. Separately, 30.12 g of refined olive oil, 5.42 g of highly refined egg-yolk lecithin and 0.73 g of oleic acid were dissolved under stirring, and then 1.5 mg of prostaglandin E1 was added thereto and dissolved under stirring. The resulting solution was added to the previously prepared mixture of injection water and glycerin and then processed for 6 minutes at 5000 rpm with an emulsifying/dispersing machine (SS5 manufactured by M Technique Co., Ltd.) such that the fluid was discharged at a rate of 50 ml/min. Thereafter, the fluid was adjusted to about pH 5 to give a fat emulsion of prostaglandin E1.

After processing, the solution was measured with a particle size distribution measuring instrument utilizing a laser diffraction/scattering method as measurement principle (trade name: SALD-7000, manufactured by Shimadzu Corporation), indicating that the (volume) average particle size was 109.5 nm.

As shown in Table 18 (in the table, Examples 5 to 8 and Comparative Examples 3 to 4 shall be read as Examples J5 to J8 and Comparative Examples J3 to J4, respectively), the amount of energy required for forming microemulsion in Examples in the present invention, as compared with Comparative Example J3, was about 1/20 for Example J5, about 1/3 for Example J6, about 1/6 for Example J7, and about 1/13 for Example J8. The amount of energy required for forming microemulsion in Examples in the present invention, as compared with Comparative Example J4, was about 1/11.2 for Example J5, about 1/1.4 for Example J6, about 1/3.3 for Example J7, and about 1/7.0 for Example J8. From this result, it can be seen that the production methods in Examples are excellent in energy efficiency.

EXAMPLES J9 TO J21

Then, the difference in the particle size of the biologically ingestible material due to a difference between introduction temperature and cooling temperature after processing was verified.

A fluid having 1.2 g of hydrogenated soybean lecithin dispersed in 10 g of soybean oil, and a fluid having 25 g of glycerin dissolved in 863 g of purified water, were subjected as oil phase and water phase respectively under the conditions shown in Table 19 (in the table, Examples 9 to 21 shall be read as Examples J9 to J21, respectively). The oil phase is allowed to flow into the water phase in a thin film fluid formed between the processing surfaces 1 and 2 arranged to be opposite to each other so as to be able to approach to and separate from each other, at least one of which rotates relative to the other, thereby emulsifying and dispersing the mixture under uniform mixing in the thin film.

TABLE 19

| | Introduction Temperature (° C.) | Cooling Temperature (° C.) | Number of Revolutions (rpm) | Discharge Amount (g/min) |
|---|---|---|---|---|
| Example 9 | 40 | 35 | 5000 | 30 |
| Example 10 | 53 | 35 | | |
| Example 11 | 58 | 35 | | |
| Example 12 | 68 | 35 | | |
| Example 13 | 78 | 35 | | |
| Example 14 | 98 | 35 | | |
| Example 15 | 100 | 35 | | |
| Example 16 | 68 | 25 | | |
| Example 17 | 68 | 40 | | |
| Example 18 | 58 | 50 | | |

TABLE 18

| | Example 5 | Example 6 | Example 7 | Example 8 | Comparative Example 3 | Comparative Example 4 |
|---|---|---|---|---|---|---|
| Number of Revolutions (rpm) | 1000 | 2000 | 1500 | 1500 | 18000/17000 | 5000 |
| Processing Time (min) | 6 | 6 | 6 | 3 | 10 | 6 |
| Particle Size $D_{50}$ (nm) | 70.4 | 38.3 | 68.5 | 70.1 | 117.3 | 109.5 |
| Degree of Energy Applied (—) | 0.05 | 0.40 | 0.17 | 0.08 | 1 | 0.56 |

Note:
The processing amount in every case was 300 g, and the final concentration in the composition was made constant. The processing time in Examples 5 to 8 was a time required for processing 300 g material.

TABLE 19-continued

|  | Introduction Temperature (° C.) | Cooling Temperature (° C.) | Number of Revolutions (rpm) | Discharge Amount (g/min) |
|---|---|---|---|---|
| Example 19 | 68 | 50 | | |
| Example 20 | 98 | 50 | | |
| Example 21 | 100 | 50 | | |

*The phase transition temperature of hydrogenated soybean lecithin is about 53° C.

The measurement results of the particle size are shown in Table 20 (in the table, Examples 9 to 21 shall be read as Examples J9 to J21, respectively).

TABLE 20

|  | Particle Size $D_{50}$ (nm) |
|---|---|
| Example 9 | 568.7 |
| Example 10 | 263.5 |
| Example 11 | 84.6 |
| Example 12 | 72.9 |
| Example 13 | 78.5 |
| Example 14 | 69.4 |
| Example 15 | 326.8 |
| Example 16 | 70.8 |
| Example 17 | 139.6 |
| Example 18 | 385.7 |
| Example 19 | 368.9 |
| Example 20 | 376.9 |
| Example 21 | 584.3 |

(K) Resin Microparticles

Hereinafter, production of resin microparticles according to the present invention is described.

Resin microparticles are formed by forced uniform mixing between the processing surfaces 1 and 2 arranged to be opposite to each other so as to be able to approach to and separate from each other, at least one of which rotates relative to the other, in the apparatus shown in FIG. 1(A).

First, a fluid containing at least one kind of aqueous solvent is introduced as a first fluid through one flow path, that is, the first introduction part d1 into the space between the processing surfaces 1 and 2 arranged to be opposite to each other so as to be able to approach to and separate from each other, at least one of which rotates relative to the other, thereby forming a first fluid film between the processing surfaces.

Then, a fluid wherein at least one kind of resin is dissolved, preferably dispersed in a molecular state, in a solvent solubilizing, and compatible with, the resin is introduced as a second fluid directly through another flow path, that is, the second introduction part d2 into the first fluid film produced between the processing surfaces 1 and 2.

As described above, a thin film fluid is formed between the processing surfaces 1 and 2, the distance of which is regulated by the pressure balance between the supply pressure of the fluid and the pressure exerted between the rotating processing surfaces. Then, the first fluid and the second fluid are allowed to flow together in this thin film fluid to form a thin film fluid. The first fluid and the second fluid are allowed to flow together and mixed to form resin microparticles by separation or emulsification. Usually, a surfactant is added to the first or second fluid to give a resin microparticle liquid dispersion having resin microparticles dispersed in a water phase. The processing in the present invention may or may not be accompanied by resin phase transition.

The "emulsification" includes a step of preparing resin emulsion particles by joining the first and second fluids together in a thin film fluid between the processing surfaces and then emulsifying a resin dissolved (dispersed in a molecular state) in the thin film fluid. When the prepared resin emulsion particles are resin microparticles themselves, or when the resin emulsion particles are removed by removing the solvent from the fluid containing the resin emulsion particles, water dispersion of the resin microparticles, and resin microparticles, can also be obtained from the resin emulsion particles.

To effect the preparation of the resin microparticles between the processing surfaces 1 and 2, the second fluid may be introduced through the first introduction part d1 and the first fluid through the second introduction part d2, as opposed to the above description. That is, the expression "first" or "second" for each fluid has a meaning for merely discriminating an $n^{th}$ fluid among a plurality of fluids present, and third or more fluids can also be present.

The particle size, or monodispersity of the obtained resin microparticles can be regulated by changing the number of revolutions of the processing surfaces 1 and 2, the distance between the processing surfaces 1 and 2 and the flow rate and temperature of the thin film fluid, and the concentration of materials. As described above, monodisperse resin microparticles having a smaller volume-average particle size that those obtained by the previous reaction methods can be obtained. Further, resin microparticles can be continuously and efficiently obtained with high production efficiency to cope with large-scale production. Depending on a necessary amount of production, the processing apparatus of the present invention can grow in size by using general scale-up concept. The resin microparticles can be obtained uniformly with low energy.

The solvent in which the resin is dissolved and dispersed in a molecular state is not particularly limited as long as it shows solubility and compatibility for the resin. As specific solvent, toluene, ethyl acetate, butyl acetate, methyl ethyl ketone, and methyl isobutyl ketone can be used singly or as a mixture of two or more thereof.

The aqueous solvent used in the present invention may be water alone or a mixture of water and a miscible solvent. The miscible solvent includes alcohols (methanol, isopropanol, ethylene glycol, and the like).

In place of the fluid in which a resin is dissolved or dispersed in a molecular state in the solvent with which the resin is soluble and compatible, a fluid containing at least one kind of molten resin may be used. That is, the molten resin can be emulsified and dispersed in a thin film fluid and then solidified. The fact that a resin is molten means that, for example, a crystalline resin when heated to a temperature higher than the melting point shows properties as liquid fluid. When a resin such as an amorphous resin is molten, the resin upon heating to a temperature which is generally higher than the glass transition point begins to decrease the viscosity thus showing behavior as fluid. On this occasion, the resin may be molten by itself or in a solvent with which the resin is not soluble or compatible. The solidification of the resin has an opposite meaning to melting. The molten resin can thereby be heated and molten just before emulsification/dispersion treatment and then cooled after the treatment, so that the treatment can be effected in a short time, the heat history (=the sum total of (temperature×time)) on resin can be substantially decreased, and thus the risk of resin hydrolysis can be reduced. Accordingly, the temperature of the emulsification/dispersion treatment can be made higher than in conventional production methods. Therefore, the resin viscosity can be further reduced in emulsion/dispersion treatment, and as a result, the objective particle size distribution can be obtained with low energy. When the molten resin is separated or emulsified/dispersed at high temperatures, the quantity possessed is so small that the apparatus can be reduced in size, is easily handled and is highly safe.

The step of preliminarily mixing the resin in an aqueous solvent, which has been essential for gradually pulverizing resin particles in the existing techniques, can be omitted according to the method for producing the resin microparticle liquid dispersion of the present invention. That is, before the fluid is introduced between the processing surfaces 1 and 2, the present invention does not need the preliminarily mixing step of previously mixing the resin in an aqueous solvent such that the resin is dispersed in the state of coarse particles in the aqueous solvent, and each fluid can be introduced as such into the apparatus. Accordingly, there are advantages that the process can be simplified, the reduction in yield due to a complex process can be prevented, the heat history of resin generated during preliminary mixing can be omitted, and the risk of resin hydrolysis can be reduced. Prior to introduction of the fluid into the space between the processing surfaces 1 and 2, mixing of the resin in a part of the aqueous solvent in the first or second fluid does not correspond to "preliminary mixing". This is because this treatment is a treatment for supplying the resin with behavior as fluid and does not correspond to treatment for gradually pulverizing resin particles as in the prior art.

However, the production method of the present invention does not completely exclude the preliminarily mixing step. Accordingly, the same preliminarily mixing step as conventional may be arranged.

The processing surfaces can be cooled or heated thereby obtaining desired resin microparticles. Particularly, when a difference in temperature is set between the first processing surface 1 and the second processing surface 2, there is an advantage that since convection can be generated in a thin film fluid, the forced uniform mixing between the processing surfaces 1 and 2 can further be promoted.

In addition, the space between the processing surfaces may be irradiated with ultraviolet ray (UV), depending on the object.

The separation or emulsification/dispersion processing is conducted in a container capable of securing a depressurized or vacuum state, and a secondary side at which the fluid (resin microparticle liquid dispersion) after processing is discharged is depressurized or made vacuous, thereby being able to remove a gas generated when the fluids join together in the thin film fluid and a gas contained in the fluid, or to remove the solvent of the fluid. By doing so, the resin microparticle-containing fluid between the processing surfaces is discharged in an atomized state from the processing surfaces, even when processing of removal of the solvent is conducted simultaneously with the separation or emulsification/dispersion processing, so that the surface area of the fluid is increased, and the efficiency of removal of the solvent is extremely high. Accordingly, separation or emulsification/dispersion processing and removal of the solvent can be effected in substantially one step more easily than conventional.

The separation or emulsification/dispersion processing can be conducted in a container capable of temperature regulation to cool e.g. the fluid (resin microparticle liquid dispersion) just after being discharged, thereby solidifying the molten resin. By doing so, the resin microparticles obtained by the separation or emulsification/dispersion processing can be rapidly cooled to a stable temperature range for the microparticles, that is, to a temperature lower than the melting point or lower than the glass transition point. Alternatively, the container may be heated to improve the efficiency of solvent removal and gas removal.

As the resin, any resins can be used. Examples of such resins include vinyl polymerizing thermoplastic resins (styrene resin, olefin resin, acrylic resin, halogen-containing resin, vinyl ester resin or derivatives thereof), condensed thermoplastic resins (polyester resin, polyamide resin, polyurethane resin, poly(thio)ether resin, polycarbonate resin, polysulfone resin, polyimide resin, and the like), natural product-derived resins (cellulose ester resin and the like), and epoxy resin. These resins may be singly or as a mixture of two or more thereof. The resin may be crystalline or amorphous.

The styrene resin includes homopolymers or copolymers (polystyrene, styrene-vinyl toluene copolymer, styrene-α-methyl styrene copolymer, and the like) of styrene monomers (styrene, α-methyl styrene, vinyl toluene, and the like), styrene monomer/copolymerizable monomer copolymers (styrene-acrylonitrile copolymer (AS resin), (meth)acrylate-ester-styrene copolymer (MS resin and the like), styrene-maleic anhydride copolymer, block copolymers such as styrene-butadiene block copolymer, graft polymers (impact-resistant polystyrene (HIPS, or rubber graft polystyrene resin)) produced by graft polymerization of at least styrene monomers in the presence of a rubber component, acrylonitrile-butadiene-styrene copolymer (ABS resin), graft copolymers (AXS resins such as AES resin, AAS resin and ACS resin) wherein rubber components such as ethylene propylene rubber E, acryl rubber A, chlorinated polyethylene C, and vinyl acetate polymer are used in place of butadiene rubber B of the ABS resin, and graft copolymers (methyl methacrylate-butadiene rubber-styrene copolymer (MBS resin) and the like) wherein (meth)acrylate monomers (methyl methacrylate and the like) are used in place of acrylonitrile of the ABS resin.

The olefin resin includes homopolymers or copolymers of α-C2-6 olefins, for example homopolymers or copolymers of olefins, such as polyethylene, polypropylene, ethylene-propylene copolymer, and poly(methylpentene-1), and copolymers of olefin and copolymerizable monomers (ethylene-vinyl acetate copolymer, ethylene-(meth)acrylic acid copolymer, ethylene-(meth)acrylate-ester copolymer, and the like).

The acrylic resin includes homopolymers or copolymers of (meth)acrylic monomers ((meth)acrylic acid, C1-C18 alkyl (meth)acrylate ester, hydroxyalkyl(meth)acrylate, glycidyl (meth)acrylate, (meth)acrylonitrile, and the like): for example, poly(meth)acrylate esters, e.g. methyl poly(meth) acrylate, methyl methacrylate-(meth)acrylic acid copolymers, methyl methacrylate-acrylate ester-(meth)acrylic acid copolymer, methyl methacrylate-(meth)acrylate ester copolymer, and (meth)acrylate ester-styrene copolymer (MS resin and the like).

The halogen-containing resin includes, for example, polyvinyl chloride resin, vinyl chloride-vinyl acetate copolymer, vinylidene chloride resin, and fluorine resin. The vinyl ester resin or its water-insoluble derivatives include, for example, homopolymers or copolymers of carboxylic acid vinyl ester (polyvinyl acetate, ethylene-vinyl acetate copolymer, and the like), their saponification products (vinyl alcohol resins such as polyvinyl alcohol with a saponification degree of 50% or less and ethylene-vinyl alcohol copolymer), and derivatives (for example, polyvinyl acetal resins such as polyvinyl formal and polyvinyl butyral) from saponification products (vinyl alcohol resins).

The polyester resin includes various resins using a dicarboxylic acid component, a diol component, oxycarboxylic acid, and lactones: for example, poly C2-6 alkylene-arylate resins such as polyethylene terephthalate, poly(trimethylene terephthalate), polypropylene terephthalate, polybutylene terephthalate, poly(1,4-cyclohexyl dimethylene terephthalate), polyethylene naphthalate and polybutylene naphthalate; copolyesters containing C2-6 alkylene-arylate units as major (for example, 50% by weight or more) component (e.g. copolyesters whose copolymerizable components are polyoxy C2-4 alkylene diols having an oxyalkylene unit, or asymmetric aromatic dicarboxylic acids such as C6-12 aliphatic dicarboxylic acids, isophthalic acid, phthalic acid and the like); polyarylate resins; aromatic polyester resins such as liquid crystalline polyesters; poly(C2-6 alkylene glycol-C2-10 aliphatic dicarboxylic acid ester) such as poly C2-6 alkylene-oxalate, poly C2-6 alkylene-succinate and poly C2-6 alkylene-adipate; polyoxycarboxylic acid resins (for example, polyglycolic acid, polylactic acid and glycolic acid-lactic acid copolymer); polylactone resins (for example, poly C3-12 lactone resins such as polycaprolactone); and copolyesters thereof (for example, polycaprolactone-polybutylene succinate copolymer resin). The polyester resins may contain urethane linkages. Further, the polyester resins may have biodegradability.

The polyamide resins include, for example, aliphatic polyamide resins (e.g. polyamide 46, polyamide 6, polyamide 66, polyamide 11, polyamide 12, polyamide 610, polyamide 612, polyamide 1010, polyamide 1012, and polyamide 1212), copolyamides (e.g. polyamide 6/11, polyamide 6/12, polyamide 66/11, and polyamide 66/12), alicyclic polyamide resins, and aromatic polyamide resins. A dicarboxylic acid component in the polyamide resins may contain a dimer acid unit. The polyamide resins may have biodegradability.

The polyurethane resins include, for example, diisocyanates (aliphatic diisocyanates such as hexamethylene diisocyanate; alicyclic diisocyanates such as 1,4-cyclohexane diisocyanate and isophorone diisocyanate; aromatic diisocyanates such as tolylene diisocyanate, diphenyl methane-4,4'-diisocyanate and 1,5-naphthalene diisocyanate or hydrogenerated diisocyanates thereof; and aromatic aliphatic diisocyanates such as xylylene diisocyanate or hydrogenerated diisocyanates thereof), polyols (for example, polyester polyols, polyether polyols such as polytetramethylene ether glycol, and polycarbonate polyols), and polyurethane resins obtained by reacting with a chain elongation agent, if necessary.

The poly(thio)ether resins include, for example, polyoxyalkylene resins (stabilized polyoxymethylene glycol or homo- or co-polyacetal resins, and polyoxy C1-4 alkylene diols such as polyoxypropylene glycol and polyoxy tetramethylene glycol), polyphenylene ether resins, polyphenylene ether ketone resins, polysulfide resins (polythioether resins such as polyphenylene sulfide or copolymers thereof), polyether ketone resins (including polyether ether ketone resins), and the like.

The polycarbonate resins include bisphenol-based aromatic polycarbonates such as bisphenol A-type polycarbonate resins, and aliphatic polycarbonates such as diethylene glycol bisallyl carbonate.

The polysulfone resins can be exemplified by polysulfone resin, polyether sulfone resin, polyaryl sulfone resin, and the like. The polyimide resins can be exemplified by polyether imide resin, polyamide imide resin, polybenzimidazole resin, and the like.

The cellulose derivatives include cellulose esters (for example, cellulose acetates (acetate cellulose) such as cellulose diacetate and cellulose triacetate, acyl celluloses such as cellulose propionate, cellulose butyrate, cellulose acetate propionate and cellulose acetate butyrate, inorganic acid esters of cellulose, and the like), and cellulose carbamates (cellulose phenyl carbamate, and the like). If necessary, for example, alkyl celluloses such as ethyl cellulose, isopropyl cellulose and butyl cellulose, aralkyl celluloses such as benzyl cellulose, and cyanoethyl cellulose may be used as water-insoluble cellulose ethers.

The thermoplastic resins include thermoplastic elastomers (for example, polyamide elastomer, polyester elastomer, polyurethane elastomer, polystyrene elastomer, polyolefin elastomer, polyvinyl chloride elastomer and fluorine thermoplastic elastomer), thermoplastic silicone resins, and natural resins or derivatives thereof.

The epoxy resins include a ring opening polymerization product of polyepoxide (19), a polyaddition product between polyepoxide (19) and an active hydrogen group-containing compound (D) {water, polyol [the diol (11) and trivalent or more polyol (12)], dicarboxylic acid (13), trivalent or more polycarboxylic acid (14), polyamine (16), polythiol (17) and the like}, and a cured product between polyepoxide (19) and an acid anhydride of dicarboxylic acid (13) or trivalent or more polycarboxylic acid (14).

Preferable among these resins are, for example, styrene resins, olefin resins, acrylic resins, halogen-containing resins, vinyl ester resins or derivatives thereof (polyvinyl acetal resin and the like), polyester resins, polyamide resins, polyurethane resins, poly(thio)ether resins, polycarbonate resins, polysulfone resins, polyimide resins, cellulose ester resins (acetate cellulose resin and the like), and epoxy resins. Also, preferable are biodegradable resins like biodegradable polyester resins such as aliphatic polyester resins (for example, polylactic acid resins and poly C3-12 lactone resins) and polyester amide, vinyl alcohol resins, and aforementioned cellulose derivatives.

These resins may be colorant-containing kneaded resins.

As the colorant, every dye and pigment known in the art can be used. Examples of the colorant that can be used include carbon black, nigrosine dye, iron black, naphthol yellow S, hansa yellow (10G, 5G, G), cadmium yellow, yellow iron oxide, yellow ocher, chrome yellow, titanium yellow, polyazo yellow, oil yellow, hansa yellow (GR, A, RN, R), pigment yellow L, benzidine yellow (G, GR), permanent yellow (NCG), Vulcan Fast Yellow (5G, R), tartrazine lake, quinone yellow lake, Anthrazane Yellow BGL, isoindolinone yellow, bengara, colcothar, red lead, cadmium red, cadmium mercury red, antimony red, permanent red 4R, Para Red, Fire Red, para chloro ortho nitro aniline red, Lithol Fast Scarlet Brilliant Fast Scarlet, Brilliant Carmine BS, Permanent Red (F2R, F4R, FRL, FRLL, F4RH), Fast Scarlet VD, Vulcan Fast Rubine B, Brilliant Scarlet Lithol Rubine GX, Permanent Red FSR, Brilliant Carmine 6B, Pigment Scarlet 3B, Bordeaux 5B, toluidine maroon, Permanent Bordeaux F2K, Helio Bordeaux BL, Bordeaux 10B, Bon Maroon Light, Bon Maroon Medium, eosin lake, rhodamine lake B, rhodamine lake Y, alizarin lake, thio indigo red B, thio indigo maroon, oil red, quinacridone red, pyrazolone red, polyazo red, chrome vermilion, benzidine orange, perinone orange, oil orange, cobalt blue, cerulean blue, alkali blue lake, peacock blue lake, Victoria blue lake, metal-free phthalocyanine blue, phthalocyanine blue, Fast Sky Blue, indanthrene blue (RS, BC), indigo, ultramarine blue, Prussian blue, anthraquinone blue, Fast Violet B, methyl violet lake, cobalt violet, manganese violet, dioxane violet, anthraquinone violet, chrome green, zinc green, chrome oxide, viridian, emerald green, pigment green B, naphthol green B, green gold, acid green lake, malachite green lake, phthalocyanine green, anthraquinone green, titanium oxide, zinc white, lithopone, and mixtures thereof.

At least one of the fluids may contain a dispersant. The dispersant is not particularly limited. The dispersant in an aqueous solvent includes water-soluble resins such as polyvinyl alcohol, polyethylene glycol, polyethylene oxide, polyvinyl pyrrolidone, water-soluble acrylic resin, water-soluble styrene resin and cellulose ether resin, and water-soluble saccharide compositions that contain oligosaccharide. In other solvents, known surfactants can be used and a dispersion stabilizer selected from a cationic surfactant, an anionic surfactant, a nonionic surfactant, and the like can be used. These surfactants may be used as a mixture of two or more thereof.

Specific examples of the cationic surfactant include dodecyl ammonium chloride, dodecyl ammonium bromide, dodecyl trimethyl ammonium bromide, dodecyl pyridinium chloride, dodecyl pyridinium bromide, hexadecyl trimethyl ammonium bromide, and the like.

Specific examples of the anionic surfactant include sulfonates (sodium dodecylbenzene sulfonate, sodium arylalkyl polyether sulfonate, 3,3-disulfone diphenyl urea-4,4-diazo-bis-amino-8-naphthol-6-sodium sulfonate, ortho-carboxybenzene-azo-dimethylaniline, 2,2,5,5-tetramethyl-triphenyl-methane-4,4-diazo-bis-β-naphthol-6-sodium sulfonate, and the like), sulfate esters (sodium dodecyl sulfate, sodium tetradecyl sulfate, sodium pentadecyl sulfate, sodium octyl sulfate, and the like) and fatty acid salts (sodium oleate, sodium laurate, sodium caprate, sodium caprylate, sodium caproate, potassium stearate, calcium oleate, and the like).

The nonionic surfactants include polyethylene oxide, polypropylene oxide, a combination of polypropylene oxide and polyethylene oxide, an ester between polyethylene glycol and higher fatty acid, alkyl phenol polyethylene oxide, an ester between higher fatty acid and polyethylene glycol, an ester between higher fatty acid and polypropylene oxide, sorbitan ester, and the like.

When a water dispersion of polyester resin into which carboxyl groups were introduced is prepared, a part or the whole of polar groups such as carboxyl groups on the surface of the dispersion may be contained in the fluid to stabilize the fluid by neutralization with the dispersion.

The basic substance that can be used in the neutralization includes, for example, amine compounds represented by ammonia and triethylamine and inorganic bases represented by sodium hydroxide, potassium hydroxide and lithium hydroxide.

Specific examples of the amine compounds include ammonia, monomethylamine, dimethylamine, trimethylamine, monoethylamine, diethylamine, triethylamine, mono-n-propylamine, dimethyl-n-propylamine, monoethanolamine, diethanolamine, triethanolamine, N-methanolamine, N-aminoethylethanolamine, N-methyldiethanolamine, monoisopropanolamine, diisopropanolamine, triisopropanolamine, N,N-dimethylethanolamine, and N,N-dimethylpropanolamine. Preferable among them are triethylamine, monoethanolamine, diethanolamine, triethanolamine, N,N-dimethylethanolamine, and N,N-dimethylpropanolamine. These amine compounds may be used as a mixture of two or more thereof.

When the resulting resin is used in an electrophotographic toner, a fluid containing at least one member selected from the above-mentioned colorant, an electrification regulator, a release agent, an external additive, a magnetic carrier, and electrically conductive powders may be used in the fluid in the method for producing the resin microparticles.

As the release agent, wax is preferably used. The wax may be known one. Examples of the wax include carbonyl group-containing wax, for example, polyolefin wax (polyethylene wax, polypropylene wax, and the like), long-chain hydrocarbons (paraffin wax, Sasol wax, and the like), polyalkanoic acid esters (carnauba wax, montan wax, trimethylol propane tribehenate, pentaerythritol tetrabehenate, pentaerythritol diacetate dibehenate, glycerin tribehenate, 1,18-octadecanediol distearate, and the like), polyalkanol esters (tristearyl trimellitate, distearyl maleate, and the like), polyalkanoic acid amides (ethylenediamine dibehenyl amide and the like), polyalkyl amides (tristearyl trimellitate amide and the like), and dialkyl ketones (distearyl ketone and the like).

The electrification regulator used may be known one. Examples of the electrification regulator include nigrosine dyes, triphenylmethane dyes, chrome-containing metal complex dyes, molybdate chelate pigments, rhodamine dyes, alkoxy amines, quaternary ammonium salts (including fluorine-modified quaternary ammonium salts), alkyl amides, phosphorus element or compound, tungsten element or compound, fluorine activators, metal salicylate and metal salts of salicylic acid derivatives.

Specific examples include nigrosine dye Bontron 03, quaternary ammonium salt Bontron P-51, metal-containing azo dye Bontron S-34, oxynaphthoate metal complex E-82, salicylate metal complex E-84 and phenol condensate E-89 (manufactured by Orient Chemical Industries Co., Ltd.), quaternary ammonium salt molybdenum complexes TP-302 and TP-415 (manufactured by Hodogaya Chemical Co., Ltd.), quaternary ammonium salt Copy Charge PSY VP2038, triphenylmethane derivative Copy Blue PR, quaternary ammonium salt Copy Charge NEG VP2036, Copy Charge NX VP434 (manufactured by Hoechst AG), LRA-901, boron complex LR-147 (manufactured by Japan Carlit Co., Ltd.), copper phthalocyanine, perylene, quinacridone, azo pigment, and other polymer compounds having functional groups such as sulfonic acid group, carboxyl group and quaternary ammonium salt.

As the external additive, inorganic microparticles can be preferably used. Specific examples of the inorganic microparticles include, for example, silica, alumina, titanium oxide, barium titanate, magnesium titanate, calcium titanate, strontium titanate, zinc oxide, tin oxide, siliceous sand, clay, mica, tabular spar, diatomaceous earth, chromium oxide, cerium oxide, colcothar, antimony trioxide, magnesium oxide, zirconium oxide, barium sulfate, barium carbonate, calcium carbonate, silicon carbide and silicon nitride.

Other polymer microparticles include, for example, those obtained by soap-free emulsion polymerization, suspension polymerization and dispersion polymerization: for example, polystyrene, methacrylate esters and acrylate ester copolymers, polycondensation products such as silicone, benzoguanamine and nylon, and polymer particles of thermosetting resin. Such fluidizers may be surface-treated to increase hydrophobicity and can prevent deterioration in flow characteristics and electrification characteristics even under high humidity. Preferable examples of surface treatment agents include silane coupling agents, silylating agents, silane coupling agents having an alkyl fluoride group, organic titanate coupling agents, aluminum coupling agents, silicone oil and modified silicone oil.

As for magnetic carriers, conventionally known ones such as iron powder, ferrite powder, magnetite powder and magnetic resin carriers can be used. And, as for the covering materials, included are amino resins: for example, urea-formaldehyde resin, melamine resin, benzoguanamine resin, urea resin and polyamide resin.

The electrically conductive powder that can be used includes metal powder, carbon black, titanium oxide, tin oxide and zinc oxide.

As the fluid in the method for producing the resin microparticles, a fluid containing silver nanoparticles can be used.

Silver microparticle-containing resin microparticles having silver nanoparticles dispersed uniformly in a resin structure can be prepared to confer an antibacterial effect on resin products.

In this manner, a dispersion (suspension) of resin microparticles having a volume-average particle size of 1 nm to 10000 nm, preferably 10 nm to 800 nm, more preferably 40 nm to 500 nm can be prepared.

As described above, the processing apparatus can be provided with a third introduction part d3 in addition to the first introduction part d1 and the second introduction part d2. In this case, a resin solution, a surfactant solution, and a colorant for example can be introduced separately through the respective introduction parts into the processing apparatus. By doing so, the concentration and pressure of each solution can be separately controlled, and the reaction of forming resin microparticles can be regulated more accurately. When the processing apparatus is provided with four or more introduction parts, the foregoing applies and fluids to be introduced into the processing apparatus can be subdivided in this manner.

Hereinafter, the present invention is described in detail with reference to Examples, but the present invention is not limited to Examples.

A resin solution or resin liquid dispersion is allowed to flow into an aqueous solvent in a thin film fluid between the processing surfaces 1 and 2 arranged to be opposite to each other so as to be able to approach to and separate from each other, at least one of which rotates relative to the other, in use of a uniformly stirring and mixing reaction apparatus shown in FIG. 1(A), thereby uniformly mixing them in the thin film.

In following Examples, the term "from the center" means "through the first introduction part d1" in the processing apparatus shown in FIG. 1(A), the first fluid refers to the first processed fluid, and the second fluid refers to the second processed fluid introduced "through the second introduction part d2" in the processing apparatus shown in FIG. 1(A). The term "part" refers to "parts by weight".

(Volume-Average Particle Size)

Particle size distribution was measured with a particle size distribution measuring instrument utilizing a laser Doppler method (trade name: Microtrac UPA150, manufactured by Nikkiso Co., Ltd.), and volume-average particle size was used.

EXAMPLE K1

A glass flask equipped with a stirrer, a distillation column, a thermometer and a nitrogen inlet was charged with 8 moles of neopentyl glycol, 4 moles of ethylene glycol and 8 moles of terephthalic acid. The flask was heated in a nitrogen stream to 180° C. in a mantle heater, a polymerization initiator (titanium tetrabutoxide) in an amount of 0.14% based on the total amount of the acid and alcohol components charged was added, and the mixture was reacted by heating under stirring. The progress of the reaction was monitored by measuring the acid value, and when a predetermined acid value was reached, the reaction was finished to give a polyester resin having a weight-average molecular weight of 650, a Tg of 56° C., a Tm of 103° C. and an acid value of 3.2.

While an aqueous solvent (1% dodecyl sodium sulfate aqueous solution) was sent as a first fluid from the center at a supply pressure/back pressure of 0.20 MPa/0.01 MPa and at a revolution number of 500 rpm, 5% polyester resin ethyl acetate solution using the above polyester resin was introduced at a rate of 10 ml/min. as a second fluid into the space between the processing surfaces 1 and 2 such that the first and second fluids were mixed and discharged at a rate of 30 ml/min. A polyester resin microparticle dispersion having a volume-average particle size of 45.2 nm was obtained.

EXAMPLES K2 TO K4

In Examples K2 to K4, the same polyester resin ethyl acetate solution and aqueous solvent as in Example K1 were used, and the number of revolutions, supply pressure and the flow rate of the discharge were changed, whereby polyester resin microparticle dispersions were obtained.

EXAMPLE K5

While an aqueous solvent (1% dodecyl sodium sulfate/ 0.5% polyvinyl alcohol aqueous solution) was sent as a first fluid from the center at a supply pressure/back pressure of 0.60 MPa/0.45 MPa and at a revolution number of 500 rpm, a softened polyester resin liquid dispersion prepared by mixing 210 g of polyester resin (weight average molecular weight 16,000, softening temperature=105° C.) in 490 g of ion-exchange water (this "mixing" does not correspond to conventional "preliminary mixing") and then heating the resulting polyester resin liquid dispersion to 150° C. just before introduction to soften the resin (30% softened polyester resin liquid dispersion) was introduced as a second fluid at 10 ml/min. into the space between the processing surfaces 1 and 2. A polyester resin microparticle dispersion having a volume-average particle size of 63.1 nm was obtained.

EXAMPLES K6 TO K8

In Examples K6 to K8, polyester resin microparticle dispersions were obtained using the same softened polyester resin in ion-exchange water (softened polyester resin liquid dispersion) and the same aqueous solvent as in Example K5 by changing the number of revolutions, the supply pressure, and the flow rate of the discharge.

EXAMPLE K9

While an aqueous solvent (0.7% sodium diisooctyl sulfosuccinate (trade name: AOT, Wako Pure Chemical Industries, Ltd.)/99.3% deionized water) was sent as a first fluid from the center at a supply pressure/back pressure of 0.15 MPa/0.01 MPa and at a revolution number of 1000 rpm, 0.4% polystyrene (PS) (trade name: Polystyrene, manufactured by Sigma-Aldrich Co.,)/99.6% tetrahydrofuran (THF) (also called "PS solution") was introduced as a second fluid at 10 ml/min. into the space between the processing surfaces 1 and 2, and the mixture was mixed and emulsified such that the amount of the discharge became 20 g/min., to give a polyester resin microparticle dispersion having a volume-average particle size of 58.3 nm.

EXAMPLES K10 TO K12

In Examples K10 to K12, polyester resin microparticle dispersions were obtained using the same PS solution and the same aqueous solvent as in Example K9 by changing the number of revolutions, the supply pressure, and the flow rate of the discharge.

COMPARATIVE EXAMPLE

Using the same polyester resin ethyl acetate solution and the same aqueous solvent as in Example K1, the polyester resin ethyl acetate solution was suspended in the aqueous solvent with CLEARMIX (manufactured by M Technique Co., Ltd.) to prepare a polyester resin microparticle dispersion. At this time, the number of revolutions with CLEARMIX was 20000 rpm, and stirring was conducted for 30 minutes. A polyester resin microparticle dispersion having a volume-average particle size of 105.4 nm was obtained.

The results are shown in Table 21 (in the table, Examples 1 to 12 shall be read as Examples K1 to K12 and Comparative, respectively).

other. For example, when the continuous phase or dispersed phase is a water phase (water, ethanol, a buffer solution and a mixture thereof), the other becomes an organic phase (oil phase) substantially insoluble in water. In the present invention, the reaction may involve phase transition.

The dispersed phase liquid may be slurry containing solids such as microparticles or a mixed solution comprising a plurality of liquids. Particularly when slurry containing solids such as microparticles is used as a first fluid, it can flow into a second fluid to form an emulsion between the processing

TABLE 21

| Example | First Fluid | Second Fluid | Number of Revolutions [rpm] | Supply Pressure [MPaG] | Discharge Amount [g/min] | Volume-Average Primary Particle Size [nm] |
|---|---|---|---|---|---|---|
| 1 | 1% dodecyl sodium sulfate aqueous solution | 5% polyester resin ethyl acetate solution | 500 | 0.2 | 30 | 45.2 |
| 2 | | | | 0.4 | 50 | 66.5 |
| 3 | | | 1000 | 0.4 | 50 | 32.1 |
| 4 | | | 2000 | | 50 | 29.9 |
| 5 | 1% dodecyl sodium sulfate/0.5 polyvinyl alcohol aqueous solution | 30% softened polyester resin liquid dispersion | 500 | 0.6 | 50 | 63.1 |
| 6 | | | 1000 | | | 44.8 |
| 7 | | | 2000 | | | 53.1 |
| 8 | | | 3000 | | | 74.1 |
| 9 | 0.7% AOT/deionized water 99.3% solution | 0.4% polystyrene/tetrahydrofuran solution | 1000 | 0.15 | 20 | 58.3 |
| 10 | | | | 0.22 | 52 | 71.8 |
| 11 | | | 3000 | 0.4 | 50 | 28.3 |
| 12 | | | 4000 | | 50 | 46.2 |
| Comparative Example | 1% dodecyl sodium sulfate aqueous solution | 5% polyester resin ethyl acetate solution | 20000 | — | — | 105.4 |

The amount of energy necessary for obtaining the resin microparticles in Examples was not higher than $1/10$ relative to that in Comparative Example, although the volume-average particle size was made smaller in Examples. From this result, it was found that the production method in Examples is superior in energy efficiency.

(L) Emulsion

Hereinafter, the procedures of obtaining an emulsion are described.

Specifically, a liquid forming a continuous phase and a liquid forming dispersed phase are kept in independent states and passed as first and second fluids, respectively, through their corresponding independent flow paths into the space between the processing surfaces 1 and 2 arranged to be opposite to each other so as to be able to approach to and separate from each other, at least one of which rotates relative to the other, thereby forming a thin film fluid between the processing surfaces and mixing the fluids in the thin film fluid to emulsion particles having a desired particle size. When the first fluid is a water phase, the second fluid as an oil phase is mixed as a dispersed phase in the water phase as a continuous phase and removed as an O/W dispersion from the space between the processing surfaces. When the first fluid is an oil phase, the second fluid serves as a water phase, and the mixture is removed as a W/O dispersion from the space between the processing surfaces.

The dispersed phase liquid used herein is dispersed in the form of droplets, and the continuous phase fluid is a solution with which droplets comprising the dispersed phase fluid are surrounded. Accordingly, the liquid forming dispersed phase and the liquid forming a continuous phase are not particularly limited as long as they are liquids incompatible with each other. For example, when the continuous phase or dispersed phase is a water phase (water, ethanol, a buffer solution and a mixture thereof), the other becomes an organic phase (oil phase) substantially insoluble in water. In the present invention, the reaction may involve phase transition.

The dispersed phase liquid may be slurry containing solids such as microparticles or a mixed solution comprising a plurality of liquids. Particularly when slurry containing solids such as microparticles is used as a first fluid, it can flow into a second fluid to form an emulsion between the processing surfaces even if there is a specific gravity difference between the microparticles in the slurry and the liquid, whereby the microparticles in the first fluid and the liquid are prevented from being separated and the microparticles can be efficiently incorporated. This is because the gap between the processing surfaces is microscope, and thus the influence of gravity is made lower than the influence of surface tension and viscosity.

For obtaining an emulsion having a more uniform volume particle size, a dispersant such as a nonionic surfactant, a cationic surfactant, an anionic surfactant or an amphoteric surfactant is preferably added to one of or both of the first fluid and the second fluid. The nonionic surfactant, cationic surfactant, anionic surfactant and amphoteric surfactant are not particularly limited as long as they can stabilize emulsion particles in the dispersed phased by coordination with the surfaces of emulsion particles.

The first and second fluids join together in a thin film fluid between the processing surfaces 1 and 2, the distance of which is regulated by the pressure balance between the supply pressure of the fluid and the pressure exerted between the rotating processing surfaces, thereby mixing the first and second fluids in the thin film fluid to form an emulsion.

Because the fluids are mixed in the thin film fluid, the intended product can be directly produced without using a heterogeneous preliminarily dispersed preparation, and a uniform mixing site can be always given, and thus an emulsion with a volume particle size having a variation coefficient of 0.3% to 30% in the intended particle size distribution can be easily obtained. The variation coefficient is calculated using the following equation.

$$\text{Coefficient of variation C.V.(\%)} = \quad \text{[Equation 1]}$$

$$\frac{\text{standard deviation STD.}}{\text{volume-average particle diameter } d} \times 100$$

The volume-average particle diameter and the standard deviation in the formula above are calculated according to the following 2 equations. The standard deviation used herein can serve as a standard for the distribution width of measured particle distribution and is not intended to mean statistical standard deviation (statistical error).

$$\text{Volume-average particle diameter } d = \frac{\sum (d_i V_i)}{\sum (V_i)} \quad \text{[Equation 2]}$$

It is assumed that in the order of increasing particle diameter, the numbers of particles having $d_1, d_2, \ldots d_i, \ldots d_k$ are $n_1, n_2, \ldots n_i, \ldots n_k$, and volume per particle is $V_i$.

$$\text{standard deviation STD.} = \frac{d84\% - d16\%}{2} \quad \text{[Equation 3]}$$

Each fluid is kept in independent states and introduced between the processing surfaces 1 and 2, and can be mixed in the thin film fluid formed thereon, thereby omitting the conventional preliminary mixing step. As a result, the desired particle size distribution can be obtained with low energy.

Because the preliminary mixing of the continuous phase with the dispersed phase becomes unnecessary, unnecessary mixed particles are not generated and energy can be applied efficiently, thus enabling preparation of an emulsion having a more uniform volume particle diameter than conventional. By freely regulating the distance between the first processing member 10 and the second processing member 20, the particle diameter of the emulsion can be controlled. The particle diameter of the resulting emulsion can be regulated not only the distance between the processing surface 1 and the second processing surface 2 but also by various conditions such as the viscosity and interfacial tension of the continuous phase and dispersed phase, the sending speed of these liquids, and the number of rotations of the processing surface, and the conditions can be appropriately established.

The expression "first" or "second" for each fluid has a meaning for merely discriminating an $n^{th}$ fluid among a plurality of fluids present, and third or more fluids can also be present. Use of three or more fluids is advantageous in production of complex emulsions or in preparing various kinds of emulsions in the same dispersed phase.

In production of the emulsion, a decompression pump Q is used as shown in FIG. 18(A), so that the space outside the first processing member 10 and the second processing member 20, that is, around the flow path through which a processed fluid passes is decompressed (e.g. vacuumized) thereby removing gases or solvents, such as air and dissolved oxygen, low-boiling organic solvents, steam and the like contained in the processed fluid in the process of forming emulsions. By doing so, the emulsion obtained by mixing between the processing surfaces is discharged in an atomized state from the processing surfaces, and thus the surface area of the fluid is increased to bring about an advantage of very high efficiency of removal of the gas and solvent.

When easily oxidized substances such as unsaturated fatty acids are contained in components in the composition, it is preferable that for preventing oxidation, an inert gas such as a nitrogen gas or argon gas be introduced onto the processing surfaces, and in this atmosphere, the treatment be carried out. For example, the space outside the first processing member 10 and the second processing member 20, that is, around the flow path through which the processed fluid passes, is filled with the inert gas.

The emulsion obtained by the present invention can be used in, for example, toner, thermal expansion agent, pressure-sensitive copying paper, thermosensitive recording paper, a spacer, a column packing material for high performance liquid chromatography, a pressure measurement film, a heat medium, light control glass, thermochromic materials (temperature-sensitive liquid crystals, temperature-sensitive dyes), magnetic migration capsules, agricultural chemicals, artificial feed, artificial seeds, aromatic substances, perfumes, creams and lotions, lipsticks, vitamin capsules, activated carbon, enzyme-containing capsules, and DDS (drug delivery system).

In the method for producing the emulsion in the present invention, an emulsion with a volume particle size having a variation coefficient of 0.3% to 30% in the particle size distribution can be easily obtained, and particles which are monodisperse and stable can be obtained. The preliminarily dispersing step which has been essential is made unnecessary, new mixing sites can always be given, the influence of uneven heat history and the influence of the amount of uneven energy applied in a preliminarily dispersed state can be eliminated, and thus uniform particle sizes can be obtained. The distance between the processing member 10 and the processing member 20 can be easily freely regulated, and thus the particle size can be freely controlled. The working process can thereby be simplified, and the desired particles can be obtained in a shorter time than conventional, and the process is excellent in energy efficiency and productivity.

Hereinafter, the present invention is described in detail with reference to Examples, but the present invention is not limited to Examples.

In following Examples, the term "from the center" means "through the first introduction part d1" in the processing apparatus shown in FIG. 1(A), the first fluid refers to the first processed fluid, and the second fluid refers to the second processed fluid introduced "through the second introduction part d2" in the processing apparatus shown in FIG. 1(A). The variation coefficient was calculated described above.

EXAMPLE L1

As a first fluid, 2% of a Tween 80 aqueous solution was sent from the center at a supply pressure/back pressure of 0.1 MPa/0.05 MPa and at a revolution number of 10000 rpm, and liquid paraffin was introduced as a second fluid into the space between the processing surfaces 1 and 2, such that they were mixed and discharged at a rate of 5.7 ml/min. The second fluid was sent such that liquid paraffin accounted for 2% of the total discharge. The emulsion shown in FIG. 40 was obtained. After processing, the solution was measured with a particle size distribution measuring instrument utilizing a laser diffraction/scattering method as measurement principle (trade name: SALD-7000, manufactured by Shimadzu Corporation), indicating that the (volume) average particle size was 2.42 μm and the CV value was 2.8%.

EXAMPLE L2

As a first fluid, 2% of a Tween 80 aqueous solution was sent from the center at a supply pressure/back pressure of 0.1

Figure 41:
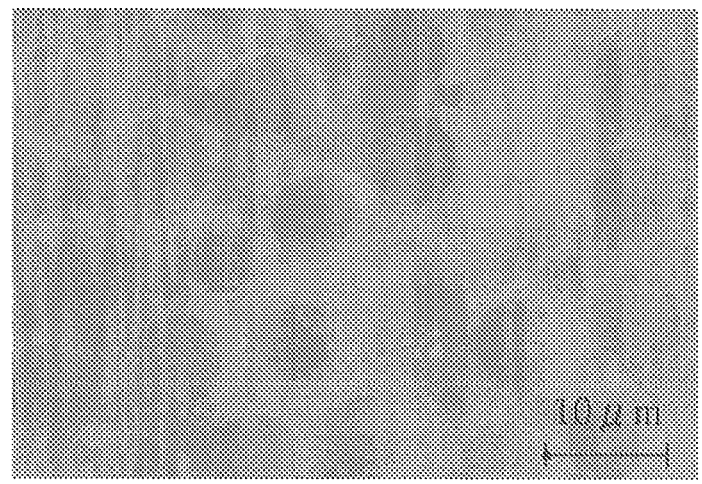
FIG. 41 is a microgram of an emulsion according to Example L2.

MPa/0.02 MPa and at a revolution number of 10000 rpm, and liquid paraffin was introduced as a second fluid into the space between the processing surfaces 1 and 2, such that they were mixed and discharged at a rate of 10.4 ml/min. The second fluid was sent such that liquid paraffin accounted for 2% of the total discharge. The emulsion shown in FIG. 41 was obtained. After processing, the solution was measured with a particle size distribution measuring instrument utilizing a laser diffraction/scattering method as measurement principle (trade name: SALD-7000, manufactured by Shimadzu Corporation), indicating that the (volume) average particle size was 11.07 μm and the CV value was 0.58%.

EXAMPLE L3

As a first fluid, 2% of a Tween 80 aqueous solution was sent from the center at a supply pressure/back pressure of 0.1 MPa/0.10 MPa and at a revolution number of 10000 rpm, and liquid paraffin was introduced as a second fluid into the space between the processing surfaces 1 and 2, such that they were mixed and discharged at a rate of 2.6 ml/min. The second fluid was sent such that liquid paraffin accounted for 2% of the total discharge. After processing, the solution was measured with a particle size distribution measuring instrument utilizing a dynamic light scattering method as measurement principle (trade name: Microtrac UPA150, manufactured by Nikkiso Co., Ltd.), indicating that the (volume) average particle size was 0.36 μm and the CV value was 28.6%.

COMPARATIVE EXAMPLE L1

Liquid paraffin of 6 ml was added to 294 ml of 2% of an aqueous Tween 80 solution and the mixture was treated at 20000 rpm for 10 min. with CLEARMIX (manufactured by M Technique Co., Ltd.). The solution after processing was measured with a particle size distribution measuring instrument utilizing a laser diffraction/scattering method as measurement principle (trade name: SALD-7000, manufactured by Shimadzu Corporation), indicating that the (volume) average particle size was 6.64 μm and the CV value was 34.6%.

(Amount of Energy Applied)

The amounts of energy applied in Examples L1 to L3 and Comparative Example L1 are shown in Table 22 (in the table, Examples 1 to 3 and Comparative Example 1 shall be read as Examples L1 to L3 and Comparative Example L1, respectively).

TABLE 22

|  | Example 1 | Example 2 | Example 3 | Comparative Example 1 |
| --- | --- | --- | --- | --- |
| Number of revolutions (rpm) | 10000 | 10000 | 10000 | 20000 |
| Particle size (D50) (μm) | 2.42 | 11.07 | 0.36 | 6.64 |
| Variation coefficient (%) | 2.8 | 0.58 | 28.6 | 34.6 |
| Amount of energy applied (—) | 0.38 | 0.12 | 0.57 | 1 |

The amount of energy applied in Examples was half to 1/10 relative to that in Comparative Example, although the CV values in Examples were smaller than in Comparative Example. From this result, it was revealed that the production method of the present invention can produce the objective emulsion particles efficiently with low energy.

(Change in Emulsion Microparticles with Time)

The average-particle sizes and CV values after processing and the average-particle sizes and CV values after 1 day and after 7 days are shown in Table 23 (in the table, Examples 1 to 3 and Comparative Example 1 shall be read as Examples L1 to L3 and Comparative Example L1, respectively).

TABLE 23

|  | After processing | | After 1 day | | After 7 days | |
| --- | --- | --- | --- | --- | --- | --- |
|  | $D_{50}$ [μm] | CV [%] | $D_{50}$ [μm] | CV [%] | $D_{50}$ [μm] | CV [%] |
| Example 1 | 2.42 | 2.8 | 2.48 | 2.8 | 2.40 | 2.9 |
| Example 2 | 11.07 | 0.58 | 11.25 | 0.62 | 11.26 | 0.63 |
| Example 3 | 0.36 | 28.6 | 0.41 | 28.6 | 0.34 | 28.8 |
| Comparative Example 1 | 6.64 | 34.6 | 8.95 | 86.4 | — | — |

It can be seen that the emulsions in Examples as compared with those in Comparative Example are not changed with time. In Comparative Example, the emulsion was completely separated into a water phase and oil phase after seven days. From this result, it can be seen that the emulsion microparticles obtained by the method for producing an emulsion according to the present invention is excellent in storage stability.

(M) Separation by Temperature Change

Hereinafter, the reaction of forming microparticles by temperature change is described by reference to aciclovir as an example.

Aciclovir (general name: JAN, INN; chemical name: 9-[(2-hydroxyethoxy)methyl]) guanine) is an antiviral agent having a purine skeleton and is a compound used widely clinically as a therapeutic agent for infections caused by herpes simplex virus, chickenpox virus and herpes zoster virus, that is, herpes simplex, chickenpox, herpes zoster, encephalitis, meningitis, and the like, which have been developed in immune-compromised patients (malignant tumor, autoimmune disease, and the like). The solubility of aciclovir in water at ordinary temperatures is low (about 0.001 w/v % to 0.01 w/v %), but can be dissolved to about 8 w/v % by heating to a temperature of 70° C. or more.

This reaction occurs by forced uniform mixing between the processing surfaces 1 and 2 arranged to be opposite to each other so as to be able to approach to and separate from each other, at least one of which rotates relative to the other, in the apparatus shown in FIG. 1(A).

First, a cooling fluid containing an aqueous solvent at a lower temperature than a second fluid described later is introduced as a first fluid through one flow path, that is, the first introduction part d1 into the space between the processing surfaces 1 and 2 arranged to be opposite to each other so as to be able to approach to and separate from each other, at least one of which rotates relative to the other, thereby forming a first fluid film between the processing surfaces.

Then, a fluid wherein at least one kind of solution having aciclovir dissolved in water heated to 85° C. is introduced as a second fluid directly through another flow path, that is, the second introduction part d2 into the first fluid film produced between the processing surfaces 1 and 2.

As described above, the first and second fluids join together in a thin film fluid produced between the processing surfaces 1 and 2, the distance of which is regulated by the pressure balance between the supply pressure of the fluid and the pressure exerted between the rotating processing surfaces. The first and second fluids are mixed in the thin film fluid and when the temperature of the mixture of the first and second fluids becomes less than 70° C., aciclovir originally contained in the second fluid in the mixture is separated. Specifically, when the temperature of the aciclovir solution between the processing surfaces 1 and 2 is decreased, the solubility of aciclovir in water can be decreased to separate aciclovir microparticles. By the processing surfaces 1 and 2, at least one of which rotates relative to the other, the thin film fluid between the processing surfaces 1 and 2 is forcibly uniformly mixed, so that without forming an interface between the first and second fluids to cause insufficient mixing, the change in solubility by the temperature decrease is rapidly attained.

To effect the reaction (separating reaction) between the processing surfaces 1 and 2, the second fluid may be introduced through the first introduction part d1 and the first fluid through the second introduction part d2, as opposed to the above description. That is, the expression "first" or "second" for each fluid has a meaning for merely discriminating an $n^{th}$ fluid among a plurality of fluids present, and third or more fluids can also be present.

The same microparticle material may be contained in both the first and second fluids.

The particle size, monodispersity or crystal form of the obtained microparticles can be regulated by changing the number of revolutions of the processing surfaces 1 and 2, the distance between the processing surfaces 1 and 2 and the flow rate and temperature of the thin film fluid, and the concentration of materials.

The microparticle materials other than aciclovir are not particularly limited as long as their solubility in solution is changed by temperature. At this time, even if a curve of solubility (solubility curve) against temperature shows that the solubility is increased as the temperature increases, or that like calcium hydroxide or cesium sulfate, the solubility is decreased as the temperature increases, the method of the present invention can be applied. Even if the solubility such as that of sodium sulfate is maximized at a specific temperature (34.38° C. for sodium sulfate), the present method can be applied. In the case of aciclovir, a cooling fluid was introduced as the second fluid, and in the case of calcium hydroxide or cesium sulfate, a heating fluid may be introduced as the second fluid. In the case of sodium sulfate, a cooling fluid and a heating fluid may be appropriately selected depending on whether the temperature used is higher or lower the specific temperature.

As with the microparticle materials, the solvent used is not particularly limited either. Aqueous solvents such as water, ion-exchange water, ultrapure water, and aqueous acidic or alkaline solvents, or organic solvents such as methanol, ethanol and toluene can be used. Oils such as silicon oil, fats and oils containing unsaturated fats, sunflower oil or industrial gear oil may also be used.

The space between the processing surfaces 1 and 2 can be cooled or heated without using the cooling or heating fluid mentioned above. In this case, at least one of the first processing member 10 and the second processing 20 is provided with a temperature regulating mechanisms J1 and J2, and a microparticle material solution having a solubility changing with temperature may be subjected to regulation of the temperature of the processing surfaces directly with the temperature regulating mechanisms, thereby separating microparticles between the processing surfaces 1 and 2.

The temperature regulating mechanism is not particularly limited. A cooling part is arranged in the processing members 10 and 20 when cooling is intended. Specifically, a piping for passing ice water and various cooling media or a cooling element such as Peltier device capable of electric or chemical cooling is attached to the processing members 10 and 20.

When heating is intended, a heating part is arranged in the processing members 10 and 20. Specifically, steam as temperature regulating medium, a piping for passing various hot media, and a heating element such as an electric heater capable of electric or chemical heating is attached to the processing members 10 and 20.

An accepting part for a new temperature regulating medium capable of directly contacting with the processing members may be arranged in the ring-accepting part. The temperature of the processing surfaces can be regulated by heat conduction of the processing members. Alternatively, a cooling or heating element may be embedded in the processing members 10 and 20 and electrified, or a path for passing a cooling medium may be embedded, and a temperature regulating medium (cooling medium) is passed through the path, whereby the temperature of the processing surfaces can be regulated from the inside. By way of example, the temperature regulating mechanisms J1 and J2 which are pipes (jackets) arranged inside the processing members 10 and 20 are shown in FIG. 25.

The whole of the processing members 10 and 20 may be dipped in a temperature regulating fluid. For example, the processing members 10 and 20 are accepted in a container, and a temperature regulating fluid is introduced into the container, thereby directly regulating the temperature of the processing members and the space between the processing surfaces.

Such mechanism can be used in combination with a temperature regulating fluid which is used for example as the second fluid.

At least one of solutions to be mixed such as the first and second fluids may contain a surfactant.

The surfactant that is used may be a known surfactant or a newly synthesized one and is not particularly limited. Various surfactants having excellent solubility in a solution and being capable of excellently dispersing separated microparticles in a solution can be used. The surfactants include various kinds of cationic surfactants, anionic surfactants and nonionic surfactants, sodium dodecylbenzene sulfonate, sodium dodecylbenzene sulfate, sodium tetradecyl sulfate, sodium pentadecyl sulfate, sodium octyl sulfate, sodium oleate, sodium laurate, sodium stearate, calcium stearate, sucrose fatty acid esters, Tween 20 and Tween 80 (which are polyoxyethylene sorbitan fatty acid esters available from ICI Specialty Chemicals), polyvinyl pyrrolidone, tyloxapol, Pluronic F68 and F108 (which are ethylene oxide/propylene oxide block copolymers available from BASF), Tetronic 908 (T908) (which is tetrafunctional block copolymers derived from adducts of ethylene diamine to which ethylene oxide and propylene oxide are continuously added, available from BASF), dextran, lecithin, Aerosol OT (which is an dioctyl ester of sodium sulfosuccinate, available from American Cyanamid), Duponol P (which is sodium laurate salfate available from DuPont), Triton X-200 (which is an alkylaryl polyether sulfonate available from Rohm and Haas), Carbowax 3350 and 934 (which are polyethylene glycols available from Union Carbide), Crodesta F-110 (which is a mixture of sucrose stearate and sucrose distearate, available from Croda Inc.), Crodesta 5L-40 (which is available from Croda Inc.), and SA90HCO (which is $C_{18}H_{37}CH_2-(CON(CH_3)CH_2(CHOH)_4CH_2OH)_2$). These materials can be used depending on the objective microparticles.

In addition, the space between the processing surfaces may be heated (warmed), may be irradiated with ultraviolet ray (UV), or may be supplied with ultrasonic energy. Particularly, when a difference in temperature is set between the first processing surface 1 and the second processing surface 2, there is an advantage that since convection can be generated in a thin film fluid, the reaction can be promoted.

Specifically for heating (warming), at least one of the processing members 10 and 20 can be provided for example with a heater or a jacket for passing a heat medium, to heat (warm) the thin film fluid, as described above. For irradiation with ultraviolet ray (UV), at least one of the processing member 10 and the processing member 20 can be provided, for example, with an element such as UV lamp to irradiate the thin film fluid with ultraviolet ray (UV) from the corresponding processing surface. For supplying with ultrasonic energy, at least one of the processing member 10 and the processing member 20 can be provided, for example, with an ultrasonic wave oscillator.

The separating reaction is conducted in a container capable of securing a depressurized or vacuum state, and a secondary side at which the fluid after processing is discharged can be depressurized or made vacuous to remove a gas generated during the reaction, to remove a gas contained in the fluid, or to remove the solvent of the fluid. Even when the separation processing and the removal processing of the solvent are simultaneously conducted, a fluid containing microparticles separated between the processing surfaces is discharged in an atomized state from the processing surfaces, so the surface area of the fluid is increased, thus bringing about the advantage of very high efficiency of removal of the solvent. Accordingly, production processing of microparticles and removal of the solvent can be effected in substantially one step more easily than conventional.

In this manner, a suspension wherein microparticles having an average primary particle size of 0.5 nm to 10000 nm, preferably 1 nm to 500 nm, more preferably 10 nm to 200 nm, are dispersed can be prepared. When the surfactant is added to a solution having microparticle materials dissolved therein, a suspension wherein microparticles having the dispersant coordinated thereon are dispersed can be prepared, and the resulting microparticles are very excellent in re-dispersibility. Contamination with foreign substances is low in the production process, and when crystals are separated, the degree of crystallization can be highly controlled.

As described above, the processing apparatus can be provided with a third introduction part d3 in addition to the first introduction part d1 and the second introduction part d2. In this case, a temperature regulating fluid, a solution containing microparticle materials, and a surfactant for example can be introduced separately through the respective introduction parts into the processing apparatus. By doing so, the concentration and pressure of each fluid can be separately controlled, and the reaction of forming microparticles can be regulated more accurately. When the processing apparatus is provided with four or more introduction parts, the foregoing applies and fluids to be introduced into the processing apparatus can be subdivided in this manner.

Hereinafter, the present invention is described in detail with reference to Examples, but the present invention is not limited to Examples.

In following Examples, the term "from the center" means "through the first introduction part d1" in the processing apparatus shown in FIG. 1(A), the first fluid refers to the first processed fluid, and the second fluid refers to the second processed fluid introduced "through the second introduction part d2" in the processing apparatus shown in FIG. 1(A).

An aqueous solution of aciclovir at 85° C. is cooled in a thin film between the processing surfaces 1 and 2 arranged to be opposite to each other so as to be able to approach to and separate from each other, at least one of which rotates relative to the other, in use of a uniformly stirring and mixing reaction apparatus shown in FIG. 1(A), thereby separating aciclovir.

EXAMPLE M1

As a first fluid, 5% Tween 80 aqueous solution was sent from the center at a supply pressure/back pressure of 0.15 MPa/0.01 Mpa, at a revolution number of 500 rpm and at a sending solution temperature of 15° C., and 3% aciclovir aqueous solution at 85° C. was introduced as a second fluid at a rate of 10 mL/min. into the space between the processing surfaces 1 and 2. The first and second fluids were mixed with each other in the thin film, and an aciclovir microparticle dispersion solution was discharged from the processing surfaces. The temperature of the discharged fluid was 48° C.

When the particle size distribution of the aciclovir microparticles solution was measured with a particle size distribution measuring instrument utilizing a laser Doppler method (trade name: Microtrac UPA150, manufactured by Nikkiso Co., Ltd.), the average particle size was 88.6 nm.

The aciclovir dispersion solution was vacuum freeze dried, and the resulting powdery aciclovir microparticles were introduced again into ion-exchange water and then stirred with a high-speed stirring dispersing machine (trade name: CLEARMIX manufactured by M Technique Co., Ltd.), whereby an aciclovir microparticle dispersion was obtained again, its average particle size was 88.1 nm, same as before vacuum free drying, and it was thus confirmed that the resulting aciclovir microparticles was excellent in re-dispersibility.

In Examples M2 to M4, aciclovir microparticle dispersions and aciclovir powders were obtained using the same Tween 80 aqueous solution and the same aciclovir aqueous solution as in Example M1, by changing the number of revolutions, supply pressure, and back pressure.

COMPARATIVE EXAMPLE M1

First, 4% Tween 80/2% aciclovir aqueous solution was dissolved under stirring by heating to 85° C., further aciclovir being dissolved. Then, the solution was stirred with CLEARMIX (manufactured by M Technique Co., Ltd.), during which the solution was cooled to 48° C. to form an aciclovir microparticle dispersion. At this time, the number of revolutions of CLEARMIX was 20000 rpm. An aciclovir microparticle dispersion having an average particle size of 1340 nm was obtained. When its re-dispersibility was confirmed in the same manner as in Examples, the particle size after re-dispersion was 3800 nm, and the particles were aggregated stronger than before vacuum freeze drying.

The results are shown in Table 24 (in the table, Examples 1 to 4 and Comparative Example 1 shall be read as Examples M1 to M4 and Comparative Example M1, respectively).

TABLE 24

| Example | First Fluid | Second Fluid | Number of Revolutions [rpm] | Supply Pressure [MPaG] | Back Pressure [MPaG] | Average Particle Size [nm] | Re-dispersibility |
|---|---|---|---|---|---|---|---|
| Example 1 | 5% Tween 80 aqueous solution | 3% aciclovir aqueous solution | 500 | 0.15 | 0.01 | 88.6 | ○ |
| Example 2 | | | 1000 | 0.15 | 0.01 | 74.3 | ○ |
| Example 3 | | | 1000 | 0.30 | 0.01 | 101.5 | ○ |
| Example 4 | | | 2000 | 0.30 | 0.01 | 64.1 | ○ |
| Comparative Example 1 | 4% Tween 80/2% aciclovir aqueous solution | | 20000 | — | — | 1340 | X |

The amount of energy required for forming aciclovir microparticles in Examples in the present invention, as compared with Comparative Example, was about 1/200 for Example M1, about 1/24 for Example M2 or M3, and about 1/3 for Example M4. From this result, it was found that the production method in Examples is superior in energy efficiency, although the production methods in Examples can produce finer particles than in Comparative Example.

The results are shown in Table 25 (in the table, Examples 1 to 4 and Comparative Example 1 shall be read as Examples M1 to M4 and Comparative Example M1, respectively),

TABLE 25

| | Example 1 | Example 2 | Example 3 | Example 4 | Comparative Example 1 |
|---|---|---|---|---|---|
| Number of revolutions [rpm] | 500 | 1000 | 1000 | 2000 | 21500 |
| Particle diameter $D_{50}$ [nm] | 88.6 | 74.3 | 101.5 | 64.1 | 1340 |
| Amount of energy applied [—] | 0.005 | 0.041 | 0.041 | 0.330 | 1 |

(N) Separation on Account of Organic Reaction

Hereinafter, the reaction of forming microparticles by separation on account of an organic reaction is described with reference to the reaction between succinic acid diester and nitrile.

A nitrile represented by $R_1$—CN, or a nitrile represented by $R_2$—CN, or a fluid containing at least one of such nitriles, in a form dissolved in the presence of a strong base, is introduced as a first fluid into the space between the processing surfaces 1 and 2 arranged to be opposite to each other so as to be able to approach to and separate from each other, at least one of which rotates relative to the other, thereby forming a first fluid film between the processing surfaces.

In the formula for the reaction between the succinic acid diester and nitrile, $R_1$ and $R_2$ are the same or different, respectively representing isocyclic or heterocyclic aromatic group that was unsubstituted or substituted. The isocyclic aromatic groups $R_1$ and $R_2$ are preferably monocyclic, dicyclic, tricyclic or tetracyclic group, particularly monocyclic or tetracyclic: for example, phenyl, biphenyl and naphthyl. The heterocyclic aromatic groups $R_1$ and $R_2$ are preferably monocyclic, dicyclic or tricyclic, and can further have one or more condensed benzene rings. The cyano group may be present not only on a heterocyclic ring but also on an isocyclic ring. Examples of the heterocyclic group include pyridyl, pyrimidyl, pyrazinyl, triazinyl, furyl, pyrrolyl, thiophenyl, quinolyl, coumarinyl, benzofuranyl, benzimidazolyl, benzoxazolyl, dibenzofuranyl, benzothiophenyl, dibenzothiophenyl, indolyl, carbazolyl, pyrazolyl, imidazolyl, oxazolyl, isoxazolyl, thiazolyl, indazolyl, benzothiazolyl, pyridazinyl, cinnolyl, quinazolyl, quinoxalyl, phthalazinyl, phthalazinedionyl, phthalamidyl, chromonyl, naphtholactamyl, quinolonyl, orthosulfobenzimidyl, maleimidyl, naphthalidinyl, benzimidazolonyl, benzoxazolonyl, benzothiazolonyl, benzothiazothionyl, quinazolonyl, quinoxalonyl, phthalazonyl, dioxopyrimidinyl, pyridonyl, isoquinolonyl, isoquinolinyl, isothiazolyl, benzoisoxazolyl, benzoisothiazolyl, indazolonyl, acridonyl, quinazolinedionyl, quinoxalindionyl, benzoxazindionyl, benzoxadinolyl and naphthalimidyl. The aforementioned isocyclic and heterocyclic aromatic groups may have the following usual substituents: for example, (1) halogen atoms such as chlorine, bromine and fluorine atoms. And, (2) branched or non-branched alkyl groups having the number of carbon atom with 1 to 18, preferably with 1 to 12, more preferably with 1 to 8, even more preferably with 1 to 4. These alkyl groups may be substituted with one or more, for example, with one, two, three, four or five substituents selected from the group comprising F, OH, CN, —$OCOR_{16}$, $OR_{17}$, $COOR_{16}$, $CONR_{17}R_{18}$ and $R_{16}$—O—$CONHR_{16}$, wherein $R_{16}$ is an alkyl, for example, an aryl such as naphthyl, benzyl, halobenzyl, phenyl, halophenyl, alkoxyphenyl or alkylphenyl, or a heterocyclic group; $R_{17}$ and $R_{18}$ may be the same or different, respectively representing hydrogen or alkyl, the alkyl being cyano, a hydroxyl group or $C_5$ to $C_6$-cycloalkyl, aryl or heteroaryl, particularly may be substituted with phenyl or halogen-, alkyl- or alkoxy-substituted phenyl; or $R_{17}$ and $R_{18}$ are combined with a nitrogen atom to form a 5- or 6-membered heterocycle such as morpholine, piperidine or phthalimide. Other possible substituents on the alkyl group include a mono- or dialkylated amino group, an aryl group such as a naphthyl, phenyl, halophenyl, alkylphenyl or alkoxyphenyl, and a heterocyclic group such as 2-thienyl, 2-benzoxazolyl, 2-benzothiazolyl, 2-benzimidazolyl, 6-benzimidazolonyl, 2-, 3- or 4-pyridyl and 2-, 4- or 6-quinolyl. The alkyl has the meaning mentioned at the beginning of (2). Examples of the unsubstituted and substituted alkyl group include methyl, ethyl, n-propyl, isopropyl, n-butyl, sec-butyl, tert-butyl, tert-amyl, n-pentyl, n-hexyl, 1,1,3,3-tetramethylbutyl, n-heptyl, n-octyl, nonyl, decyl, undecyl, dodecyl, hydroxymethyl, trifluoromethyl, trifluoroethyl, cyanomethyl, methoxycarbonylmethyl, acetoxymethyl and benzyl. And, (3) alkoxy group: —$OR_B$. The $R_{19}$ is a hydrogen, the above-defined alkyl or aryl, $C_5$ to $C_6$-cycloalkyl, aralkyl or heterocyclic group. The $R_{19}$ group is preferably methyl, ethyl, n-propyl, isopropyl, trifluoroethyl, phenyl, o-, m- or p-chlorophenyl, o-, m- or p-methylphenyl, α- or β-naphthyl, cyclohexyl, benzyl, thienyl or pyranylmethyl. (4) —$SR_{19}$ group. The $R_{19}$ is as defined in (3). Specific examples of $R_{19}$ include methyl, ethyl, n-propyl, isopropyl, phenyl, o-, m- or p-chlorophenyl, o-, m- or p-methylphenyl, α- or β-naphthyl, cyclohexyl, benzyl, thienyl or pyranylmethyl. (5) Cyano group. (6) Group of formula: —$NR_{17}R_{18}$. The $R_{17}$ and $R_{18}$ are as defined in (2). Examples include amino, methylamino, dimethylamino, ethylamino, diethylamino, isopropylamino, β-hydroxyethylamino, β-hydroxypropylamino, N,N-bis(β-hydroxyethyl)amino, N,N-bis(β-cyanoethyl)amino, cyclohexylamino, phenylamino, N-methylphenylamino, benzylamino, dibenzylamino, piperidyl and morpholyl. (7) Group of formula: —$COOR_{16}$. The $R_{16}$ is as defined in (2). Examples include methyl, ethyl, tert-butyl, phenyl, o-, m- or p-chlorophenyl, o-, m- or p-methylphenyl and α- or β-naphthyl. (8) Group of formula: —$COR_{19}$. The $R_{19}$ is as defined in (3). Examples include methyl, ethyl, tert-butyl, phenyl, o-, m- or p-chlorophenyl, o-, m- or p-methylphenyl and α- or β-naphthyl. (9) Group of formula: —$NR_{20}COR_{16}$. The $R_{16}$ is as defined in (2), and the $R_{20}$ is a hydrogen, alkyl, aryl (for example, naphthyl or particularly unsubstituted or halogen-, alkyl- or —O-alkyl-substituted phenyl), $C_5$ to $C_6$-cycloalkyl, aralkyl or —$COR_{16}$, and two $COR_{16}$ may be combined with a nitrogen atom to form a heterocyclic ring. The alkyl $R_{20}$ can have carbon atoms, the preferable number of which is described in (2). Examples include acetylamino, propionylamino, butyrylamino, benzoylamino, p-chlorobenzoylamino, p-methylbenzoylamino, N-methylacetylamino, N-methylbenzoylamino, N-succinic acid imide and N-phthalimide. (10) Group of formula: —$NR_{19}COOR_{16}$. The $R_{19}$ and $R_{16}$ are as defined in (2) or (3). Examples include —$NHCOOCH_3$, $NHCOOC_2H_5$ and $NHCOOC_6H_5$. (11) Group of formula: —$NR_{19}CONR_{17}R_{18}$. The $R_{19}$, $R_{17}$ and $R_{18}$ are defined in (3) or (2). Examples include ureido, N-methylureido, N-phenylureido and N,N'-2',4'-dimethylphenylureido. (12) Group of formula: —$NHSO_2R_{16}$. The $R_{16}$ is as defined in (2). Examples include methanesulfonylamino, phenylsulfonylamino, p-tolylsulfonylamino and β-naphthylsulfonylamino. (13) Group of formula: —$SO_2R_{16}$ or —$SOR_{16}$. The $R_{16}$ is as defined in (2). Examples include methylsulfonyl, ethylsulfonyl, phenylsulfonyl, 2-naphthylsulfonyl and phenylsulfoxydyl. (14) Group of formula: —$SO_2OR_{16}$. The $R_{16}$ is as defined in (2). Examples of $R_{16}$ include methyl, ethyl, phenyl, o-, m- or p-chlorophenyl, o-, m- or p-methylphenyl and α- or β-naphthyl. (15) Group of formula: —$CONR_{17}R_{18}$. The $R_{17}$ and $R_{18}$ are as defined in (2). Examples include carbamoyl, N-methylcarbamoyl, N-ethylcarbamoyl, N-phenylcarbamoyl, N,N-dimethylcarbamoyl, N-methyl-N-phenylcarbamoyl, N-α-naphthylcarbamoyl and N-piperidylcarbamoyl. (16) Group of formula: —$SO_2NR_{17}R_{18}$. The $R_{17}$ and $R_{18}$ are as defined in (2). Examples include sulfamoyl, N-methylsulfamoyl, N-ethylsulfamoyl, N-phenylsulfamoyl, N-methyl-N-phenylsulfamoyl and N-morpholylsulfamoyl. (17) Group of formula: —N=N—$R_{21}$. The $R_{21}$ is a coupling element group, or an unsubstituted, halogen-, alkyl- or —O-alkyl-substituted phenyl group. The alkyl $R_{21}$ can have carbon atoms, the preferably number of which is described in (2). Examples of $R_{21}$ include acetoacetoarylide, pyrazolyl, pyridonyl, o- or p-hydroxyphenyl, o-hydroxynaphthyl, p-aminophenyl and p-N,N-dimethylaminophenyl groups. (18) Group of formula: —$OCOR_{16}$. The $R_{16}$ is as defined in (2). Examples of $R_{16}$ include methyl, ethyl, phenyl, and o-, m- or p-chlorophenyl. (19) Group of formula: —$OCONHR_{16}$. The $R_{16}$ is as defined in (2). Examples of $R_{16}$ include methyl, ethyl, phenyl, and o-, m- or p-chlorophenyl. In preferable embodiments in the reaction between the succinic acid diester and nitrile, $R_1$ and $R_2$ independently represent phenyl; phenyl substituted with one or two chlorine atoms, one or two methyl groups, methoxy, trifluoromethyl, cyano, methoxycarbonyl, tert-butyl, dimethylamino or cyanophenyl; naphthyl; biphenyl; pyridyl; pyridyl substituted with amyloxy; furyl or thienyl. In particular, preferable $R_1$ and $R_2$ respectively represents phenyl, 3- or 4-chlorophenyl, 3,5-dichlorophenyl, 4-methylphenyl, 4-methoxyphenyl, 3-trifluoromethylphenyl, 4-trifluoromethylphenyl, 3-cyanophenyl, 4-cyanophenyl, 4-methoxycarbonylphenyl, 4-methylphenyl, 4-tert-butylphenyl, 4-dimethylaminophenyl, 4-(p-cyanophenyl)phenyl, 1- or 2-naphthyl, 4-biphenylyl, 2-pyridyl, 6-amyloxy-3-pyridyl, 2-furyl or 2-thienyl.

Particularly, a nitrile of the following formula is preferable.

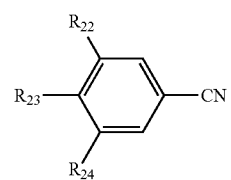

[Chemical 2]

In the formula above, $R_{22}$, $R_{23}$ and $R_{24}$ independently represent a hydrogen, fluorine, chlorine, bromine, carbamoyl, cyano, trifluoromethyl, $C_2$ to $C_{13}$-alkylcarbamoyl, $C_1$ to $C_{12}$-alkyl, $C_1$ to $C_{12}$-alkoxy, $C_1$ to $C_{12}$-alkylmercapto, $C_2$ to $C_{13}$-alkoxycarbonyl, $C_2$ to $C_{13}$-alkanoylamino, $C_1$ to $C_{12}$-monoalkylamino, $C_2$ to $C_{24}$-dialkylamino, unsubstituted or halogen-, $C_1$ to $C_{12}$-alkyl- or $C_1$ to $C_{12}$-alkoxy-substituted phenyl, phenylmercapto, phenoxycarbonyl, phenylcarbamoyl or benzoylamino, and the alkyl or phenyl group is unsubstituted or substituted with a halogen, $C_1$ to $C_{12}$-alkyl or $C_1$ to $C_{12}$-alkoxy, and at least one of $R_{22}$, $R_{23}$ and $R_{24}$ is a hydrogen.

More specifically, the nitrile is represented by the following formula.

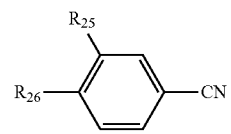

[Chemical 3]

In the formula above, one of $R_{25}$ and $R_{26}$ is a hydrogen, chlorine, bromine, $C_1$ to $C_4$-alkyl, cyano, $C_1$ to $C_4$-alkoxy, unsubstituted or chlorine-, methyl- or $C_1$ to $C_4$-alkoxy-substituted phenyl, carbamoyl, $C_2$ to $C_5$-alkylcarbamoyl, or unsubstituted or chlorine-, methyl- or $C_1$ to $C_4$-alkoxy-substituted phenylcarbamoyl, and the other is a hydrogen.

The strong base used in the reaction between the succinic acid diester and nitrile is not particularly limited. Preferable examples of such bases include alkali metal amides such as lithium amide, sodium amide and potassium amide; alkali metal hydrides such as lithium hydride, sodium hydride and potassium hydride; and alkali earths or alkali metal alkoxides derived from particularly C1 to C10 primary, secondary or tertiary aliphatic alcohols, such as lithium methoxide, sodium methoxide, potassium methoxide, lithium ethoxide, sodium ethoxide, potassium ethoxide, lithium n-propoxide, sodium n-propoxide, potassium n-propoxide, lithium isopropoxide, sodium isopropoxide, potassium isopropoxide, lithium n-butoxide, sodium n-butoxide, potassium n-butoxide, lithium sec-butoxide, sodium sec-butoxide, potassium sec-butoxide, lithium tert-butoxide, sodium tert-butoxide, potassium tert-butoxide, lithium 2-methyl-2-butoxide, sodium 2-methyl-2-butoxide, potassium 2-methyl-2-butoxide, lithium 2-methyl-2-pentoxide, sodium 2-methyl-2-pentoxide, potassium 2-methyl-2-pentoxide, lithium 3-methyl-3-pentoxide, sodium 3-methyl-3-pentoxide, potassium 3-methyl-3-pentoxide, lithium 3-ethyl-3-pentoxide, sodium 3-ethyl-3-pentoxide, and potassium 3-ethyl-3-pentoxide. A mixture of the above bases can also be used. The strong base used in the reaction between the succinic acid diester and nitrile is preferably an alkali metal alkoxy wherein the alkyl metal is specifically sodium or potassium, and the alkoxide is derived from a secondary or tertiary alcohol. Accordingly, particularly preferable examples of the strong base include sodium isopropoxide, potassium isopropoxide, sodium sec-butoxide, potassium sec-butoxide, sodium tert-butoxide, potassium tert-butoxide, sodium tert-amyloxide and potassium tert-amyloxide.

The strong base can be used in the following fluid containing a succinic acid diester.

Then, a fluid containing at least one kind of succinic acid diester is introduced as a second fluid directly through another flow path, that is, the second introduction part d2 into the first fluid film formed between the processing surfaces 1 and 2.

The succinic acid diester used in the reaction between the succinic acid diester and nitrile is not particularly limited. Examples of the succinic acid diester include dialkyl, diaryl or monoalkyl monoaryl esters, among which the dialkyl succinates or diaryl succinates can be asymmetric. However, symmetric succinic acid diesters, particularly symmetric dialkyl succinates are preferably used. When diaryl succinates or monoaryl monoalkyl succinates are present, the aryl is specifically unsubstituted phenyl or phenyl substituted with a halogen such as chlorine or $C_1$ to $C_6$-alkyl such as methyl, ethyl, isopropyl or tert-butyl, or $C_1$ to $C_6$ alkoxy such as methoxy or ethoxy. In the case of dialkyl succinates or monoalkyl monoaryl succinates, the alkyl can be non-branched or branched, preferably branched, and have the number of carbon atom preferably with 1 to 18, particularly with 1 to 12, more preferably with 1 to 8, even more preferably with 1 to 5. The branched alkyl is preferably sec- or tert-alkyl such as isopropyl, sec-butyl, tert-butyl, tert-amyl or cyclohexyl. Examples of the succinic acid diester include dimethyl succinate, diethyl succinate, dipropyl succinate, dibutyl succinate, dipentyl succinate, dihexyl succinate, diphenyl succinate, dioctyl succinate, diisopropyl succinate, di-sec-butyl succinate, di-tert-butyl succinate, di-tert-amyl succinate, di-[1,1-dimethylbutyl]succinate, di-[1,1,3,3-tetramethylbutyl]succinate, di-[1,1-dimethylpentyl]succinate, di-[1-methyl-1-ethylbutyl]succinate, di-[1,1-diethylpropyl]succinate, diphenyl succinate, di-[4-methylphenyl]succinate, di-[2-methylphenyl]succinate, di-[4-chlorophenyl]succinate, monoethyl monophenyl succinate, and dicyclohexyl succinate. Diisopropyl succinate is particularly preferable.

The strong base used in the reaction between the succinic acid diester and the nitrile, the nitrile represented by $R_1$—CN or the nitrile represented by $R_2$—CN, or a mixture of these nitriles, and the succinic diester are preferably in the form of a liquid or solution, and the solvent that can be used therein includes, but is not limited to, water such as ion-exchange water, purified water, tap water and ultrapure water and an organic solvent. Preferable examples of the organic solvent include C1 to C10 primary, secondary or tertiary alcohols such as methanol, ethanol, n-propanol, isopropanol, n-butanol, sec-butanol, tert-butanol, n-pentanol, 2-methyl-2-butanol, 2-methyl-2-pentanol, 3-methyl-3-pentanol, 2-methyl-2-hexanol, 3-ethyl-3-pentanol, and 2,4,4-trimethyl-2-pentanol; glycols such as ethylene glycol or diethylene glycol; ethers such as tetrahydrofuran and dioxane; glycol ethers such as ethylene glycol methyl ether, ethylene glycol ethyl ether, diethylene glycol monomethyl ether and diethylene glycol monoethyl ether; polar aprotic solvents such as acetonitrile, benzonitrile, dimethylformamide, N,N-dimethylacetamide, nitrobenzene, and N-methylpyrrolidone; aliphatic or aromatic hydrocarbons such as benzene and alkyl-, alkoxy- or halogen-substituted benzene such as toluene, xylene, anisole or chlorobenzene; and aromatic heterocycles such as pyridine, picoline and quinoline. When reactant nitriles or reactant succinic acid diesters of formula (VI) or (VII) are liquid in the temperature range where they are reacted, they can be used as the solvent. The solvent used may be a mixture. The reaction between the succinic acid diester and nitrile is conducted in an alcohol as a solvent, particularly in a secondary or tertiary alcohol. The tertiary alcohol is preferably tert-butanol alcohol and tert-amyl alcohol. In this relation, to be noted are mixtures of these preferable solvents and aromatic hydrocarbons such as toluene and xylene or halogen-substituted benzene such as chlorobenzene.

As described above, the first fluid and the second fluid are allowed to join together in a thin film fluid formed between the processing surfaces 1 and 2, the distance of which is regulated by the pressure balance between the supply pressure of the fluid and the pressure exerted between the rotating processing surfaces. The first fluid and the second fluid are mixed in the thin film fluid, and the two substances are reacted. More specifically, the succinic acid diester and nitrile can be reacted.

Alternatively, a mixture in which a strong base and a nitrile represented by $R_1$—CN, a nitrile represented by $R_2$—CN, or a fluid containing these nitriles, and succinic acid diester are mixed to such a degree that the reaction between the processing surfaces is not influenced may be used as a first or second fluid.

Specifically, a diketopyrrolopyrrole pigment can be synthesized. In this case, the reaction between the succinic acid diester and nitrile can be carried out in the presence of a pigment dispersant, preferably dispersants based on diketopyrrolopyrrole and quinacridone. Such dispersants include, for example, compounds of the following formula.

[Chemical 4]

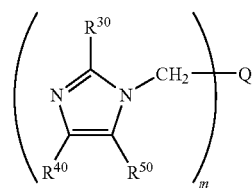

In the formula above, $R_{30}$, $R_{40}$ and $R_{50}$ are independent or different, and respectively each represent a hydrogen, chlorine, bromine, fluorine, nitro, $C_1$ to $C_6$ alkyl, $C_1$ to $C_6$ alkoxy, benzoylamino, an isocyclic or heterocyclic aromatic group, particularly a hydrogen or methyl, and Q is quinacridone group or diketopyrrolopyrrole group, preferably a quinacridone group which may be substituted with one, two, three or four substituents selected from F, Cl, Br, $C_1$ to $C_4$-alkyl, $C_1$ to C4-alkoxy, carboxamide which may be substituted with a $C_1$ to $C_6$-alkyl group, and phenoxy, or a diketopyrrolopyrrole group which may be substituted as described above, and m is 0.1 to 4.

The dispersant includes the following compounds. In the formula, $R_{30}$, $R_{40}$, $R_{50}$, m and Q are as defined above.

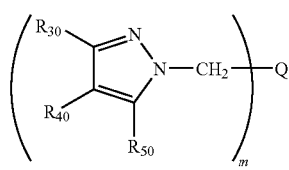

[Chemcial 5]

The dispersant also includes the following compounds. In the formula, $R_{30}$, $R_{40}$, $R_{50}$, m and Q are as defined above. $R_{60}$ has the meaning of $R_{30}$, $R_{40}$ or $R_{50}$, and to $R_{60}$ each preferably represent a hydrogen, methyl group or chlorine.

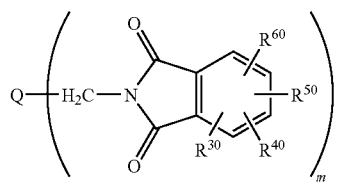

[Chemical 6]

The dispersant also includes the following compounds.

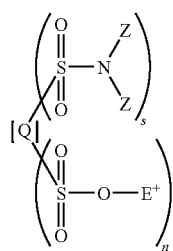

[Chemical 7]

In the formula above, Q is as defined above; s and n independently represent 0 to 4, but both of them are not set to zero; $E^+$ is $H^+$ or $M^{f+}/f$ (f: 1, 2 or 3) corresponding to a metal cation $M^{f+}$ from the major groups I to V or the transition group I or II or IV to VIII in the periodic table of chemical elements, such as $Li^{1+}$, $Na^{1+}$, $K^{1+}$, $Mg^{2+}$, $Ca^{2+}$, $Sr^{2+}$, $Ba^{2+}$, $Mn^{2+}$, $cu^{2+}$, $Ni^{2+}$, $Co^{2+}$, $Zn^{2+}$, $Fe^{2+}$, $Al^{3+}$, $Cr^{3+}$ or $Fe^{3+}$; ammonium $N+R_9 R_{10} R_{11} R_{12}$; $R_9$, $R_{10}$, $R_{11}$ and $R_{12}$ independently represent a hydrogen atom, $C_1$ to $C_{30}$-alkyl, $C_2$ to $C_{30}$-alkenyl, $C_5$-$C_{30}$-cycloalkyl, phenyl, ($C_1$ to $C_8$)-alkyl-phenyl, ($C_1$ to $C_4$)-alkylene-phenyl (for example, benzyl) or a (poly)alkyleneoxy group of formula —[CH($R_{80}$)—CH($R_{80}$)—O]k-H (k is 1 to 30, two $R_{80}$ independently represent a hydrogen, $C_1$ to $C_4$-alkyl, or a combination thereof when k is greater than 1); $R_9$, $R_{10}$, $R_{11}$ and/or $R_{12}$ which are alkyl, alkenyl, cycloalkyl, phenyl or alkylphenyl may be substituted with amino, hydroxyl group and/or carboxyl; $R_9$ and $R_{10}$ may be combined with a quaternary nitrogen atom to form a 5- to 7-membered saturated ring system further having another heteroatom selected from the group comprising O, S and N as desired, such as pyrrolidone, imidazolizine, hexamethyleneimine, piperidine, piperazine or morpholine; $R_9$, $R_{10}$ and $R_{11}$ may be combined with a quaternary nitrogen atom to form a 5- to 7-membered aromatic ring system which further has another heteroatom selected from the group comprising O, S and N as desired and which may be condensed with another ring if necessary, such as pyrrole, imidazole, pyridine, picoline, pyrazine, quinoline or isoquinoline; or E+ defines an ammonium ion of the following formula.

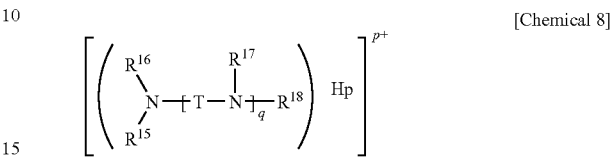

[Chemical 8]

In the formula above, $R_{15}$, $R_{16}$, $R_{17}$ and $R_{18}$ independently represent a hydrogen or a (poly)alkyleneoxy group of formula —[CH($R_{80}$)—CH($R_{80}$)O]k-H; k is 1 to 30, and two $R_{80}$ independently represent a hydrogen, $C_1$ to $C_4$-alkyl, or a combination thereof when k is greater than 1); q is 1 to 10, preferably 1, 2, 3, 4 or 5; p is 1 to 5 provided that p is equal to or smaller than (q+1); T is a branched or non-branched $C_2$ to $C_6$-alkylene group; or T can be a combination of branched or non-branched $C_2$ to $C_6$-alkylene groups when q is greater than 1; two Z groups are the same or different and Z has the definition of $Z_1$ or $Z_4$; and $Z_1$ is a group represented by —[X—Y]$_q$$R^{91}$.

In the formula by —[X—Y]$_q$$R^{91}$, X is a $C_2$ to $C_6$-alkylene group, a $C_5$ to $C_7$-cycloalkylene group or a combination thereof; these groups may be substituted with one to four groups selected from $C_1$ to $C_4$-alkyl groups, hydroxyl groups, ($C_1$ to $C_4$)-hydroxyalkyl groups and/or 1 to 2 groups selected from other $C_5$ to $C_7$-cycloalkyl groups; or X may be a combination having the above meaning when q is greater than 1.

Y is —O—, a group of the following formula, or —$NR_{90}$ group; or Y can be a combination having the above meaning when q is greater than 1; q is 1 to 10, preferably 1, 2, 3, 4 or 5; $R_{90}$ and $R_{91}$ independently represent a hydrogen atom, a branched or non-branched ($C_1$ to $C_{20}$)-alkyl group that was substituted or unsubstituted fluorinated or perfluorinated, a substituted or unsubstituted $C_5$ to $C_7$-cycloalkyl group, or a substituted or unsubstituted fluorinated or perfluorinated ($C_2$ to $C_{20}$)-alkenyl group; their substituents can be a hydroxyl group, phenyl, cyano, chlorine, bromine, amino, $C_2$ to $C_4$-acyl or $C_1$ to $C_4$-alkoxy, and the number of substituents is preferably 1 to 4; or $R_{90}$ and $R_{91}$ are combined with a nitrogen atom to form a saturated, unsaturated or aromatic 5- to 7-membered heterocyclic ring, and the ring may have one or two other nitrogen, oxygen or sulfur atoms, or may be substituted with one, two or three substituents selected from the group comprising OH, phenyl, CN, Cl, Br, $C_1$ to $C_4$-alkyl, $C_1$ to $C_4$-alkoxy, $C_2$ to $C_4$-acyl and carbamoyl, or may have a saturated, unsaturated or aromatic carbocyclic or heterocyclic rings in which one or two benzo-elements were condensed; $Z_4$ is a hydrogen, a hydroxyl group, amino, phenyl, ($C_1$ to $C_4$)-alkylene-phenyl, $C_5$ to $C_7$-cycloalkyl or $C_1$ to $C_{20}$-alkyl; the phenyl ring, ($C_1$ to $C_4$)-alkylene-phenyl group and alkyl group may be substituted with one or more, for example, one, two, three or four substituents from the group comprising Cl, Br, CN, $NH_2$, OH, $C_6H_5$, mono-, di- or tri-$C_1$ to $C_4$-alkoxy-substituted $C_6H_5$, carbamoyl, $C_2$ to $C_4$-acyl and $C_1$ to $C_4$-alkoxy (for example, methoxy or ethoxy); the phenyl ring and ($C_1$ to $C_4$)-alkylene-phenyl group may be substituted with $NR_{90}R_{91}$ ($R_{90}$ and $R_{91}$ are as defined above); or the alkyl group is perfluorinated or fluorinated.

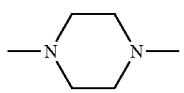

[Chemical 9]

The dispersant includes compounds of the following formula.

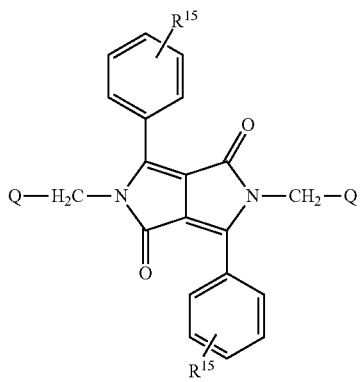

[Chemical 10]

In the formula above, $R_{15}$ is a hydrogen, chlorine, bromine, fluorine, $C_1$ to $C_6$-alkyl, $C_1$ to $C_6$-alkoxy, phenyl, di-($C_1$ to $C_6$-alkyl)amino, $C_1$ to $C_6$-alkylthio, phenylthio or phenoxy; preferably $R_{15}$ is bound at position 4 to a phenyl group; Q is as defined above; the compound of the formula (IX) has 0 to 6 $SO_3$-$E^+$ groups; and E is as defined above.

The dispersant also includes compounds of the following formula. In the formula, $R_{30}$, $R_{40}$, m and Q are as defined above.

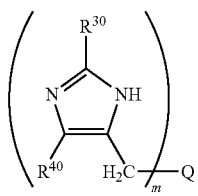

[Chemical 11]

The method of the present invention can be carried out preferably using a saccharine-containing pigment dispersant based on quinacridone and diketopyrrolopyrrole.

In the case of the reaction between the succinic acid diester and nitrile, it is also possible to use auxiliary substance selected from the group comprising a surfactant, a filler, a standardization agent, a resin, an antifoaming agent, an antidust agent, a spreading agent, a light-shielding coloring agent, a preservative, a drying retardant, a rheology regulating additive, and a combination thereof. The useful surfactant includes anionic, cationic and nonionic substances or mixtures thereof. The useful anionic substances include, for example, fatty acid taurides, fatty acid N-methyl taurides, fatty acid isethionates, alkyl phenyl sulfonates, alkyl naphthalene sulfonates, alkyl phenol polyglycol ether sulfates, aliphatic alcohol polyglycol ether sulfates, fatty acid amide polyglycol ether sulfates, alkyl sulfosuccinamates, alkenyl succinic acid monoesters, aliphatic alcohol polyglycol ether sulfosuccinates, alkane sulfonates, fatty acid glutamates, alkyl sulfosuccinates, fatty acid sarcosides; fatty acids such as palmitic acid, stearic acid and oleic acid; resin acids such as aliphatic resins, naphthenates and abietic acid, alkali soluble resins such as rosin-modified maleic acid resin, and soaps such as alkali metal salts of condensation products based on cyanuric chloride, taurine, N,N'-diethylaminopropylamine, and p-phenylenediamine. Resin soap that is an alkali metal salt of resin acid is particularly preferable. The useful cationic substances include, for example, quaternary ammonium salts, aliphatic amine alkoxylates, alkoxylated polyamines, aliphatic aminopolyglycol ethers, aliphatic amines, di- and polyamines derived from aliphatic amines or aliphatic alcohols, alkoxylates derived from the di- and polyamines, imidazolines derived from fatty acids, and salts of these cationic substances. The useful nonionic substances include, for example, amine oxides, aliphatic alcohol polyglycol ethers, fatty acid polyglycol esters, betaines such as aliphatic amide N-propyl betaine, phosphonates of aliphatic alcohols or aliphatic alcohol polyglycol ethers, aliphatic acid amide ethoxylates, aliphatic alcohol-alkylene oxide adducts, and alkyl phenol polyglycol ethers.

Both the dispersant and the auxiliary substance, or either the dispersant or the auxiliary substance, may be present in either the first or second fluid or in a new third fluid different from the first and second fluids.

The salt obtained by the reaction of the succinic acid diester and nitrile can also be hydrolyzed. When the hydrolysis is carried out, a fluid containing a substance formed by the reaction of the nitrile with the succinic acid ester, and a fluid containing at least one kind of a hydrolyzing agent are allowed to join together between the processing surfaces. In this case, a fluid containing a substance formed by the reaction of the nitrile with the succinic acid ester is used again as a first fluid, and a fluid containing at least one kind of hydrolyzing agent is used as a second fluid, and the first fluid and the second fluid are allowed to join in the processing surfaces. In another embodiment, the reaction of the succinic acid diester with nitrile is conducted upstream from the processing surfaces, and the reaction between a fluid containing the resulting reaction product and the hydrolyzing agent may be conducted downstream from the processing surfaces. A fluid in which the hydrolyzing agent is mixed with a fluid containing the succinic acid diester or nitrile such that the reaction in the processing surfaces is not influenced can also be used.

The hydrolyzing agent used in the salt obtained in the reaction between the succinic acid diester and nitrile is not particularly limited, and preferable examples include water, alcohols and acids, or alcohols or acids, as well as mixtures thereof, and appropriately selected solvents other than those described above. The useful alcohols include, for example, methanol, ethanol, isopropanol, isobutanol, tert-butanol and tert-amyl alcohol. The acids include, for example, an inorganic acid such as hydrochloric acid, phosphoric acid, preferably sulfuric acid, or aliphatic or aromatic carboxylic acids or sulfonic acids such as formic acid, acetic acid, propionic acid, butyric acid, hexanoic acid, oxalic acid, benzoic acid, phenylacetic acid, benzenesulfonic acid or p-toluenesulfonic acid, preferably acetic acid and formic acid or an acid mixture.

The invention claimed is:
1. A method for producing nanoparticles, comprising the steps of:
  providing at least two kinds of fluids to be processed, comprising a first fluid and a second fluid, at least one of said at least two kinds of fluids including a microparticle material;

providing two processing surfaces capable of approaching to and separating from each other and rotating relative to each other;

maintaining a minute space of 1 mm or less between the two processing surfaces, said minute space constituting a first flow path;

introducing the first fluid into the minute space through the first flow path;

forming a forced thin film of the first fluid of laminar flow;

providing a second flow path different from the first flow path;

introducing the second fluid through the second flow path into the forced thin film of the first fluid of laminar flow;

mixing the first and second fluids under condition of laminar flow in the forced thin film; and obtaining a nanoparticle dispersion containing at least one of nanoparticles of the microparticle material, and nanoparticles of a reaction product through reaction between the first and second fluids, in the forced thin film.

2. The method for producing nanoparticles according to claim 1, wherein at least one opening leading to the second flow path is arranged in at least either of the two processing surfaces.

3. The method for producing nanoparticles according to claim 2, wherein the volume-average particle diameter in the particle size distribution of the nanoparticles obtained by the production method is 1 nm to 200 nm.

4. The method for producing nanoparticles according to claim 2, wherein the nanoparticle dispersion containing nanoparticles is further stirred in the forced thin film between the two processing surfaces and then discharged from the processing surfaces.

5. The method for producing nanoparticles according to claim 2, wherein said first and second fluids are free of particles larger than the nanoparticles obtained by the production method.

6. The method for producing nanoparticles according to claim 1, wherein the volume-average particle diameter in the particle size distribution of the nanoparticles obtained by the production method is 1 nm to 200 nm.

7. The method for producing nanoparticles according to claim 6, wherein the nanoparticle dispersion containing nanoparticles is further stirred in the forced thin film between the two processing surfaces and then discharged from the processing surfaces.

8. The method for producing nanoparticles according to claim 6, wherein said first and second fluids are free of particles larger than the nanoparticles obtained by the production method.

9. The method for producing nanoparticles according to claim 1, wherein the nanoparticle dispersion containing nanoparticles is further stirred in the forced thin film between the two processing surfaces and then discharged from the processing surfaces.

10. The method for producing nanoparticles according to claim 9, wherein said first and second fluids are free of particles larger than the nanoparticles obtained by the production method.

11. The method for producing nanoparticles according to claim 1, wherein said first and second fluids are free of particles larger than the nanoparticles obtained by the production method.

12. A method for producing nanoparticles, comprising the steps of:

providing at least two kinds of fluids to be processed, comprising a first fluid and a second fluid, at least one of said at least two kinds of fluids including a liquid forming a continuous phase, another of said at least two kinds of fluids including a liquid forming a dispersed phase;

providing two processing surfaces capable of approaching to and separating from each other and rotating relative to each other;

maintaining a minute space between the processing surfaces by a balance between a force in the approaching direction and a force in the separating direction, including supply pressure of the fluid and pressure exerted between the rotating processing surfaces, said minute space constituting a first flow path;

introducing the first fluid into the minute space through the first flow path;

forming a forced thin film of the first fluid of laminar flow;

providing a second flow path different from the first flow path;

introducing the second fluid through the second path into the forced thin film of the first fluid of laminar flow;

mixing the first and second fluids under condition of laminar flow in the forced thin film; and obtaining a nanoparticle dispersion containing dispersed nanoparticles in the forced thin film through emulsification or emulsification and dispersion between the first and second fluids.

13. The method for producing nanoparticles according to claim 12, further comprising the step of providing a forced ultrathin film rotary processing apparatus comprising:

a fluid pressure imparting mechanism for imparting pressure to a fluid to be processed, at least two processing members of a first processing member and a second processing member, the second processing member being capable of approaching to and separating from the first processing member, and a rotation drive mechanism for rotating the first processing member and the second processing member relative to each other, wherein at least two processing surfaces of a first processing surface and a second processing surface are provided in a position of the processing members facing each other, wherein each of the processing surfaces constitutes part of a sealed flow path through which the fluid under the pressurized pressure is passed, wherein two or more fluids to be processed are uniformly mixed between the processing surfaces, wherein of the first and second processing members, at least the second processing member is provided with a pressure-receiving surface, and at least part of the pressure-receiving surface is comprised of the second processing surface, wherein the pressure-receiving surface receives pressure applied to the fluid by the fluid pressure imparting mechanism thereby generating a force to move in the direction of separating the second processing surface from the first processing surface, and the two or more fluids to be processed are passed between the first and second processing surfaces capable of approaching to and separating from each other and rotating relative to each other, whereby the fluids to be processed form the forced thin film and simultaneously pass between the processing surfaces, to obtain the nanoparticles while the fluids to be processed are stirred and mixed in the forced thin film between the processing surfaces.

14. The method for producing nanoparticles according to claim 13, wherein said first and second fluids are free of particles larger than the nanoparticles obtained by the production method.

15. The method for producing nanoparticles according to claim 12, wherein at least one opening leading to the second flow path is arranged in at least either of the two processing surfaces.

16. The method for producing nanoparticles according to claim 12, wherein the volume-average particle diameter in the particle size distribution of the nanoparticles obtained by the production method is 1 nm to 200 nm.

17. The method for producing nanoparticles according to claim 12, wherein the nanoparticle dispersion containing nanoparticles is further stirred in the forced thin film between the two processing surfaces and then discharged from the processing surfaces.

18. The method for producing nanoparticles according to claim 12, wherein said first and second fluids are free of particles larger than the nanoparticles obtained by the production method.

19. The method for producing nanoparticles according to claim 12, further comprising the step of providing a forced ultrathin film rotary processing apparatus comprising:
   a fluid pressure imparting mechanism for imparting pressure to a fluid to be processed,
   at least two processing members of a first processing member and a second processing member, the second processing member being capable of approaching to and separating from the first processing member, and
   a rotation drive mechanism for rotating the first processing member and the second processing member relative to each other,
   wherein at least two processing surfaces of a first processing surface and a second processing surface are provided in a position of the processing members facing each other,
   wherein each of the processing surfaces constitutes part of a sealed flow path through which the fluid under the pressurized pressure is passed,
   wherein two or more fluids to be processed are uniformly mixed between the processing surfaces,
   wherein of the first and second processing members, at least the second processing member is provided with a pressure-receiving surface, and at least part of the pressure-receiving surface is comprised of the second processing surface,
   wherein the pressure-receiving surface receives pressure applied to the fluid by the fluid pressure imparting mechanism thereby generating a force to move in the direction of separating the second processing surface from the first processing surface, and
   the two or more fluids to be processed are passed between the first and second processing surfaces capable of approaching to and separating from each other and rotating relative to each other, whereby the fluids to be processed form the forced thin film and simultaneously pass between the processing surfaces, to obtain the nanoparticles while the fluids to be processed are stirred and mixed in the forced thin film between the processing surfaces.

20. The method for producing nanoparticles according to claim 19, wherein said first and second fluids are free of particles larger than the nanoparticles obtained by the production method.

* * * * *